(12) United States Patent
Priess et al.

(10) Patent No.: US 10,290,053 B2
(45) Date of Patent: May 14, 2019

(54) FRAUD DETECTION AND ANALYSIS

(71) Applicant: GUARDIAN ANALYTICS, INC., Mountain View, CA (US)

(72) Inventors: Craig Priess, Mountain View, CA (US); Steve Schramm, Mountain View, CA (US)

(73) Assignee: Guardian Analytics, Inc., Mountain View, CA (US)

( * ) Notice: Subject to any disclaimer, the term of this patent is extended or adjusted under 35 U.S.C. 154(b) by 512 days.

(21) Appl. No.: 14/209,076

(22) Filed: Mar. 13, 2014

(65) Prior Publication Data
US 2015/0026027 A1  Jan. 22, 2015

Related U.S. Application Data

(63) Continuation-in-part of application No. 12/483,887, filed on Jun. 12, 2009, now Pat. No. 10,115,111, and
(Continued)

(51) Int. Cl.
*G06Q 20/40* (2012.01)
*G06Q 10/04* (2012.01)
(Continued)

(52) U.S. Cl.
CPC ............. *G06Q 40/00* (2013.01); *G06Q 10/04* (2013.01); *G06Q 10/067* (2013.01); *G06Q 10/10* (2013.01);
(Continued)

(58) Field of Classification Search
None
See application file for complete search history.

(56) References Cited

U.S. PATENT DOCUMENTS 5,819,226 A  10/1998  Gopinathan et al.
6,430,305 B1  8/2002  Decker
(Continued)

FOREIGN PATENT DOCUMENTS

| CN | 102812488 A | 12/2012 |
|---|---|---|
| WO | 2009152465 A1 | 12/2009 |
| WO | 2014160296 A1 | 10/2014 |

OTHER PUBLICATIONS

Anderson et al., Detecting Unusual Program Behavior Using the Statistical Component of the Next-generation Intrusion Detection Expert System (NIDES), May 1995, SRI-CSL-95-06, 86 pages.
(Continued)

*Primary Examiner* — Joseph W. King
(74) *Attorney, Agent, or Firm* — The Webb Law Firm

(57) ABSTRACT

Systems and methods comprise a platform including a processor coupled to a database. Risk engines are coupled to the platform and receive event data and risk data from data sources. The event data comprises data of actions taken in a target account during electronic access of the account, and the risk data comprises data of actions taken in a accounts different from the target account. The risk engines, using the event data and the risk data, dynamically generate an account model that corresponds to the target account, and use the account model to generate a risk score. The risk score represents a relative likelihood an action taken in the target account is fraud. A risk application coupled to the platform includes an analytical user interface that displays for the actions in the target account at least one of the risk score and event data of any event in the account.

6 Claims, 39 Drawing Sheets

Related U.S. Application Data a continuation-in-part of application No. 12/483,963, filed on Jun. 12, 2009, and a continuation-in-part of application No. 13/632,834, filed on Oct. 1, 2012, now Pat. No. 8,862,526.

(60) Provisional application No. 61/779,472, filed on Mar. 13, 2013.

(51) Int. Cl.
| | | |
|---|---|---|
| *G06Q 40/00* | (2012.01) | |
| *G06Q 50/26* | (2012.01) | |
| *G06Q 10/06* | (2012.01) | |
| *G06Q 10/10* | (2012.01) | |
| *G06Q 40/02* | (2012.01) | |
| *G06Q 40/08* | (2012.01) | |

(52) U.S. Cl.
CPC ......... *G06Q 20/40* (2013.01); *G06Q 20/4016* (2013.01); *G06Q 40/02* (2013.01); *G06Q 40/08* (2013.01); *G06Q 50/26* (2013.01); *G06Q 50/265* (2013.01)

(56) References Cited

U.S. PATENT DOCUMENTS

| | | |
|---|---|---|
| 6,535,728 B1 | 3/2003 | Perfit et al. |
| 6,594,481 B1 | 7/2003 | Johnson et al. |
| 6,658,393 B1 | 12/2003 | Basch et al. |
| 7,006,992 B1 | 2/2006 | Packwood |
| 7,580,813 B2 | 8/2009 | Thiesson et al. |
| 7,853,533 B2 | 12/2010 | Eisen |
| 7,908,645 B2 | 3/2011 | Varghese et al. |
| 8,140,301 B2 | 3/2012 | Abe et al. |
| 8,204,833 B2 | 6/2012 | Mu et al. |
| 8,280,833 B2 | 10/2012 | Miltonberger |
| 8,769,684 B2 | 7/2014 | Stolfo et al. |
| 8,862,526 B2 | 10/2014 | Miltonberger |
| 8,887,281 B2 | 11/2014 | Honig et al. |
| 2002/0133721 A1 | 9/2002 | Adjaoute |
| 2002/0194119 A1 | 12/2002 | Wright et al. |
| 2004/0143753 A1 | 7/2004 | Hernacki et al. |
| 2004/0167893 A1 | 8/2004 | Matsunaga et al. |
| 2005/0149348 A1 | 7/2005 | Baum-Waidner |
| 2005/0222929 A1 | 10/2005 | Steier et al. |
| 2006/0041464 A1 | 2/2006 | Powers et al. |
| 2006/0149580 A1 | 7/2006 | Helsper et al. |
| 2006/0156389 A1 | 7/2006 | Brown et al. |
| 2006/0212386 A1 | 9/2006 | Willey et al. |
| 2007/0028301 A1 | 2/2007 | Shull et al. |
| 2007/0090181 A1 | 4/2007 | Varadarajan et al. |
| 2007/0112667 A1 | 5/2007 | Rucker |
| 2007/0220604 A1 | 9/2007 | Long |
| 2007/0239604 A1* | 10/2007 | O'Connell ............ G06Q 30/06 705/50 |
| 2008/0059631 A1 | 3/2008 | Bergstrom et al. |
| 2008/0109392 A1 | 5/2008 | Nandy |
| 2008/0208784 A1 | 8/2008 | Hill et al. |
| 2008/0270088 A1 | 10/2008 | Abe et al. |
| 2009/0089869 A1 | 4/2009 | Varghese |
| 2009/0098547 A1 | 4/2009 | Ghosh |
| 2009/0287623 A1 | 11/2009 | Martin et al. |
| 2010/0094767 A1 | 4/2010 | Miltonberger |
| 2010/0094768 A1 | 4/2010 | Miltonberger |
| 2010/0191513 A1 | 7/2010 | Listgarten et al. |
| 2010/0287099 A1 | 11/2010 | Liu et al. |
| 2011/0196791 A1 | 8/2011 | Dominguez |
| 2011/0238575 A1 | 9/2011 | Nightengale et al. |
| 2012/0239557 A1 | 9/2012 | Weinflash et al. |
| 2012/0310785 A1 | 12/2012 | Poulin |
| 2015/0026027 A1 | 1/2015 | Priess et al. |
| 2015/0310196 A1 | 10/2015 | Turgeman et al. |

OTHER PUBLICATIONS

Bolton et al., "Statistical Fraud Detection: A Review", Statistical Science, 2002, pp. 235-255, vol. 17:3.

Davison et al., "Predicting Sequences of User Actions", AAAI Technical Report WS-98-07, 1998, 8 pages.

Edge et al., "Towards a Proactive Fraud Management Framework for Financial Data Streams", Third IEEE International Symposium on Dependable, Autonomic and Secure Computing, 2007, pp. 55-62.

Garg et al., "Profiling Users in GUI Based Systems for Masquerade Detection", Proceedings of the 2006 IEEE, 2006, pp. 48-54.

Iglesias et al., "Creating Evolving User Behavior Profiles Automatically", IEEE Transactions on Knowledge and Data Engineering, 2012, pp. 854-867, vol. 24:5.

Manavoglu et al., "Probabilistic User Behavior Models", Proceedings of the Third IEEE International Conference on Data Mining, 8 pages.

Maxion et al., "Masquerade Detection Using Truncated Command Lines", Proceedings of the International Conference on Dependable Systems and Networks, 2002, 10 pages.

Maxion, "Masquerade Detection Using Enriched Command Lines", International Conference on Dependable Systems & Networks, 2003, San Francisco, CA, pp. 5-14.

Schonlau et al., "Computer Intrusion: Detecting Masquerades", Statistical Science, 2001, pp. 58-74, vol. 16:1.

Yung, "Using Feedback to Improve Masquerade Detection", ACNS 2003, LNCS 2846, 2003, pp. 48-62.

Zanero, "Behavioral Intrusion Detection", Springer-Verlag Berlin Heidelberg, 2004, pp. 657-666.

\* cited by examiner

FRAUD DETECTION AND ANALYSIS

RELATED APPLICATION

This application claims the benefit of U.S. Provisional Patent Application No. 61/779,472, filed Mar. 13, 2013.

This application is a continuation in part of U.S. patent application Ser. Nos. 12/483,887 and 12/483,963, both filed Jun. 12, 2009.

This application is a continuation in part of U.S. patent application Ser. No. 13/632,834, filed Oct. 1, 2012, now U.S. Pat. No. 8,862,526.

TECHNICAL FIELD

The disclosure herein relates generally to fraud detection and analysis. In particular, this disclosure relates to fraud detection using behavior-based modeling.

BACKGROUND

Tracking fraud in the online environment is a hard problem to solve. Fraudster tactics rapidly evolve, and today's sophisticated criminal methods mean online account fraud often doesn't look like fraud at all. In fact, fraudsters can look and behave exactly like a customer might be expected to look and behave. Accurate detection is made even more difficult because today's fraudsters use multi-channel fraud methods that combine both online and offline steps, any one of which looks perfectly acceptable but when taken in combination amount to a fraudulent attack. Identifying truly suspicious events that deserve action by limited fraud resources is like finding a needle in a haystack.

Consequently, customer financial and information assets remain at risk, and the integrity of online channels is at risk. Companies simply do not have the resources to anticipate and respond to every possible online fraud threat. Today's attacks expose the inadequacies of yesterday's online fraud prevention technologies, which cannot keep up with organized fraudster networks and their alarming pace of innovation.

Reactive strategies are no longer effective against fraudsters. Too often, financial institutions learn about fraud when customers complain about losses. It is no longer realistic to attempt to stop fraudsters by defining new detection rules after the fact, as one can never anticipate and respond to every new fraud pattern. Staying in reactive mode makes tracking the performance of online risk countermeasures over time more difficult. Adequate monitoring of trends, policy controls, and compliance requirements continues to elude many institutions.

The conventional technologies that hope to solve the online fraud problem, while often a useful and even necessary security layer, fail to solve the problem at its core. These solutions often borrow technology from other market domains (e.g. credit card fraud, web analytics), then attempt to extend functionality for online fraud detection with mixed results. Often they negatively impact the online user experience.

Conventional alternatives attempting to solve the online fraud problem include multi-factor and risk-based authentication solutions and fraud rule-, fraud indicator- and fraud pattern-based transaction monitoring solutions. The multi-factor and risk-based authentication solutions are ineffective because they typically result in high false detections (false positives) and return non-actionable information. Authentication failure and the need for challenge questions are not accurate indicators of fraud, and challenge rates are too high to be acted upon by limited fraud investigation resources. Their fraud detection capabilities (e.g., device identification, cookies, etc.) do not deliver the performance required and lack the rich behavior models and account history necessary to investigate suspicious activity. Recently fraudsters have demonstrated the ability to circumvent this technology completely.

Fraud rule-, fraud indicator- and fraud pattern-based transaction monitoring solutions are generally always behind the latest fraud techniques. These solutions merely react to known threats instead of recognizing new threats as they happen. They require complicated rules development and maintenance, known fraud "truth sets" for algorithm training, and ongoing "care and feeding" maintenance to try to remain current. As a result, these solutions are unable to spot new fraud types and patterns. Once a breach occurs, most return minimal detail on any given fraud instance, little context, limited characterization of individual user behavior, no visual analytics, less granular risk scoring, and minimal forensics.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 15 is an example AUI showing the Fraud Match view, under an embodiment.

DETAILED DESCRIPTION

Fraud prevention systems and methods are described below for use in the prevention of account fraud and identity theft, providing real-time risk management solutions that protect online and off-line channels. The fraud prevention systems and methods described herein, collectively referred to herein as the fraud prevention system (FPS), support the end-to-end online risk management process with behavior-based modeling and rich analytics. The FPS offers an analytics-based software solution that addresses the entire risk management lifecycle, as described in detail below.

The FPS of an embodiment connects data analytics, the online domain, and fraud expertise by providing predictive models of individual behavior, dynamically adjusting to identify anomalous and suspicious activity, and then providing actionable alerts and rich investigation capabilities as part of a comprehensive risk management solution. The FPS automatically detects new and evolving fraud threats without any requirement for fraud rule/pattern development or ongoing maintenance effort.

In the following description, numerous specific details are introduced to provide a thorough understanding of, and enabling description for, embodiments of the FPS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In the descriptions and examples provided herein, a user or customer is an owner of an account, a fraudster is any person that is not the user or account owner and an analyst or employee is the user of the FPS system.

Figure 1:
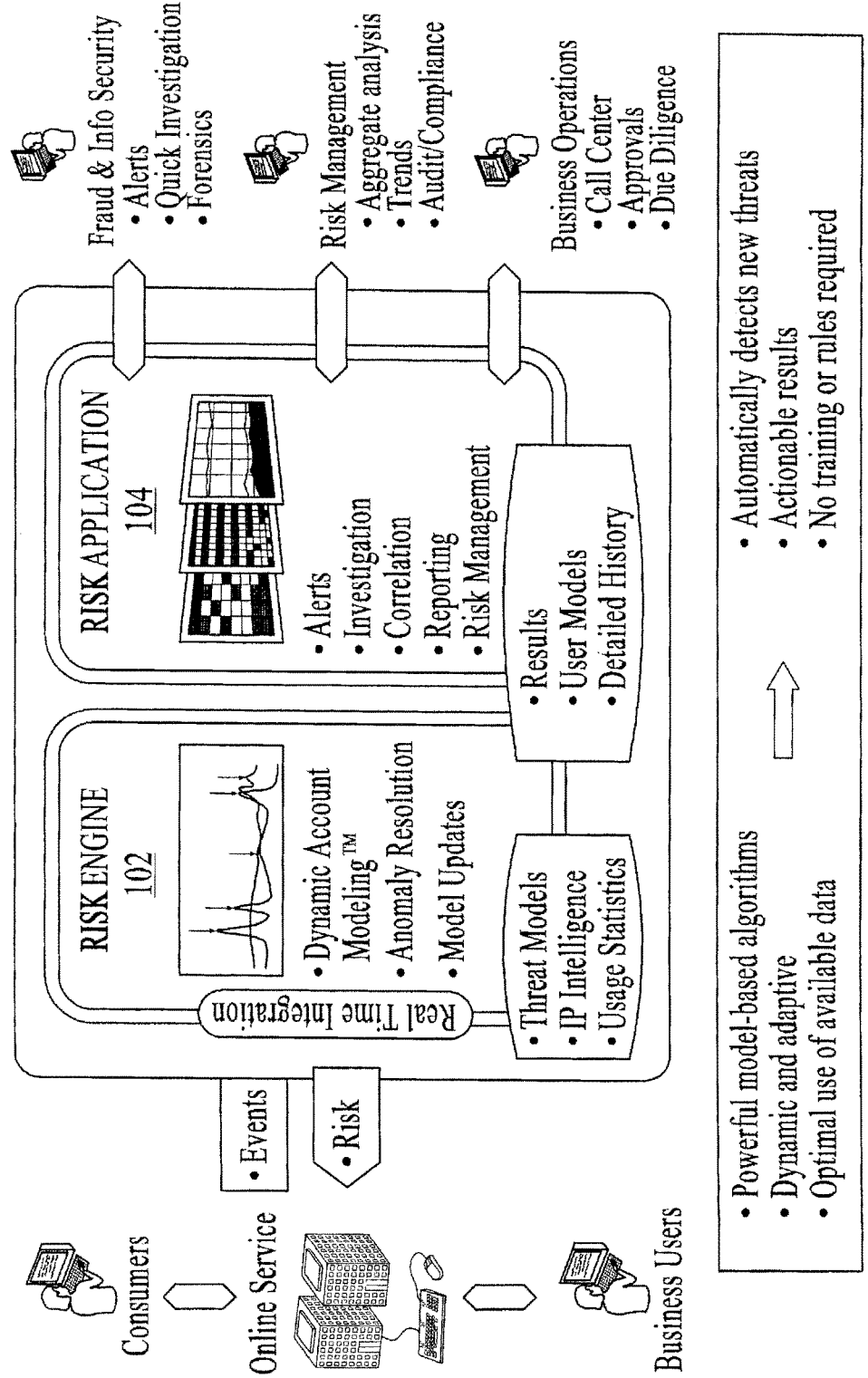
FIG. 1 is a block diagram of the Fraud Prevention System (FPS), under an embodiment.

FIG. 1 is a block diagram of the FPS 100, under an embodiment. The FPS 100 includes a Risk Engine 102 coupled to a Risk Application 104. The Risk Engine 102 includes or hosts applications, using predictive models of individual online customer behavior along with analytics that together detect fraud and minimize false positives. Unlike conventional approaches, the Risk Engine applications include real-time Dynamic Account Modeling that automatically detects new fraud attacks without requiring rules development or algorithm training. The Risk Application 104 features a visual analytic interface to aid investigation, resolution and risk monitoring. The visual analytic interface included in and/or coupled to the Risk Application 104 is also referred to herein as the analytical user interface (AUI). Going beyond simple alerts, the Risk Application 104 delivers analysts high-fidelity risk scores and extensive contextual information behind the risk score to support comprehensive analysis and investigation.

The Risk Engine 102 of an embodiment detects new and emerging fraud schemes using predictive models of individual online customer behavior and, as such, it differentiates normal user behavior from suspicious activity. The Risk Engine 102 may use fraud models based on known information about fraud threats when available, but is not dependent on knowing detailed fraud patterns or pre-defined fraud rules. To ease integration with the customer's online channel, the Risk Engine 102 features both a real-time API and file-based batch controller for wider integration and deployment options.

The Risk Engine 102 includes Dynamic Account Modeling, as described herein. The Dynamic Account Modeling, also referred to herein as "predictive modeling" or "modeling", uses predictive models of each individual online user's behavior. Because the Risk Engine 102 is not dependent on pre-defined fraud rules and automatically detects anomalous behavior, new threats are detected as they occur. Furthermore, the Risk Engine 102 easily handles real world situations such as changing user and fraudster behavior, the use of proxies, corporate firewalls, dynamic IP addresses, and upgrades to customer hardware and software. The advanced statistical models of the Risk Engine are based on probabilities that dynamically adjust to individual user behavior, recognizing that every user behaves differently and what might be unusual for one user may be normal for another.

The Risk Application 104 provides a visual analytic interface to aid investigation, resolution and risk monitoring. Components of the Risk. Application 104 display detailed views of online account activity from customer sessions with fine-grained risk scoring, as described in detail herein.

The interactive configuration of the Risk Application 104 enables use by any employee involved in fraud prevention, including fraud analysts, IT security personnel, risk management analysts, online channel analysts, or even customer-facing employees. The Risk Application 104 functions include, but are not limited to, alert management, investigation and forensics, process management, and performance measurement, each of which is described in detail below.

The alert management function of the Risk Application 104 includes highly accurate risk score alerts that use adjustable thresholds to pinpoint only the most suspicious activity, isolating compromised accounts. High fidelity scoring allows fraud teams to optimize their time and effort by ensuring the right investigative priorities. This intuitive, actionable information focuses anti-fraud efforts.

The investigation and forensics function of the Risk Application 104 provides visual tools to scrutinize suspicious events with sophisticated investigation tools. The application returns session-specific context and detailed customer history to aid investigation. It detects coordinated attacks, correlating activity across accounts. Other business operations can leverage detailed account histories and customer activity to aid in the risk assessment of offline transactions.

The process management function of the Risk Application 104 includes case management tools that allow investigators to track any incident, manage related workflows, and analyze fraud case histories on an individual or aggregate basis.

The performance measurement function of the Risk Application 104 measures and reports on the effectiveness of fraud controls trended over time, increasing the risk management organization's understanding of risk levels. Metrics track risk trends, aggregate analysis across accounts, and aid compliance directives with auditable results.

Figure 2A:
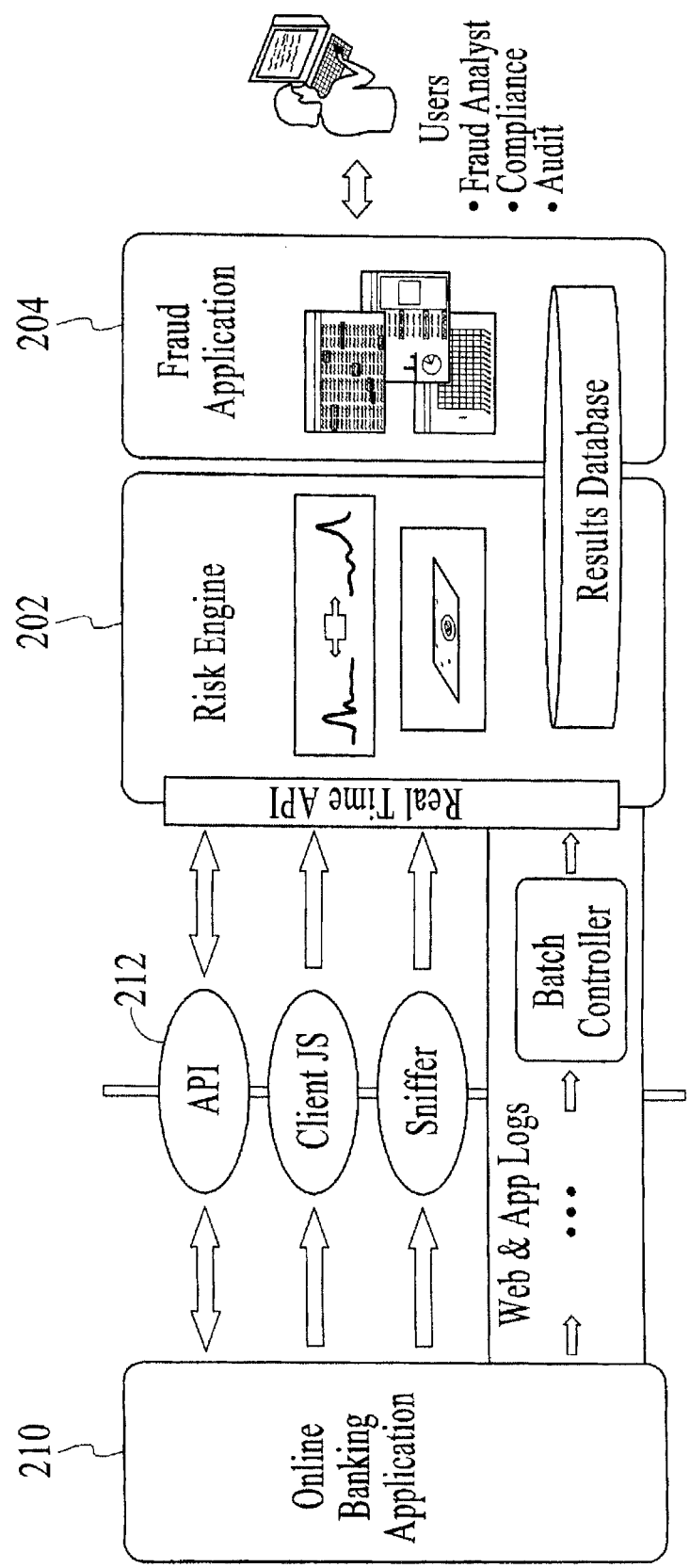
FIGS. 2A and 2B show a block diagram of FPS integration with an online banking application, under an embodiment.
Figure 2B:
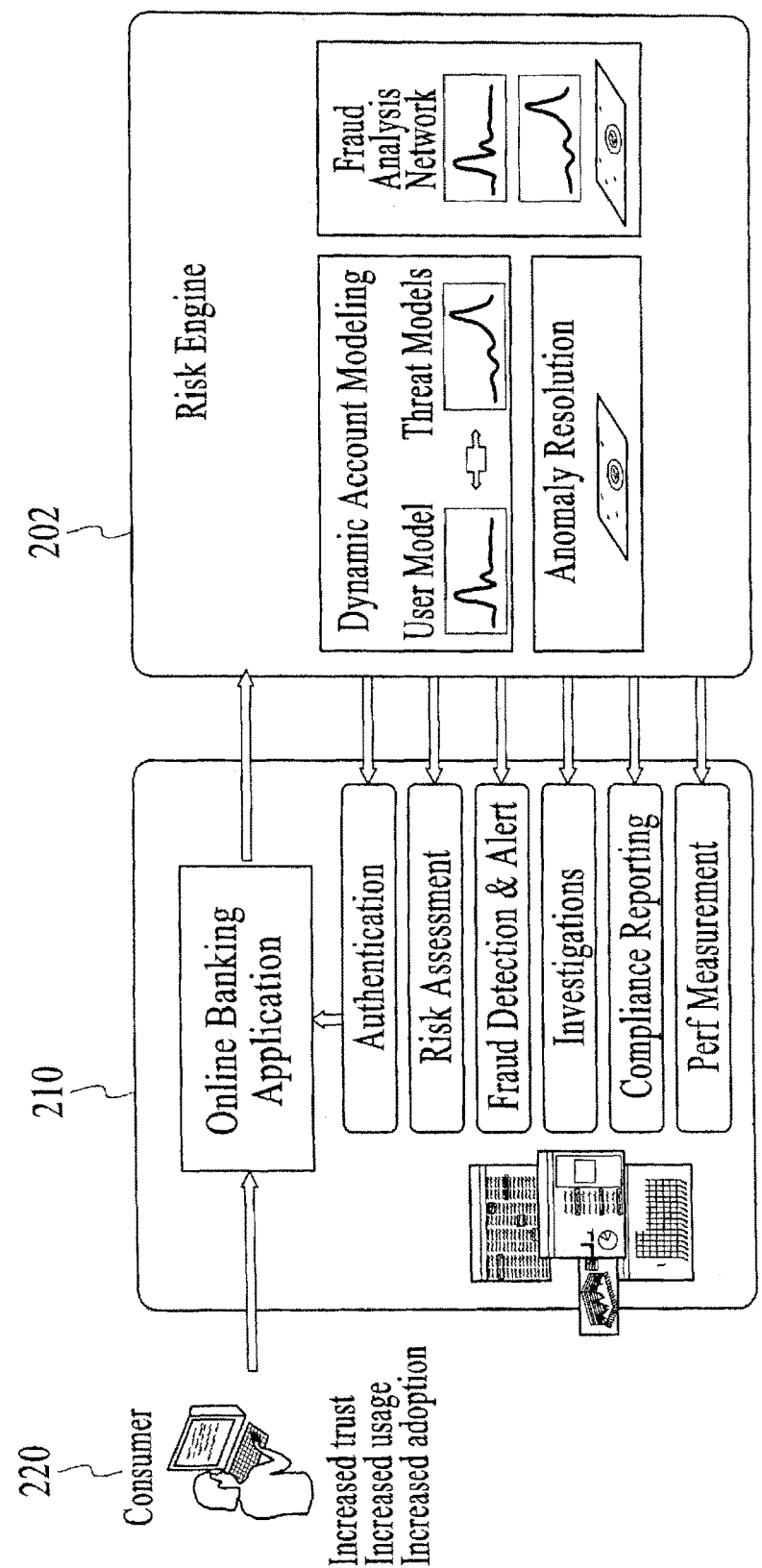

The FPS of an embodiment is used to prevent one or more of online fraud, off-line fraud, and multi-channel fraud. As one example, FIGS. 2A and 2B show a block diagram of FPS integration with an online banking application, under an embodiment. In this example, the Risk Engine 202 is coupled to the online banking application 210 using a real-time application programming interface (API) 212 and/or one or more applications (e.g., authentication, risk assessment, fraud detection and alert, investigations, compliance reporting, performance measurement, etc.) as appropriate to a configuration of the Risk Engine 202 and/or the online banking application 210. The FPS can be integrated with the online application 210 through a real time feed of event information or by processing log files that contain event information. As described above, the Risk Application 204 (labeled as the Fraud Application 204 in this example) functions to perform one or more of alert management, investigation and forensics, process management, and performance measurement, to name a few.

The user or "consumer" 220 in this example logs in to the online banking system 210 and uses the online banking system 210 to perform events (e.g., check account balance, view check images, transfer funds, etc.) in his/her account. The FPS comprises a risk engine 202 coupled to a risk application 204, as described herein. The risk engine 202 is a real-time event processor that receives data of user events or a set of events. The risk engine 202 also stores the user account model for the particular user. The risk engine 202 calculates a risk score using the event data and the user account model. The risk engine 202 uses the risk score and details of the observed event to update the user account model, and stores the updated user account model for use in evaluating the next subsequent set of event data (of a session) of the user. The risk engine 202 also transfers the risk score to the online banking application 210. The risk application 204 also provides alerts and allows authorized personnel to perform correlations, reporting, and investigations using the event data.

Figure 3:
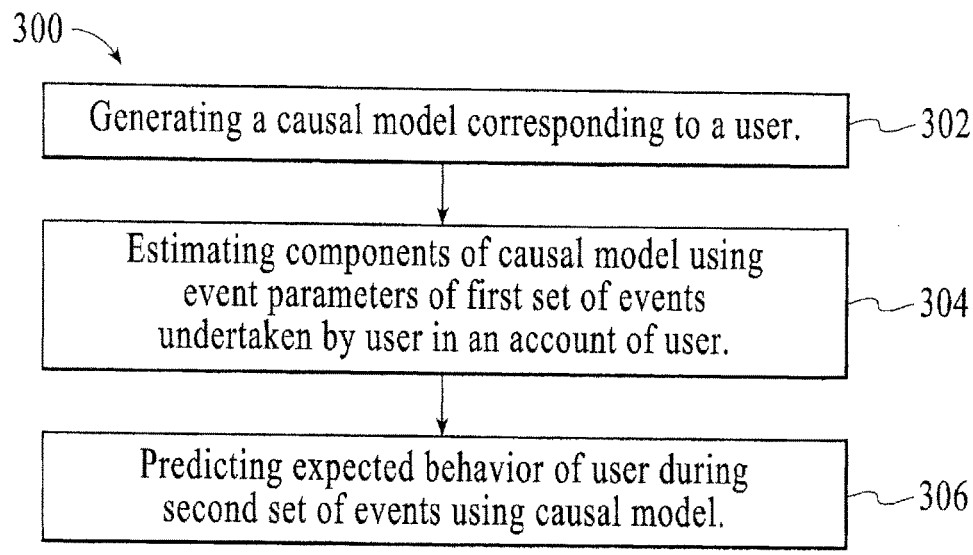
FIG. 3 is a flow diagram for a method of predicting expected behavior using the FPS, under an embodiment.

Regardless of physical system configuration, the FPS functions to detect and prevent fraud using behavior-based models that correspond to a particular user's behavior. As one example, FIG. 3 is a flow diagram for a method 300 of predicting expected behavior using the FPS, under an embodiment. Operations begin by dynamically generating 302 a causal model corresponding to a user. Components of the causal model are estimated 304 using event parameters of a first set of events undertaken by the user in an account of the user. Expected behavior of the user is predicted 306 during a second set of events using the causal model.

The FPS is configured and functions to prevent online fraud, off-line fraud, and multi-channel fraud. More specifically, the online fraud and off-line fraud includes account takeover fraud, which is when someone steals the account access credentials (username, password, PIN, etc.) of a user or account owner and then masquerades as that user and accesses account. Multi-channel fraud includes all channels through which a user interacts with his/her bank or accesses bank accounts (e.g., ATM, call center, live branch visit, etc.). An example of multi-channel fraud is when someone steals account access credentials, accesses the account online and changes profile information or gets information about the account owner (e.g., account balances, account numbers, signature from check images, etc.), and then commits fraud via other channels (check fraud by forging signature) using information gained via account access. This is an example where the financial fraud occurs off-line, but it started online with fraudster accessing user's account using stolen access credentials.

An event as used herein comprises an online event, an offline event, and/or a multiple-channel event. Consequently, the first set of events comprises at least one of online events, offline events, and multiple channel events. The second set of events comprises at least one of online events, offline events, and multiple-channel events. The online events are events that can be undertaken via electronic access to the account.

For online events, an online event comprises one or more of a login event and an activity event. A set of events comprises a session, and a session is a sequence of related events. The sequence of related online events comprises a session login event and a termination event, and can include one or more activity events.

For offline events, an offline event comprises one or more of an account access event and an activity event. A set of events comprises a session, and a session is a sequence of related events. The sequence of related online events comprises an account access event and a termination event, and can include one or more activity events.

Multi-channel events include online and offline events. Therefore, multi-channel events include one or more of a login event, an account access event, and an activity event.

Figure 4:
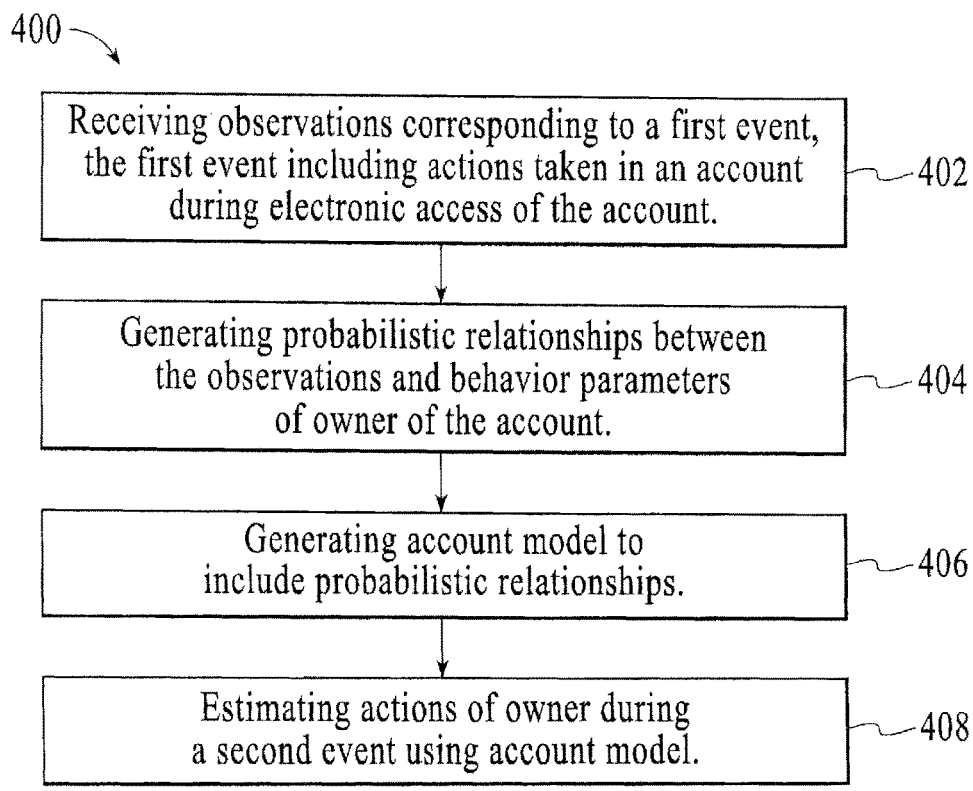
FIG. 4 is a flow diagram for a method of estimating actions of an account owner using the FPS, under an embodiment.

As another example of FPS operation, FIG. 4 is a flow diagram for a method 400 of predicting expected behavior of an account owner using the FPS, under an embodiment. Operations begin by receiving 402 observations corresponding to a first event. The first event of an embodiment includes actions taken in an account during electronic access of the account. Probabilistic relationships are generated 404 between the observations and derived behavior parameters of an owner of the account. Operations continue by generating 406 an account model to include the probabilistic relationships, and estimating 408 actions of the owner during a second event using the account model.

Figure 5:
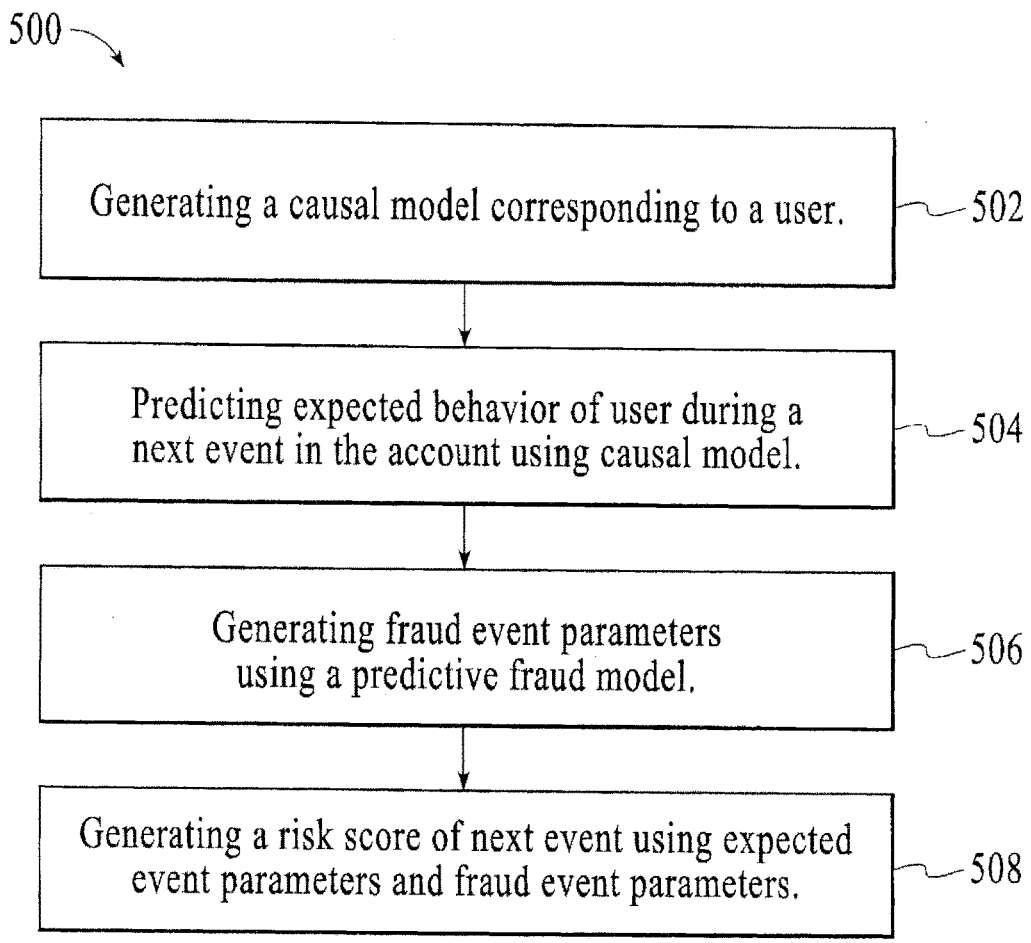
FIG. 5 is a flow diagram for a method of determining the relative likelihood a future event is performed by the user versus the fraudster using the FPS, under an embodiment.

As yet another example of FPS operation, FIG. 5 is a flow diagram for a method 500 of determining the relative likelihood a future event is performed by the user versus the fraudster using the FPS, under an embodiment. Operations begin by automatically generating 502 a causal model corresponding to a user. Generating the causal model comprises estimating components of the causal model using event parameters of a previous event undertaken by the user in an account of the user. Operations continue by predicting expected behavior 504 of the user during a next event in the account using the causal model. Predicting the expected behavior of the user includes generating expected event parameters of the next event. Operations continue by generating fraud event parameters 506 using a predictive fraud model. Generating the fraud event parameters assumes a fraudster is conducting the next event, the fraudster being any person other than the user. Operations continue by generating a risk score 508 of the next event using the expected event parameters and the fraud event parameters. The risk score indicates the relative likelihood the future event is performed by the user versus the fraudster.

Figure 6:
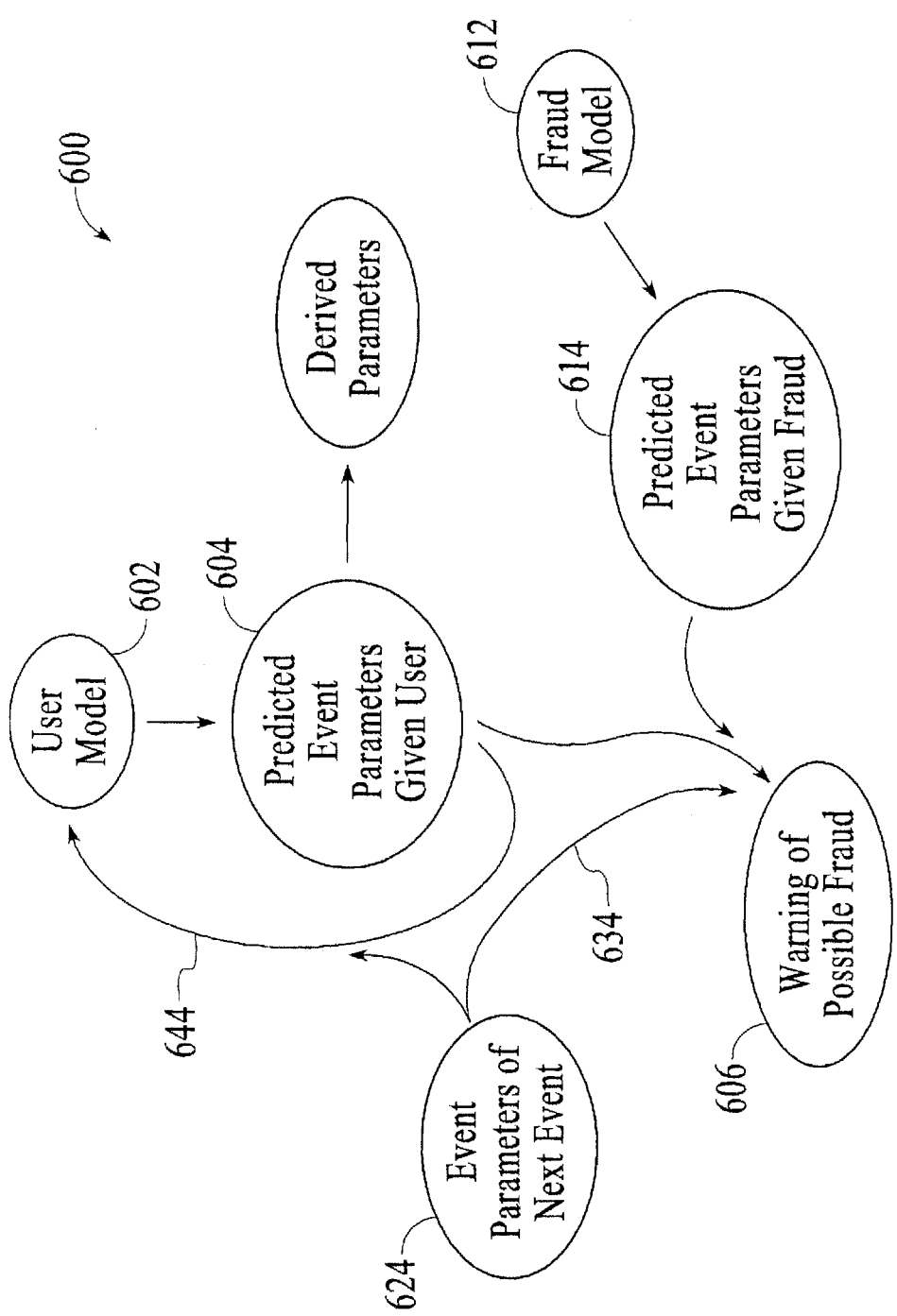
FIG. 6 is a flow diagram for using the FPS to generate warnings of possible fraudulent activity, under an embodiment.

FIG. 6 is a flow diagram for using the FPS to generate warnings 600 of possible fraudulent activity, under an embodiment. Operations begin by generating a predictive user model 602 corresponding to a user. The predictive user model 602 includes numerous probability distributions representing event parameters observed during a first event in an account of the user. Predicted event parameters 604 are generated using the predictive user model 602. The predicted event parameters 604 are expected to be observed during a second event 624 in the account, where the second event follows the first event in time. Generation of the predicted event parameters 604 includes generating a first set of predicted probability distributions that represent the predicted event parameters under an assumption that the user is conducting the second set of online events.

A second set of predicted probability distributions is generated using a predictive fraud model 612. The second set of predicted probability distributions represents expected fraud event parameters 614 and assumes a fraudster is conducting the second set of online events, where the fraudster is any person other than the user. A comparison 634 is made between actual event parameters of the second event 624 to the predicted event parameters 604 and 614 during the second event, and a warning 606 generated when the actual event parameters 624 appear to be initiated by a person other than the user. The warning 606 comprises generating a risk score using information of the predicted event parameters 604, but the embodiment is not so limited. The user model 602 is updated 644 using information of the event parameters of the second event 624.

Conventional fraud detection is based on pre-specified rules, identified fraud patterns, or taking known fraud and processing it using supervised learning techniques, as described above. Conventional fraud detection is ineffective, in online fraud for example, because online fraud is very dynamic and technology development for conducting fraud is very dynamic and constantly changing. Also, activity associated with online fraud often does not look suspicious (e.g., viewing account information, check images, etc.). This makes it very difficult to craft rules to detect fraud because fraud can be very subtle and is constantly changing.

As opposed to attempting to determine exactly what fraud looks like or to precisely model fraud and then compare this model to a normal (average) user, embodiments of the FPS described herein instead analyze each individual user and the exact behavior of that user. This is more effective because the behavior of each user is a very small subset of the behavior included in a modeling of average behavior of many different users. Thus, the particular online banking activities or behavior typically observed in a single user (e.g., login from Palo Alto, Calif., login using a particular computer, login using a particular internet service provider (ISP), perform same types of activities (e.g., look at account balance, view check images, etc.)) can be used to establish an online behavior model of the user which is very specific and unique to each particular user. This makes fraud easier to detect because the fraudster does not know how the user behaves online so it is very difficult for the fraudster to appear like the account owner. Notably, what may be normal for an "average" user may be very unusual for a specific user. Of equal importance, even behavior that might be considered "unusual" for the "average" user may be very normal for a particular individual. Both of these cases are therefore very distinctive and useful in distinguishing between legitimate and fraudulent activity.

The FPS uses a predictive model of each individual user to detect online fraud. This real-time or dynamic predictive modeling, also referred to herein as Dynamic Account Modeling, is an application running on or under the Risk Engine of an embodiment. Exact behavior of the fraudster becomes less important using this approach because the analysis focuses more on the types of things users generally do instead of detecting specific known fraud patterns. Unlike a system in which fraud data of previous fraud activities is used to train a system or to generate rules, the FPS does not require rules or training. Thus, the FPS can detect new types of fraud even though this new fraud may not have been seen before because it is based on the user's online behavior. This results in high detection rates and low false alarm rates.

Generally, the FPS uses two types of models in preventing fraud. The FPS models behavior of a specific user through a predictive user model (PUM) that is used to calculate the probability of an observed event given the specific user. The FPS models behavior of fraudsters through a predictive fraud model (PFM) that is used to calculate the probability of an observed event given a fraudster. The probabilities are then used to calculate a risk score for a next occurrence of the event to which the probabilities correspond.

The models of the FPS described herein are supported using two hypotheses for each event: a first hypothesis assumes the observed event is by the real user associated with the specific account, and the second hypothesis assumes that the observed event is performed by a fraudster. An event includes, for example, an account login, and/or any particular activity taken in the account while logged into the account. Each event includes a set of parameters including, but not limited to, IP address and identification data of the computer used during the event to name a few.

The FPS generates and maintains the PUM, a specific causal model for each user, under the first hypothesis, and then uses the PUM to predict the expected actions of that individual user to which the model corresponds. The FPS generates the PUM for a user by estimating a probability function of a user based on previous user activity and also a normal expectation of how users behave. The FPS starts with a generic "normal" user activity model when no prior activity information is available for a user. As activity data is gathered for the user from events or activities taken by the user, parameters of the user model are estimated over time based on gathered observations of the user so that, at any point in time, an accurate PUM is available for a user. The PUM is thus developed recursively over time. User events are scored as they happen, and this provides a risk score for an event. Event parameters are then used to update the user model, and the updated user model is used to determine a risk score for the next subsequent user event.

The PUM is built based on observed behavior of the user along with a statistical analysis of users in general. The structure of the PUM is pre-formulated so that there is no requirement to discover the structure of the model but rather to estimate unknown parameters of the model. The PUM development uses a causal model, represented or formulated in an embodiment as a Bayesian network, that relates (probabilities of) real-world derived parameters (e.g., location of the user (country, state, city), type of computer being used for the event, activities detected during an online session) to observable parameters of the session (e.g., IP address, HTTP header information, page views, etc.). The IP address provides an estimate of location information like country, state, city, network block, and internet service provider. The HTTP header provides information of the operating system (OS), user agent string, referrer string, and browser type of a computer used for an event. Therefore, the behavior of each user can be modeled using probability distributions of observable parameters of sessions and events of the user. The Bayesian network is decomposed into individual parameters and the relationships between the parameters. Distributions and conditional distributions are based on prior, observed data, "new mode" probability models, etc.

The user is related to the actual observable parameters (including time, IP address, browser, OS, etc.) corresponding to an event. The FPS uses a causal model based on user's observed behavior to predict future behavior. The PUM is therefore the structure formed by the real world parameters used or selected, the observed event parameters and the relationships between the real world parameters and observed event parameters.

The use of the causal model for specific users allows the FPS to detect fraudulent activity and events without the need for specific known rules, patterns, and/or indicators and without the need for training data of known fraud cases. Therefore, the FPS can detect all fraud, both known and unknown, including fraudulent activity that has never before been seen.

A PFM is generated under the second hypothesis of an embodiment. The PFM generally uses all other session or event data of all other online account holders who are not the user. This data is used to generate a probability of users at large. These probabilities can then be adjusted using known information of prolific fraudsters (e.g., that the rate of fraud coming from Nigeria is ten times higher than other (low-risk) countries), but this is not necessary. This is different from conventional fraud systems, which rely on information about fraud through the use of new and/or additional rules, indicators or patterns. In contrast, the FPS uses at large online activity to develop the PFM, a causal model that represents fraudsters (everyone not a particular account owner), and then adjusts the probabilities or expectations of the PFM based on how fraudsters behave. Thus the FPS is unique in how it incorporates information of fraudulent activities.

The models of an embodiment include the PUM, which is a joint probability distribution, as described above. The PUM is a causal model. The net effect or result of the PUM is a probability of the observed parameters or event given the specific user to which the PUM corresponds. The PUM is therefore a predicted probability distribution of event parameters for the next event given the specific user to which the PUM corresponds.

The FPS models also include the PFM, as described above, which is a joint probability distribution. The PFM is also a causal model. The net effect of the PFM is a probability of the observed parameters or event given a fraudster. The PFM is therefore a predicted probability distribution of event parameters for the next event given fraud.

A risk score is calculated for a next event using the results of the PUM and PFM. The next event is an event or action taken in a user's account that appears to be initiated or taken by the account owner. The risk score of the next event is determined or calculated by taking the probability of the observed event given fraud, as determined using the PFM, and dividing it by the probability of the observed event given the specific user, as determined using the PUM. The risk score can be used to generate alerts or warnings for the next event.

The FPS uses recursive model building to generate the PUM. The PUM does not represent the full detail of every event ever seen in the account of the user but, instead, it includes individual probability distributions for each of a number of particular parameters of one or more observed events. Each probability distribution of an observed parameter is a statistical distribution for the parameter over the observed events corresponding to the account. The individual probability distributions for the parameters are combined to form a joint probability distribution that is the PUM.

Generally, the PUM is generated by collecting event data in the form of observed parameters and, after each event, the PUM for the user to whom the events correspond is updated based on the observed parameters. The PUM then allows for propagation of the distribution of observed event parameters into a distribution of behavior event parameters, where the propagation includes the distribution of the observed parameters plus the prior model.

An example of model use begins with someone, either a user or fraudster, initiating an observed event. An observed event includes, for example, someone logging in to the user's account and/or any activity taken during an online session (e.g., checking account balance, transferring funds between accounts, viewing account information, etc.). The observed event may or may not be an online event. Each event includes or corresponds to one or more event parameters. Event parameters are directly observable parameters, or raw data that can be measured or observed, of an event. Examples of event parameters include, but are not limited to, network information that includes parameters of the network by which an online event is occurring (e.g., IP address, etc.) (country, state, city are derived parameters derived from network information; this is implied information in contrast to actual observed data of an event), user agent string (OS and browser of device or computer used for the event are derived parameters derived from user agent string; this is implied information in contrast to actual observed data of an event), and event or session time (timestamp), to name a few.

The models (e.g., PUM and PFM) of an embodiment are used to predict the actual observed event parameters for the next event given the model of the user's behavior during past events. Derived parameters, which are not directly observable, are then derived or propagated from the PUM and the observable parameters. Examples of derived parameters include, but are not limited to, geographic location (e.g., country, state, city, etc.) of user at time of event, device being used for event (e.g., device type/model, device OS, device browser, software applications, etc.), interne service provider (ISP), and user's local time of day of event, etc. The causal model of an embodiment includes probability relationships between derived parameters and event (observable) parameters, and probability relationships between different derived parameters. An example of relationships between parameters can be that the country of the user (event parameter) can relate to the ISP (derived parameter), and the ISP can relate to a particular set of IP addresses (event parameter).

The causal model of an embodiment is represented as a Bayesian network (BN). The BN of an embodiment uses or includes conditional probability distributions to model or represent the relationships between parameters (relationship between different derived parameters, relationship between event parameters and derived parameters, etc.). The BN, as embodied in the PUM, is or represents the distribution of the derived parameters, the distribution of observed parameters and the relationships between the observed and derived parameters. The result output from the PUM is a predicted distribution of expected event parameters of a next event. The distribution of the expected event parameters is used to calculate the risk score. The PUM is generated as described below.

The PUM is used to predict the event parameters of the next event. The predicted event parameters include the predicted probability distribution of what might be observed during the next event. The PUM therefore generates the predicted distribution of the event parameters for the next event. The next event is then observed and information of the observed event parameters is collected or received. Given the observed event parameter values (e.g., actual IP address), and the predicted probability distribution of all possible IP addresses that might be used (from the PUM, probability of the actual IP address given the user), the result is the probability of a specific observed event parameter (e.g., IP address) given the PUM. This is performed across all parameters.

The causal model of an embodiment therefore generates the likelihood of observing the observed parameter values given the current PUM (i.e., predicted distribution as defined by the PUM), and generates the likelihood of observing the observed parameter values given the current PFM (i.e., predicted distribution as defined by the PFM). The risk score is then calculated using these results, as described above.

As described herein, the PUM is generated by collecting event data in the form of observed parameters and, after each event, the PUM for the user to whom the events correspond is updated based on the observed parameters. The PUM then allows for propagation of the distribution of observed events into a distribution of behavior events, where the propagation includes the distribution of the observed parameters plus the prior model.

The update process updates the distribution of one or more observed parameters in the PUM to produce an updated PUM. The updated PUM therefore includes an updated expectation of one or more observed parameters in the form of an updated probability distribution relating to specific observed parameters. As an example, because a particular parameter (e.g., IP address (observed) in the US (location, derived parameter)) has been observed being used by the user during an event, this information is propagated back into the PUM to update the corresponding distribution so that, during the next subsequent event, there is a higher expectation that the same or similar parameter (IP address in the US) will be seen in the next event.

The model is updated periodically using actual observed event parameters since the last update of the model. The joint probability distribution of an embodiment is updated by updating the probability distributions for each observed parameter included in the model. The model update process of an embodiment is recursive and takes into account the last observed event, the previous user model (i.e., PUM), and the prior user model to name a few. The previous user model includes the PUM that was current for as of the last or most recent observed event. The prior user model includes the predicted probability distribution (i.e., PUM) before any events have been observed.

The model update process includes two alternatives. In a first embodiment of the update process, data of the current observed event is used to update the previous user model, and the prior user model is considered to be embedded in the previous user model and thus updated as part of the recursive process that updates the prior user model in response to each occurrence of an observed event.

In a second embodiment of the update process, the update process maintains an observed frequency distribution for each observed event parameter. Consequently, instead of updating the previous user model, each event parameter probability distribution is updated using data of the current observed event. The updated observed frequency distribution for each event parameter is then integrated with the prior user model to generate the updated PUM.

The probability distributions included in the prior model can initially be adjusted, prior to receiving any observed event data of the user, using general statistical information about users at large and/or data of the specific user collected from the user or from the user's account profile. For example, the probability distributions can be adjusted using uniform probability distributions. The probability distributions can also be adjusted using probability data corresponding to residence information of the user (e.g., US resident, and 1% of US residents use particular block of IP addresses). Furthermore, the probability distributions can be adjusted using financial institution data of the user (e.g., user is XYZ Bank customer, and 95% of XYZ Bank customers are in the US).

The fraud model (i.e., PFM) of an embodiment is similar to the PUM in that it is a predictive distribution based on observed parameters and derived parameters of events. This is in contrast to conventional rule-based systems that use specific indicators (rules) relating to fraud. The rules can be weighted, however, a weighting is not a probability distribution so these systems have absolutely nothing in common with the embodiments described herein.

Figure 7:
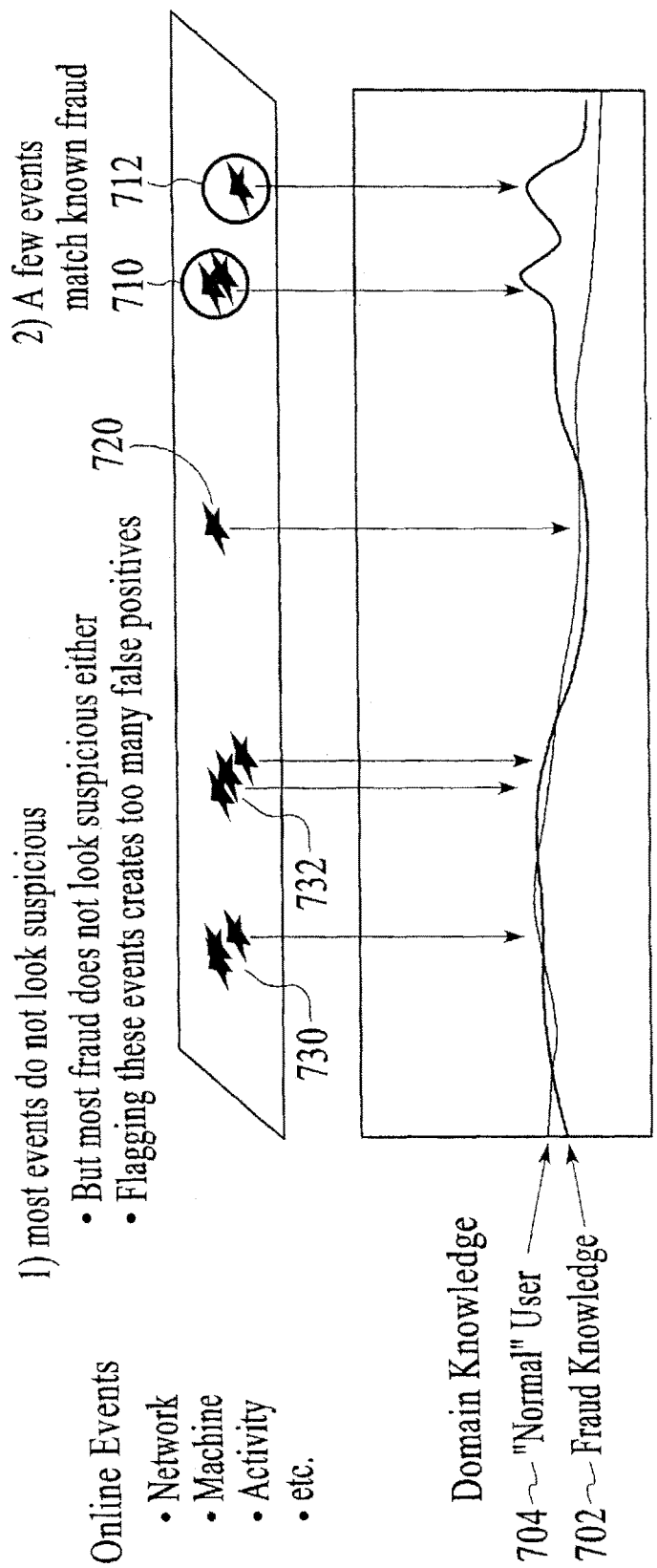
FIG. 7 shows the use of conventional fraud techniques ("fraud knowledge") applied to activities of a user ("normal user") under the prior art.
Figure 8:
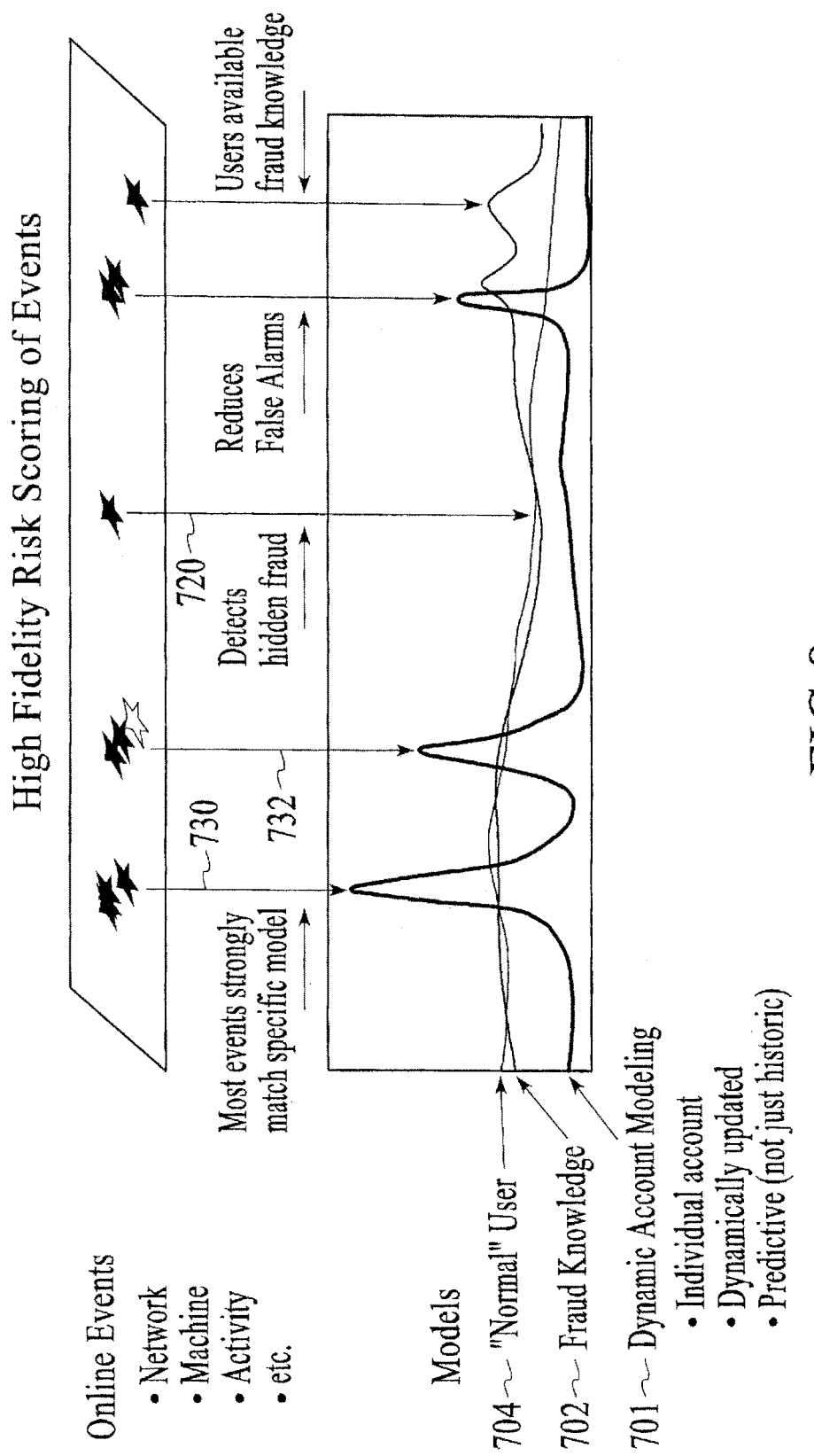
FIG. 8 shows the use of dynamic account modeling applied to activities of a user, under an embodiment.

FIG. 7 shows the difficulties and limitations of using conventional fraud techniques 702 (fraud knowledge 702) applied to activities of a user 704 (normal user 704) under the prior art. These conventional techniques, as described above, can detect some known fraud events 710 and 712, but can allow real fraud events 720 to go undetected while generating many false positives for events 730 and 732 that are not fraudulent activity. In contrast, FIG. 8 shows the use of dynamic account modeling 701 applied to activities of a user, under an embodiment. The dynamic account modeling 701 applies a predictive model 701 of the specific user against event activities of the user's account and, in so doing, detects previously hidden fraud 720 and reduces false alarms for events 730 and 732 that are not fraudulent activity.

The FPS of an embodiment includes a graphical interface for a user's account that shows account activity along with corresponding parametric data. The graphical interface is also referred to herein as an analytical user interface (AUI). The AUI displays for any event in the account at least one of the risk score and the event parameters, to name a few functions. The AUI comprises a horizontal axis representing time and a vertical axis representing the event parameters. The event parameters, as described above, include one or more of Internet Protocol (IP) data and Hypertext Transfer Protocol (HTTP) data. The IP data includes one or more of an IP address, IP address country, IP address city, IP network block, and internet service provider supporting an event. The HTTP data includes one or more of data of an operating system, a user agent string, a referrer string, and internet browser of a computer used for an event.

The AUI includes numerous columns, and each column represents at lease one event conducted in the account. The columns of an embodiment are arranged according to date. The AUI also includes numerous rows, and a set of rows represent event parameters of the events. Considering the rows and columns, the AUI includes numerous intersection regions, and each intersection region is defined by an intersection of a row and a column. The intersection region corresponds to an event parameter of at least one event. Furthermore, the intersection region includes color coding relating the event parameter to a corresponding probability of the account model. The color coding represents a relative likelihood ratio that the event parameter corresponds to the user.

The AUI also includes a risk row representing risk of the events. Each intersection region defined by the intersection of the risk row with a column corresponds to the risk score of at least one event corresponding to the column. The intersection region includes color coding relating the risk score to at least one event. The color coding represents a relative likelihood ratio that the user conducted the event.

Figure 9:
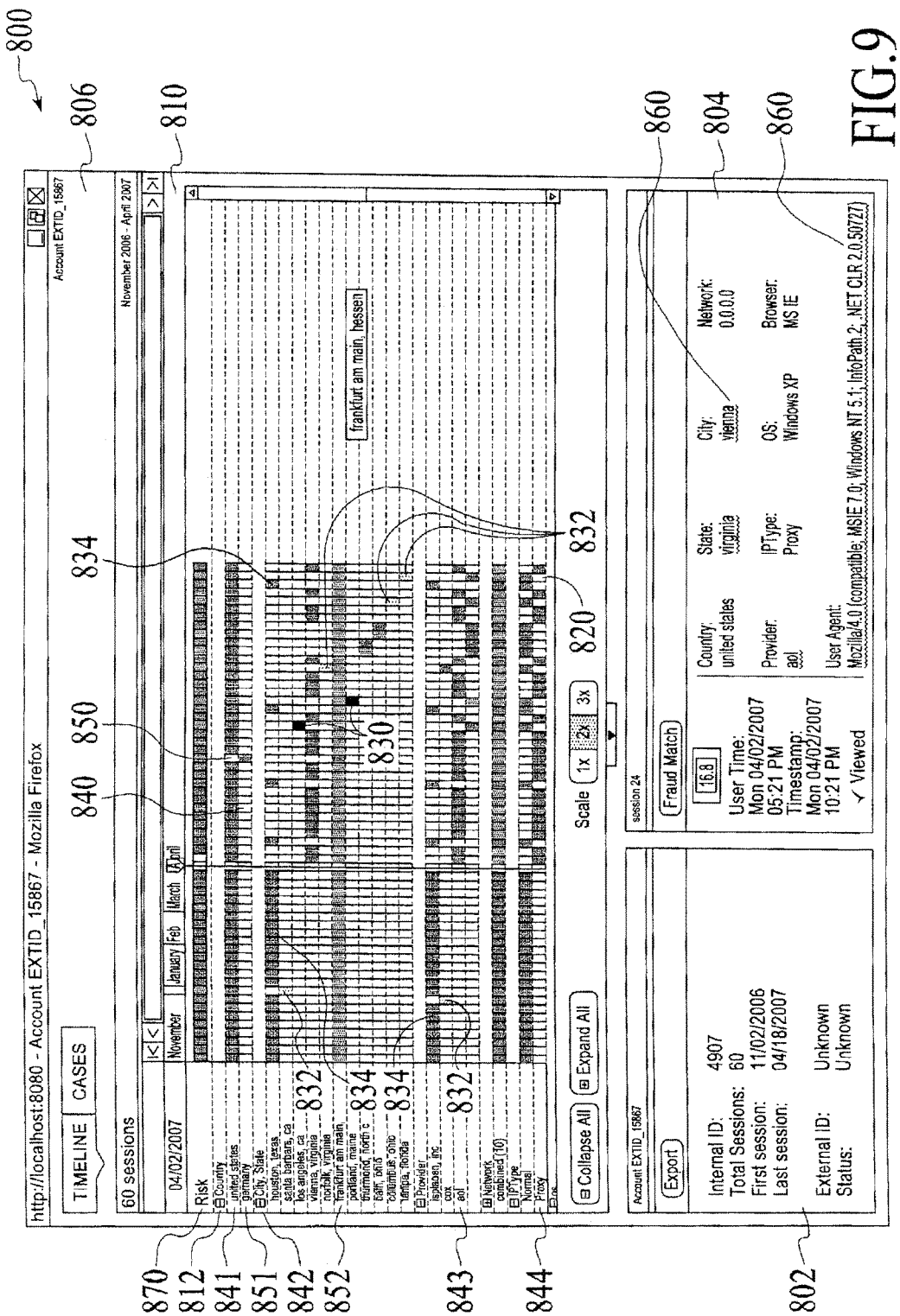
FIG. 9 is an example screen of the FPS graphical interface (AUI), under an embodiment.

FIG. 9 is an example screen 800 of the AUI, under an embodiment. One type of AUI screen includes one or more information portions 802-804 along with a graph portion 806. The graph portion 806 of the AUI includes a horizontal axis 810 and a vertical axis 812. The horizontal axis 810 represents time (e.g., date). The horizontal or time axis 810 can be modeled as weekdays and weekends, and each day can be subdivided by morning, afternoon, evening, for example, but the embodiment is not so limited. The vertical axis 812 of the AUI represents categories of parameters (e.g., country, city, state, internet service provider, network, IP type, etc.) along with all different parameter values historically observed for the user's activity in a category. Each column 820 of the AUI represents a user login event or user session organized by date. The AUI includes a color-coded bar 870 in a region of the display, and the color-coded bar is an overall risk column for the user to whom the display corresponds.

The AUI displays a color coding (e.g., red 830, yellow 832, green 834, etc.) representing thresholds corresponding to the component risk scores of each parameter of an event. The FPS models behavior, as described above, based on the fact that as more data is received tying a particular user to a particular parameter value (e.g., 98% of logins by Jane Doe are in US), it determines a probability that this particular parameter will be different for the particular user (e.g., what is the probability that Jane Doe logs in from Mexico). The predicted probability distribution of the model parameters become much tighter or narrower as more event data is collected from the user, and the colors displayed on the AUI relate to each parameter of the event and the relative model probabilities (fraud versus user) corresponding to that parameter.

For example, for event 840, the parameters for country (United States 841), City, State (Vienna, Va. 842), provider (AOL 843), and IP Type (proxy 844) can be coded green to show a high probability under the dynamic account modeling that the account owner is initiating the event. In contrast, for event 840 the parameters for country (Germany 851) and City, State (Frankfurt 852) can be coded red for an event to show a low probability under the dynamic account modeling that the account owner is initiating the event, while the parameters for provider (AOL 843) and IP Type (proxy 844) can be coded green for the same event to show a high probability under the dynamic account modeling that the account owner is initiating the event.

The information portions 802-804 of the AUI can be used to display a variety of parameters or data as appropriate to the FPS and any integrated application. For example, the AUI can display underlined parameter values 860 having an underline color (e.g., red, yellow, green, etc.) that correlates with the amount of risk associated with that particular parameter (e.g., Virginia (state) and Vienna (City) have a red underlining to indicate high probability of fraudster activity).

The adaptive nature of the FPS model is especially useful in situations where, for example, a user may travel frequently so that the parameters are frequently changing. The FPS dynamically adapts to this behavior so that the behavior is not consistently flagged as fraud, as would happen under conventional rule-based systems. Therefore, the model adapts over time using data that shows particular behavior (e.g., user in Denver) has been observed from a user (e.g., user logs in from Denver), so what is the probability that the same behavior (e.g., user logs in from Denver in a subsequent event) will be observed in the future from the same user.

Figure 10:
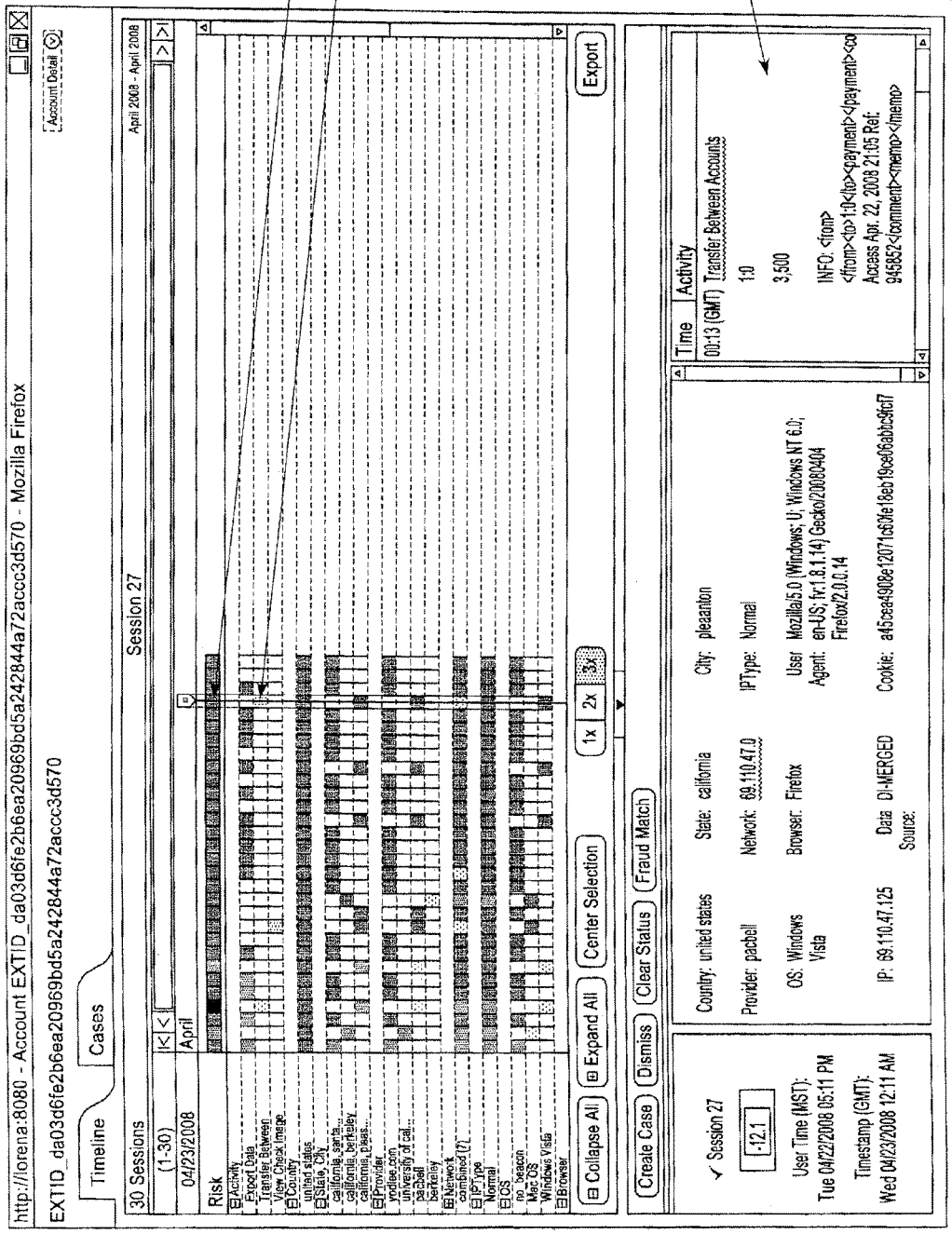
FIG. 10 shows a variation of the example screen (FIG. 9) of the FPS graphical interface (AUI), under an embodiment.

FIG. 10 shows a variation of the example screen (FIG. 9) of the AUI, wider an embodiment. Referring to this example screen, information from all related activity events from the same online session is shown on the timeline within the same column 1001 that represents the session. Summary information about what types of activities occurred in each session are indicated by a color coded bar 1002. The color, Red, Yellow or Green indicates the associated risk for the activities of that type for that particular session. On the same screen, detailed information about each activity within the selected session can also be shown in one or more information boxes or regions 1003 of the AUI.

If suspected fraudulent activity is indicated by the FPS, the Risk Application allows an analyst to perform a fraud match. The fraud match of an embodiment allows the analyst to search for other sessions across all institutional accounts having similar characteristics (e.g., sessions originating from Mexico, sessions with provider AOL, etc.) in an attempt to identify other instances of fraud.

The FPS fraud match enables a comparison between data of one session and all other data of an institution in order to identify all sessions having one or more similar parameters. Thus, institutions can use the fraud match function to identify other suspicious sessions with parameters that are similar or the same (e.g., ISP, country, machine, etc.) as a suspected fraud attack.

The FPS therefore can provide a risk assessment based on the overall activity of all users within an institution over a specified period of time (e.g., day, multiple days, week, etc.) in order to help the institution determine if it is under attack.

This is a fundamental difference in the FPS when compared to conventional systems, because the FPS takes a risk management approach versus the approach of conventional systems, which is to try and stop all fraud.

All features of the FPS work together to allow a financial institution, for example, to understand fraud instead of attempting to make a prefect binary decision on whether to block a transaction as fraud, which is futile. The FPS recognizes that the importance is to understand fraud so that fraud can be recognized earlier using observable parameters (related or translated to derived parameters) and losses minimized versus trying to block any suspicious activity, which if done imperfectly only leads to customer dissatisfaction and inconvenience when non-fraudulent transactions are flagged as fraudulent based on conventional rules-based approaches. From a risk management perspective, the fraud match application allows an institution to look at all data collected over time according to one or a defined set of criteria in order to see an overall percentage of fraudulent activity related to the criteria. This allows smarter decisions to be made, for example, because knowing that a very high percentage of traffic with a certain ISP is not fraudulent might prevent a decision to block all traffic from the ISP based on a high occurrence of fraudulent activity in a recent period of time.

The FPS components described herein (e.g., Risk Engine, Risk Application, Dynamic Account Models, etc.) can be components of a single system, multiple systems, and/or geographically separate systems. The FPS components can also be subcomponents or subsystems of a single system, multiple systems, and/or geographically separate systems. The FPS components can be coupled to one or more other components (not shown) of a host system or a system coupled to the host system.

The FPS of an embodiment includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers and other processor-based devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the FPS, and/or provided by some combination of algorithms. The FPS methods described herein can be implemented in one or more of software algorithm(s), programs, firmware, hardware, components, circuitry, in any combination.

The FPS components can be located together or in separate locations. Communication paths couple the FPS components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Following is a description of a fraud analysis example generated by the FPS using actual data of an account owner of a financial institution. The example is presented only to help describe operation of the FPS and are not intended to limit embodiments of the FPS to only the scope of these examples.

Fraud Analysis Example

Figure 11:
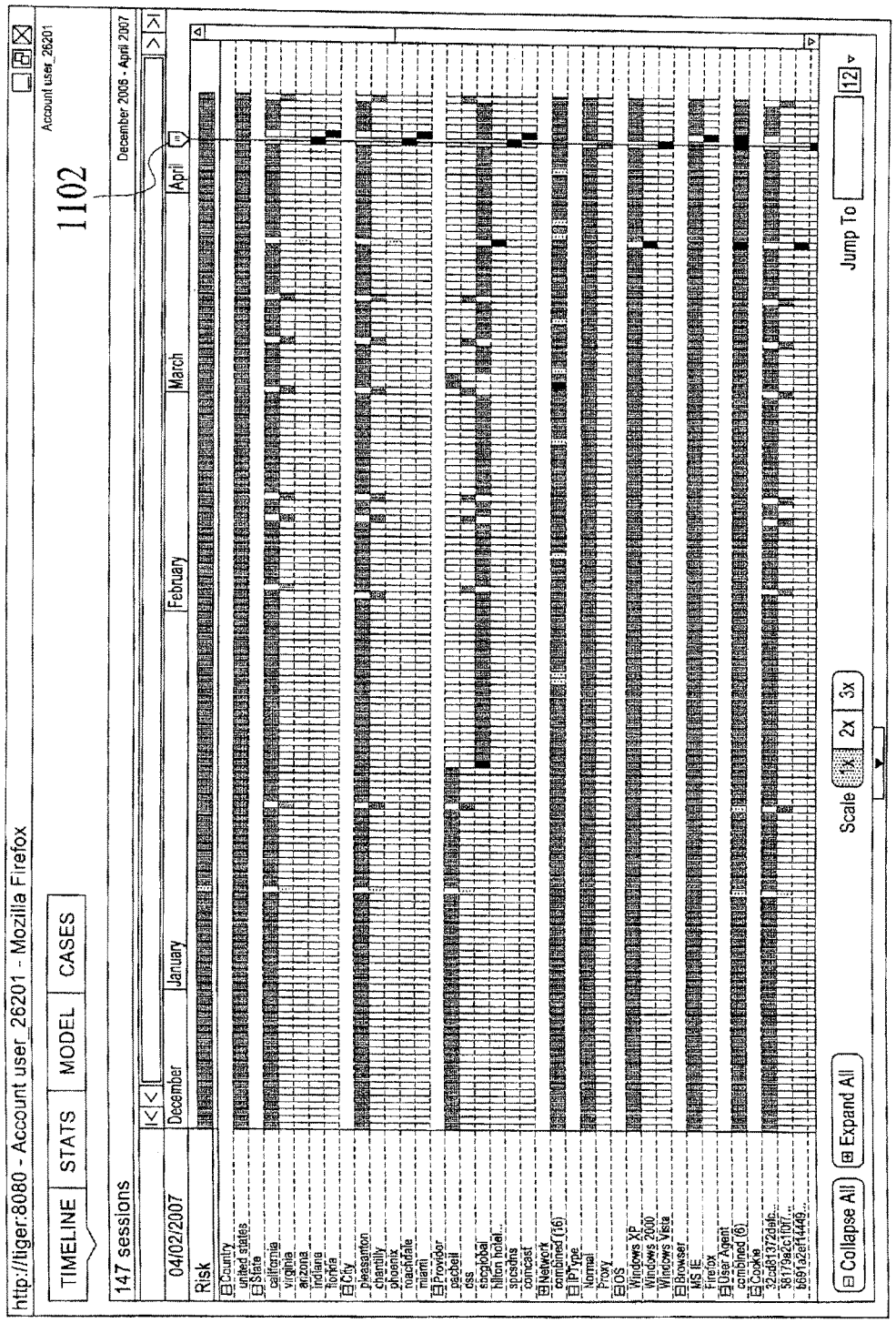
FIG. 11 is an example AUI showing normal use behavior for a user, under an embodiment.

FIG. 11 is an example AUI showing normal use behavior for a user, under an embodiment. This is a frequent user and he/she logs in a few times a week. The normal behavior of this user consists of two normal patterns: (1) access from the San Francisco Bay Area using SBC/PacBell with a single machine; and (2) occasional access from an organization called DSS.MIL (which is a government organization) using another machine.

In this example, the FPS is configured only to process Login Attempts (i.e., the information whether a login succeeded or failed is not available to the system nor is other activities that occur within a single online session). For readability the AUI displays a separate User Name (user_26201) which is a generated for the account identifier string above.

On Apr. 2, 2007 (column adjacent marker or slide bar 1102) there were 2 RED alerts for this user.

Figure 12:
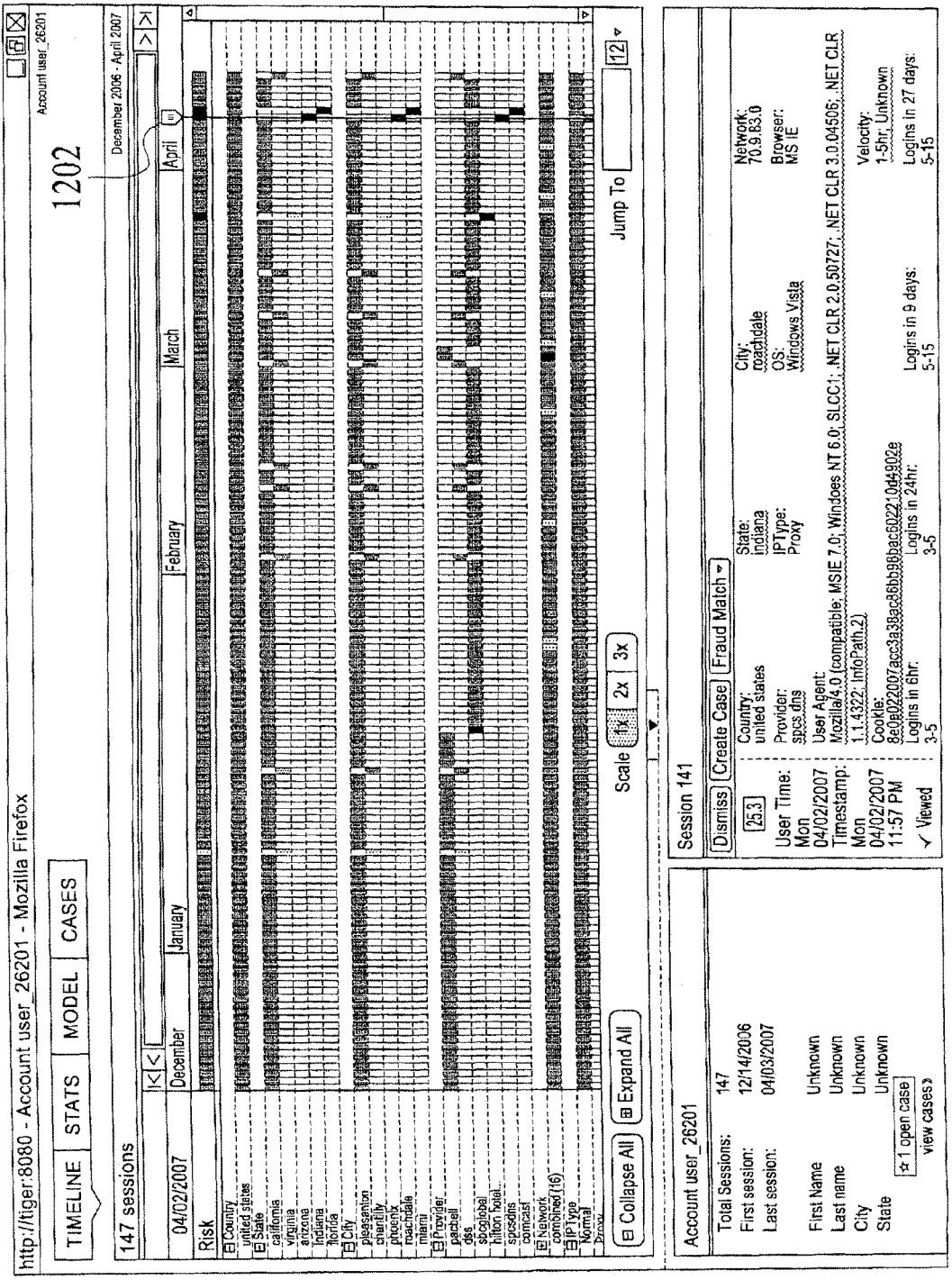
FIG. 12 is an example AUI showing a first RED alert for a user, under an embodiment.

FIG. 12 is an example AUI showing a first RED alert for an account event 1202, under an embodiment. An attempted login occurred from Network Block 70.9.83.0 using a provider "spcsdns.net" via a proxy located in Indiana. Upon further investigation, it is believed that this network is operated by Sprint Mobile Broadband and that the IP address is a proxy which may hide the true location of the user (i.e., the user may not be in Indiana). The attempt was from a new OS (Vista) that had not been seen from this user. The login was at Apr. 2, 2007 11:57 PM GMT, or Apr. 2, 2007 06:57 PM Indiana Time.

Figure 13:
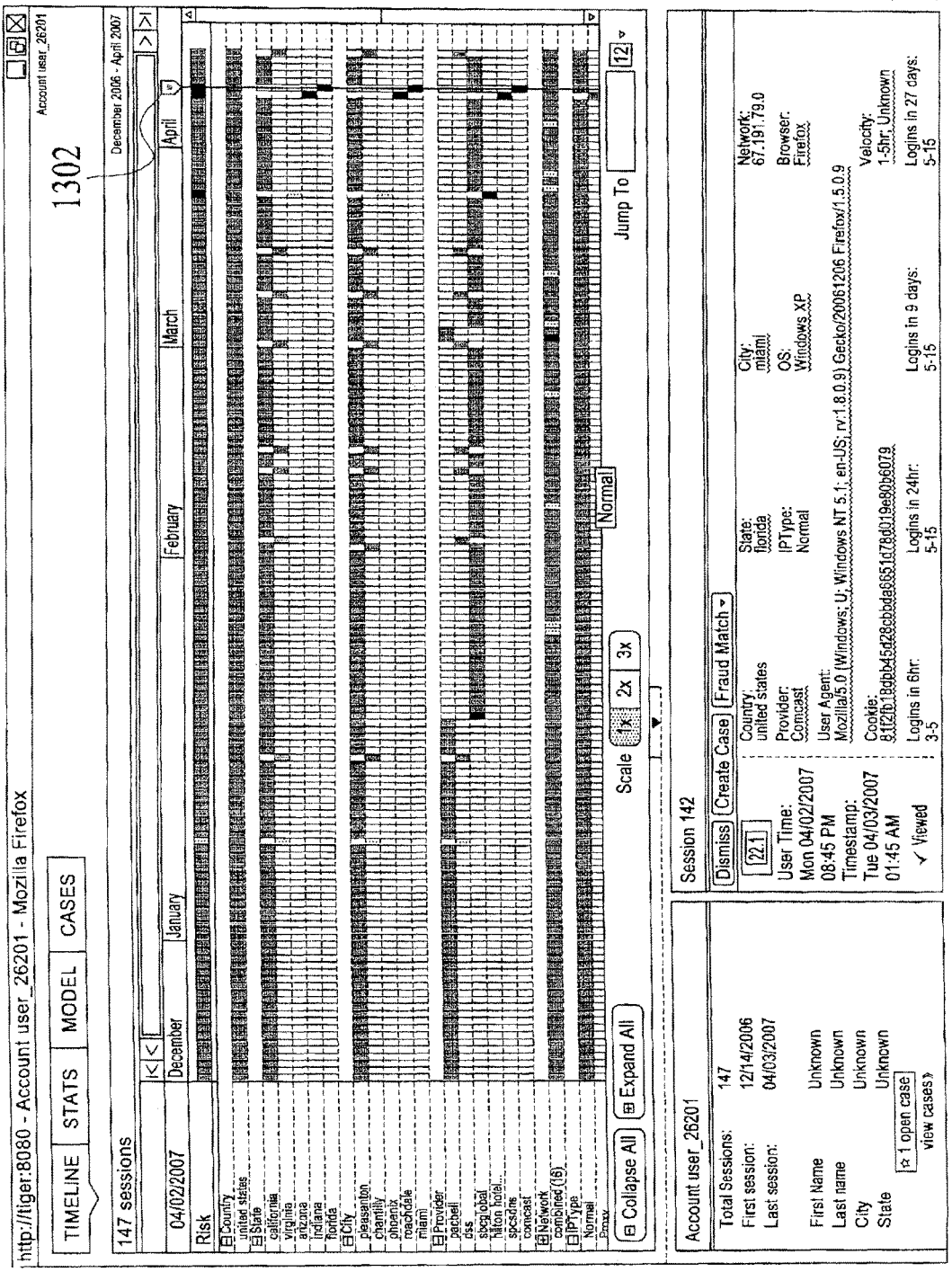
FIG. 13 is an example AUI showing a second RED alert for a user, under an embodiment.

FIG. 13 is an example AUI showing a second RED alert for an account event 1302, under an embodiment. The second Red alert occurred approximately 2 hours after the first RED alert, and was an attempted login from Network Block 70.9.83.0 using a provider Comcast from Miami, Fla. In this case the Browser (Firefox) was different from any previous session from this user. The login was on Tue Apr. 3, 2007 01:45 AM GMT, or Mon Apr. 2, 2007 08:45 PM Miami Time.

Figure 14:
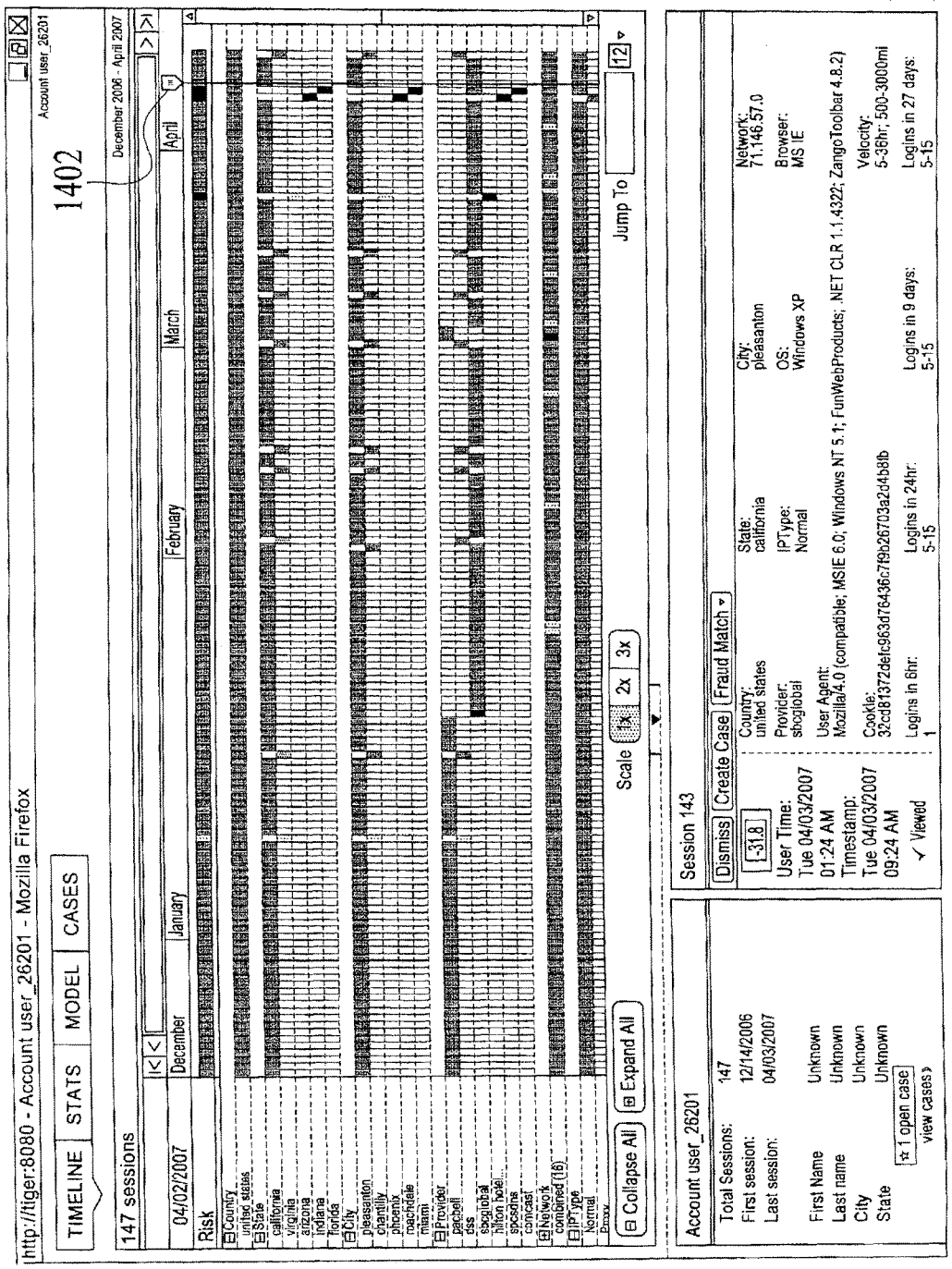
FIG. 14 is an example AUI showing additional for a user account, under an embodiment.

FIG. 14 is an example AUI showing additional information for account activity 1402, under an embodiment. This activity occurred eight hours later and was a sequence of four login attempts (probably failed logins) from what appears to be the real account holder. It was also noted that on March 21 a user (probably the real user) logged in from a Hilton Hotel in Pheonix; there is probably no reason to relate this to the fraud situation, but it may be worth noting for future reference.

Figure 15:
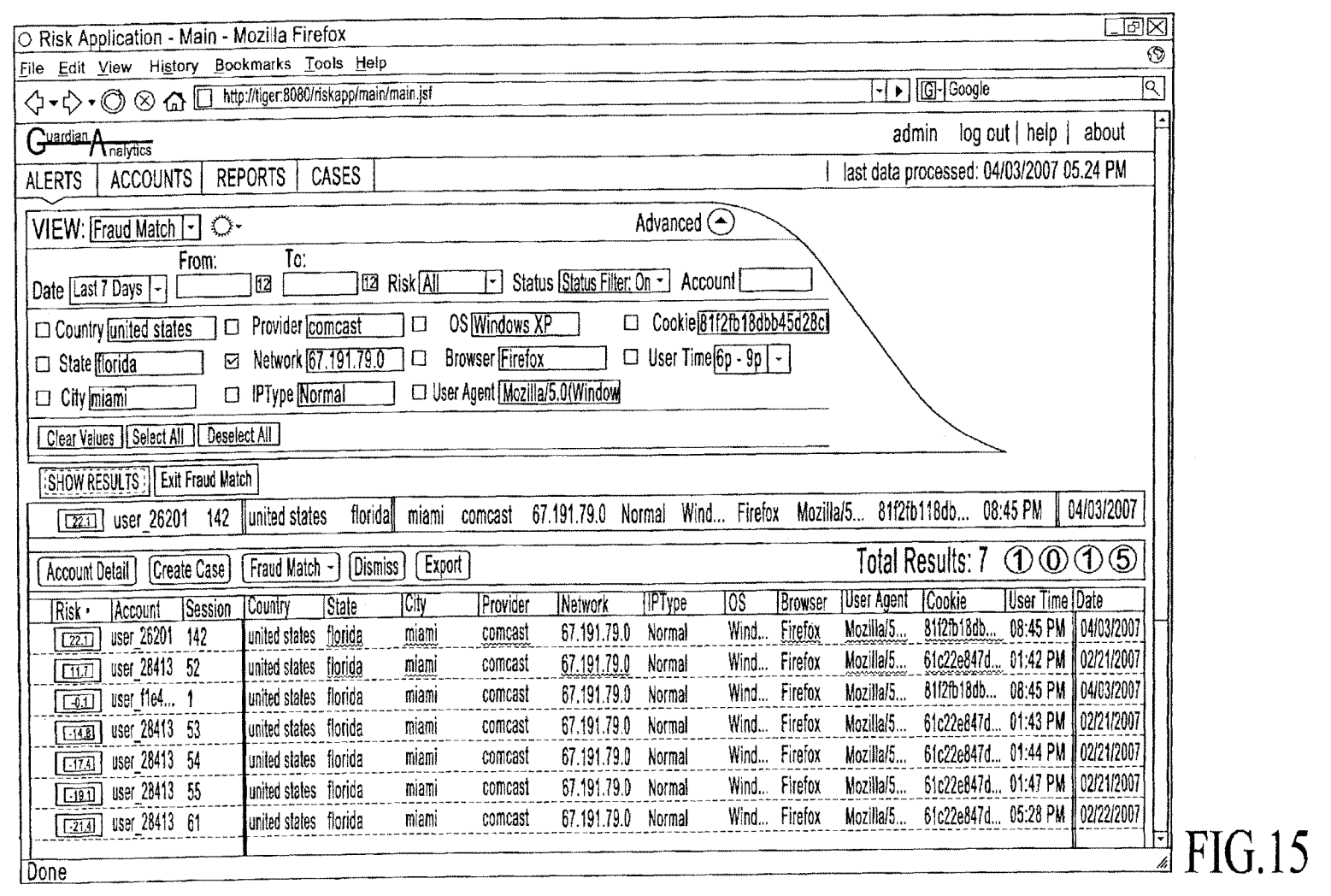

The FPS Fraud Match was used to search for other similar user sessions. FIG. 15 is an example AUI showing the Fraud Match view, under an embodiment. A search was performed for other user sessions using the Comcast network block 67.191.79.0. The only sessions identified were as follows:

the five sessions from a previous fraud case; one session from this fraud case; and the additional session corresponding to the first RED alert.

Figure 16:
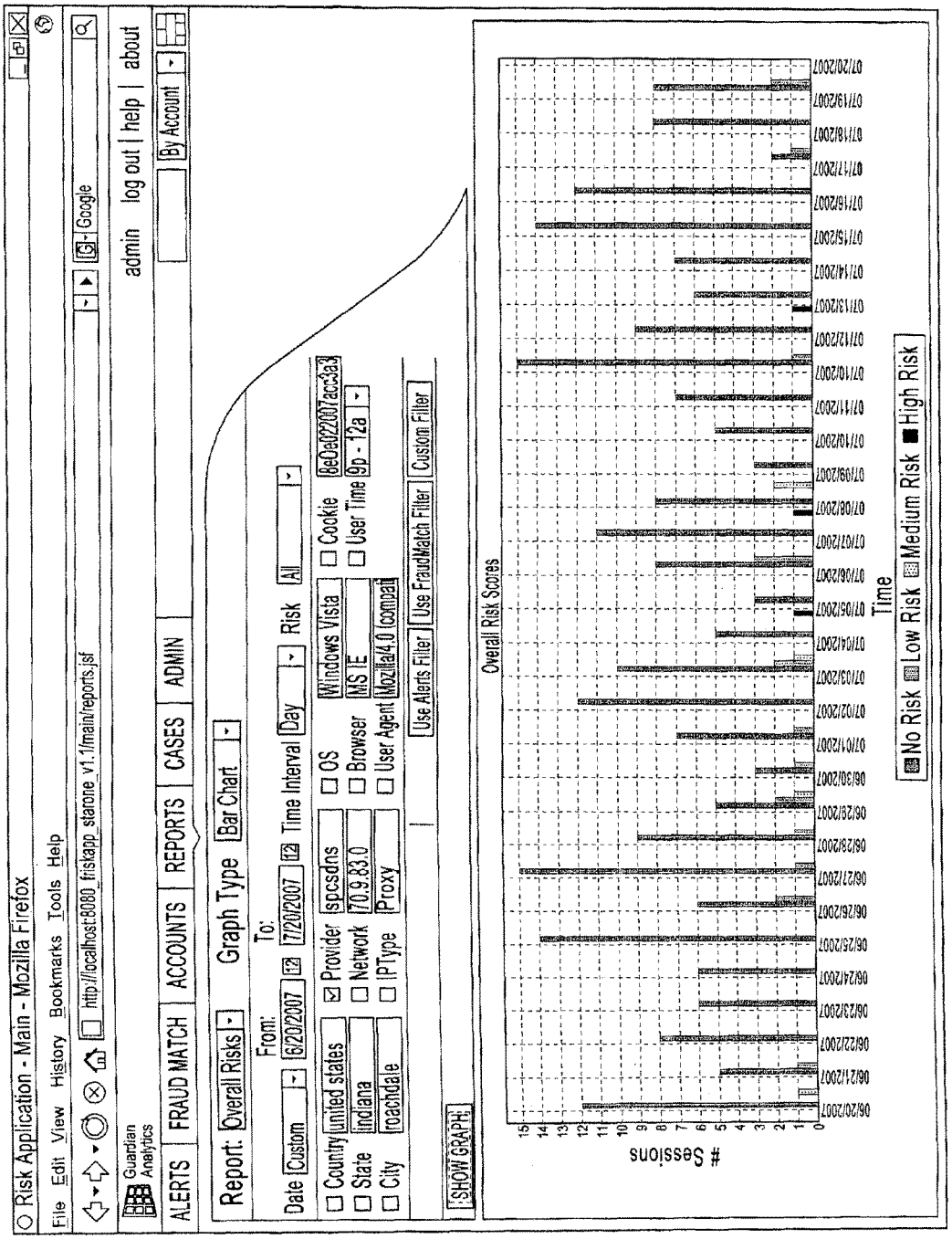
FIG. 16 is another example AUI showing the results obtained in the Fraud Match View plotted over time, under an embodiment.

FIG. 16 is another example AUI showing the results obtained in the Fraud Match View plotted over time, under an embodiment. The ability to perform various analyses of related events provides unique insight. In this example, the timeline view allows the analyst to determine if the related suspicious activity is changing over time (perhaps as a result of a wide spread fraud attack).

A detailed description of the dynamic account modeling follows.

Risk Based Hypothesis Test

A Bayesian Network is a well known representation of a probabilistic model that represents a set of variables and their probabilistic independencies as a graph of nodes (parameters) and edges (dependent relations). Bayesian Hypothesis Testing is a well known technique that can determine the optimal decision criteria for discriminating between two or more possible hypotheses given a set of observed data and known probability models for each hypothesis.

The Account Holder (User) is the real world person that owns the online account. In the case of ID Theft, a Fraudster is defined herein as any person other than the Account Holder. Mathematically, two hypotheses are:

$H_0$=The observed event (for example, a login event) was generated by the Account Holder (aka User)
$H_1$=The observed event (for example, a login event) was generated by someone else (i.e., a Fraudster)

If the true conditional probability was known by observing the current event given that the event was generated by the real User and conditional probability that the event was generated by a Fraudster, the optimal fraud/non-fraud decision statistic is the relative likelihood ratio L as defined by $$L(\text{Event}) = \frac{P(\text{Fraudster}|\text{Event})}{P(\text{User}|\text{Event})} = \frac{P(F|E)}{P(U|F)}. \quad (0.1)$$

Using Bayes Rule, Equation (0.1) can be rewritten as:

$$L(E) = \frac{P(E|F)P(F)}{P(E|U)P(U)}, \quad (0.2)$$

and, alternatively as:

$$L(E) = \rho\lambda(E) \quad (0.3)$$

where $$\lambda(E) = \frac{P(E|F)}{P(E|U)},$$

and $$\rho = \frac{P(F)}{P(U)} = \frac{P(F)}{1 - P(F)}$$

The following apply in the above equations:

P(E|F) is the Fraud Model, which is the expectation of observing the parameters of Event E given that the Event was caused by a Fraudster (someone other than the User)

P(E|U) is the User Model, which is the expectation of observing the parameters of Event E given that the Event was caused by the real User P(F) is the Prior Probability of Fraud (aka, the apriori Fraud Expectation), which is the prior probability that an Event would be caused by a Fraudster (without knowing anything else about the Event)

P(U) is the Prior Probability of the User (aka, the apriori User Expectation), which is the prior probability that an Event would be caused by a Fraudster (without knowing anything else about the Event)

The Prior Probabilities and hence $\rho$ are constant if the Events are independent from each other. When this is the case, the impact of $\rho$ can be ignored as any decision criteria on L(E) can be performed (with appropriate scaling) on the Decision Statistic $\lambda(E)$ instead.

For example, $\lambda(E)$ can be used as part of a binary decision process by introducing a threshold:

Decide Fraud if $\lambda(E) > \tau$

Decide User if $\lambda(E) \leq \tau$. \quad (0.4)

Alternatively, $\lambda(E)$ can be used to rank a set of Events from high to low fraud risk.

Often it is easier to work with the log likelihood ratio. The Risk of an Event is formally defined herein to be:

$$R(E) = \ln(\lambda(E)) = \ln\left(\frac{P(E|F)}{P(E|U)}\right) \quad (0.5)$$

Then R(E) is used as a decision statistic in the same way as $\lambda(E)$ or L(E) are used.

Predictive Models

The problem now becomes how to calculate R(E). And, more specifically, how to calculate the two conditional probabilities P(E|F) and P(E|U). In this case, a sequence of Events is observed associated with a User's Account with the k' th Observed Event designated as $E^k$. Also, knowledge of the User can be updated based on previous observations. This previously observed information about a User is denoted as $U^{k-1}$ such that $P(E|U^{k-1})$ represents the estimated User Model after observing the sequence of Events $E^1 \ldots E^{k-1}$. Thus, Equations (0.3) and (0.5) can be rewritten as:

$$L(E^k) = \rho\lambda(E^k) \quad (0.6)$$

$$\rho = \frac{P(F)}{1 - P(F)}$$

$$\approx P(F)$$

for $P(F) = 1$ $$\lambda(E^k) = \frac{P(E^k|F)}{P(E^k|U^{k-1})}$$

$$R(E^k) = \ln(\lambda(E^k))$$

Note that in this model the Event Fraud Model $P(X^k|F)$ and the a priori expectations of Fraud (and the User) are constant, i.e., they do not change based on observing the previous Events $E^1 \ldots E^{k-1}$.

In practice, the conditional probabilities are expressed in terms of actual observed data for the Event. In this case the observed data is the set of parameters that the online application is able to collect about the Event (for example the Client IP Address and the User Agent String of the user's browser) at the time of the Event. This represents the observed parameters (i.e., the Observed Data) for the by the vector $D^k=[X, Y, \ldots, Z]$, where each element represents one of the observed parameters.

The definitions of the Fraud and User Models can be represented as:

$P(E^k|F)=P(D^k|F)=P(X,Y,\ldots,Z|F)$ @ Fraud Model $P(E^k|U^{k-1})=P(D^k|U^{k-1})=P(X,Y,\ldots,Z|U^{k-1})$ @ User Model (0.7)

Each of these is a predictive model over the observed parameters, one for the fraudster and one for the user. When calculating $\lambda(E^k)$ and $R(E^k)$ there is an interest in the ratio of these models which will be able to be used to an advantage in some real world cases.

For purposes of explanation, there are two directly observable parameters assumed:

X=The IP address associated with the HTTP session

Y=The User Agent String of the device used to access the application

Then for an observed event, D=(IPAddr=x, UserAgent=y) calculations are:

$$\lambda(E) = \frac{P(IPAddr = x, UserAgent = y \mid F)}{P(IPAddr = x, UserAgent = y \mid U)} \quad (0.8)$$

The problem is that these probabilities are typically unknown and in general difficult if not impossible to calculate in this form. Even if independence is assumed between the observed parameters this would be faced with simpler yet still intractable problem of computing the individual terms (or at least the individual ratios) of the resulting likelihood ratio:

$$\lambda(E) = \frac{P(IPAddr = x \mid F)P(UserAgent = y \mid F)}{P(IPAddr = x \mid U)P(UserAgent = y \mid U)} \quad (0.9)$$

This problem is solved by decomposing the probability into more manageable components. One way of doing this is to introduce the derived, real-world behavior parameters as described previously as a conditioning parameter. For example, P(IPAddr=x|U) could be reformulated as:

$$P(IPAddr = x \mid U) = \sum_{Country} P(IPAddr = x \mid U, Country = y) P(Country = y \mid U)$$

This approach of decomposing complex probability models into a more computationally feasible network of causally related parameters is key to the Dynamic Account Modeling approach. Once the models have been reformulated as a causal model, the Bayesian Network formalism allows for propagation of information through a network of related parameters. To simplify the following discussion, this will often focus on the case with only one observed parameter X. Extending this to a full Bayesian Network that represents the entire PUM as described herein by introducing conditional parameters and distributions.

The User Model

To facilitate explanation, a description follows of the underlying math for a class of parameters that have the characteristics of discrete (it can only take on well defined set of values), finite cardinality (there are a finite (the perhaps unknown) set of values), and categorical (each value is independent of other values, i.e., there is no explicit or implicit ordering or distance between values). Similar models can be developed for other parameter types (for example, continuous parameters). Similarly, extending to conditional parameters is also straight forward under the teachings herein.

A number of variables are described as follows:

$U^k$ designates the updated User Information (Model) after k Events have been observed $X^{k+1}$ is the observed parameter for Event k+1 where $X \in \{x_1, x_2, \ldots, x_n\}$ The predictive User Model (distribution) on $X^{k+1}$ is a vector:

$$P(X^{k+1} \mid U^k) = P(X \mid U^k) \quad (0.10)$$
$$= \{p(x_1 \mid U^k), p(x_2 \mid U^k), \ldots, p(x_n \mid U^k)\}$$

Similarly, before any Events for the User are observed this will have a prior distribution on X as:

$$P(X^1 \mid U^0) = P(X \mid U^0) \quad (0.11)$$
$$= \{p(x_1 \mid U^0), p(x_2 \mid U^0), \ldots, p(x_n \mid U^0)\}$$

Combining Priors and Observations

One method for combining the prior probability distribution and the observed events is to use a Dirichlet Distribution. Other distributions or combining techniques may also be used. The Dirichlet Distribution is used to estimate an unknown multinomial probability distribution. More specifically, it extends the Beta distribution into multiple dimensions and provides for a smooth transition between the prior distribution and the observed distribution and allows for control over how quickly that transition occurs.

The Dirichlet distribution is a second order distribution (a distribution on a distribution). For example, for an event parameter X that can take on one and only one value per event $X \in \{x_1, x_2, \ldots, x_m\}$ and $P_X = \{p(x_2), \ldots, p(x_2), \ldots, p(x_m)\}$, the Dirichlet distribution on $P_X$ can be expressed as:

$$p(P_X) = D(P_X \mid P_X^0, \alpha) \quad (0.12)$$

and $$D(P_X \mid P_X^0, \alpha) @ \prod_i (p(x_i))^{(\alpha p^0(x_i)-1)} \quad (0.13)$$

Here, $p(P_X)$ is a scalar that is the probability that the probability distribution $P_X$ is correct $P_X^0 = [p^0(x_1), \ldots, p^0(x_m)]$ (is the apriori (assumed) distribution (vector) over X, and $\alpha$ is a scaling factor (in units of number of observations) that essentially represents how much belief is put into the prior distribution. That is, it controls the rate of convergence away from the prior and toward the observed distribution.

Following the derivation, the maximum likelihood estimate $\hat{P}_X = E[P_X]$ as given by:

$$\hat{P}_X = E[p(x_i) \mid P_X^0, \alpha, m_i, k] = \frac{\alpha p^0(x_i) + m_i}{\alpha + k}, \quad (0.14)$$

where $m_i$ is the number of times $x_i$ was observed and $k = \Sigma_j m_j$ is the total number of observed events.

The Dirichlet can be used as an estimate of the predictive User Model so that each element $p(x_i \mid U^{k-1})$ of Equation (0.10) can be estimated as:

$$\hat{p}(x_i \mid U^{k-1}) = \frac{\alpha p(x_i \mid U^0) + m_i}{\alpha + k} \quad (0.15)$$

The Dirichlet Model (Equation (0.15)) can be rewritten as:

$$\hat{p}(x_i \mid U^{k-1}) = \beta p(x_i \mid U^0) + (1-\beta)\left(\frac{m_i}{k}\right), \quad (0.16)$$

where $$\beta = \frac{\alpha}{\alpha + k}$$

$$1 - \beta = \frac{k}{\alpha + k}.$$

Hence, the estimated User Model provides a smooth and intuitive transition between the prior and observed distribution on X for a given User. The rate of convergence to the observed distribution is controlled by the parameter $\alpha$ which is in units of k (i.e., observed events).

This is a good model for some parameter types, however, it fails to account for other expectations on user behavior. Notable, for some parameter types (e.g., location) only a few observed values are expected for any given User. And for these parameters, the expectation of seeing a new parameter value may be based on the User's previously observed behavior. A model for incorporating this type of expectation is addressed in the next subsection.

Modified Event Model (New Mode Probability)

The Modified Event Model takes into account the expectation that a single user will only be observed with a finite set of parameter values. Furthermore, it recognizes that a user switching to a new (previously unobserved) parameter value is an event of interest unto itself. For example, an individual user in one or perhaps a small number of different countries is expected, and seeing the user in a new country is an interesting occurrence.

Consider the observed Random Variable X with all of the definitions from the previous section. While awaiting the $k+1^{th}$ observation, this can characterize the possible outcomes using a modified experiment based on a new random variable • where $•^{k+1}$=FALSE if the observed value $X^{k+1}$ has been previously observed (for that user) and $•^{k+1}$=TRUE if this is the first time observing the value (for that user). In other words, $•^{k+1}$=TRUE is a New Mode Event. This can define the New Mode Probability $\eta$ as:

$$P(• \mid U) = \begin{cases} \eta & \text{if } • = \text{TRUE} \\ 1-\eta & \text{if } • = \text{FALSE} \end{cases} \quad (0.17)$$

Combining the New Mode Event with the actual observed value, this can be written as:

$$p(x_i \mid U^k) = \begin{cases} \eta \dfrac{p(x_i \mid U^0)}{1-\upsilon} & \text{if } x_i \text{ not previously observed} \\ (1-\eta)\hat{p}(x_i \mid U^{k-1}) & \text{if } x_i \text{ has been previously observed} \end{cases}, \quad (0.18)$$

where the following are defined:
$\eta$ is the New Mode Probability for this user based on the previous Events observed. The new mode probability $\eta$ can be modeled in many different ways including statistical models based on historic data
$\upsilon$ is the previously observed prior probability mass for X, specifically $$\upsilon = \sum_{(x_i \text{ Previously Observed})} p(x_i \mid U^0) \quad (0.19)$$

$$= 1 - \sum_{(x_j \text{ NOT Previously Observed})} p(x_j \mid U^0)$$

And $\hat{p}(x_i \mid U^{k-1})$ is the estimated probability of the previously observed value $x_i$, for example, Equation (0.16).

The decision to use the New Mode Model (i.e., Equation (0.19) or it's variants) versus a more traditional model such as the or the Dirichlet Model (i.e., Equation (0.16)) is determined by the type of parameter being modeled. If the parameter includes a strong expectation on whether a new mode (value) should be observed then Equation (0.18) provides additional fidelity in this respect. However, if the parameter is best modeled simply as an expectation of its value, then Equation (0.16) provides a simpler and mode direct way of modeling this behavior.

The Trust Model

The Trust Model accounts for the fact that an Event observed for a User could have been caused by a Fraudster. If that were the case, the User Model should not be updated with the observed information. Of course, this must be done probabilistically as the system is never absolutely certain whether the Event was caused by the User or a Fraudster.

The Trust Model is particularly important for fraud scenarios that occur over multiple sessions. This helps prevent a Fraudster from fooling the system (by biasing the model) with a number of benign-looking sessions before attempting more suspicious activity.

The basic idea is to consider two possible updated User Models after observing an Event.

1. $U^+$ is the resulting User Model that includes the impact of a previous Event E
2. $U^-$ is the resulting User Model that ignores the impact of a previous Event E Then, the likelihood of a subsequent Event E' can be written as:

$$P(E' \mid U) = P(E' \mid U^+)P(U^+ \text{ is correct} \mid U) + \quad (0.20)$$
$$P(E' \mid U^-)P(U^- \text{ is correct} \mid U)$$
$$= P(E' \mid U^+)P(U^+ \text{ is correct} \mid U) +$$
$$P(E' \mid U^-)(1 - P(U^+ \text{ is correct} \mid U))$$

Where $P(U^+$ is correct$\mid U)$ is essentially the probability that the Event E was in fact caused by the User. This term is defined as the Trust of the Event, $T_E$:

$$T_E @ P(U^+ \text{ is correct} | U) = 1 - P(U^- \text{ is correct} | U) @ \quad (0.21)$$
$$P(\text{That User } U \text{ was the cause of observed Event } E)$$
$$= P(U | E)$$
$$1 - P(F | E)$$

Combining this with Equations (0.1) and (0.3) yields:

$$\rho\lambda(E) = L(E) \quad (0.22)$$
$$= \frac{P(F | E)}{P(U | E)}$$
$$= \frac{1 - P(U | E)}{P(U | E)}$$
$$= \frac{1 - T_E}{T_E}$$

Rearranging to solve for $T_E$:

$$T_E = \frac{1}{1 + \rho\lambda(E)} \quad (0.23)$$
$$\rho = \frac{P(F)}{1 - P(F)} \approx P(F)$$

Intuitively, P(F) will always be =1 so that when the relative likelihood ratio $\lambda(E)=1/P(F)$, the Trust of the Event will be ≈1. Conversely, the Trust of the Event will be significantly reduced when $\lambda(E) \geq 1/P(F)$.

The Trust of previous Events can be used in the estimate (update) of the User Model. For the Dirichlet User Model described in Equation (0.16), the Accumulated Trust can be used instead of the Count Observed for deriving the Predicted User Model each parameter value (aka Mode). Specifically:

$$\hat{p}(x_i | U^{k-1}) = \beta_\tau p(x_i | U^0) + (1 - \beta_\tau) \frac{\tau_i}{\sum_j \tau_j} \quad (0.24)$$

Where the prior weight coefficient $\beta_\tau$ is now calculated based on the Accumulated Trust over all observed values for the parameter, i.e.:

$$\beta_\tau = \frac{\alpha}{\alpha + \sum_j \tau_j} \quad (0.25)$$

Here the following are followed:
$p(x_i|U^0)$ is the prior (user) probability of observing the value $x_i$
$\alpha$ is the Dirichlet scaling factor (in units of the number of observations)
$\tau_i$ the Accumulated Trust of the Events in which $x_i$ was observed for this user:

$$\tau_i = \sum_{E \text{ where } X=x_i} T_E$$

$\Sigma_j \tau_j$ is the total Accumulated Trust across all observed values of X for this user Referring back to the definition and interpretation of $T_E$ in (Equation (0.23)), in cases where the Event is generally consistent with the User Model (ie., $\lambda(E)=1/P(F)$), $T_E \approx 1$ so this equation behaves equivalently to the original Dirichlet Model (Equation (0.15)). However if an Event has very high risk ($\lambda(E) \geq 1/P(F)$), the resulting $T_E$ may be significantly less than 1 and it will have a correspondingly reduced influence to the resulting updated User Model. Likewise, the Trust Score can be used in the New Mode Model of Equation (0.18) by using a similar substitution.

Time Decay Model

The derivation of the User Model up to this point does not factor in the passage of time and more specifically that the User may change the behavior over time such that observed behavior a long time ago may not reflect the current expected behavior. This issue is addressed by introducing a Time Decay Model for the User Model.

The basic idea behind the Time Decay Model is that the relevancy of an observed event decreases over time. The exponential decay function forms a computationally attractive basis of the model. Using an exponential decay function, the relative weight of each event decays according to the function:

$$\omega(t, t_{Event}) = e^{-\frac{t-t_{Event}}{\lambda}} \quad (0.26)$$

The following apply for this function:
t is the current time (or any time after the Event was observed)
$t_{Event}$ is the time the Event was observed
$\lambda$ is the decay parameter (in the same unit as t) of the model This weighting function can be applied recursively from one point in time to another. Specifically, for two future points in time $t_2 > t_1 > t_{Event}$:

$$\omega(t_2, t_{Event}) = e^{-\left(\frac{t_2 - t_{Event}}{\lambda}\right)} \quad (0.27)$$
$$= e^{-\left(\frac{(t_2 - t_1) + (t_1 - t_{Event})}{\lambda}\right)}$$
$$= e^{-\left(\frac{t_2 - t_1}{\lambda}\right)} e^{-\left(\frac{t_1 - t_{Event}}{\lambda}\right)}$$
$$= \omega(t_2, t_1) \omega(t_1, t_{Event})$$

With this background, the Time Decay Model is now described. Define $M_i(t)$ as the Accumulated Observed Mass for the parameter value $x_i \in X$. The Accumulated Observed Mass could be based on Event Count (i.e., the base weight for each Event is 1) the Trust of an Event (the base weight for an Event is $T_E$) or some other metric that weights each observed Event. However, as defined, the Accumulated Observed Mass can also vary over time.

Using the exponential decay function, a definition of specific form for the Accumulated Observed Mass for a given time t given a specific exponential time constant is:

$$M_{\lambda,i}(t) = M_{\lambda,i}^{Last} e^{-\frac{(t - t_i^{Last})}{\lambda}} \quad (0.28)$$

The following apply for the Accumulated Observed Mass:
$M_{\lambda,i}^{Last} = M_{\lambda,i}(t_i^{Last})$ is the Accumulated Observed Mass for the value $x_i$ immediately after the last Event in which $x_i$ was observed.

$t_i^{Last}$ is the timestamp of the last Event in which $x_i$ was observed. The value of $t_i^{Last}$ s stored as part of the User Model (each $x_i$ has its own $t_i^{Last}$)

t is the current time and is usually set by the time of the next Event to evaluate λ is the exponential time constant and is a static parameter of the model. $M_{\lambda,i}^{Last}$ and $t_i^{Last}$ are calculated recursively as part of the User Model Update process. Specifically, whenever an Event is observed that contains the value $x_i$, the User Model is updated using $$M_{\lambda,i}^{Last|k} = m_i^{E^k} + M_{\lambda,i}^{Last|k-1} e^{\frac{-(t_i^{Event}-t_i^{Last|k-1})}{\lambda}}, \quad (0.29)$$

$$t_i^{Last|k} = t^{Event}$$

where:

$M_{\lambda,i}^{Last|k}$ the new (updated) Accumulated Observed Mass for the value $x_i$ immediately after the current Event k (in which $x_i$ was observed)

$M_{\lambda,i}^{Last|k-1}$ is the Accumulated Observed Mass for $x_i$ prior to observing the most recent Event $m_i^{E^k}$ is the Incremental Observed Mass for $x_1$ based for the current (single) Event k.

If the Observed Mass is based on Count Observed, then $m_i^{E^k}=1$

If the Observed Mass is based on the Event Trust, then $m_i^{E^k}=T_{E^k}$ $t^{Event}$ is the timestamp of the most recent Event k (in which $x_i$ was observed)

$t_i^{Last|k}$ is the new (updated) Last Time Observed for the value $x_i$ based on Event k $t_i^{Last|k-1}$ is the Last Time Observed for the value x, prior to this most recent Event If this is the first time x, is observed (for this User), the initial update reduces to:

$$M_{\lambda,i}^{Last|k}=m_i^{E^k}$$

$$t_i^{Last|k}=t^{Event} \quad (0.30)$$

Evaluating an Event follows exactly the same process with the Time Decay model as without except that the Accumulated Observed Mass $M_{\lambda,i}(t)$ is used instead of the Count Observed or the Accumulated Trust in calculating the Risk Score of an Event. Specifically, $M_{\lambda,i}(t)$ is used instead of $m_i$ in Equation (0.16) if the Event Count is used as the basis of $m_i^{E^k}$. Also, k (which is now real-valued) is calculated using the summation $$\sum_j M_{\lambda,j}(t)$$

which sums the Accumulated Observed Mass over all previously observed values $x_j$ $M_{\lambda,i}(t)$ is used instead of $\tau_i$ in Equation (0.24) or if the Event Trust is used as the basis of $m_i^{E^k}$. Similarly, the normalization is now done using the summation $$\sum_j M_{\lambda,j}(t)$$

instead of $$\sum_j \tau_j$$

More complex decay models can be used, for example a weighted average of multiple exponential decays.

Fraud Impersonation Model

The formulation described above assumes that the Fraudster acts independently of the User, i.e., that the Fraudster does not know anything about users in general or about the specific User and/or even if the fraudster did the fraudster would not be able or choose to do anything different because of that knowledge. As fraudsters become more sophisticated this assumption no longer holds and may impact the performance of the algorithm.

The Impersonation Model addresses this issue. Consideration may be given to two related but different scenarios:

1. The Fraudster has knowledge of Users in general (perhaps for a particular target bank). Essentially, the Fraudster may be able to use this knowledge to guess what a typical user might do. For example a Fraudster attacking a US bank might safely assume that most Users will access the online application from the US so the fraudster may use a US proxy to hide the fraudster's location and perhaps more importantly to look like a normal user. Of course, this is more relevant for some parameters (e.g., Country) but not for others because the fraudster may be unable to sufficiently guess what an user may use (e.g., in the case of a User Agent String) and/or it would be difficult to mimic their behavior (e.g., to come from the exact same network block).

2. The Fraudster has been able to learn something about a specific User (perhaps by collecting data from a Phishing Site or by installing Malware on the User's machine). And based on this information the fraudster may change the attack profile to look like that specific User. This creates more opportunities and a more sophisticated attack profile. Still, this is more relevant to some parameters than others. For example, it is relatively easy to look like a specific User Agent String but it is much more difficult to use the exact same network block (which would require sophisticated malware on the user's machine).

Both cases are based on the same basic model, however this model is applied at different times: 1) the ability to guess is handled by adjusting the Parameter Priors for the Fraudster while 2) the ability to actively impersonate a specific user is handled dynamically.

For the case that a Fraudster can guess the behavior of users in general, adjustments can be made to the Parameter Priors in the Fraud Model to account for this possibility. In particular, this defines the probability that a Fraudster could guess the behavior of users for each parameter in the model:

$P_{Guess}$@Probility that Fraudster guesses parameter value. (0.31)

Essentially, this says that with probability $P_{Guess}$ the Fraudster knows the prior probability (for the specific parameter) of Users in general (for the specific target bank and/or application). This can be easily factored into the model by modifying the Fraud Parameter Prior for the parameter being considered. This is done using:

$$P(X|F^0)=P_{Guess}P(X|U^0)+(1-P_{Guess})P(X|F^0) \quad (0.32)$$

This modified Fraud Parameter Prior is used instead of the original Fraud Parameter Prior. In practice, this is done offline and the Risk Engine simply uses the modified Fraud Parameter Prior values.

The more interesting and challenging case is when a Fraudster is actually able to observe a User and then to mimic the behavior (or at least the observed parameters). In this case the Impersonation Model must take into account a number of effects as follows: the probability that a Fraudster would try to mimic a particular observed parameter; the probability that the Fraudster is able to observe (or otherwise learn about) a specific behavior (observed parameters) of a specific User (e.g., the Fraudster is able to observe the actual IP address or User Agent string that a User would have while accessing the online application); the probability that the fraudster is able to mimic the specific parameter value that was observed for the User. For any particular parameter this models the probability of the combination of these conditions by a single, statically defined parameter as follows:

$$P_{Imp} @ \text{Probility that Fraudster successfully impersonates the parameter value} \quad (0.33)$$

Then, at any point in time the resulting Fraud Model is a probabilistic combination of the original Fraud Model (which is simply the prior) and the Impersonated User Model.

$$P(X^k|F^{k-1}) = P_{Imp} P(X^k|U^{k-1}) + (1-P_{Imp}) P(X^k|F^0) \quad (0.34)$$

This model can be used directly in the calculation of the Likelihood Ratio and Risk for an Event (see Equation (0.6)):

$$\lambda_{Imp}(X^k) = \frac{P_{Imp} P(X^k|U^{k-1}) + (1-P_{Imp}) P(X^k|F^0)}{P(X^k|U^{k-1})} \quad (0.35)$$

$$= P_{Imp} + (1-P_{Imp}) \frac{P(X^k|F^0)}{P(X^k|U^{k-1})}$$

$$= P_{Imp} + (1-P_{Imp}) \lambda(X^k)$$

Therefore, $$R(X^k) = \ln(P_{Imp} + (1-P_{Imp}) \lambda(X^k)). \quad (0.36)$$

Looking at the limits, if $P_{Imp}=1$ that if the original Fraud Likelihood Ratio $\lambda(X^k) \geq 1$ (i.e., the original Risk is >0) that the resulting likelihood ratio and Risk is generally unaffected. However, if $\lambda(X^k)<1$ (i.e., the original Risk is a relatively large negative number) that the inclusion of $P_{Imp}$ effectively sets a lower bound on the Risk:

$$R(X^k) \geq \ln(P_{Imp}) \quad (0.37)$$

Intuitively this makes sense as it essentially says that if a Fraudster could impersonate the observed parameters of a User this should limit the amount of confidence that is placed on observing a parameter value that would normally be expected to be seen from a User. In practice, this becomes useful when the User Model consists of many parameters and $P_{Imp}$ is defined based on the nature of each parameter. For example, it is much easier to use a proxy that would allow a Fraudster to mimic the country of the user than it would be to mimic the exact city of a user.

Also, while the full model expressed in Equation (0.34) can be used, a simplistic model that simply sets a minimum risk according to Equation (0.37) could be used and would provide much of the same value (i.e., by limiting the amount of confidence that observing one expected parameter has on the overall risk score). Thus, $P_{Imp}$ is interpreted as a conditional probability if the underlying parameter is also conditional.

Fraud Co-Occurrence Model

The Fraud Co-Occurrence Model attempts to model the observation that a fraud attack against a single online account often consists of a flurry of sessions. For example: an initial session (or sessions) may be used to steal credentials or to confirm that the stolen credentials are correct and, once that is confirmed, another attack vector will be used to carry out the fraud; multiple sessions may be used, each to carry out a piece of the fraudulent activity in an effort to keep financial activity below the radar of transaction monitoring rules; if one fraud attack is successful against an account, the fraudster may come back and try again.

Note that in these cases the sequence of fraudulent sessions may or may not have a similar profile. Also, in most cases the fraudster tries to move as quickly as they can to carry out the fraud before their activity is discovered or their access to the account is shut down. Mathematically, this implies that observing a (potentially) fraudulent session should influence the expectation that a subsequent Event may also be fraudulent. Rewriting Equation (0.3) for Event $E^k$ using the updated User Model $U^{k-1}$:

$$L(E^k) = \rho \lambda(E^k) \quad (0.38)$$

where $$\lambda(E^k) = \frac{P(E^k|F)}{P(E^k|U^{k-1})}, \text{ and } \rho = \frac{P(F)}{P(U)} = \frac{P(F)}{1-P(F)}$$

In this equation P(F) is the a priori probability that any observed Event E is caused by a fraudster rather than the User. In the previous sections, assumptions that each Event is independent and that P(F) is constant such that L(E) and $\lambda(E)$ can be used as equivalent decision statistics. However, as previously discussed, this is not the case as observing one fraudulent event could change some expectation of seeing fraud (i.e., P(F)) of subsequent events.

Note, that in addition to modifying P(F) this could also include some form of dynamic event prediction model for fraud, i.e., $P(E^K|F^{k-1})$ which is done for the User Model. However this is a difficult thing to define and would add a lot of complexity to the resulting algorithms and models.

Therefore the focus is on modifying the estimate P(F) based on the previous observations (of potentially fraudulent activity). Ideally, this would be done recursively such that the resulting model would not have to remember each previous event.

One such model is the exponential decay. This model implements the assumption that subsequent fraudulent activity (on a single account) tends to occur within a limited timeframe (for example, within the same day or a few days). It also takes advantage of the favorable half-life characteristic of the time-based exponential decay model.

Specifically, assume a fraudulent Event $E_F$ at time $t_F$ was seen and there is an increased a priori expectation (that decays over time) that if a subsequent Event E' at time t' was seen that it would also be fraud. One way to model this is to use an exponential decay model for the increased a priori expectation based on knowing that $E_F$ was fraud:

$$P(F'|E_F \text{ is Fraud}) @ P(E' \text{ is Fraud } E_F \text{ is Fraud}) = P(F_0) + (\varepsilon - P(F_0)) e^{-(t'-t_F)/\mu} \quad (0.37)$$

where $P(F_0)$ is the original (before any Events are observed) a priori probability that any Event is fraud $\varepsilon$ is a parameter of the model that defines the new a priori fraud prior immediately after the event $E_F$ is observed.

$\mu$ is a parameter of the model that defines the half life decay of the increased fraud expectation.

Intuitively, upon seeing the fraudulent event $E_F$, the a priori expectation of seeing another Fraud Event immediately jumps from $P(F_0)$ to $\varepsilon$ and then decays back to $P(F_0)$ with an exponential half-life equal to $\mu$.

Of course, in a real situation there is no certainty that some previous Event $E_i$ is fraud. To account for this uncertainty two cases may be considered, with one case conditioned on whether $E_i$ was caused by fraud and another case conditioned on whether $E_i$ was not caused by fraud. The first case uses $P(F^k|E^i)$ as defined above as the subsequent Fraud Prior while the second uses the original Fraud Prior $P(F_0)$:

$$P(F^k|E^i) = P(F^i \text{ is Fraud})P(F^i|E^i) + P(F_0)(1 - P(F^i|E^i)) \quad (0.40)$$

Using Equation (0.21) substitute $P(F^i|E^i) = 1 - T_{E^i}$ and rewrite as:

$$P(F^k|E^i) = P(F_0)T_{E^i} + \\ [P(F_0) + (\varepsilon - P(F_0))e^{-(t_k - t_i)/\mu}](1 - T_{E^i}) \\ = P(F_0) + (1 - T_{E^i})(\varepsilon - P(F_0))e^{-(t_k - t_i)/\mu} \quad (0.41)$$

Note, for any interesting case, $\varepsilon \gg P(F_0)$ this can further simplify as:

$$P(F^k|E^i) \approx P(F_0) + (1 - T_{E^i})\varepsilon e^{-(t_k - t_i)/\mu} \quad (0.42)$$

which is the new Fraud Prior based on some previous, potentially fraudulent Event $E_i$. Note, alternatively, this could define E as the increase in the fraud prior and in this case Equation (0.42) would be exact. In practice both methods are equivalent.

There are potentially many previously observed Events (for this User Account) and in general the possible contribution of each should be considered. This is done by introducing a Fraud Co-Occurrence Update Model.

Since the decay in the increased fraud expectation is exponential, the proportion of decay from any single Event only depends on the length of the decay interval and that $e^{-(t_k - t_i)/\mu} = e^{-(t_k - t_{k-1})/\mu} e^{-(t_{k-1} - t_i)/\mu}$. This allows a recursive model to be defined for the Fraud Prior for the next observed Event $E^k$ based on all previously observed Events $\{E^1, \ldots, E^{k-1}\}$ as:

$$P(F^k) = P(F_0) + \gamma_{k-1} \varepsilon e^{\left(\frac{-(t_k - t_{k-1})}{\mu}\right)} \quad (0.43)$$
$$\gamma_k = g(\gamma_{k-1}, T_{E^k}, (t_k - t_{k-1}))$$
$$\gamma_0 = 0$$

In this formulation, $\gamma_{k-1}$ essentially represents the Accumulated Mistrust through observed Event $E^{k-1}$. The choice of the update function $\gamma_k = g(\ )$ defines how the affect from multiple Events are combined. A simple recursive update model that behaves as intended can be defined as:

$$\gamma_k = \max((1 - T_{E^k}), \gamma_{k-1} e^{-(t_k - t_{k-1})/\mu}) \quad (0.44)$$

Other variations are possible by using some accumulation of previous events while ensuring that $\gamma_k \leq 1$. For example, an alternative model could allow $\gamma_k$ to grow to some value if there is a plethora of highly suspicious events. For example, $$\gamma_k = (1 - T_{E^k}) + \gamma_{k-1} e^{-(t_k - t_{k-1})/\mu}. \quad (0.45)$$

The calculation of the Likelihood Ratio and associated Risk Score using the Fraud Co-Occurrence model can use Equation (0.42) directly. Though it is useful to see (and probably implement) the relative affect of this component. To do so, the Fraud Co-Occurrence Coefficient $\Gamma^k$ is defined to be $$\Gamma^k @ \frac{\overline{L}(E^k)}{L(E^k)} = \frac{\frac{P(E^k|F)}{P(E^k|U^{k-1})}\left(\frac{P(F^k)}{1 - P(F^k)}\right)}{\frac{P(E^k|F)}{P(E^k|U^{k-1})}\left(\frac{P(F_0)}{1 - P(F_0)}\right)} \quad (0.46)$$

In this case L is the original Likelihood Ratio and $\overline{L}$ is the Likelihood Ratio that incorporates the Fraud Co-Occurrence Model. Observing that the first terms in both cases are identical and $F_0 = 1$, this simplifies to:

$$\Gamma^k = \frac{P(F^k)}{P(F_0)(1 - P(F^k))}. \quad (0.47)$$

Substituting Equation (0.43), provides:

$$\Gamma^k = \frac{P(F_0) + \gamma_{k-1}\varepsilon e^{\left(\frac{-(t_k - t_{k-1})}{\mu}\right)}}{P(F_0)\left(1 - P(F_0) - \gamma_{k-1}\varepsilon e^{\left(\frac{-(t_k - t_{k-1})}{\mu}\right)}\right)} \quad (0.48)$$

And finally, observing that for any case of interest $P(F_0) = 1 - \varepsilon$, this arrives at:

$$\Gamma^k = \frac{1 + Ea}{1 - \varepsilon a} \quad (0.49)$$

where $$E = \frac{\varepsilon}{P(F_0)}$$

$$a = \gamma_{k-1} e^{\left(\frac{-(t_k - t_{k-1})}{\mu}\right)}$$

so that:

$$\overline{L}(E^k) = \Gamma^k L(E^k)$$

and $$\overline{R}(E^k) = \ln(\Gamma^k) + R(E^k) \quad (0.50)$$

Hence, the Fraud Co-Occurrence Model essentially increases the Risk of a subsequent Event by an amount determined by the Accumulated Mistrust derived recursively from previous Events.

The Session Model

In addition to determining the risk of a single Event, the FPS can determine the risk of a sequence of related events. For example, in the context of online activity, a online session consists of one Login Event followed by one or more Activity Events (for example, checking an account balance, initiating a money transfer, viewing a check image, etc) and then some form of Termination Event (either an explicit logout by the user or some form of session timeout).

Consideration is given to a Generic Session Model that comprises 0, 1 or more observations of Activity Events. It is recognized that at any point in time a Session can be Open (where observing additional Activities) or Closed (and no additional Activities can be observed).

The $k^{th}$ Session for a User is denoted as:

$$S_k = (A_1, A_2, \ldots, A_N), \quad (0.51)$$

where $A_n$ is an observed Activity Event. Every Activity Event $A_n$ has a Type (or Class) attribute $C_n$ that takes the value of one of a set of predefined Types and a set of observed parameters that we designate by the vector $V_n$. Explicitly:

$$A_n = (C_n, V_n)$$

$$C_n \in \{c^1, c^2, \ldots, c^m\}$$

$$V_n = (v^1, v^2, \ldots, v^p) \quad (0.52)$$

Differentiations can be made between an Open Session (a Session that may receive future Activity Events) and a Closed Session (a Session that may not receive future Activity Events). When necessary, an Open Session is designated as $\overset{\backslash}{S}_k$ and a Closed Session is designated as $\overset{/}{S}_k$.

In general, the likelihood ratio and associated Risk for the Session as:

$$\lambda(S_k) = \frac{P(S_k \mid F^{k-1})}{P(S_k \mid U^{k-1})} \quad (0.53)$$

$$= \frac{P(A_1, A_2, \ldots, A_N \mid F^{k-1})}{P(A_1, A_2, \ldots, A_N \mid U^{k-1})}$$

$$R(S_k) = \log(\lambda(S_k))$$

An Online Login Session is a special case of the Generic Session Model. Specifically, (ignoring cases with failed logins), an Online Login Session starts with a Login Event (which initiates an Open Session), then has 0, 1 or more Activity Events and eventually ends with some form of Termination Event which also serves to Close the Session. The Termination Event could be an explicit Log Out by the user, or it could be a timeout by the Online Banking Application or the Risk Engine.

Essentially, the Login and Termination Events are special types of Events that also designate the start and end of a Session. The corresponding Open and Closed Sessions are defined as:

$$\overset{\backslash}{S}_k = \{L, A_1, A_2, \ldots, A_N\}$$

$$\overset{/}{S}_k = \{L, A_1, A_2, \ldots, A_N, T\} \quad (0.54)$$

In these definitions L denotes the Login Event and T denotes the Termination Event. By definition, there can be one and only one Login Event. Likewise, for a Closed Session there is one and only one Termination Event while Open Sessions do not have a Termination Event. In general, both L and T may have parameters and types associated with them.

In most cases we can safely assume that both the Login Event and Termination Event are conditionally independent of each other and all other Activity Events given either the specific User or Fraud model. This allows for the rewriting of Equation (0.53) for an Online Login Session Model as:

$$\lambda(S_k) = \frac{P(S_k \mid F^{k-1})}{P(S_k \mid U^{k-1})} \quad (0.55)$$

$$= \frac{P(L \mid F^{k-1})}{P(L \mid U^{k-1})} \frac{P(T \mid F^{k-1})}{P(T \mid U^{k-1})} \frac{P(A_1, A_2, \ldots, A_N \mid F^{k-1})}{P(A_1, A_2, \ldots, A_N \mid U^{k-1})}$$

and $$R(S_k) = \log(\lambda(S_k))$$
$$= R_L(S_k) + R_{\overline{A}}(S_k) + R_T(S_k)$$

where:

$$R_L(S_k) = \log \frac{P(L_k \mid F^{k-1})}{P(L_k \mid U^{k-1})}$$

is the Risk of the Login Event which can be computed as described above $$R_T(S_k) = \log \frac{P(T_k \mid F^{k-1})}{P(T_k \mid U^{k-1})}$$

is the Risk of the Termination Event. This can incorporate previous or expected behavior (for example, the User may always explicitly log out). In most situations both conditional probabilities are constant and usually equal to each other so this entire term can safely be ignored.

$$R_{\overline{A}}(S_k) = R(A_1, A_2, \ldots, A_N) = \log \frac{P(A_1, A_2, \ldots, A_N \mid F^{k-1})}{P(A_1, A_2, \ldots, A_N \mid U^{k-1})}$$

is the combined Risk of all Activity Events within the Session (aka Activity Risk) and is described below.

Calculating the Combined Activity Risk

An estimate of the Activity Likelihood Ratio and associated Activity Risk for Session $S_k$ are provided as:

$$\lambda_{\overline{A}}(S_k) @ \lambda(A_1, A_2, \ldots, A_N) = \frac{P(A_1, A_2, \ldots, A_N \mid F^{k-1})}{P(A_1, A_2, \ldots, A_N \mid U^{k-1})} \quad (0.56)$$

$$R_{\overline{A}}(S_k) @ R(A_1, A_2, \ldots, A_N) = \log(\lambda(S_k))$$

It is impractical to calculate this general form. However, estimating these terms using simpler models that are more tractable to work with captures the most salient affects. There are many ways to approach this problem. For this description the general form has been broken into three components as $$\lambda_{\overline{A}}(S_k) \approx \lambda_{\overline{A}}^{freq}(S_k) \times \lambda_{\overline{A}}^{order}(S_k) \times \lambda_{\overline{A}}^{params}(S_k) \quad (0.57)$$

where
 $\lambda_{\overline{A}}^{freq}$=Activity Type Frequency Model
 is the combined contribution from each Activity in the Session of the observed count of each Activity Type
 $\lambda_{\overline{A}}^{order}$=Activity Type Order Model
 is the combined contribution from each Activity in the Session of the specific order of the observed Activity Types. This defines $\lambda_{\overline{A}}^{order}$ such that the underlying probability of any possible order is conditioned on the Activity Type Count.
 $\lambda_{\overline{A}}^{params}$=Activity Parameter Model
is the combined contribution of the specific observed parameters for each Activity in the Session. This defines $\lambda_{\overline{A}}^{params}$ such that the underlying probability likelihoods are conditioned on the Type of the observed Activity and in general they may be dependent on previously observed Activities. By taking the natural log, the corresponding Risk values are defined as $$R_{\overline{A}}(S_k) = R_{\overline{A}}^{freq}(S_k) + R_{\overline{A}}^{order}(S_k) + R_{\overline{A}}^{params}(S_k). \quad (0.58)$$

Consideration is given to each term.

For a Closed Session, $\lambda_{\overline{A}}^{freq}$ can be written as a product of likelihood ratios where the individual terms correspond to the expectation of seeing the observed number $n_c$ of each Activity Type c:

$$\lambda_{\overline{A}}^{freq}(\hat{S}_k) = \prod_{c \in \{c^1, c^2, \ldots, c^M\}} \frac{P(N_c = n_c \mid F^{k-1})}{P(N_c = n_c \mid U^{k-1})}. \quad (0.59)$$

Similarly, the Risk of an Open Session can be computed. However, for an Open Session the minimum number Activities that will be observed for that session might be known. This is manifested by using ≥ instead of = within the probabilities:

$$\lambda_{\overline{A}}^{freq}(\check{S}_i) = \prod_{c \in \{c^1, c^2, \ldots, c^M\}} \frac{P(N_c \geq n_c \mid F^{k-1})}{P(N_c \geq n_c \mid U^{k-1})}. \quad (0.60)$$

Similarly, the associated $R_{\overline{A}}^{freq}$ values can be computed as:

$$R_{\overline{A}}^{freq}(\hat{S}_k) = \sum_{c \in \{c^1, c^2, \ldots, c^M\}} \log\left(\frac{P(N_c = n_c \mid F^{k-1})}{P(N_c = n_c \mid U^{k-1})}\right) \quad (0.61)$$

and $$R_{\overline{A}}^{freq}(\check{S}_i) = \sum_{c \in \{c^1, c^2, \ldots, c^M\}} \log\left(\frac{P(N_c \geq n_c \mid F^{k-1})}{P(N_c \geq n_c \mid U^{k-1})}\right)$$

Note that all Activity Types are included in the calculation even if no specific Activities of that type are observed in the Session.

In most cases the specific order of activities within a session is not statistically different whether conducted by a fraudster or a user. Mathematically this means assumptions might be made that:

$$\lambda_{\overline{A}}^{order} = 1$$

$$R_{\overline{A}}^{order} = 0$$

In the most general case, the expected probability distributions of the observed parameters of each Activity can be dependent on previously observed Activities. Also, in general, the relevant previous Activities could have occurred in this or some other earlier session (or a combination of both). Information from previous sessions is contained in the updated User Activity Model $U^{k-1}$ and the updated Fraud Activity Model $F^{k-1}$ (if one is used). Information about a previous Activity that occurred within the current session is available directly as all information about Activities are maintained for the life of a Session.

Therefore, in the most general form, $\lambda_A^{params}$ can be written as a product of the likelihood of each Activity:

$$\lambda_{\overline{A}}^{params}(S_k) = \prod_j \lambda_{A_j}^{params} \quad (0.62)$$

where $$\lambda_{A_j}^{params} = \frac{P(V_j \mid C_j, A_1, A_2, \ldots, A_{j-1}, F^{k-1})}{P(V_j \mid C_j, A_1, A_2, \ldots, A_{j-1}, U^{k-1})}$$

And similarly:

$$R_{\overline{A}}^{params}(S_k) = \sum_j R_{A_j}^{params} \quad (0.63)$$

where $$R_{A_j}^{params} = \log\left(\lambda_{A_j}^{params}\right)$$

In most cases the parameters of an Activity are independent of previous Activities (the Type of the Activity may already have been conditioned). If the parameters of an Activity are independent of any previous activities, then $$\lambda_{A_j}^{params} = \frac{P(V_j \mid C_j, F^{k-1})}{P(V_j \mid C_j, U^{k-1})} \quad (0.64)$$

Session Cost Model

From a business and risk perspective, different types of Activities may carry different costs. For example, missing fraud on a Money Transfer is probably more costly than missing fraud on Checking Account Balance. To accommodate this, the concept of Cost is introduced when computing the Risk of a Session.

Keeping with this decision theory approach where a possible cost is assigned to each decision outcome, and since this decision space is essentially to declare a Session as Fraud or User, there may be four possible outcomes for a decision:

FPS determines a Session is Fraud when in fact it was from the User. This is referred to as the Cost of a False Alarm and denoted as:
£ (Decide F when really U)@£$_{FA}$ FPS determines a Session is Fraud when in fact it is Fraud. This may be referred to as the Cost of Correct Fraud and denoted as:
£ (Decide F when really F)

FPS determines a Session is User when in fact it is Fraud. This may be referred to as the Cost of Missed Fraud and denoted as:
£ (Decide U when really F)@£$_{Missed}$ FPS determines a Session is User when in fact it was from the User. This may be referred to as the Cost Correct User and denoted as:
£ (Decide U when really U)

In general, when a decision might be made that a Session is Fraud, the expected cost is:

$$E[\pounds|\text{Decide } F] = \pounds(\text{Decide } F \text{ when really } U)P(U|S_k) + \pounds(\text{Decide } F \text{ when really } F)P(F|S_k) \quad (0.65)$$

Likewise, when a decision is made that a Session is from the User, the expected cost is:

$$E[\pounds|\text{Decide } U] = \pounds(\text{Decide } U \text{ when really } F)P(U|S_k) + \pounds(\text{Decide } U \text{ when really } F)P(F|S_k) \quad (0.66)$$

Therefore, to minimize the expected cost, the decision criteria is simplified by using:

Choose $U$ if: $E[\pounds|\text{Decide } F] > E[\pounds|\text{Decide } U]$ and

Choose $F$ if $E[\pounds|\text{Decide } F] < E[\pounds|\text{Decide } U]$ (0.67)

And, alternatively:

$$\text{Choose } F \text{ if: } \frac{E[\pounds \mid \text{Decide } U]}{E[\pounds \mid \text{Decide } F]} > 1 \quad (0.68)$$

and

Choose $U$ otherwise

The individual costs may represent any cost to the business, including actual fraud losses, resources used to respond an alert and negative impact on the customer if a transaction is stopped. An assumption is made that the cost of making the correct decision is 0, ie, £ (Decide F when really F)=£ (Decide U when really U)=0. Recognition should be given that the cost of making an incorrect decision can depend on the Session itself (via the associated Activities). Using this, the decision criteria of Equation (0.68) is rewritten as:

$$\frac{\pounds_{Missed}^{S_k} P(F \mid S_k)}{\pounds_{FA}^{S_k} P(U \mid S_k)} > 1 \tag{0.69}$$

Using Bayes Rule:

$$\frac{\pounds_{Missed}^{S_k} P(S_k \mid F^{k-1}) P(F_0)}{\pounds_{FA}^{S_k} P(S_k \mid U^{k-1}) P(U_0)} > 1 \tag{0.70}$$

Recognizing that the user and fraud priors are related as $P(U_0)=1-P(F_0)$ and that the fraud prior $P(F_0)$ is constant, these terms can be moved into the threshold such that:

$$\theta(S_k)\lambda(S_k) > e^\tau \tag{0.71}$$

or $$\log(\theta(S_k)) + R(S_k) > \tau$$

where $$\theta(S_k) = \frac{\pounds_{Missed}^{S_k}}{\pounds_{FA}^{S_k}} \text{ @ Cost Ratio}$$

$$\tau = \log\left[\frac{1 - P(F_0)}{P(F_0)}\right]$$

A sufficient statistic can be defined as:

$$R^\theta(S_k) \text{ @ Cost Adjusted Risk} = R(S_k) + \log[\theta(S_k)] \tag{0.72}$$

In other words, the Cost Adjusted Risk of the Session is a generalization of the simple Risk score that is able to incorporate the cost of different types of sessions. Therefore, the Cost Adjusted Risk for the Session can be used as the primary decision statistic for Sessions.

The cost ratio θ does not depend on the content of the Session (i.e., the costs were the same for all sessions), so it can be moved into the threshold such that the original $R(S_k)$ is a sufficient statistic. This is usually a valid when only considering a single event type like a Login Event.

Activity Model

In general there are many types of activities and an appropriate risk model for an activity type should be based on the nature of the activity. In this section a general model is described that can be used for many types of activities. Other models can be derived and used based on similar logic.

This model described calculates the Risk of an activity based on whether any Activity of the Type (regardless of how many) have been observed in the Session. The Cost contribution can include a base cost, an incremental costs for each observed Activity and a cost that can be tied to a quantitative observed parameter of the Activity (for example, the amount of a money transfer).

The general form for calculating the Risk component from all Activities of a given type (i.e., $A \in \overline{A}_{c^i}$) is as follows:

$$R_{\overline{A}_{c^i}}(S_k) = R_{\overline{A}_{c^i}}^{freq}(S_k) + \sum_{A_j \in A_{c^i}} R_{A_j}^{params}(S_k) \tag{0.73}$$

For this Activity Model Template all Activities of the Type should be treated as indistinguishable, i.e., $P(V \mid C, F^{k-1}) = P(V \mid C, U^{k-1})$, such that $$R_{A_j}^{params}(S_k) = 0 \tag{0.74}$$

The quantity $$R_{\overline{A}_{c^i}}^{freq}(S_k)$$

is based on whether an Activity of this type is observed (i.e., $N_{c^i} > 0$) or not observed (i.e., $N_{c^i} = 0$) in this session. This model is derived from a Beta distribution to estimate the likelihood of observing this type of Activity for this User, i.e.:

$$P(\text{Observe } A \in \overline{A}_{c^i} \mid U^{k-1}) = \frac{\alpha \rho_U + \Omega_{c^i \mid U^{k-1}}}{\alpha + \Omega_{total \mid U^{k-1}}} \tag{0.75}$$

$$P(\text{Observe } A \in \overline{A}_{c^i} \mid F^{k-1}) = \rho_F$$

where
  $\rho_F$=fraud_occurance_prior
    This is the prior probability of seeing this Activity Type within a session given Fraud
  $\rho_U$=user_occurance_prior
    This is the prior probability of seeing this Activity Type within a session given Fraud
  α=alpha_occurance
    This is the α associated with the Dirichlet Model for the User (in units of number of Sessions)
  $\Omega_{c^i \mid U^{k-1}}$@The observed Session occurrences of $c^i$ for $U^{k-1}$
    This is the observed occurrences (count or preferably the accumulated trust) of prior Sessions for this User that contain this Activity Type
  $\Omega_{total \mid U^{k-1}}$@The total observed session occurrences for $U^{k-1}$
    This is the total number of observed Sessions (count or preferably the accumulated trust) of prior Sessions (regardless of whether this Activity Type was observed)

Using the definitions in Equation (0.75), $R_{\overline{A}_{c^i}}^{freq}(S_k)$ is calculated as:

1. If $S_k$ is open and no Activity of this type has been observed, then (see Equation (0.61)):

$$R_{\overline{A}_{c^i}}^{freq}(S_k) = \log\left(\frac{P(N_{c^i} \geq 0 \mid F^{k-1})}{P(N_{c^i} \geq 0 \mid U^{k-1})}\right) = \log\left(\frac{1}{1}\right) \tag{0.76}$$

$$= 0$$

2. If $S_k$ is closed and no Activity of this type has been observed, then:

$$R_{\overline{A}_{c^i}}^{freq}(S_k) = \log\left[\frac{1 - P(\text{Observe } A \in \overline{A}_{c^i} \mid F^{k-1})}{1 - P(\text{Observe } A \in \overline{A}_{c^i} \mid U^{k-1})}\right] \tag{0.77}$$

$$= \log\left[\frac{(1 - \rho_F)(\alpha + \Omega_{total \mid U^{k-1}})}{\alpha(1 - \rho_U) + (\Omega_{total \mid U^{k+1}} - \Omega_{c^i \mid U^{k-1}})}\right]$$

3. If there has been at least one Activity of this type observed (regardless of whether $S_k$ is open or closed), then:

$$R^{freq}_{\overline{A}_{c^i}}(S_k) = \log\left[\frac{P(\text{Observe } A \in \overline{A}_{c^i} | F^{k-1})}{P(\text{Observe } A \in \overline{A}_{c^i} | U^{k-1})}\right] \quad (0.78)$$

$$= \log\left[\rho_F \frac{\alpha + \Omega_{total|U^{k-1}}}{\alpha\rho_U + \Omega_{c^i|U^{k-1}}}\right]$$

The Missed Fraud and False Alarm Cost model uses a general parameterized form that can be used to model a variety of situations. Specifically (for the Fraud Cost):

$$\pounds^{c^i}_{Missed} = \beta^{Missed}_{type} + \beta^{Missed}_{count} N_{c^i} + \sum_{A_j \in A_{c^i}} \beta^{Missed}_{quant} V^{A_j}_{quantifier} \quad (0.79)$$

where
  $N_{c^j}$ is the number of Activities of Type $c^i$ that have been observed in this Session, including the current Activity
  $V_{quantifier}^A$ is the Quantifier parameter associated Activity A
  The β's are cost coefficients provided as Activity Model Template Parameters
    $\beta_{type}^{Missed}$=missed_type_cost
    $\beta_{count}^{Missed}$=missed_type_cost
    $\beta_{quant}^{Missed}$=missed_count_cost The False Alarm Cost model uses the same general parameter form, but with a separate set of cost coefficients.

$$\pounds^{c^i}_{FA} = \beta^{FA}_{type} + \beta^{FA}_{count} N_{c^i} + \sum_{A_j \in A_{c^i}} \beta^{FA}_{quant} V^{A_j}_{quantifier} \quad (0.80)$$

where
  The β's are cost coefficients provided as Activity Model Template Parameters
    $\beta_{type}^{FA}$=FA_type_cost
    $\beta_{count}^{FA}$=FA_count_cost
    $\beta_{quant}^{FA}$=FA_quantifier_cost The embodiments described herein include a method comprising: automatically generating a causal model corresponding to a user; estimating a plurality of components of the causal model using event parameters of a first set of events undertaken by the user in an account of the user; and predicting expected behavior of the user during a second set of events using the causal model.

Automatically generating the causal model of an embodiment includes generating statistical relationships between components of the plurality of components.

The method of an embodiment comprises representing the causal model as a Bayesian network.

Automatically generating the causal model of an embodiment includes generating a joint probability distribution that includes the plurality of components.

The plurality of components of an embodiment includes a plurality of probability distribution functions that represent the event parameters.

The event parameters of an embodiment are observable parameters collected during the first set of events.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the second set of events, location of the device, identification of the device, and electronic service provider of the device.

Predicting the expected behavior of the user of an embodiment includes generating expected event parameters of the second set of events.

Generating the expected event parameters of an embodiment includes generating a first set of predicted probability distributions that represent the expected event parameters, wherein generating the first set of predicted probability distributions assumes the user is conducting the second set of events.

The method of an embodiment comprises receiving a predictive fraud model. The method of an embodiment comprises generating a second set of predicted probability distributions that represent expected fraud event parameters, wherein generating the second set of predicted probability distributions assumes a fraudster is conducting the second set of events, wherein the fraudster is any person other than the user.

The method of an embodiment comprises automatically generating the predictive fraud model by estimating a plurality of fraud components of the predictive fraud model using fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The method of an embodiment comprises generating in real-time a risk score of an event of the second set of events using the expected event parameters and the expected fraud event parameters along with the observed parameters.

The method of an embodiment comprises generating an alert corresponding to an event of the second set of events when the expected behavior indicates a person other than the user is conducting the event.

The method of an embodiment comprises automatically updating the causal model using a second set of event parameters collected during the second set of events.

The second set of event parameters of an embodiment are observable parameters collected during the second set of events.

Automatically updating the causal model of an embodiment includes updating a joint probability distribution that includes the plurality of components.

Automatically updating the causal model of an embodiment includes updating at least one of the plurality of components.

Automatically updating the causal model of an embodiment includes updating at least one of a plurality of probability distribution functions that represent the event parameters, the updating modifying the at least one of the plurality of probability distribution functions by considering data of the second set of event parameters.

The method of an embodiment comprises generating a probability distribution function for each of the event parameters of the first set of events. The method of an embodiment comprises generating an updated probability distribution function for each of the event parameters by applying data of a second set of event parameters of the second set of events to the probability distribution function.

The method of an embodiment comprises receiving a baseline causal model that corresponds to the user, the baseline causal model generated without using data of any event. The method of an embodiment comprises generating the causal model by generating a joint probability distribution that includes the plurality of components, wherein the plurality of components includes the updated probability distribution function for any event parameter represented in the causal model.

The first set of events and the second set of events of an embodiment comprise at least one of online events, offline events, and multiple channel events.

Online events of an embodiment are events undertaken via electronic access to the account.

Events of an embodiment comprise login events.

Events of an embodiment comprise activity events.

A set of events of an embodiment comprises a session, wherein the session is a sequence of related events.

The sequence of related events of an embodiment comprises a session login event and a termination event.

The sequence of related events of an embodiment comprises at least one activity event.

The method of an embodiment comprises determining probabilistically that the second set of events was conducted by the user. The method of an embodiment comprises automatically updating the causal model using a second set of event parameters collected during the second set of events.

The method of an embodiment comprises updating the causal model to include a trust factor, the trust factor representing a probability that the second set of events was in fact conducted by the user.

The method of an embodiment comprises updating the causal model to include an accumulated trust factor, the accumulated trust factor representing a cumulative probability across a plurality of sets of events that an event parameter in the plurality of sets of events was in fact conducted by the user.

Automatically generating the causal model of an embodiment comprises generating the causal model to include a decay parameter.

The decay parameter of an embodiment comprises an exponential decay function by which a relative weight of each event in a set of events in the account changes with passage of time since the event.

The embodiments described herein include a method comprising: receiving a plurality of observations corresponding to a first event, the first event including actions taken in an account during electronic access of the account; generating probabilistic relationships between the observations and derived parameters of an owner of the account; automatically generating an account model to include the probabilistic relationships; and estimating actions of the owner during a second event using the account model, wherein the second event follows the first event in time.

The embodiments described herein include a method comprising: automatically generating a causal model corresponding to a user, the generating comprising estimating a plurality of components of the causal model using event parameters of a previous event undertaken by the user in an account of the user; predicting expected behavior of the user during a next event in the account using the causal model, wherein predicting the expected behavior of the user includes generating predicted event parameters of the next event; receiving observed event parameters of the next event; and updating the causal model for use in a future event, the updating comprising regenerating the plurality of components based on a relationship between the expected event parameters and the observed event parameters.

The embodiments described herein include a system comprising a processor executing at least one application, the application receiving event parameters of a first set of events undertaken by the user in an account of the user, the application automatically generating a causal model corresponding to a user by estimating a plurality of components of the causal model using the event parameters of the first set of events, the application using the causal model to output a prediction of expected behavior of the user during a second set of events.

Automatically generating the causal model of an embodiment includes generating statistical relationships between components of the plurality of components.

Automatically generating the causal model of an embodiment includes generating a joint probability distribution that includes the plurality of components.

The plurality of components of an embodiment includes a plurality of probability distribution functions that represent the event parameters.

The event parameters of an embodiment are observable parameters collected during the first set of events.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the second set of events, location of the device, identification of the device, and electronic service provider of the device.

Predicting the expected behavior of the user of an embodiment includes generating expected event parameters of the second set of events.

Generating the expected event parameters of an embodiment includes generating a first set of predicted probability distributions that represent the expected event parameters, wherein generating the first set of predicted probability distributions assumes the user is conducting the second set of events.

The system of an embodiment comprises receiving a predictive fraud model. The system of an embodiment comprises generating a second set of predicted probability distributions that represent expected fraud event parameters, wherein generating the second set of predicted probability distributions assumes a fraudster is conducting the second set of events, wherein the fraudster is any person other than the user.

The system of an embodiment comprises generating in real-time a risk score of an event of the second set of events using the expected event parameters and the expected fraud event parameters along with the observed parameters.

The system of an embodiment comprises generating an alert corresponding to an event of the second set of events when the expected behavior indicates a person other than the user is conducting the event.

The system of an embodiment comprises automatically updating the causal model using a second set of event parameters collected during the second set of events.

Automatically updating the causal model of an embodiment includes updating at least one of a plurality of probability distribution functions that represent the event parameters, the updating modifying the at least one of the plurality of probability distribution functions by considering data of the second set of event parameters.

The system of an embodiment comprises generating a probability distribution function for each of the event parameters of the first set of events. The system of an embodiment comprises generating an updated probability distribution function for each of the event parameters by applying data of a second set of event parameters of the second set of events to the probability distribution function.

The first set of events and the second set of events of an embodiment comprise at least one of online events, offline events, and multiple channel events.

Online events of an embodiment are events undertaken via electronic access to the account.

Events of an embodiment comprise login events.

Events of an embodiment comprise activity events. A set of events of an embodiment comprises a session, wherein the session is a sequence of related events.

The system of an embodiment comprises determining probabilistically that the second set of events was conducted by the user. The system of an embodiment comprises automatically updating the causal model using a second set of event parameters collected during the second set of events.

The system of an embodiment comprises updating the causal model to include a trust factor, the trust factor representing a probability that the second set of events was in fact conducted by the user.

The system of an embodiment comprises updating the causal model to include an accumulated trust factor, the accumulated trust factor representing a cumulative probability across a plurality of sets of events that an event parameter in the plurality of sets of events was in fact conducted by the user.

Automatically generating the causal model of an embodiment comprises generating the causal model to include a decay parameter.

The decay parameter of an embodiment comprises an exponential decay function by which a relative weight of each event in a set of events in the account changes with passage of time since the event.

The embodiments described herein include a system comprising a processor executing at least one application, the application receiving event parameters of a first set of events undertaken by a user in an account of the user, the application automatically generating an account model corresponding to the user, the account model comprising a plurality of components, wherein generating the account model comprises generating the plurality of components using the event parameters of the first set of events, the application predicting expected behavior of the user during a second set of events using the account model, the application generating an updated version of the account model for use in a future set of events, the updating comprising regenerating the plurality of components using the second set of events.

The embodiments described herein include a method comprising: automatically generating a causal model corresponding to a user, the generating comprising estimating a plurality of components of the causal model using event parameters of a previous event undertaken by the user in an account of the user; predicting expected behavior of the user during a next event in the account using the causal model, wherein predicting the expected behavior of the user includes generating expected event parameters of the next event; using a predictive fraud model, generating fraud event parameters, wherein generating the fraud event parameters assumes a fraudster is conducting the next event, wherein the fraudster is any person other than the user; and generating a risk score of the next event using the expected event parameters and the fraud event parameters, the risk score indicating the relative likelihood the future event is performed by the user versus the fraudster.

The method of an embodiment comprises automatically generating the predictive fraud model by estimating a plurality of fraud components of the predictive fraud model using the fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating a joint probability distribution that includes the plurality of fraud components.

The plurality of fraud components of an embodiment includes a plurality of fraud probability distribution functions that represent the fraud event parameters.

The fraud event parameters of an embodiment are observable fraud parameters collected during the previous fraudulent events.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The method of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The method of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The method of an embodiment comprises identifying at least one previous fraud event, a previous fraud event comprising a previous event in the account potentially caused by the fraudster. The method of an embodiment comprises generating the original fraud model by estimating a plurality of components of the fraud model using event parameters of at least one previous fraud event undertaken in the account, the at least one previous fraud event potentially conducted by the fraudster.

The method of an embodiment comprises modifying the predictive fraud model based on at least one previous event potentially conducted by the fraudster.

The method of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

Automatically generating the causal model of an embodiment includes generating statistical relationships between components of the plurality of components.

Automatically generating the causal model of an embodiment includes generating a joint probability distribution that includes the plurality of components.

The plurality of components of an embodiment includes a plurality of probability distribution functions that represent the event parameters of the previous event.

The event parameters of an embodiment are observable parameters collected during the previous event.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the next event, location of the device, identification of the device, and electronic service provider of the device.

Predicting the expected behavior of the user of an embodiment includes generating expected event parameters of the next event.

Generating the expected event parameters of an embodiment includes generating a first set of predicted probability distributions that represent the expected event parameters, wherein generating the first set of predicted probability distributions assumes the user is conducting the next event.

The method of an embodiment comprises generating an alert corresponding to the next event when the risk score indicates a person other than the user is conducting the next event.

The method of an embodiment comprises automatically updating the causal model using a second set of event parameters collected during the next event.

The second set of event parameters of an embodiment is observable parameters collected during the next event.

Automatically updating the causal model of an embodiment includes updating a joint probability distribution that includes the plurality of components.

Automatically updating the causal model of an embodiment includes updating at least one of the plurality of components.

Automatically updating the causal model of an embodiment includes updating at least one of a plurality of probability distribution functions that represent the event parameters, the updating modifying the at least one of the plurality of probability distribution functions by considering data of the second set of event parameters.

The method of an embodiment comprises generating a probability distribution function for each of the event parameters of the previous event. The method of an embodiment comprises generating an updated probability distribution function for each of the event parameters by applying data of a second set of event parameters of the next event to the probability distribution function.

The method of an embodiment comprises receiving a baseline causal model that corresponds to the user, the baseline causal model generated without using data of any event. The method of an embodiment comprises generating the causal model by generating a joint probability distribution that includes the plurality of components, wherein the plurality of components includes the updated probability distribution function for any event parameter represented in the causal model.

The previous event and the next event of an embodiment comprise at least one of online events, offline events, and multiple channel events.

Online events of an embodiment are events undertaken via electronic access to the account.

An event of an embodiment comprises a login event.

An event of an embodiment comprises an activity event.

The method of an embodiment comprises determining probabilistically that the next event was conducted by the user. The method of an embodiment comprises automatically updating the causal model using a second set of event parameters collected during the next event.

The method of an embodiment comprises updating the causal model to include a trust factor, the trust factor representing a probability that the next event was in fact conducted by the user.

The method of an embodiment comprises updating the causal model to include an accumulated trust factor, the accumulated trust factor representing a cumulative probability across a plurality of events that an event parameter in the plurality of events was in fact conducted by the user.

Automatically generating the causal model of an embodiment comprises generating the causal model to include a decay parameter.

The decay parameter of an embodiment comprises an exponential decay function by which a relative weight of each event in the account changes with passage of time since the event.

The embodiments described herein include a method comprising: automatically generating an account model corresponding to a user, the generating of the account model using event parameters of a previous event performed by the user in an account of the user to generate predicted distributions of the event parameters for a next event in the account, wherein the account model includes the predicted distributions of the event parameters; receiving observed event parameters of the next event as the next event occurs; generating a first probability using the account model, wherein the first probability is a probability of observing the observed event parameters assuming the user is conducting the next event; generating a second probability using a fraud model, wherein the second probability is a probability of observing the observed event parameters assuming a fraudster is conducting the next event, wherein the fraudster is a person other than the user; and generating a risk score using the first probability and the second probability, the risk score indicating the relative likelihood the next event is performed by the user versus the fraudster.

The embodiments described herein include a method comprising: generating probabilistic relationships between observations of a first event and derived parameters of an owner of an account; automatically generating an account model including the probabilistic relationships; dynamically updating the account model using observations of a second event; and using the account model to predict during a third event whether the owner or a fraudster is perpetuating the third event, wherein an event includes actions taken in the account during electronic access of the account.

The embodiments described herein include a system comprising a processor executing at least one application, the application automatically generating a predictive user model corresponding to a user, wherein the predictive user model includes a plurality of probability distributions representing event parameters observed during a first event in an account of the user, the application generating predicted event parameters using the predictive user model, the predicted event parameters expected to be observed during a second event in the account, the second event following the first event, the application comparing actual event parameters of the second event to the predicted event parameters during the second event and generating an alert corresponding to the second event when the actual event parameters appear to be initiated by a person other than the user.

The embodiments described herein include a system comprising a processor executing at least one application, the application automatically generating a causal model corresponding to a user by estimating a plurality of components of the causal model using event parameters of a previous event undertaken by the user in an account of the user, the application predicting expected behavior of the user during a next event in the account using the causal model, wherein predicting the expected behavior of the user includes generating expected event parameters of the next event, the application using a predictive fraud model, generating fraud event parameters, wherein generating the fraud event parameters assumes a fraudster is conducting the next event, wherein the fraudster is any person other than the user, the application generating a risk score of the next event using the expected event parameters and the fraud event parameters, the risk score indicating the relative likelihood the future event is performed by the user versus the fraudster.

The system of an embodiment comprises automatically generating the predictive fraud model by estimating a plurality of fraud components of the predictive fraud model using the fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating a joint probability distribution that includes the plurality of fraud components.

The plurality of fraud components of an embodiment includes a plurality of fraud probability distribution functions that represent the fraud event parameters, wherein the fraud event parameters are observable fraud parameters collected during the previous fraudulent events.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The system of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The system of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The system of an embodiment comprises identifying at least one previous fraud event, a previous fraud event comprising a previous event in the account potentially caused by the fraudster. The system of an embodiment comprises generating the original fraud model by estimating a plurality of components of the fraud model using event parameters of at least one previous fraud event undertaken in the account, the at least one previous fraud event potentially conducted by the fraudster.

The system of an embodiment comprises modifying the predictive fraud model based on at least one previous event potentially conducted by the fraudster.

The system of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

Automatically generating the causal model of an embodiment includes generating a joint probability distribution that includes the plurality of components.

The plurality of components of an embodiment includes a plurality of probability distribution functions that represent the event parameters of the previous event.

The event parameters of the previous event of an embodiment are observable parameters collected during the previous event.

The event parameters of the previous event of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

Automatically generating the causal model of an embodiment includes generating statistical relationships between the event parameters and derived parameters.

The derived parameters of an embodiment include one or more of geographic area from which a device is initiating the next event, location of the device, identification of the device, and electronic service provider of the device.

Predicting the expected behavior of the user of an embodiment includes generating expected event parameters of the next event, wherein generating the expected event parameters includes generating a first set of predicted probability distributions that represent the expected event parameters, wherein generating the first set of predicted probability distributions assumes the user is conducting the next event.

The system of an embodiment comprises generating an alert corresponding to the next event when the expected behavior indicates a person other than the user is conducting the next event.

The system of an embodiment comprises automatically updating the causal model using a second set of event parameters collected during the next event, wherein the second set of event parameters is observable parameters collected during the next event.

Automatically updating the causal model of an embodiment includes updating at least one of a plurality of probability distribution functions that represent the event parameters, the updating modifying the at least one of the plurality of probability distribution functions by considering data of the second set of event parameters.

The previous event and the next event of an embodiment comprise at least one of online events, offline events, and multiple channel events, wherein online events are events undertaken via electronic access to the account.

An event of an embodiment comprises at least one of a login event and an activity event.

The system of an embodiment comprises determining probabilistically that the next event was conducted by the user. The system of an embodiment comprises automatically updating the causal model using a second set of event parameters collected during the next event.

The system of an embodiment comprises updating the causal model to include a trust factor, the trust factor representing a probability that the next event was in fact conducted by the user.

The system of an embodiment comprises updating the causal model to include an accumulated trust factor, the accumulated trust factor representing a cumulative probability across a plurality of events that an event parameter in the plurality of events was in fact conducted by the user.

Automatically generating the causal model of an embodiment comprises generating the causal model to include a decay parameter, wherein the decay parameter comprises an exponential decay function by which a relative weight of each event in the account changes with passage of time since the event.

The embodiments described herein include a system comprising: a risk engine executing on a processor and coupled to a financial system that includes an account, the risk engine generating an account model corresponding to a user and events conducted in the account, the generating of the account model using event parameters of a previous event performed by the user in the account to generate predicted distributions of the event parameters for a next event in the account, the risk engine receiving event parameters of the next event as the next event occurs, the risk engine generating a first probability using the account model, wherein the first probability is a probability of observing the event parameters assuming the user is conducting the next event, the risk engine generating a second probability using a fraud model, wherein the second probability is a probability of observing the event parameters assuming a fraudster is conducting the next event, wherein the fraudster is a person other than the user, wherein the events conducted in the account comprise the previous event and the next event, the risk engine generating a risk score using the first probability and the second probability, the risk score indicating the relative likelihood the next event is performed by the user versus the fraudster; and a risk application executing on the processor, the risk application comprising an analytical user interface (AUI), the AUI displaying for any event in the account at least one of the risk score and the event parameters.

The AUI of an embodiment comprises a horizontal axis representing a sequence of events ordered by time.

The AUI of an embodiment comprises a vertical axis representing the event parameters.

The event parameters of an embodiment include one or more of Internet Protocol (IP) data and Hypertext Transfer Protocol (HTTP) data.

The IP data of an embodiment includes one or more of an IP address, IP address country, IP address city, IP network block, and internet service provider supporting an event.

The HTTP data of an embodiment includes one or more of data of an operating system, a user agent string, a referrer string, and internet browser of a computer used for an event.

The AUI of an embodiment comprises a plurality of columns, wherein each column of the plurality of columns represents at lease one event of the events conducted in the account, wherein the plurality of columns are arranged according to date.

The AUI of an embodiment comprises a plurality of rows, wherein a set of rows of the plurality of rows represent event parameters of the events.

The AUI comprises of an embodiment a plurality of intersection regions, each intersection region defined by an intersection of a row of the set of rows and a column, wherein the intersection region corresponds to an event parameter of the at least one event, wherein the intersection region includes color coding relating the event parameter to a corresponding probability of the account model.

The color coding of an embodiment represents a relative likelihood ratio that the event parameter corresponds to the user.

The AUI of an embodiment comprises a risk row representing risk of the event, wherein each intersection region defined by the intersection of the risk row with a column corresponds to the risk score of the at least one event corresponding to the column.

The intersection region of an embodiment includes color coding relating the risk score to the at least one event.

The color coding of an embodiment represents a relative likelihood ratio that the user conducted the at least one event.

The at least one event of an embodiment comprises at least one of an online event, an offline event, and a multiple-channel event.

Online events of an embodiment are events undertaken via electronic access to the account.

The at least one event of an embodiment comprises a login event.

The at least one event of an embodiment comprises an activity event.

The at least one event of an embodiment comprises a session, wherein the session is a sequence of related events.

The sequence of related events of an embodiment comprises a session login event and a termination event.

The sequence of related events of an embodiment comprises at least one activity event following the login event.

Generating the account model of an embodiment includes generating statistical relationships between predicted distributions.

Generating the account model of an embodiment includes generating a joint probability distribution that includes the predicted distributions.

The predicted distributions of an embodiment include a plurality of probability distribution functions that represent the event parameters.

The event parameters of an embodiment are observable parameters collected during the previous event.

Generating the account model of an embodiment includes generating statistical relationships between the event parameters and derived parameters.

The derived parameters of an embodiment include one or more of geographic area from which a device is initiating the next event, location of the device, identification of the device, and electronic service provider of the device.

Generating the risk score of an embodiment includes generating expected event parameters of the next event.

Generating the expected event parameters of an embodiment includes generating a first set of predicted probability distributions that represent the expected event parameters, wherein generating the first set of predicted probability distributions assumes the user is conducting the second set of events.

The system of an embodiment comprises receiving a predictive fraud model. The system of an embodiment comprises generating a second set of predicted probability distributions that represent expected fraud event parameters, wherein generating the second set of predicted probability distributions assumes a fraudster is conducting the next event.

The system of an embodiment comprises automatically generating the predictive fraud model by estimating a plurality of fraud components of the predictive fraud model using fraud event parameters of previous fraudulent events undertaken in a plurality of accounts, wherein the previous fraudulent events are events suspected as having been conducted by the fraudster.

Automatically generating the predictive fraud model of an embodiment includes generating statistical relationships between fraud components of the plurality of fraud components.

Automatically generating the predictive fraud model of an embodiment includes generating statistical relationships between the fraud event parameters and derived fraud parameters.

The derived fraud parameters of an embodiment include one or more of a location of the device, identification of the device, and electronic service provider of the device.

The system of an embodiment comprises generating the predictive fraud model.

Generating the predictive fraud model of an embodiment comprises generating an original fraud model to include a probability of observing an event given that the event is caused by the fraudster and absent any other information about the event Generating the predictive fraud model of an embodiment comprises generating a probabilistic combination of the original fraud model and an impersonation model.

The system of an embodiment comprises generating the original fraud model to include a probability of observing an event given that the event is caused by the fraudster and absent any other information about the event.

Generating the predictive fraud model of an embodiment comprises generating the predictive fraud model to include an impersonation probability, wherein the impersonation probability is a probability that the fraudster successfully impersonates a parameter value of an event parameter of a set of events undertaken by the user.

The impersonation model of an embodiment comprises a probability that the fraudster mimics an event parameter of a set of events undertaken by the user.

The impersonation model of an embodiment comprises a probability that the fraudster observes an event parameter of a set of events undertaken by the user.

The system of an embodiment comprises identifying at least one previous fraud event, a previous fraud event comprising a previous event in the account potentially caused by the fraudster. The system of an embodiment comprises generating the original fraud model by estimating a plurality of components of the fraud model using event parameters of at least one previous fraud event undertaken in the account, the at least one previous fraud event potentially conducted by the fraudster.

The system of an embodiment comprises modifying the predictive fraud model based on at least one previous event potentially conducted by the fraudster.

The system of an embodiment comprises generating the predictive fraud model to include a fraud co-occurrence coefficient for at least one previous event potentially conducted by the fraudster.

The fraud co-occurrence coefficient of an embodiment represents an accumulated mistrust derived recursively from the at least one previous event potentially conducted by the fraudster.

The fraud co-occurrence coefficient of an embodiment comprises a coefficient representing an affect of a plurality of previous events potentially conducted by the fraudster.

The system of an embodiment comprises selectively updating the account model using a second set of event parameters collected during the next event.

The second set of event parameters of an embodiment is observable parameters collected during the next event.

Automatically updating the account model of an embodiment includes updating a joint probability distribution that includes a plurality of components of the account model.

Automatically updating the account model of an embodiment includes updating at least one of a plurality of components of the account model.

Automatically updating the account model of an embodiment includes updating at least one of a plurality of probability distribution functions that represent the event parameters, the updating modifying the at least one of the plurality of probability distribution functions by considering data of the second set of event parameters.

The system of an embodiment comprises generating a probability distribution function for each of the event parameters of the prior event. The system of an embodiment comprises generating an updated probability distribution function for each of the event parameters by applying data of a second set of event parameters of the next event to the probability distribution function.

The system of an embodiment comprises receiving a baseline account model that corresponds to the user, the baseline account model generated without using data of any event. The system of an embodiment comprises generating the account model by generating a joint probability distribution that includes a plurality of components of the account model, wherein the plurality of components includes the updated probability distribution function for any event parameter represented in the account model.

The previous event and the next event of an embodiment comprise at least one of online events, offline events, and multiple channel events.

Online events of an embodiment are events undertaken via electronic access to the account.

Events of an embodiment comprise login events.

Events of an embodiment comprise activity events.

The events of an embodiment comprise a session, wherein the session is a sequence of related events.

The sequence of related events of an embodiment comprises a session login event and a termination event.

The sequence of related events comprises at least one activity event.

The system of an embodiment comprises determining probabilistically that the next event was conducted by the user. The system of an embodiment comprises automatically updating the account model using a second set of event parameters collected during the next event.

The system of an embodiment comprises updating the account model to include a trust factor, the trust factor representing a probability that the next event was in fact conducted by the user.

The system of an embodiment comprises updating the account model to include an accumulated trust factor, the accumulated trust factor representing a cumulative probability across a plurality of events that an event parameter in the plurality of events was in fact conducted by the user.

Automatically generating the account model of an embodiment comprises generating the account model to include a decay parameter.

The decay parameter of an embodiment comprises an exponential decay function by which a relative weight of each event of the events in the account changes with passage of time since the event.

The embodiments described herein include a system comprising: a risk engine executing on a processor and receiving from a financial system observations corresponding to a prior event that include actions taken in an account of the financial system during electronic access of the account, the risk engine estimating parameters of an account model using the observations and dynamically generating an account model to include the parameters, the account model corresponding only to the user, the risk engine using output of the account model to generate a risk score that is a relative likelihood an event in the account following the prior event is performed by the user versus the fraudster; and a risk application executing on the processor, the risk application comprising an analytical user interface (AUI), the AUI displaying for any event in the account at least one of the risk score and event parameters of any event in the account.

Embodiments described herein include a system comprising a platform comprising a processor coupled to at least one database. The system includes a plurality of risk engines coupled to the platform. The plurality of risk engines receiving event data and risk data from a plurality of data sources that includes at least one financial application. The event data comprises data of actions taken in a target account during electronic access of the account. The risk data comprises data of actions taken in a plurality of accounts different from the target account. The plurality of risk engines uses the event data and the risk data to dynamically generate an account model that corresponds to the target account, and uses the account model to generate a risk score that is a relative likelihood an action taken in the target account is fraud. The system includes a risk application coupled to the platform and comprising an analytical user interface that displays for the actions in the target account at least one of the risk score and event data of any event in the account.

Embodiments described herein include a method comprising receiving at a plurality of risk engines event data and risk data from a plurality of data sources that includes at least one financial application. The event data comprises data of actions taken in a target account during electronic access of the account. The risk data comprises data of actions taken in a plurality of accounts different from the target account. The method comprises dynamically generating an account model that corresponds to the target account, the generating using the event data and the risk data. The method comprises generating a risk score using the account model. The risk score is a relative likelihood an action taken in the target account is fraud. The method comprises presenting an analytical user interface that displays for the actions in the target account at least one of the risk score and event data of any event in the account.

The embodiments described herein include additional components as described in detail below.

Embodiments of the FraudMAP System

Figure 17:
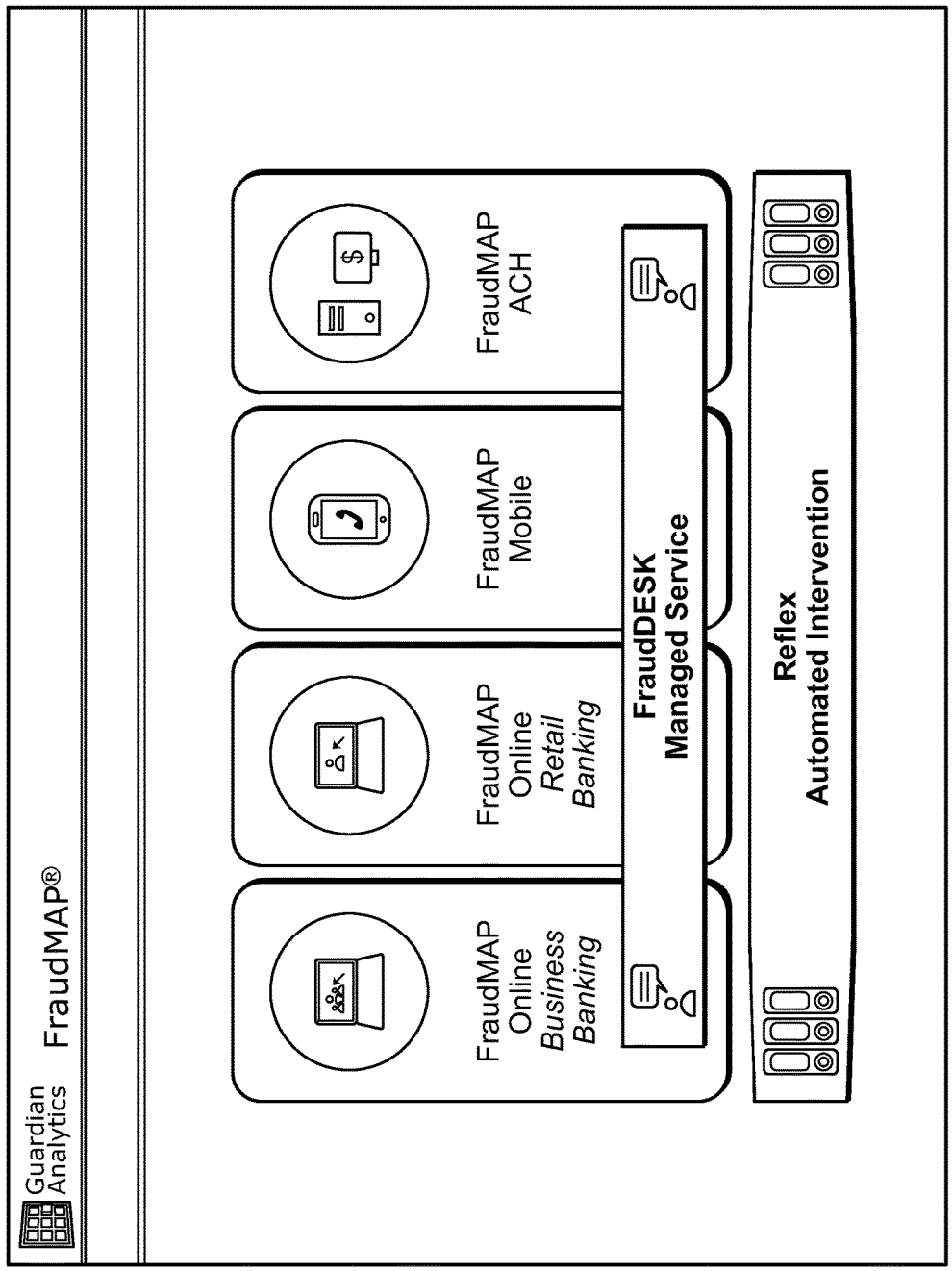
FIG. 17 is a block diagram of the FraudMAP system, under an embodiment.

FIG. 17 is a block diagram of the FraudMAP system, under an embodiment.

Figure 18:
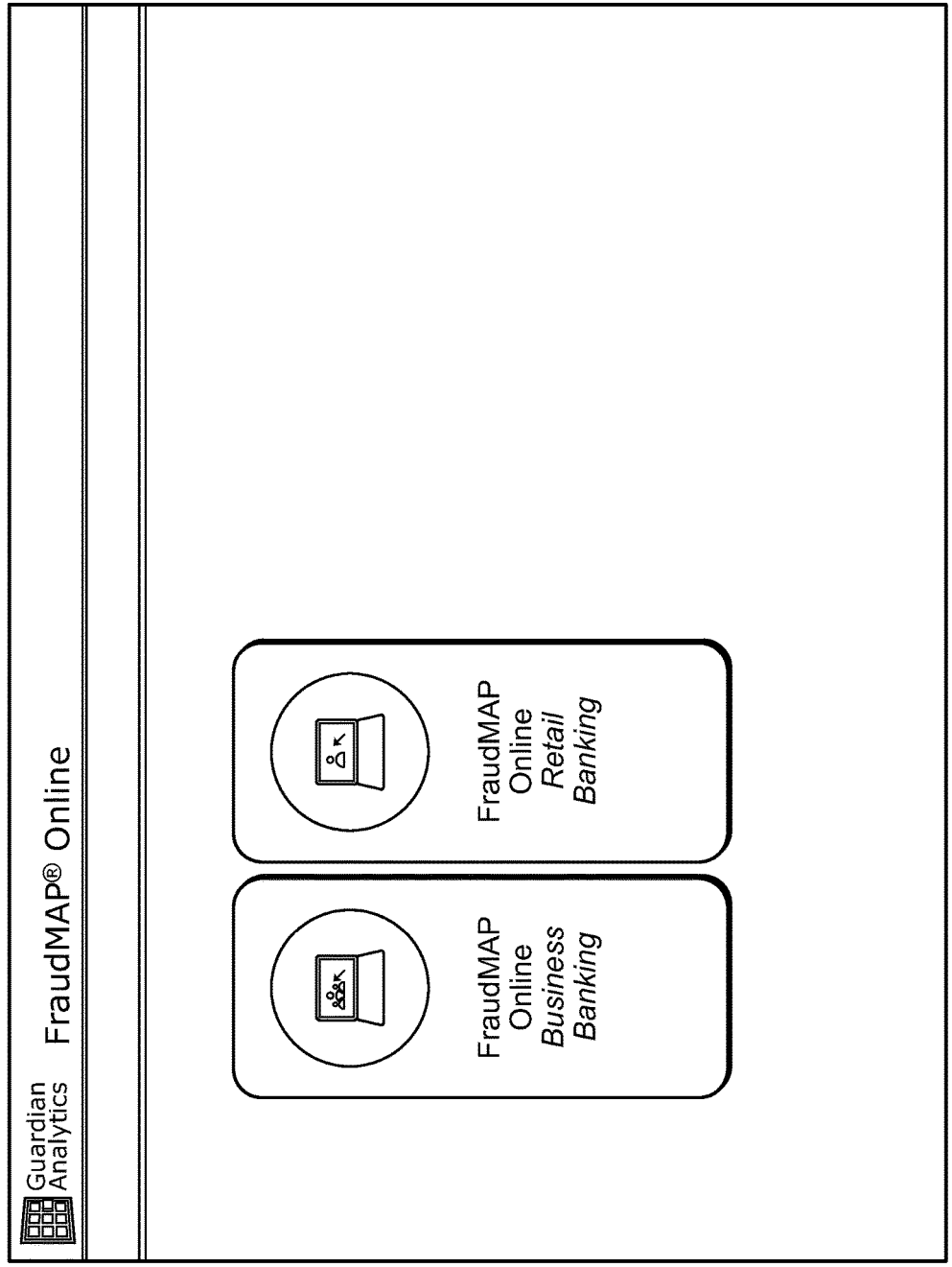
FIG. 18 is a block diagram of the FraudMAP Online system, under an embodiment.

FIG. 18 is a block diagram of the FraudMAP Online system, under an embodiment.

Figure 19:
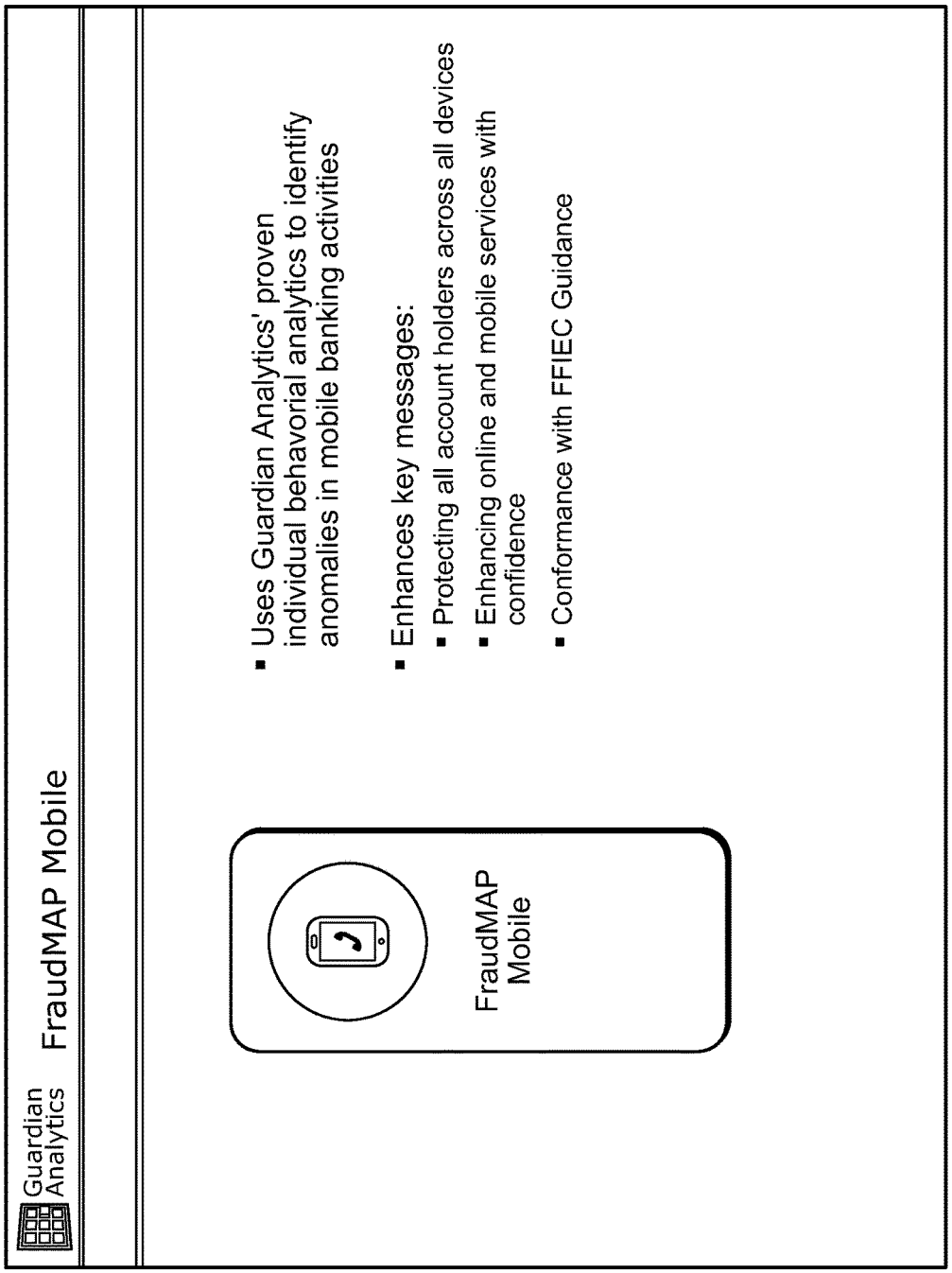
FIG. 19 is a block diagram of the FraudMAP Mobile system, under an embodiment.

FIG. 19 is a block diagram of the FraudMAP Mobile system, under an embodiment.

Figure 20:
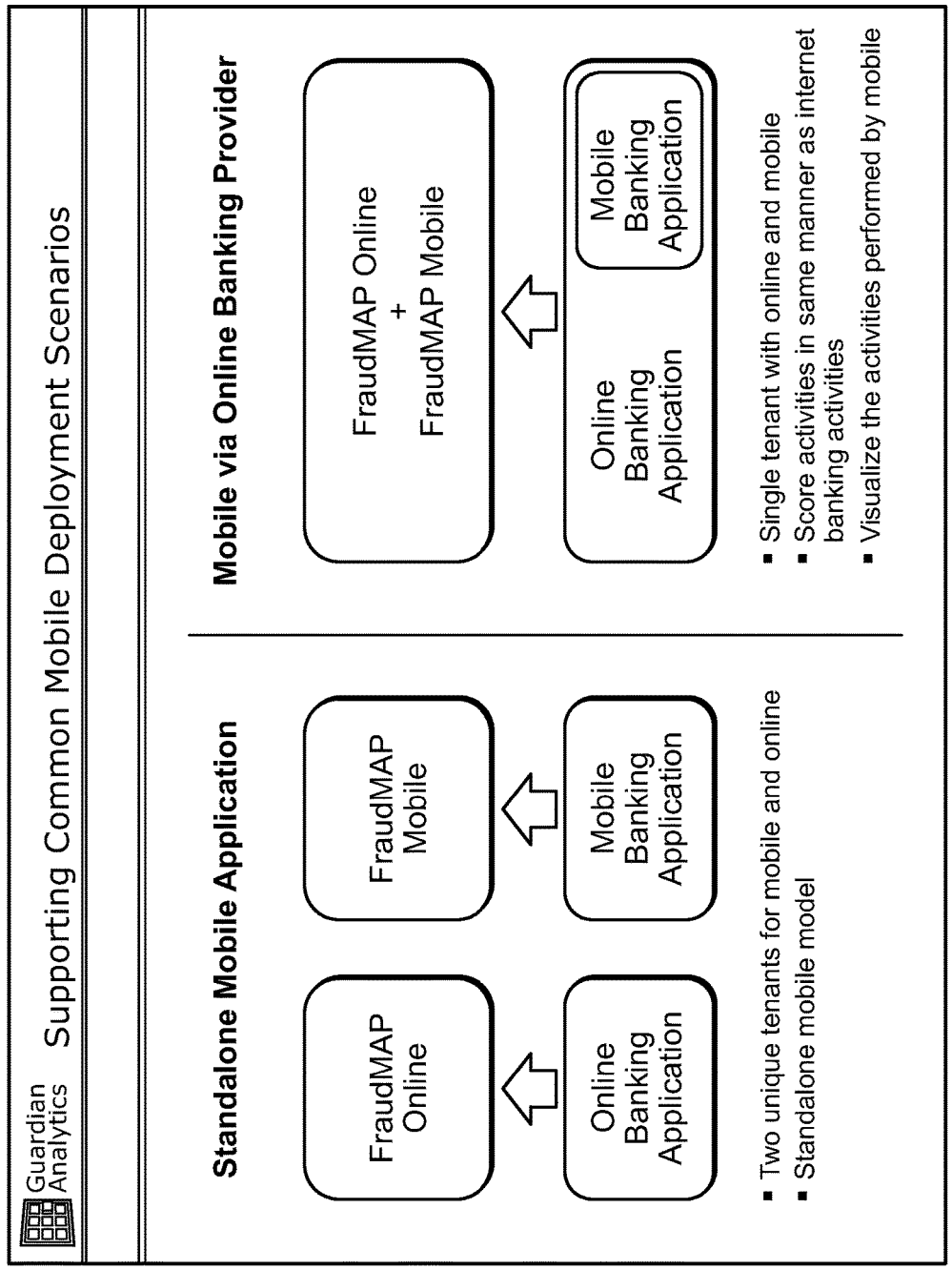
FIG. 20 is a block diagram of FraudMAP supporting mobile deployment scenarios, under an embodiment.

FIG. 20 is a block diagram of FraudMAP supporting mobile deployment scenarios, under an embodiment.

Figure 21:
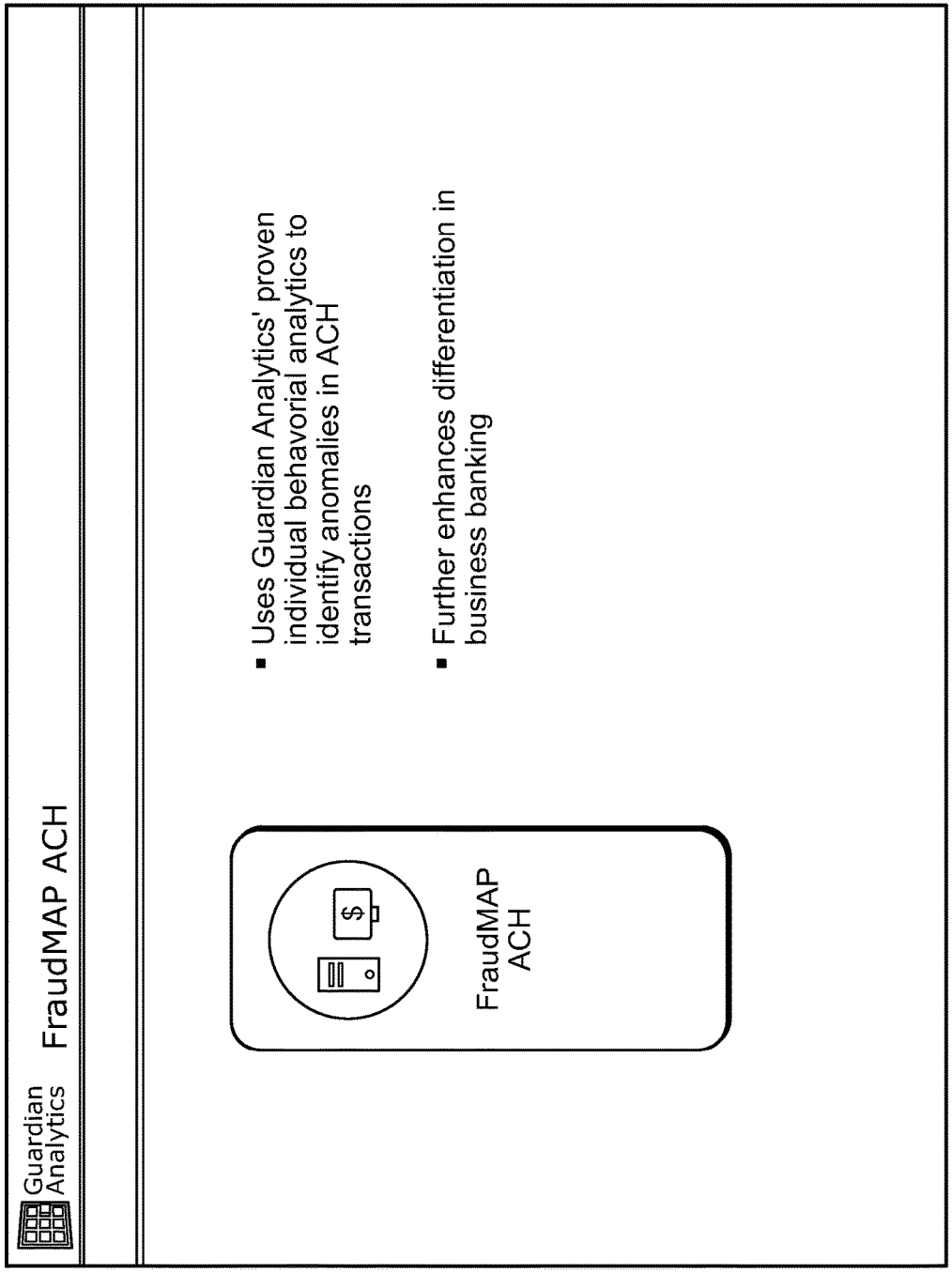
FIG. 21 is a block diagram of the FraudMAP ACH system, under an embodiment.

FIG. 21 is a block diagram of the FraudMAP ACH system, under an embodiment.

Figure 22:
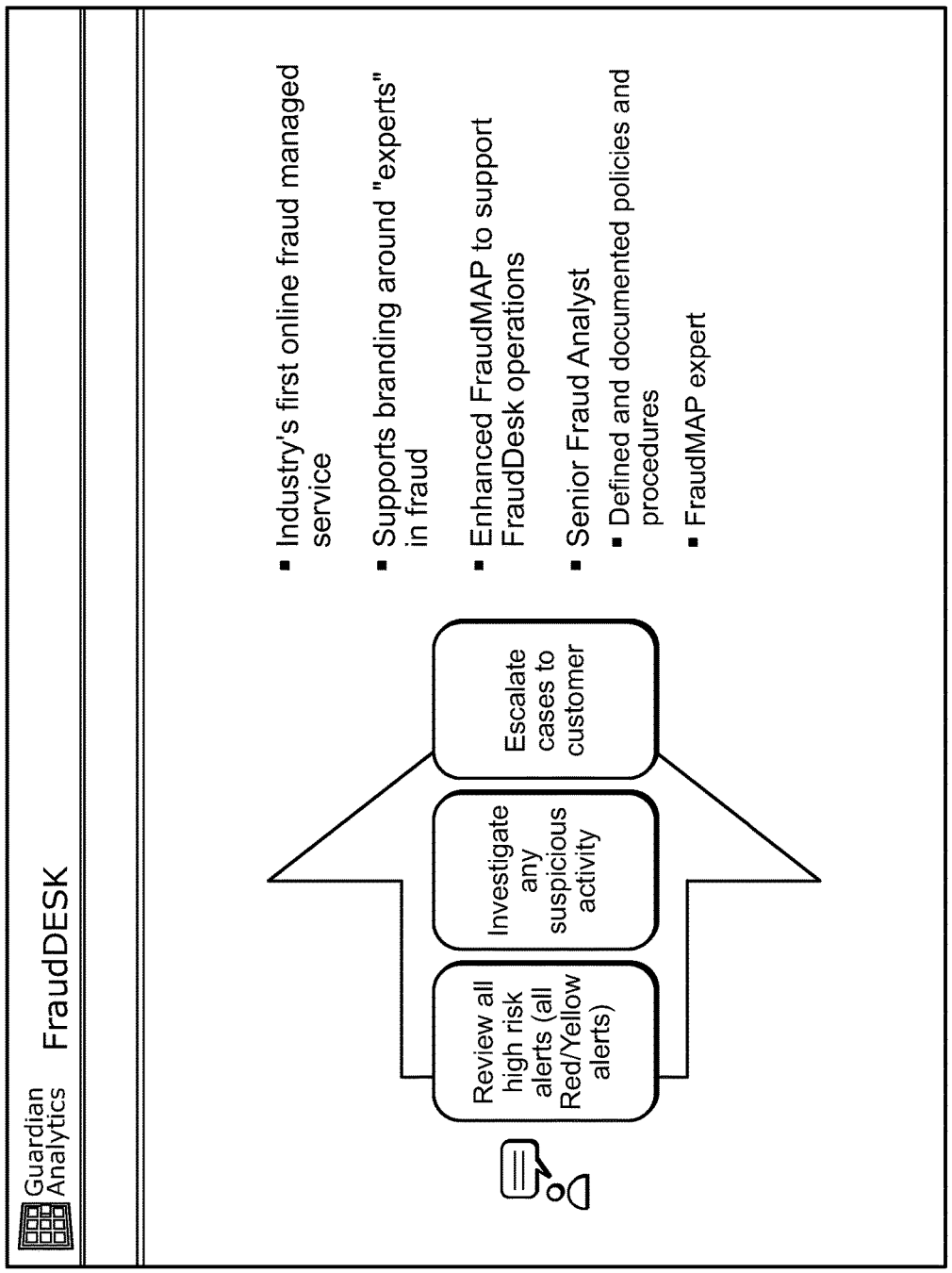
FIG. 22 is a block diagram of the FraudDESK system, under an embodiment.

FIG. 22 is a block diagram of the FraudDESK system, under an embodiment.

Figure 23:
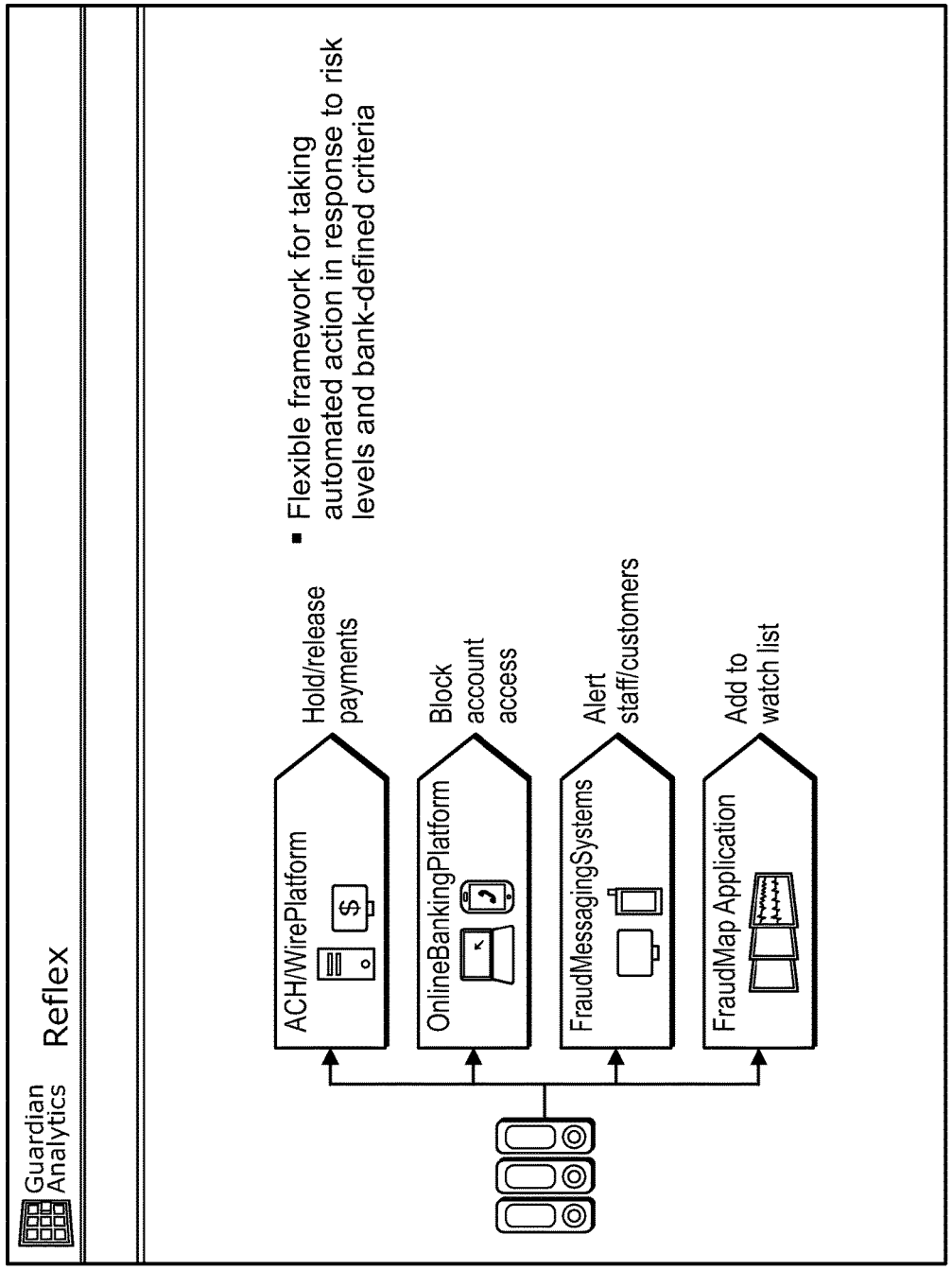
FIG. 23 is a block diagram of Reflex, under an embodiment.

FIG. 23 is a block diagram of Reflex, under an embodiment.

Figure 24:
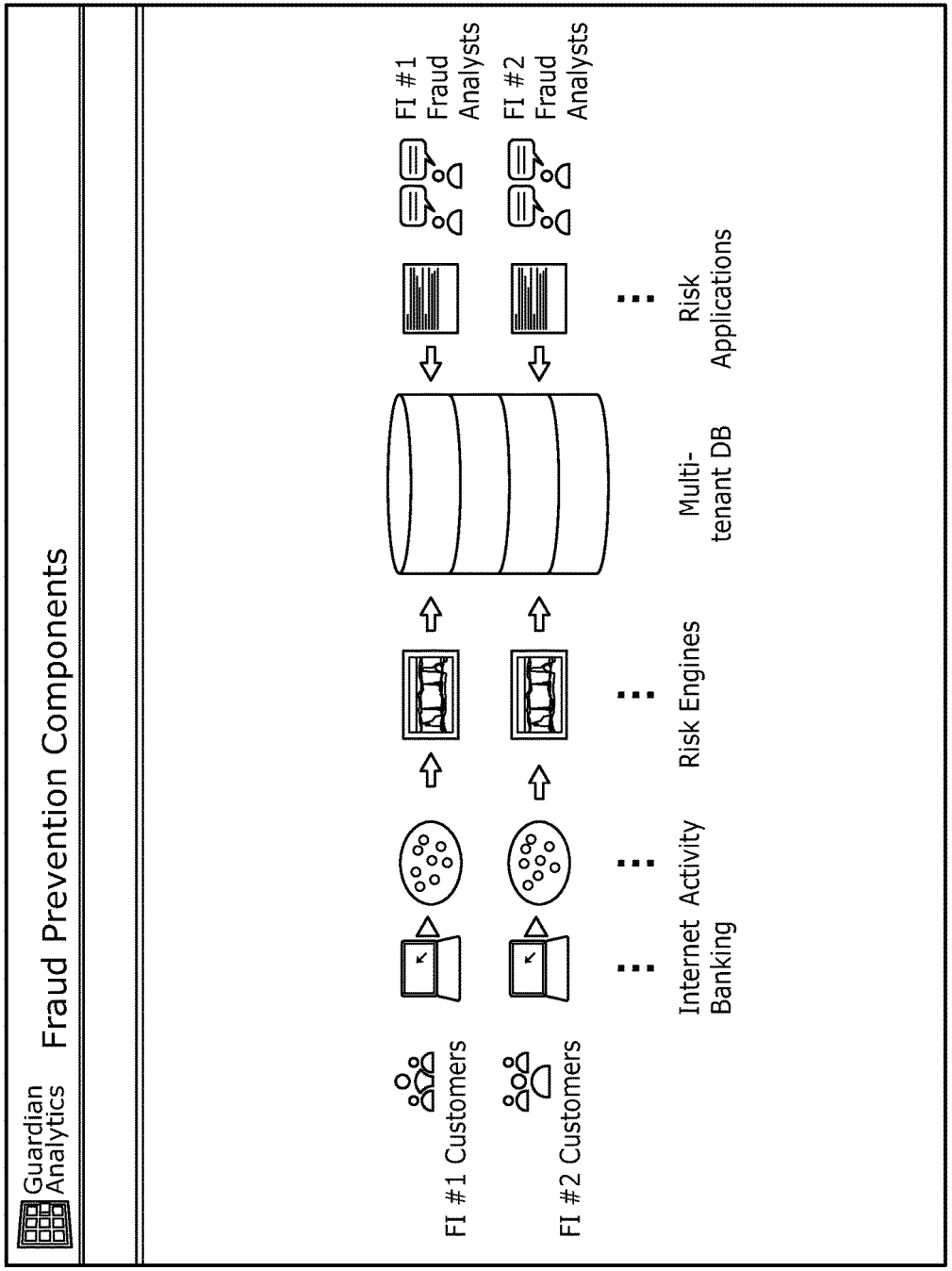
FIG. 24 is a block diagram of fraud prevention components, under an embodiment.

FIG. 24 is a block diagram of fraud prevention components, under an embodiment.

Figure 25:
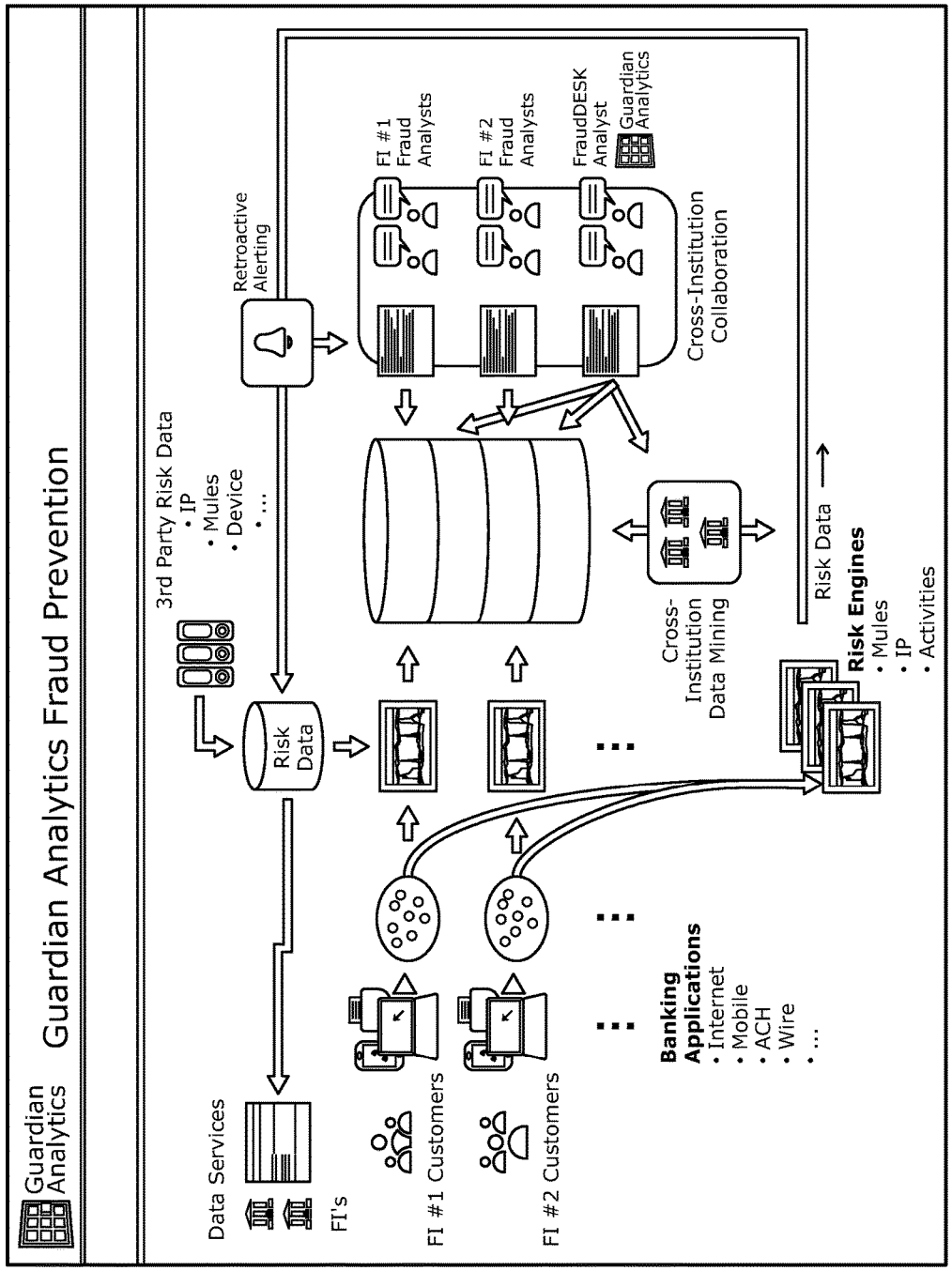
FIG. 25 is a flow diagram of fraud prevention using the FraudMAP system, under an embodiment.

FIG. 25 is a flow diagram of fraud prevention using the FraudMAP system, under an embodiment.

Figure 26:
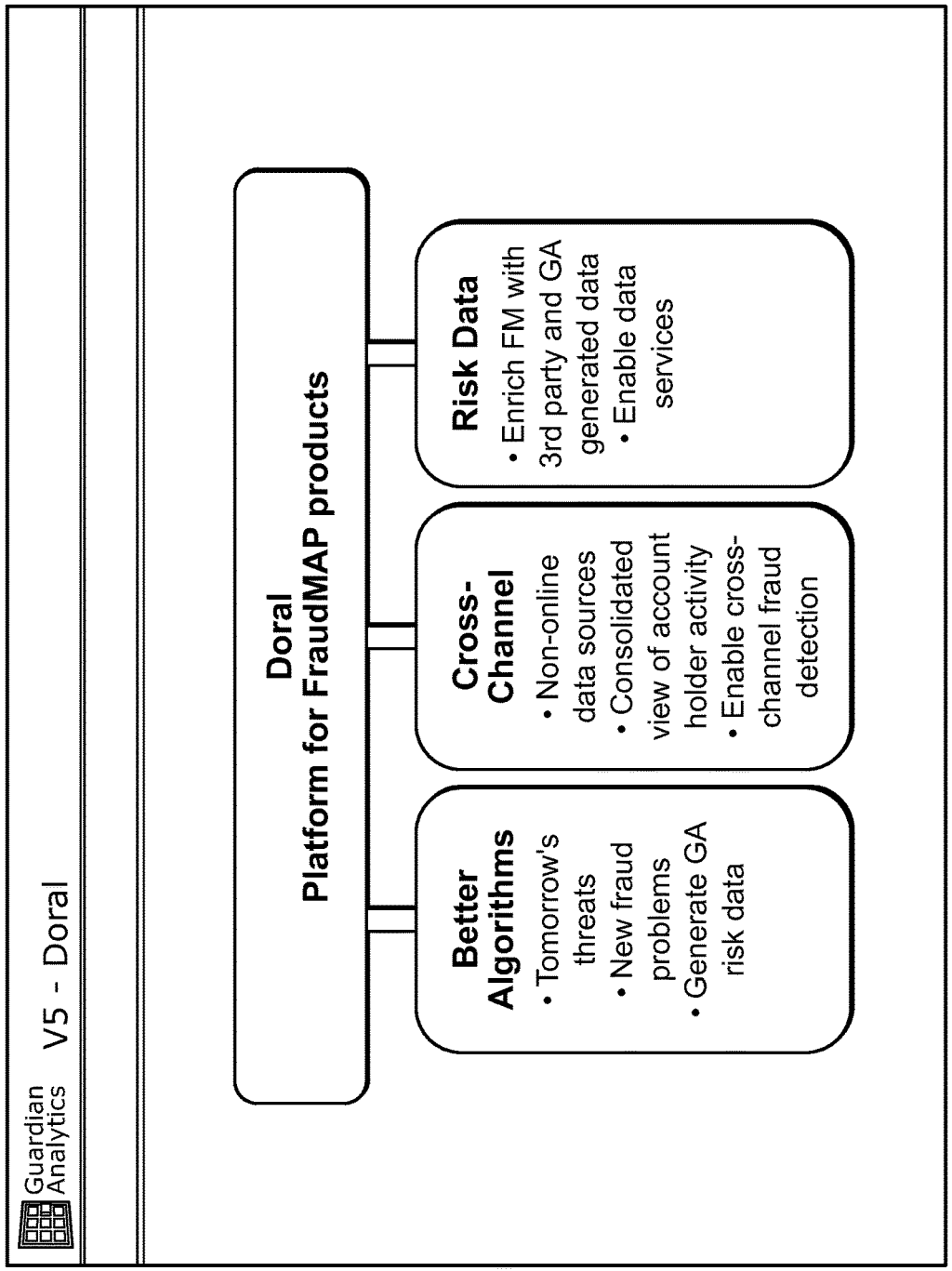
FIG. 26 is a block diagram of the platform for FraudMap products, under an embodiment.

FIG. 26 is a block diagram of the platform for FraudMap products, under an embodiment.

Functions of the FraudMAP System

Figure 27:
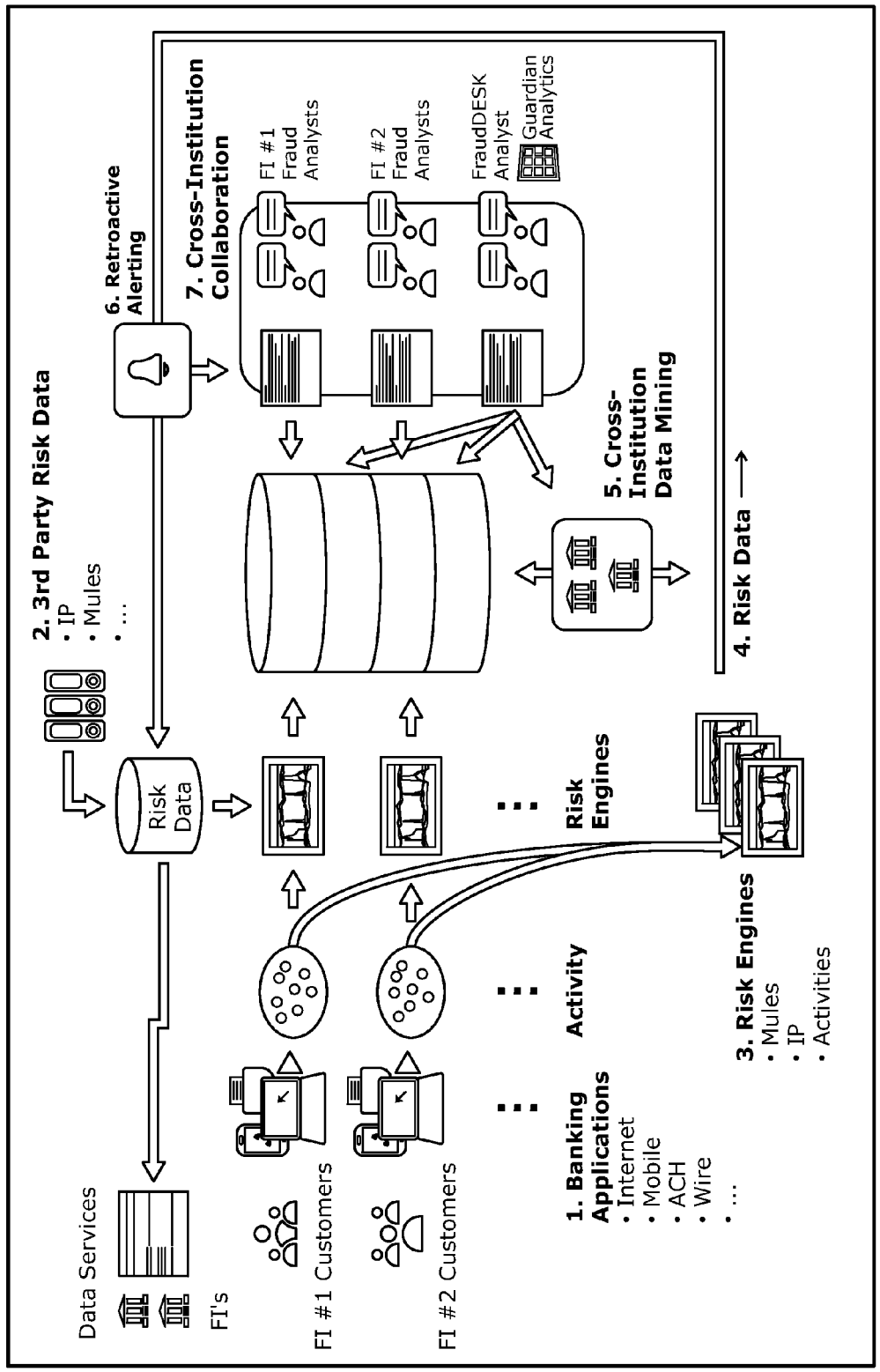
FIG. 27 is a diagram of the RiskEngine of the FraudMAP system under an embodiment.

FIG. 27 is a diagram of the RiskEngine of the FraudMAP system under an embodiment. Please refer to the above diagram for the discussion below. Products comprising the FPS include FraudMAP, RiskEngine (RE) and RiskFeed. Design, components and functionalities of these products are detailed, including automation, database design, algorithms, analytics, activation methodology, model generation/data generation and specification of third-party sources.

FraudMAP is consistent with multiple product requirements and methodologies as described in detail below.

Banking Applications

The behavioral analytics technology will have application in the context of other fraud problems within financial institutions. The foundation of the platform consists of behavioral analytics technology, Dynamic Account Modeling™. Behavioral analytics can be applied to a wide variety of business problems and this approach is "generic" in the sense that it is not limited to assessing the risk of Internet and mobile banking activity. This approach expands on the current online banking fraud prevention offering to be a cross-product, cross-channel offering.

Third-Party Risk Data to be Used for Event Risk Scoring.

Several third party risk data sources (e.g., IP risk, mules) may comprise aspects of the automatic risk scoring methods. The FPS platform is designed to receive this data and incorporate it automatically to provide enhanced risk-scoring capabilities.

Purpose-Built Risk Engines for Generating Risk Data.

A variety of risk engines will process activity data. Instead of risk-scoring individual user activity on a per institution basis, these risk engines may process data across institutions, in order to identify suspicious activity sequences, IP addresses, money transfer destination accounts (i.e., mules), etc. Data generated through these risk engines may be used similarly to the third party risk data identified in the previous item.

Cross-Institution Data Mining and FraudDESK.

A data mining engine capability has been prepared for use with FraudDesk. For example, one engine pivots off of confirmed fraud cases at any given customer to identify similar activity at any other customer. Coupled with the investigations and research of FraudDESK analysts monitoring activities for individual customers and across all customers, the combined efforts may generate new risk data and impetus for proactive customer communications.

Retroactive Alerting.

Based on new information from cross-institution analysis and FraudDESK activity, the platform may automatically provide alerts to institutions on historical yet recent activities that can be re-scored based on new information.

Cross-Institution Collaboration.

With nearly all of customers using a hosted, SaaS-based platform, the generally tight and collaborative anti-fraud community, and the expressed desire by customers to have more opportunities to interact with each other, cross-institution collaboration features are envisioned using the secure and closed FraudMAP application environment. For example, customers may seek advice on suspicious activity, alert each other to new threats, share FraudMAP generated results, correlate with each other regarding cross-institution attacks, share specific risk factors, and other topics.

Product, Database and Dataflow of the FraudMAP System

Figure 28A:
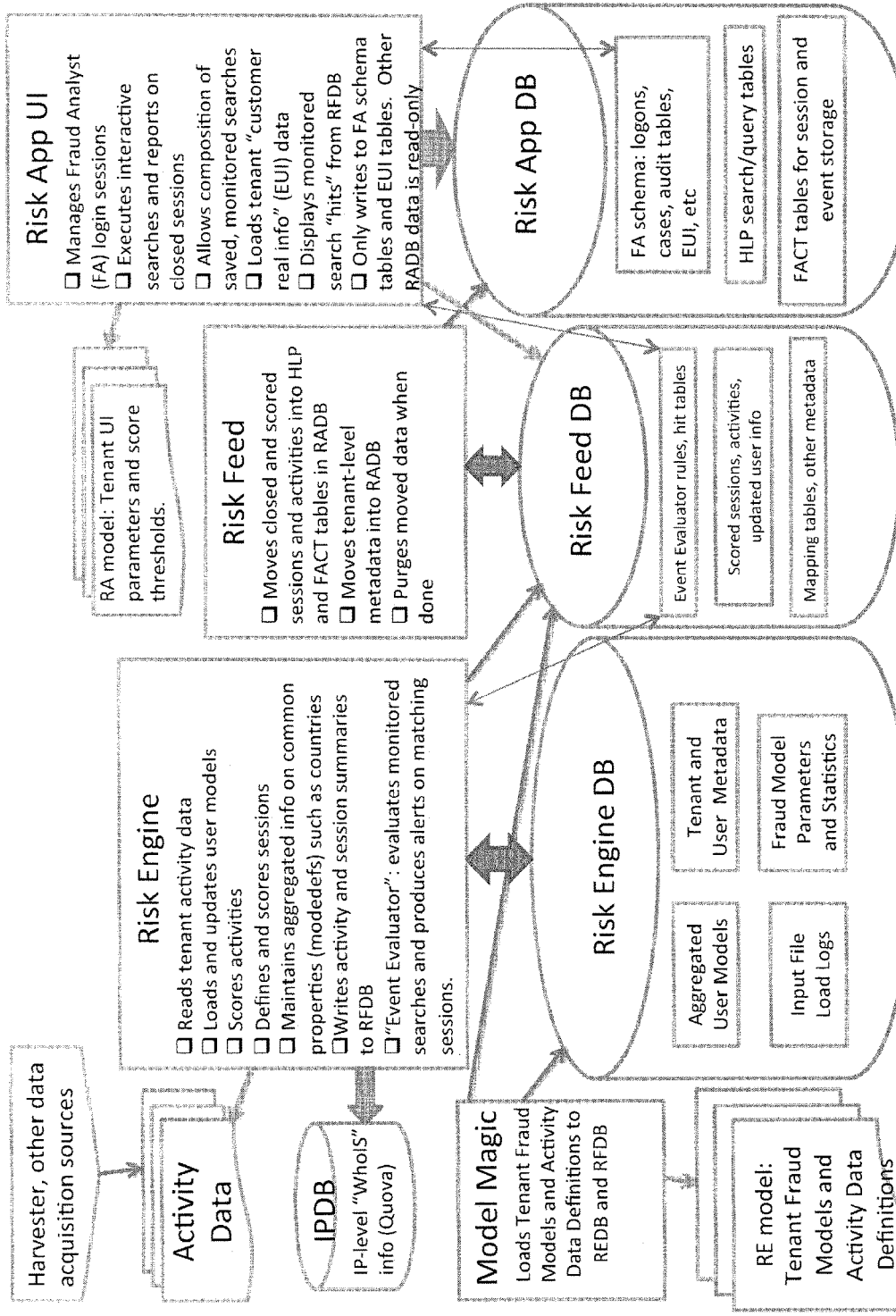
FIGS. 28A and 28B (collectively FIG. 28) show a block diagram of the FraudMAP data storage and data flow, under an embodiment.
Figure 28B:
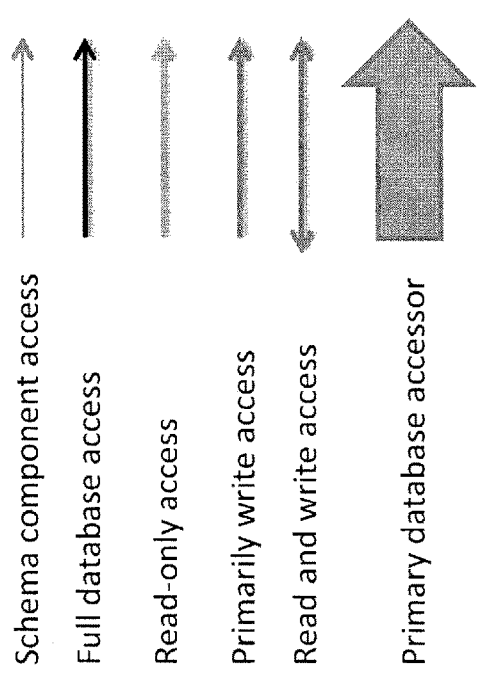

FIGS. 28A and 28B (collectively FIG. 28) show a block diagram of the FraudMAP data storage and data flow, under an embodiment.

Several practical considerations to FraudMAP have been considered, including the following: relational DBMS query execution engines only use one index per table; RA searches involve many parameters; there is no single search index that can "drive" the entire search; RA searches often involve millions or tens of millions of rows in intermediate working sets; row-level qualification joins are far too slow for interactive searches; even if they are well-organized, secondary index lookups are too slow; HLP tables and set ops are intended to qualify bitmap and columnar databases; data may be ordered by risk, and support realtime updates; bitmap indexes are unordered, static, and may not be employed; and RDBMs that support bitmaps or columnar storage are expensive.

In response to these factors, a solution is envisioned that addresses the following: it utilizes a small number of very large databases, instead of one database per customer or multiple small databases, which yields significant operational and cost advantages over large databases, and cross-tenant fraud analysis; it uses user-managed index (HLP) tables for all supported searches; HLP tables are designed to contain the following: "anchor" search parameter, tenant (service) ID, risk, date, time, and the ID of the session; HLP tables are intended to have multi-value primary keys to allow InnoDB PK-based index organization to exactly match the searches; FACT tables are intended for lookups and display only, and contain all session and activity data; searches are intended to traverse one HLP table per search parameter and working sets are to be saved to temporary (TMP) tables; after all search parameters are executed, the system is intended to employ set operations on the TMP table contents (INTERSECT, UNION, MINUS) in order to evaluate the search; and the riskiest sessions that meet the search criteria are fetched from FACT tables for display.

The following is anticipated as a result of this design approach: first, RADB may contain nearly 5 billion records, but 99% of user searches finish in under 5 seconds as compared with a "Standard RDBMS" approach, in which searches often took many minutes or hours in single-customer environments with only a few million records. Second, RiskFeed loads may stay ahead of each RiskEngine that is running, with minimal data backlog.

This is effective for the following reasons: the system leverages the index-organized property of MySQL InnoDB tables, which allows an optimal level of page reads; HLP tables are organized in a way such that searches in them involve a single B-Tree traversal and are partitioned by day so that they can be loaded quickly, and loading time has an absolute upper bound; day-based partitioning allows searches to be "partition pruned"; loading and qualifying TMP tables is very fast because they appear in RAM; the only rows that are loaded from the FACT tables are those to be displayed, which results in the need for a minimal number of ID-joins and B-tree traversals.

FraudMAP System Data Transformer

Figure 29:
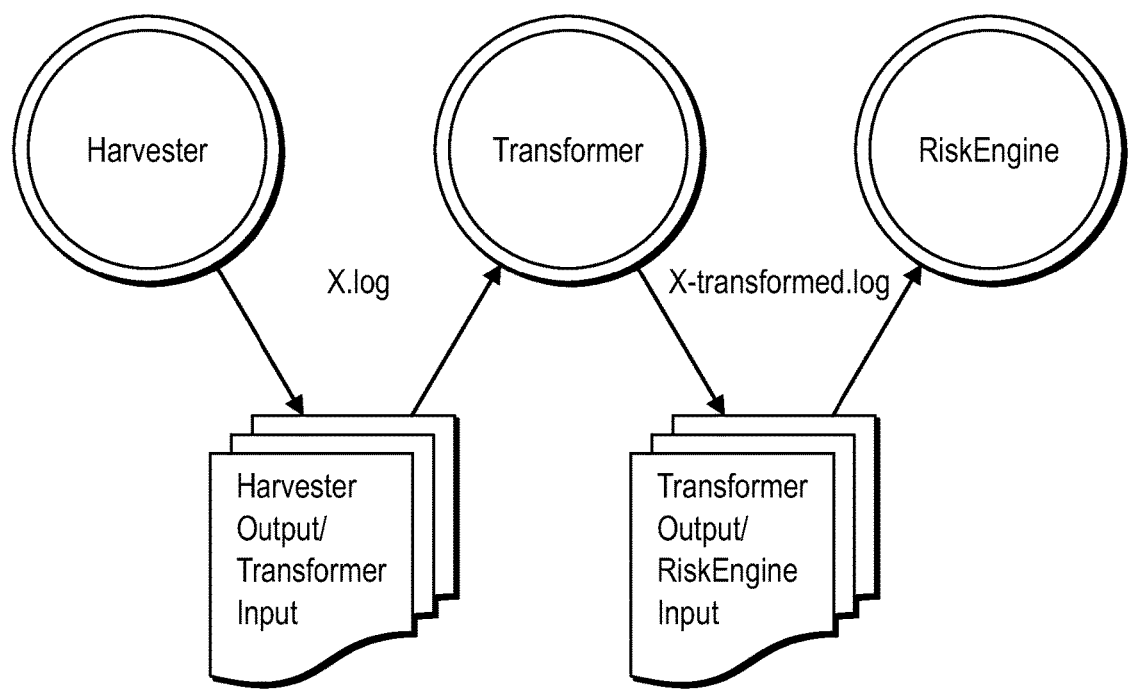
FIG. 29 is a diagram of the data transformer process, under an embodiment.

FIG. 29 is a diagram of the data transformer process, under an embodiment.

Data Transformer—Overview.

Data Transformer components are configured to sit between the Harvester/Collector and the RiskEngine. The Data Transformer components provide clean and expected data for processing by one or more RiskEngines. For example, the Sorter component can sort data coming out of a Harvester before feeding data into a RiskEngine, which may address the increasing out-of-order data present in some customer data. Multiple transformer components are combined so a series of operations can be performed on the input data files. To add a Data Transformer component (or components) for a customer, a Transformer.ini file is used once it is created and checked into the customer's configuration directory in SVN.

The Transformer layer is invoked after the Harvester component, fetching data into files and the determination of invoking the Transformer layer is based on if the Transformer.ini file exists for that customer. The transformer.ini file will determine exactly what action(s) will be performed in the Transformer layer, one or more actions can be performed in this layer. Files which get transformed will have '-transformed' word added to the name.

Operational Requirements for Transformer Components.

The Data Transformer function uses a transformer.ini to control the operation it needs. For each tenant, the transformer.ini may be checked into each tenant's configuration directory if a transform action is needed for that tenant. Data Transformer components may conform to the logging and overriding frameworks of existing architecture. Data Transformer components process all the data available at the moment of invocation and terminate when no more data are present with an exit status code of 0. Data Transformer components may report errors and terminate with an exit status code of non-zero when encountering errors that require human intervention. The output of Data Transformer may tag "-transformed" into the filename of file that it transforms. For example, if an input file is 'A.log' that is being transformed (could be sorting or de-duped), its output becomes 'A-transformed.log'. If an output file already exist, the Data Transformer reports as an error and terminates as a default. In this situation, Data Transformer output options include OVERWRITE, SKIP, or ERROR. Data Transformers can be daisy-chained so multiple operations can take place. This may be specified with the transformer.ini file. Data Transformer components are capable of cleaning up all temp files created when terminated. Data Transformer components may have a debug/verbose mode that can output additional information for debugging purpose. The transformer.ini may remain backward compatible if possible; if not, it may be controlled by version number.

Transformer Chaining Requirements.

Each transformer piece may be combined with other components in order to perform a series of data transformations. If a component cannot be a part of a chain due to technical limitations, the transformer may display an error out message if the unsupported component is chosen to participate in a chain. If a file has partially gone through a transforming chain of actions during a period of system unavailability, upon restarting, execution will resume for the unfinished portion of the chain components. Processing for the partially completed files may occur in alphabetical order together with new files. The system is capable of processing new files in tandem with partially-transformed data. For each intermediate file after each stage of chaining component, the file name or extension may be differentiated in order to distinguish it from the original file and the next file.

Transformer Parameter and Version Requirements.

Transformer components are can adapt to new requirements, due to the frequency and complexity of the parameters in which it operates. For example, changes to the transformer.ini file are made in order for it to work with new Transformer functionality. In order to provide seamless support, Transformer components are defined to include the following requirements.

Any changes made to the Transformer components remain backward compatible as much as possible; this means existing configuration file continues to work as it is without any behavior changes. However, possible WARN message to indicate that certain options are outdated may be updated to use the new parameters. When backward compatible is not possible, the Transformer component may error out upon detecting the incompatibility between the code and the configuration file. This will assist in operation to detect the issue and bring a quick resolution.

With the introduction of a new incompatible transformer core code in relationship to the existing configuration file, manual notification to all parties of the changes is utilized so that changes are made to all affected existing configuration files. Any new parameters introduced to existing components have a default so all existing configuration files can continue to work in the default behavior. If a different behavior is required for a certain customer, that particular customer's configuration file will have to be modified.

Transformer—Operations.

In order to facilitate Transformer operations, initiate command to invoke the transformer.py. In chaining mode, after each stage the transformer produces intermediate result files in the input directory, which are processed by the next stage. For configurations like component=sorter,deduper,A.log-.sorted will be the sorted file which will be deduped as the final stage to produce A-transformed.log as the final output in the output directory.

Transformer—Known and Planned Data Transformer Components

Known and Planned Data Transformer components are employed and include a Sorter, which sorts within a file chronologically. A De-duper removes duplicates of data from the next file accessed. A Combiner combines multiple files into one. An Adjuster removes data errors and impurity. A Splitter splits one data source into multiple sources. A Filter removes selected data from view so that the output or display is cleaner. A Mapper is able to overlay one user ID onto another in a display.

RiskFeed Component of FraudMAP System

Figure 30:
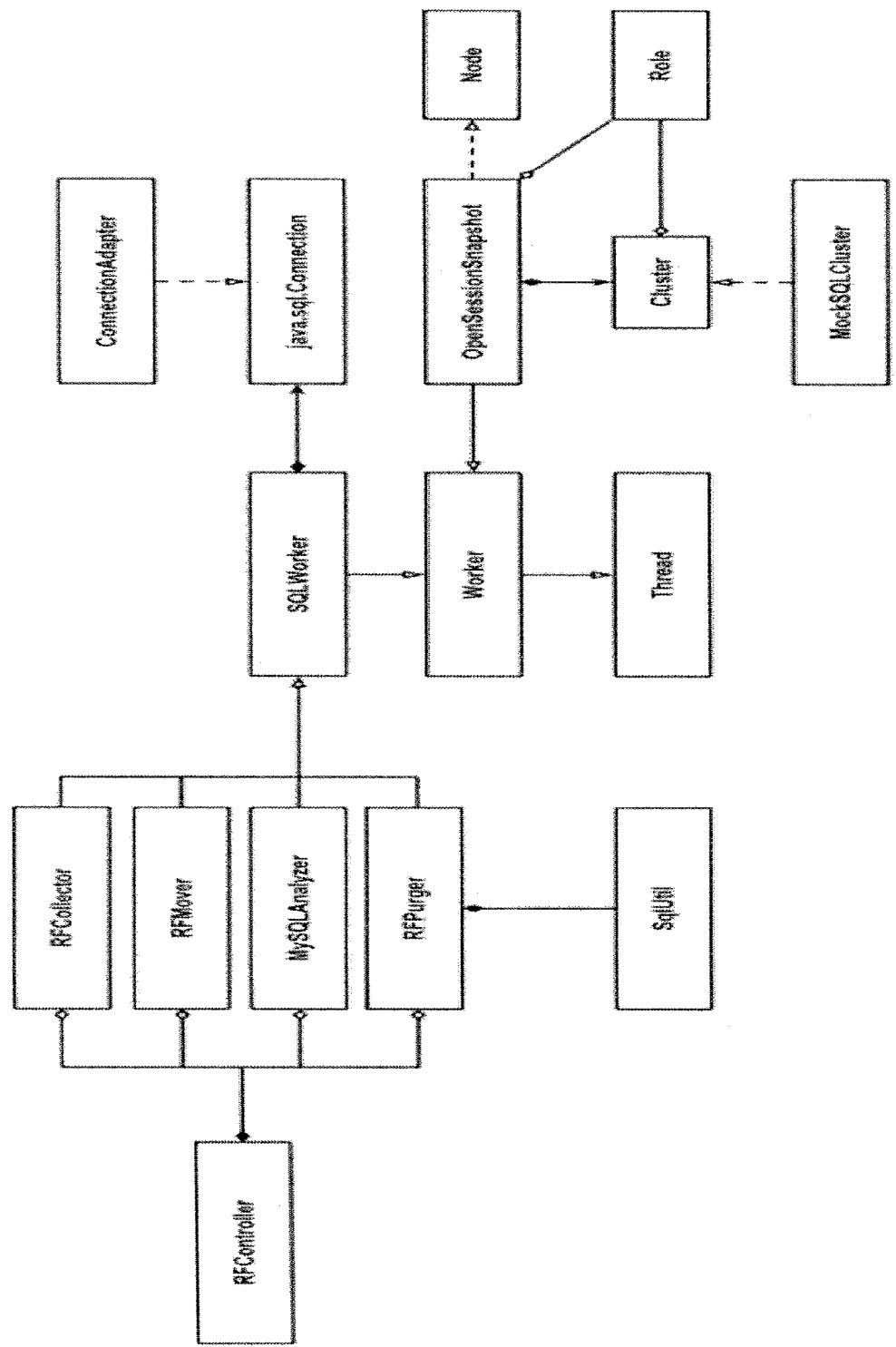
FIG. 30 is a flow diagram of the RiskFeed process, under an embodiment.

FIG. 30 is a flow diagram of the RiskFeed process, under an embodiment.

Figure 31:
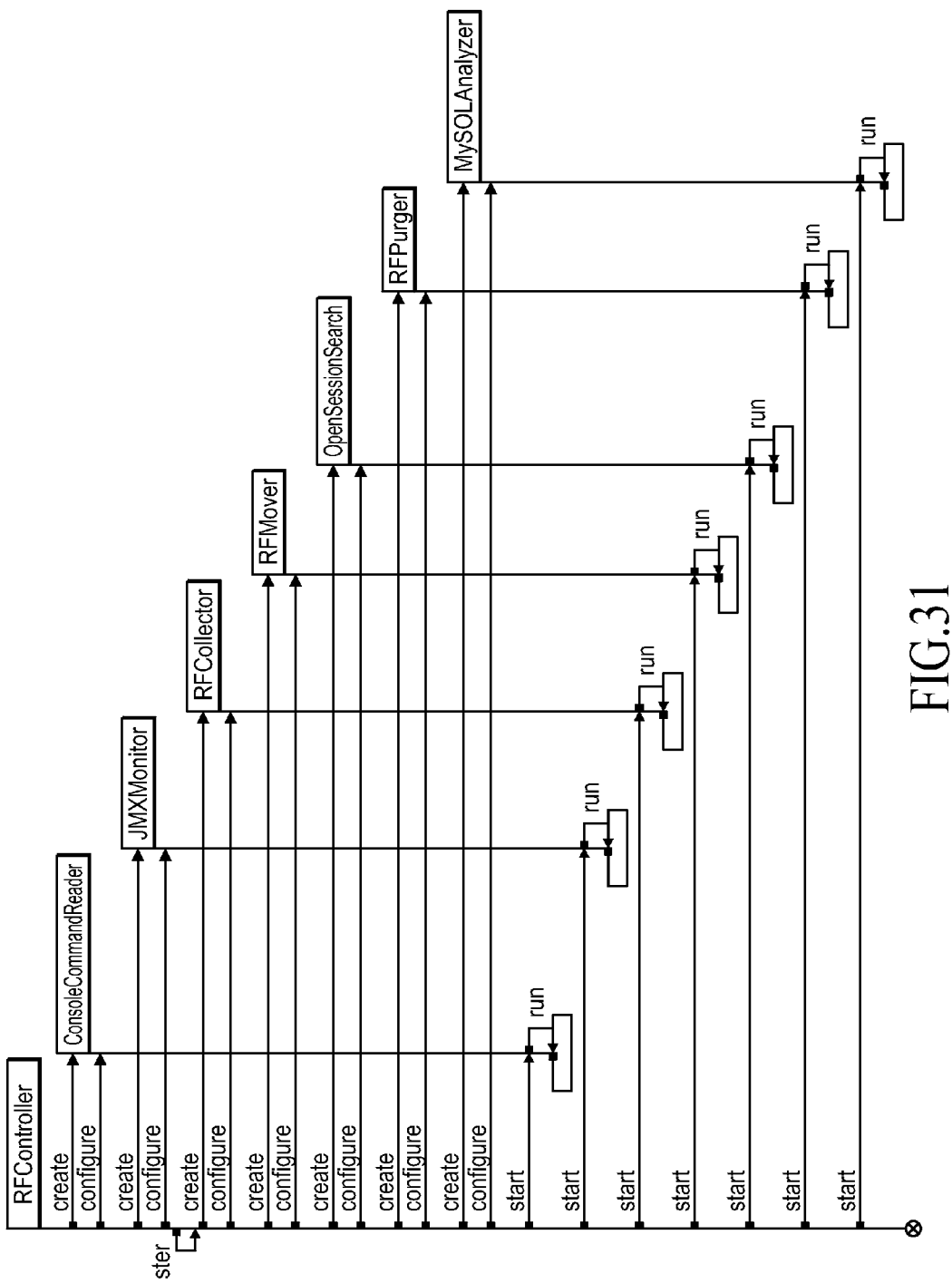
FIG. 31 is a transaction diagram of the RiskFeed process, under an embodiment.

FIG. 31 is a transaction diagram of the RiskFeed process, under an embodiment.

RiskFeed Functional Design—Overview.

RiskFeed is a FraudMap component designed for handling large scaled data sets. In a typical setup, RiskEngine populates REDB and StagingDB (as today's RepDB). RiskFeed transforms and loads data from StagingDB to RADB, and RA queries mainly RADB. As its objective, RiskFeed may transform data from StagingDB into optimized representation in RADB for better query performance. It may also support RA's limited queries on real time information in StagingDB.

RiskFeed is capable of perfottning data freshness in RADB (All closed sessions need to be available in RADB in short time). RiskFeed's work on StagingDB will not slow down RE's data population and model calculation. RiskFeed's data population into RADB will not impact RA queries.

Scope of RiskFeed Operation.

The RiskFeed operation consists of elements including a REDB, StagingDB and RADB and may consist of three different databases. These databases may reside typically on three different machines, which is a design that limits or avoids resource contention in a large-scale computing environment. RiskFeed can also be employed on the same processing unit as the StagingDB, RE or RA elements.

RiskFeed is employed with a configurable scheduling policy option, which avoids slowing down RA queries in the RADB load process. The RADB loading process can also be manually paused and resumed.

The system's StagingDB function is initialized using model template information it obtains, and StagingDB may run after a model template is loaded to both REDB and StagingDB. Once this initialization occurs, RiskFeed can then operate without the requirement that RA or RE also be operating.

RiskFeed—StagingDB Design.

RiskEngine populates 4 several types of records into Riskfeed's StagingDB. These include a LoginStats history, a session and event history together with its data, MetaData type definitions history, an ActivityStatsHistory and a Modedefs. They will be moved to RADB for to support RA's queries.

SessionHistory.

In the SessionHistory record, there is a one-to-one relationship between LoginStatsHistory and SessionHistory, which occurs through the matching of session identifications. RiskFeed will move the matched LoginsStatsHistory/SessionHistory pair only when the corresponding session is closed. SessionHistory and its corresponding data consists of the aggregate of all activities from login, to logout, and all events that occur during the life of the [RiskFeed] session. Storage occurs using a FIFO queue to store all session identifications that may be selected for move. A collection thread performs a sequence of tasks that include the enqueue of newly-closed sessions since last check, a moving thread that may be used to move and then dequeue the record pairs. A separate cleanup thread may remove the records displated in LoginStatsHistory and SessionHistory tables. The movement of selected records is accomplished not as a single task but in batches, which have the benefit of being stopped without jeopardizing a completed batch if RADB becomes busy. The moving thread is controlled by a protocol with RA so that it only loads a batch when RADB is free. The Collection thread and Purger cleanup thread are scheduled to periodically wakeup and execute, and additionally some simple interprocess orchestration occurs between the Collector, Mover, and Purger. The Collector "wakes up" the Mover when it has completed a collection round. The Mover "wakes up" the Purger after every mover round.

ActivityStatsEvent History.

The ActivityStatsEvent History records can be created and managed (i.e. moved, stored) using a first in, first out manner consistent with the LoginStatsSession History function described in this specification.

Modedefs.

Modedefs are managed (i.e. moved and stored to RADB) in different ways depending on their types. For example, shared modedefs can be moved as a set that is based on all newly created modedfs since last move. Non-shared modedefs are managed by mapping of all modedfs that are created since the last move. These have distinct values that are based on defining fields, and are assigned a normalized modedef idenfier. Once identified, these normalized distinct modedefs can be moved into RADB.

As a special case, mutable modedefs (i.e. IPNetBlock) utilize a record-moving logic that it shares with non-shared modedefs. This logic ignores the mutable fields of a modedef because search and retrieve functionalities are not a part of the mutable modedfs operation. Instead, immutable modedefs can be moved only following the action of updating previously moved records. In order to manage large cardinality modedefs such as cookies, since there is no compression gain from the removal of duplicates, which is also a very expensive, large cardinality modedefs are treated as shared modedefs, and may be moved without normalization.

All modedef identifications that are identified for move are placed into a queue and managed as first-in, first-out. A collection thread enqueues newly created modedefs since last check; a moving thread normalizes modedefs, adjusts LoginStatsHistory references and applies them in RADB helper tables, and loads modedefs into RADB; a cleanup thread purges modedefs after they are loaded to RADB and their normalization map (see explanation below) is built. A table of all distinct non-shared modedefs (i.e. normalized ones) throughout the history is maintained for modedef normalization. A map of modedef identification to normalized modedef identification is maintained for all non-shared modedefs. This is used to change LoginStatsHistory's reference to old modedefs into new normalized modedef identifications when building helper tables. Record moving is done in modules as in LoginstatsHistory/SessionHistory. Collection thread and cleanup thread are active periodically. In RADB, modedefs may have only defining columns, and only distinct values.

Synchronizing Session, Event, and Metadatamodedefs, ActivityStatsHistory and LoginStatsHistory Records.

"LoginStatsHistory" refers here to LoginStatsHistory and its corresponding SessionHistory record. For LoginStatsHistory, record moving is performed in rounds, governed by an activity cycle of collection threads, which are [*]. In each round, a collection thread is launched and finds newly-created records for further action since the last round. To ensure referential integrity beginning with LoginStatsHistory through and including Modedefs activities, a snapshot is first taken before each round so that the collection thread has a consistent "newly created record set" of session identification both for modedefs and LoginStatsHistory. Since LoginStatsHistory records arrive in batches, and hence later than modedefs, a snapshot is intended to confirm that all LoginStatsHistory records refer to modedefs that have existed in StagingDB. The snapshot defines the newly created records. These records become the working set for a current round of operational review and action. The moving thread executes each round by moving chunks to RADB. Each chunk is loaded to RADB in a transaction. These chunks form checkpoints in StagingDB so that the process can be interrupted between chunks. In each round, the moving thread performs tasks in sequence in which first a batch of modedefs is moved, followed by movement of a batch of ActivityStatsHistory, followed by the movement of a batch of LoginStatsHistory. Using this approach, a referrer file is moved after a referee file.

RiskFeed Flow Control.

Ideally, the operational task of RADB loading is paused in the event that RA is busy. The system is capable of being configured to pause this operational task using settings that are designed to minimize system latency. The configuration consists of the following elements:

Whenever loading a batch, RiskFeed checks the busy state of RADB. If busy, RiskFeed retries after a prescribed wait period. The wait period is governed by the exponential back-off logic until it reaches a maximum value. When RADB is not or is no longer busy, the batch is loaded and RiskFeed resets its wait period to a minimum value.

If RiskFeed is falls behind by failing to complete the work set (identified by a collection thread cycle), RiskFeed will enter "catch-up" mode. In catch-up mode, WorkFeed requests RA to block future queries and starts loading as soon as RADB is not busy. When RiskFeed catches up to within a [small number] of collection threads, it withdraws its RA blocking request and goes into regular mode.

RiskFeed may also address contention on StagingDB between RE and RiskFeed, which is not required when the loads from both StagingDB and RiskFeed are manageable. The RADB contention policy can be applied in this setting, where material load factor is present.

The communication between RiskFeed and RA is accomplished through RADB tables. These tables include a "RA busy" flag and "RiskFeed request" flag.

RiskFeed—MetaData.

RiskFeed deals with several types of metadata which are populated by either the RiskEngine or the ModelLoader. These include Model Configuration, Data Element Definitions, Event Type Definitions and Risk Component Definitions. The first type of metadata is model template information, and is populated when a model loader populates metadata in REDB and in StagingDB. The second type of metadata is riskengine configuration information, which is populated to StagingDB when RE starts and loads configurations.

RiskFeed—Startup and Shutdown.

RiskFeed can work on StagingDB, regardless of whether either RE or RA operating. When RE is operating, information delay is prevented through the contemporaneous operation of RiskFeed. In this setting, RiskFeed may be controlled by an agent, through which either RE or a human administrator can operate or shut down RiskFeed. The agent's address is a configuration parameter of RE.

RiskFeed—Configuration.

RiskFeed has the following configurations: a collection thread cycle, which defines the frequency with which the collection thread identifies work in an activity round, a batch size which is configured for each type of record that is loaded to RADB, a RADB wait period minimum and maximum which is configured for flow control policy, a purging thread cycle, which determines the frequency with which files loaded to RADB and purged, and the types of modedefs to be normalized.

Multiple RiskEngine Support.

Modedef identifications are globally unique, not just unique within REDB. As a result, the LoginStatsHistory reference to modedef is unambiguous. RiskEngine is configured to prevent overlap or conflict between modedef identifications. RiskFeed is designed under this assumption. There are two possible RiskFeed setups in situations with multiple RiskEngines: one RiskFeed for each RiskEngine; and one RiskFeed for all RiskEngines. In situations in which RiskEngine and RiskFeed exist in equal quantities, information is consolidated in RADB so that RiskFeed can operate as if there is only one RiskEngine.

In situations where RiskEngines outnumber RiskFeed, shared modedefs are unique within REDB but may have duplicates from different RiskEngines. In this case, RiskFeed will ignore duplicates (because compression ratio is small) and load them to RADB as in single RiskEngine setup. For non-shared modedefs, normalization happens regardless the point of origin of RiskEngine. RiskFeed will also apply the same logic as in single RiskEngine setup. However, multiple RiskEngines may cause the modedef identifications to be not in temporal order, which makes first in, first out queue implementation less efficient.

Open Issues.

To support modedef normalization, StagingDB could be designed to be capable of keeping a table of all distinct modedefs and a map table that correlates all modedef identifications to their normalized identifications. Both tables can grow unboundedly. This unbounded growth makes the normalization not scalable. Another issue is the determination of the types of queries that the RA can use with stagingDB. With minimal index support in a context requiring support-rich queries, a scheduling policy may be designed that moves records on an aggressive schedule in order to keep the StagingDB scale small. Such an aggressive policy may have additional impact on RA queries.

RiskFeed—Supplemental Information

Collector Cycle.

This cycle consists of the following steps: Get next round identification, select all closed sessions with identifications >last_moved_session_id, and enqueue them with the round identification, update and save last_moved_session_id for t the round in round_session_map table, select all "new" modedefs and insert them into the RA db, select all Session data for the current round and insert them into a working table and commit Staging DB. For purposes of this risk collector cycle, "new" modedefs are those not collected in previous rounds, and can be implemented by a collection round tag on each records (i.e. tag the untagged ones with round id before collecting).

Data Moving Cycle.

The RiskFeed data moving cycle consists of the following elements:

Examine all working tables to find the min round id—r.

Work on round r entries in working tables in the following order: MetaData, Sessions, Risk Components, Events, Misc Helper Data.

Work on each of these table based on progress table, which logs are contemplated for up to round r.

Shared Modedef working table (for each type): load round r records (for this type) to RADB (no need for batches because of small size); commit RADB; clean up round r records in working table (for this type); log progress for modedef type m, round r; marked round r records "moved"; commit Staging DB; non-shared Modedef working table (for each type); select round r records into temp table t;

add new distinct values from t into normalized modedef table (for this type);

select all records in t, join with normalized table (for this type) and insert identificaiton; and normalized_id pair into map table (for this type).

Meta Data Determine a diff of the RA metadata, against the RF meta data; and Move only "new" meta data to the RA DB.

Session Data: select working data by constraints: searchable; needs DeDuping and structural; for each set, map the data and load it into the temp working table on the RA DB Risk Components Event Data Update Entity Model statistics Diff the known RA Entities and move only the new ones to RA DB Data Element Helper Tables (as defined as Searchable in the model)

Miscellaneous Helper Tables

Update Round processing statistics: update references from ga_ra_loginstats_history in round r with normalized id using map table; load round r normalized modedef records (for this type) into RADB; select round r normalized records into temp table t1; load to RADB next chunk of N records from t1 (next=1+max chunk id in progress table); commit RADB; log progress for modedef type m, round r, chunk c; commit Staging DB; repeat last 2 steps until all loaded; mark "moved" round r modedefs (i.e. those with corresponding id in t); clean up temp table t and t1; clean up round r (and all previous rounds) records in working table (for this type); and commit staging DB ActStats working table: load to RADB next chunk of N round r records; commit RADB; log progress for round r chunk c; commit Staging DB; repeat last 2 steps until all loaded; clean up round r (and all previous rounds) records in working table; and commit Staging DB.

LoginStats and SessionStats working table: select from loginstats_history and session_history round r records (with updated modedef reference); load to RADB next chunk of N round r records; load to RADB helper table using these same records; commit RADB; log progress for round r chunk c; commit Staging DB; repeat last 2 steps until all loaded; clean up round r (and all previous rounds) records in working table; update round_session_map that round r is moved; and commit Staging DB.

RiskFeed Purger Cycle.

The purger cycle consists of the following operational steps: first, the Purger will either wake up on its configured schedule, or be woken up by a signal from the Mover; second, the Purger then calculates N number of rounds to purge, and begins with the MIN(ROUND); third, at the end of each purge, the purger will attempt to purge rounds from the table it uses to calculate which rounds to purge; fourth, if the table is actively being used by the Mover, the purger will skip this step; fifth, ActStats, Loginstats_history and session_history table (select from round_session_map table all moved but unpurged rounds; iterate over each round r in order as follows: purge ActStats table with session id<=round r's max session identification; purge loginstats_history with ids<=round r's max session identification; purge session_history with id<=round r's max session identification; update round_session_map that round r is purged; and commit Staging DB); and sixth, modedef tables (shared modedef means, for each modedef type m, a purge of the record marked "moved", and non-shared modedef means, for each modedef type m, a purge of the record marked "moved").

RiskFeed Alternative Embodiments

Threading.

Each thread manages its own state, and the three (3) additional threads that monitored and blocked the worker threads have been removed. The model of an alternative embodiment uses a bounded wait on a Thread safe atomic object. There is no longer any case where a Thread can be in an infinite wait state. The run loop has a universal catch-all and allows the Worker to handle any exception and continue, or panic (shutdown). The new Exception handling does not use exceptions for branching or conditional handling. The new thread model may be used by the following operations: RFMover, RFCollector, RFPurger, OpenSessionSearch and MySQLAnalyzer.

Orchestration.

The manner in which orchestration occurs is as follows: RFMover is immediately woken up when a COLLECTOR round completes; RFPurger is immediately woken up when a MOVER round completes, MySQLAnalyzer is woken up (if enabled) after a MOVER round completes; and all data related activities have been ported from the RFController and relocated to the worker classes. In the foregoing, OSS manages its own roles.

Database.

The underlying database handler has been rewritten for RFMover, RFController and RFCollector. For these classes, the new Database logic forces the use of required JDBC connection options. The PURGER does not use the new db logic, and uses (at a minimum) rewriteBatchedStatements=true. The sql debug log file, in addition to query output, includes approximate data throughput of loads (in bytes). The embodiment includes an ANALYZE agent that is configurable via the config. The default behavior is to run after each of the first 5 rounds complete, then exit.

Failure Recovery.

A heartbeat operates as follows: RFController uses the "ts" column in the? "ga_rf_instance" table for heartbeat updates. The HEARTBEAT interval is hardcoded to 1 minute, but is not so limited. The TIMEOUT after a crash is hardcoded to 2 minutes, but is not so limited. The Riskfeed should be able to restart from a failure at any point in its execution. The collector will NEVER leave the db in an inconsistent state and can be killed at any time. The MOVER should detect that a step did not complete and enter RECOVERY_MODE. If the RF detects a failed step (a step that has started but not completed). It will enter RECOVERY_MODE for the remainder of the step. While in RECOVERY_MODE, NO ERRORS will be thrown. All previous steps in the round will be skipped over. RECOVERY_MODE will be turned off at the completion of that step. All subsequent steps will return to doing "insert" and will throw a PK exception if one is encountered. Following a crash, the following steps are taken: Manual intervention is not necessary after a crash; instead, the launch of another RF instance is undertaken. The next RF instance should "reclaim" a crashed instance after 2 minutes, if no other instance is emitting heartbeats. If the ga_rf_instance table is empty, the Riskfeed should still detect another running RF process. In relation to transient database issues, in some cases the RF may appear to be doing nothing, where it is actually blocked waiting for a lock. When starting, the RF will ALWAYS check for active processes in the same schema. If it finds any, it will exit with an error. In order to retry, the RF will back off, then wait and retry (up to 3 times) in the following cases: transaction lock timeout; db processes killed and invalid connection state. In a panic context, the RF will try to do an orderly shutdown in the following cases: primary key violation and DataQualityException.

Shutdown, Pause.

The underlying handler for shutdown and pause has been entirely changed, but should behave the same way. On "shutdown"—the RF should return as soon as its current "step" is complete. On "pause"—the RF should pause as soon as its current "query" is complete. On "resume"—the RF should immediately resume. When paused, a shutdown should force an orderly shutdown. A CATCH ALL has been added to the shutdown, in order to facilitate exit.

Console.

Two additional commands have been added to the console: "status" will return the current/last known status for all running services; and "analyze" will cause the analyze agent to immediately run once.

Query Changes.

This occurs when more than 50% of the queries have been modified in one way or another, some for correctness most for performance. In this event, ENTITY, EVENT, DATA ELT, and RISK COMPONENT definitions are loaded by delta at the start of every round. Additionally, RF working tmp table no longer uses the round as a constraint.

DataQualityChecks.

The RF now has data quality checks in strategic locations, which if FAILED, will cause the RF to shutdown.

OpenSessionSearch.

In addition to the Collector, Mover, and Purger, a thread in the RF handles capturing open session searchable data. Failure Recovery consists of the following: the OSS process is self-recovering and can take up to 5 minutes to start again after a crash, but is not so limited. No other manual intervention is required. The OpenSessionSearch runs standalone (outside of the RF process) if necessary.

Continuous Operation.

The riskfeed continues running in the event the RE is restarted, or if a new model is loaded.

Two Letter Codes.

The RiskFeed does not generate these codes but, instead, these codes are loaded by the ModelLoader.

Logging.

The daily rotation now GZips the archived logs. The logs are split into (RF, and SQL) content.

Configuration.

Parameters have been added to the riskfeed.cfg.xml. This function is identified as OPEN_SESS_REFRESH_CYCLE.

The OpenSessionSearch process takes a new snapshot at a default setting of 60000 milliseconds.

FraudMAP System Automated Intervention.

Summary

A flexible architecture provides automated intervention on the evaluation of specific events. Such interventions may include (among others): Deactivating Online Banking Users w/out Account Holder Involvement; Deactivating Online Banking End Users with Account Holder Involvement; Releasing Financial Transactions; and Event-Based Processing of Activity Logs.

Architectural Requirements.

The Automated Intervention solution is decoupled from any existing FraudMAP component and stands up in its own right and may be forward-compatible with respect to Doral. Interfaces are rapidly written to new systems in a fast manner with as little impact on Development as possible. This architecture enables Fraud Analysts to see (from FraudMAP) what interventions have been attempted as well as their current status, and is written in such a way that other actions (such as an automatic email to the Fraud Analyst) can also be driven following the origination of, or response to, an intervention. The configuration is flexible and simple, and provides for system recoverability following a system down.

FraudMAPConnect.

The FraudMAPConnect service has the following as its responsibilities: To manage (and persist) the state of messages sent to and received from third-party systems; to expose messages that are received by third parties, to other components in FraudMAP; and to accept interactions from FraudMAP in order to initiate or respond to conversations with third party systems.

Persistent Communications Structure.

This architecture implements a means of recording conversations with third-party systems. These conversations are logged as shown on tables, structured as follows and located in the RFdb: ga_fmc_conversation_log

| ID | CONVERSATION_TYPE | THIRD_PARTY | THIRD_PARTY_REF | INITIATED_TIME |
|---|---|---|---|---|
| Unique Tenant-based Universal ID. | Could be: WIRE ENDUSERVERIFICATION DISABLEACCOUNTREQUEST | Could be: PILOT ACCOUNT CLAIRMAIL DIGITALINSIGHT | The ID that the third party gives us, relating to this interaction. | The time the status was set. | ga_fmc_message_log

| ID | CONVERSATION_ID | DIRECTION | MESSAGE_TYPE | APPL_REF | STATE | RECEIVED_TIME | LAST_MODIFIED |
|---|---|---|---|---|---|---|---|
| Unique Tenant-based Universal ID. | Points to ID in ga_fmc_conversation_log | Either: IN OUT | Could by: WIRE_ALERT, WIRE_RESPONSE, etc. | An application reference string that will be used by FMConnect to ignore duplicate messages. | Could be: RCVD, QUEUED, SENT, ACCEPTED, etc | The time the message was received | The time the message status was updated. | ga_fmc_message_parameters

| ID | MESSAGE_ID | KEY | VALUE |
|---|---|---|---|
| Unique Tenant-based Universal ID. | Points to ID in ga_fmc_message_log | Could be: MID, ACCOUNT_ID, WIRE_REF STATUSCODE, REASONCODE, etc. | The value of the parameter. |

A complete conversation could result in the following: A single row in ga_fmc_conversation_log; multiple rows in ga_fmc_message_log; multiple sets of rows in ga_fmc_message_parameters; and multiple rows in ga_fmc_message_status. These can be demonstrated the following interactions with third parties (time stamp fields have been omitted but form part of this data):

Wire Notification Received:

| ID | CONVERSATION_TYPE | THIRD_PARTY | THIRD_PARTY_REF | | |
|---|---|---|---|---|---|
| 12000019 | WIRE | REDACTED | ABC123XYZ | | |

| ID | CONVERSATION_ID | DIRECTION | MESSAGE_TYPE | APPL_REF | STATE |
|---|---|---|---|---|---|
| 15000019 | 12000019 | IN | WIRE_ALERT | | RCVD |

| ID | MESSAGE_ID | KEY | VALUE |
|---|---|---|---|
| 12000019 | 15000019 | MID | ABC123XYZ |
| 12000019 | 15000019 | ACCOUNT_ID | JOHNDOE3 |
| 13000019 | 15000019 | WIRE_REF | 13489729139 |
| 14000019 | 15000019 | STATUS_CODE | HELD |

Wire-Release Request by FraudMAP:

| ID | CONVERSATION_ID | DIRECTION | MESSAGE_TYPE | APPL_REF | STATE |
|---|---|---|---|---|---|
| 16000019 | 12000019 | OUT | WIRE_RESPONSE | 212000019-547-000019 | QUEUED |

| ID | MESSAGE_ID | KEY | VALUE |
|---|---|---|---|
| 15000019 | 16000019 | MID | ABC123XYZ |
| 16000019 | 16000019 | STATUS_CODE | RELEASE |
| 17000019 | 16000019 | REASON_CODE | LOW RISK |

Wire-Release Request Sent:

| ID | CONVERSATION_ID | DIRECTION | MESSAGE_TYPE | APPL_REF | STATE |
|---|---|---|---|---|---|
| 16000019 | 12000019 | OUT | WIRE_RESPONSE | 212000019-547-000019 | SENT |

This interaction can be further detailed as follows: On the basis of a high risk event, correspondence is enabled with the end-user to determine if the transaction is acceptable or should be prevented. In this instance, communication, which may be intermediated through a third party, would take action based on a response. In this case, a conversation would initiate as follows:

FraudMAP Detects Risky Event and Opts to Correspond with End-User:

| ID | CONVERSATION_TYPE | THIRD_PARTY | THIRD_PARTY_REF | | |
|---|---|---|---|---|---|
| 22000019 | ENDUSERVERIFICATION | CLAIRMAIL | <null> | | |

| ID | CONVERSATION_ID | DIRECTION | MESSAGE_TYPE | APPL_REF | STATE |
|---|---|---|---|---|---|
| 25000019 | 22000019 | OUT | VERIFY_REQUEST | 212000019-547-000019 | QUEUED |

| ID | MESSAGE_ID | KEY | VALUE |
|---|---|---|---|
| 22000019 | 25000019 | ACCOUNT_ID | JANEAYRE2 |
| 23000019 | 25000019 | TEXT | For client protection . . . |
| 24000019 | 25000019 | EMAIL_ADDRESS | janeayre@booboo.com |

Correspondence Sent:

| ID | CONVERSATION_ID | DIRECTION | MESSAGE_TYPE | APPL_REF | STATE |
|---|---|---|---|---|---|
| 25000019 | 22000019 | OUT | VERIFY_REQUEST | 212000019-547-000019 | SENT |

Acknowledgement Received:

| ID | CONVERSATION_TYPE | THIRD_PARTY | THIRD_PARTY_REF | | |
|---|---|---|---|---|---|
| 22000019 | ENDUSERVERIFICATION | REDACTED | XYZ123CBA | | |

| ID | CONVERSATION_ID | DIRECTION | MESSAGE_TYPE | APPL_REF | STATE |
|---|---|---|---|---|---|
| 26000019 | 22000019 | IN | VERIFY_RCVD | | RCVD |

Acknowledgement Accepted:

| ID | CONVERSATION_ID | DIRECTION | MESSAGE_TYPE | APPL_REF | STATE |
|---|---|---|---|---|---|
| 26000019 | 22000019 | IN | VERIFY_RCVD | | ACCEPTED |

End-user Responds:

| ID | CONVERSATION_ID | DIRECTION | MESSAGE_TYPE | APPL_REF | STATE |
|---|---|---|---|---|---|
| 27000019 | 22000019 | IN | VERIFY_OK | | RCVD |

| ID | MESSAGE_ID | KEY | VALUE |
|---|---|---|---|
| 25000019 | 27000019 | ACCOUNT_ID | JANEAYRE2 |
| 26000019 | 27000019 | EMAIL_ADDRESS | janeayre@booboo.com |

End-user Response Accepted:

| ID | CONVERSATION_ID | DIRECTION | MESSAGE_TYPE | APPL_REF | STATE |
|---|---|---|---|---|---|
| 27000019 | 22000019 | IN | VERIFY_OK | | ACCEPTED |

Interfaces Outbound.

Interfaces are developed in order to receive, initiate and respond to conversations with third-party systems. These interfaces may have different transport mechanisms, but at minimum, it is expected that messages are sent by HTTP. FraudMAPConnect will provide interfaces with third-party systems and will attempt to abstract as much as possible. In reality, custom classes may be written and obey the protocols agreed with third parties. These custom classes communicate with the common conversation logic described above. Each developed interface meets prescribed parameters in order to re-use connection classes and provide a professional services competency with the maximum ability to develop new services as contracts are provided.

Interfaces Inbound.

The approach to interfacing with other FraudMAP components for the purposes of detecting new inbound messages and initiating outbound messages is as follows. Since it has been determined to persist these conversations in database tables, a client API has been developed to interact with these tables. The coordination of multiple instances of components requesting the same action has been addressed. An example of this problem is demonstrated in the context of multiple emails being sent to customers as a result of having two RiskApp instances (an active and failover) running. Therefore, conversations are tightly controlled so that this anomaly does not occur in the FraudMAPConnect system.

Conducting of Conversations.

A majority of conversations will, at least at first, be conducted by the RiskApp. This is because the RiskEngine doesn't currently have the ability to detect the conditions anticipated to be within specification. In this instance, RE may be utilized with Monitored Searches. This is demonstrated in the Wire scenario in which: a monitored search is configured to catch all types of wire transfer, the EventEvaluator detects a wire and creates a triggered alert; the triggered alert is picked up by RA; RA then determines that this triggered alert requires further analysis leading to potential automated intervention; and the session identified by the triggered alert is passed into some logic that determines if automated intervention is required. If an intervention is specified, RA converses appropriately with FraudMAPConnect.

Procedure for FMConnect Analysis.

A new element is introduced to the RiskApp model, as follows:

```
<monitoredSearchWithFMConnect conversationType="WIRE"
messageType="WIRE_RELEASE" thirdParty="[REDACTED]">
    <searchCriteria name="All wires for Automated Intervention">
        <criterion key="activities" value="WrSndT WrSndF"/>
    </searchCriteria>
    <excludeMatchCriteria type="ANY">
        <criterion key="risk" value="med" comparator="GE"/>
        <criterion key="amount" value="10000" comparator="GE"/>
        <criterion key="activity" value="WrSndF" comparator="EQ"/>
    </excludeMatchCriteria>
    <excludeMatchCriteria type="ALL">
        <criterion key="activity" value="WrSndT" comparator="EQ"/>
        <criterion key="amount" value="2000" comparator="GE"/>
        <criterion key="wireTemplateAge" value="14 days"
        comparator="LT"/>
    </excludeMatchCriteria>
    <connectParameters>
        <sessionElement key="SESSION_ID" attribute="$
        {fmconnect.session.id}"/>
        <sessionElement key="ACCOUNT_ID"
attribute="${fmconnect.session.account.externalUserId}"
isConvKey="true"/>
        <activityElement key="MID" attribute="${fmconnect.partnerRefID}"
isConvKey="true"/>
        <activityElement key="WIRE_REF"
attribute="${fmconnect.wire.refID}"
isConvKey="true"/>
        <activityElement key="WIRE_AMOUNT"
attribute="${fmconnect.wire.amount}"/>
    </connectParameters>
</monitoredSearchWithFMConnect>
```

The example describes a possible definition for the method of detecting safe wires and dictating how to communicate results to the third party. The objective is to capture the required parameters in order to: First, Define the type of conversation and who it is with ("<monitoredSearchWithFMConnect>"); second, Define what types of event will trigger further analysis ("<searchCriteria>"); third, Define criteria that will exactly match events that for inclusion or exclusion ("<excludeMatchCriteria>" and "<includeMatchCriteria>"); and fourth, Define data to be logged and conveyed to the third party in question ("<connectParameters>").

Communicating with FraudMAPConnect.

Communication occurs through an API that effectively updates the FMC tables described above. The data introduced into the FMC tables (specifically the ga_fmc_message_parameters table) are selected as prescribed by the <connectParameters> element and will use Velocity (or other similar open source software) to interpret the variable names and translate them into real values. At the same time that the data is inserted, an appropriate row is added into the ga_fmc_message_status table with status set to QUEUED. This will trigger the FMConnect process to attempt to send a suitably formatted message to the third party. Should the message fail to be sent or the FMConnect process be down, the status will remain in QUEUED status and an attempt made as soon as FMConnect is back up. With current failover strategy, both an active and a failover RiskApp may be running concurrently. Both are executing the same background processes and are unaware of each other. Furthermore, the way in which they detect and react to triggered alerts can only be synchronized within a relatively open window. It is anticipated that both will try to reply to a conversation at the same time. In order to prevent the transmission of duplicate instructions, a Sequence_ID may be inserted into the ga_fmc_message_status table. This sequence_ID is formed using aspects of the triggered alert and so if the FMConnect process detects more than one similar message with the same Sequence_ID it will ignore all but the first.

FraudMAPConnect Communication with Third Parties.

Third parties cannot be expected to conform to a specified protocol. Adaptation to third-party rules is anticipated, and basic elements of conversation and abstract are contemplated. Each implementation will differ in the following ways:

Low level transport. Most third parties support HTTP, in addition to other modes of communication.

Application protocols (Web API). Some protocols may be very basic and quite proprietary. Others may involve the use of a technology such as SOAP or an architecture such as RESTful.

Data formats. Some third parties may wish to pass data in XML or JSON formiats. Some may want to use a proprietary format of their own.

Conversation rules. The rules of the conversations with third parties may differ considerably. Some third parties will only require a response to conversations that they initiate; others will expect communication with them on an as-needed basis; some will send acknowledgment and wish to be acknowledged in return; others will never respond.

Configuration. For each connection, variable parameters such as host name, port, URL, are to be specified and will vary for each third party.

Given this significant variability, the implementation of basic interfaces which may have as few as two methods (send and receive) are contemplated. Custom implementations of this interface are anticipated for each new third party, with use of inheritance and other standard practices to centralize common code & behavior.

System Integrity & Recovery.

In instances of FraudMAPConnect sending messages out, they will first be queued and then sent. If the system happens to abort between queuing and sending, on start-up, a re-send of all messages that are in a queued status is initiated. It will be the responsibility of the client (internal) API to persist all information required for the sending of the message in the database when it gets queued and then, on start-up, any queued but un-sent messages will be re-sent. On unusual occasions, duplicate messages may be sent out, with the benefit of preventing failure to communicate requests to third parties.

FraudMAPConnect Processing.

FraudMAPConnect may perform the following functions: listen for incoming messages from third parties; listen for messages from FraudMAP components; and send out messages to third parties.

FraudMAPConnect will communicate via HTTP/HTTPS or via JMS and SMTP, or other more specialized protocols. In any event, running as a web-service under an application server such as JBoss enables the ability to satisfy most communication protocols. Conversation protocols both at the lower and higher levels of the communication stack are specified by type. This architecture is designed in such a way that code to obey common protocols is re-used, and a configuration system enables rapid specification of communication parameters.

On the internal side the database exists as the mode of communication. This has the advantages of built-in persistence, easy inclusion in transactions and low impact with regards to configuring the interactions between FraudMAP components. The major disadvantage is that messages may be sucked up by any component that is able to do so. Therefore, the production system is tightly controlled so as to prevent a rogue process being started that would erroneously drain messages out of the database queue and send them to an undesirable location.

Figure 32:
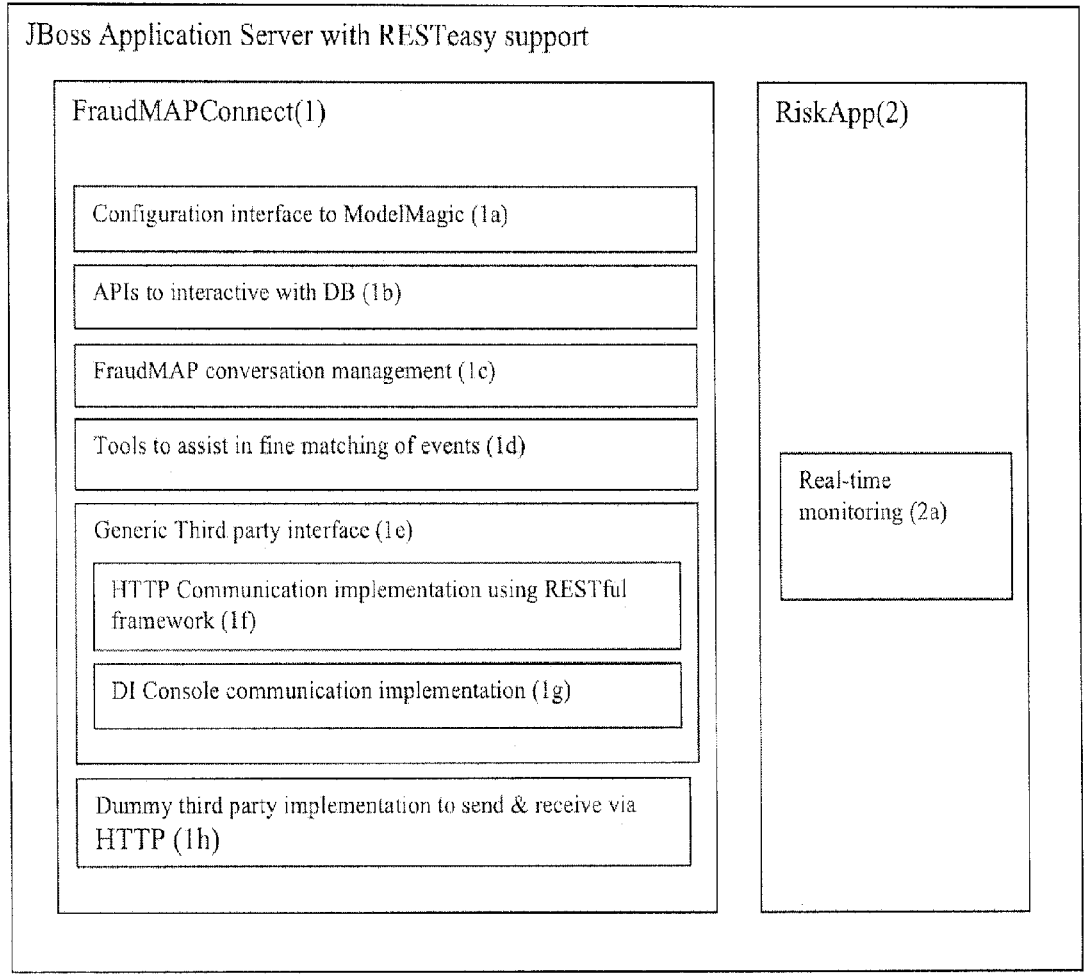
FIG. 32 is a block diagram of the JBoss Application Server and ModelMagic technology infrastructure, under an embodiment.
Figure 32:
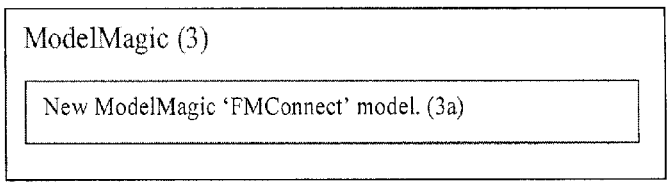

FIG. 32 is a block diagram of the JBoss Application Server and ModelMagic technology infrastructure, under an embodiment.

New Application.

A new JBoss application, FraudMAPConnect will be written, consisting of: first, a configuration interface that will utilize the current ModelMagic framework (classes will be written to read from a ModelMagic file on start-up and configure appropriate data classes to drive services in FraudMAPConnect); second, a database service layer will be written to persist to and read from the database (to include APIs to initiate, read and update conversations); third, a conversation management layer will be written to interact with the database service layer according to prescribed business logic which will be configured through Model-Magic; fourth, tools will be developed that can be used by callers to assist in fine-matching of events (initially for use by RiskApp but will be written in such a way that they can be callable by other components; to be configured through ModelMagic); fourth, a generic interface will be written to send and receive messages between third parties and Fraud-MAPConnect; fifth, an HTTP communication implementation of the above will be developed (will also be configured via an appropriate element in the ModelMagic FMConnect model file; sixth, an implementation of the generic interface will be developed that communicates with the DI Console; and seventh, a dummy implementation of FraudMAPConnect will be developed that uses the HTTP communication method to act as a test third party endpoint.

Enhancements to RiskApp.

Implementation of another Monitor type (besides regular monitoring and RBA) that services conversations managed by FraudMAPConnect.

Enhancements to ModelMagic.

Incorporation of another model type, FMConnect, that serves to define and present ModelMagic configurations to FraudMAPConnect.

Reflex

User Story—Main Components.

User Stories are aspects of a software development tool implemented for the FraudMAPConnect. A successful implementation of the product will involve several components, including: Engine, which determines how Reflex will look for triggering events and respond; Logging, which determines how Reflex will record all activities in a log file for later review and retrieval; Notification, which determines how Reflex will alert a financial institution's analysts of its activity; Display, which determines where in the FraudMAP UI the Reflex actions displayed, and how a user can search and locate them, when needed; and Configuration, which determines how personnel will build Reflex criteria on a FI's behalf.

As each of these components are separate Projects, tracked using a "User Story"-based approach. User Stories are considered "successful" and "complete" by developing to meet a series of Acceptance Criteria. These Criteria are defined at the end-user level, allowing for specialist groups (engineering, DBA, UI, etc.) to define the best possible technical methods to meet them.

Currently many FraudMAP FI users perform multiple manual activities on low-risk items on a daily basis. These activities include: releasing automatically delayed Wire and ACH transactions and cancelling or suspending user accounts which are performing usual activities; etc. Low-risk activities (such as releasing automatically-delayed wire or ACH transactions) take up many hours of work time and can be automated. High-risk activities should trigger swift response (for example, an account suspension) without manual intervention. Thus, certain activities defined by the financial institution are automatically performed on the customer's behalf using a system of third-party messages.

Acceptance Criteria:

An initial criterion is the creation of an infrastructure or system to send and receive external messaging to third-party suppliers (for example: the DI console) which can invoke changes on that external system. One example is the deactivation (suspension) of a Home Banking consumer's access to the online system without account-holder or FI involvement. Another example is the automatic release of automatically delayed or held ACH or Wire transactions based on low score or low dollar amount. The initial project defining this underlying activity is displayed in the "Plan" section above and describes such an infrastructure as it applies to sending messages to the DI console; however, the full User Story defines each of the different systems that form the communication network. Since it is expected that each Provider will use different terms and will allow automated messaging in different ways (if they allow it at all), it is assumed that each separate Provider will need its own distinct User Story.

An additional criterion is the creation of a notification and reporting system, which will inform bank employees and/or account holders of every automated action and activity. One example is to send an email alert to a special bank email list any time an account-holder's Home Banking account is suspended. Another example is the creation of a daily report of all automatically released ACH or Wire transactions that met the "low risk, low dollar" criteria described in the preceding paragraph. The goal of this is to notify the bank to automatic events that carry with them some required level of follow-up by the bank. For example, an automated account suspension may require the bank to contact the account-holder at the last good address or phone number to alert them that they need to cancel possibly compromised bank or credit card accounts and re-activate their account. Depending on the complexity of each action, individual User Stories may be specified for each activity. This criterion also pertains to changes to the current risk app UI to accommodate Reflex activities as they apply to currently-displayed information. For example: Reflex performs an "account suspend" action based on defined triggering criteria on behalf of a bank. This should display as an "activity" in that session's activity pane.

An additional criterion is the creation of a new, separate location in the FraudMAP risk application which displays all Reflex-related activities. While this data may also be available in the current system, for example displaying an automatic release of a low-dollar, low-risk transaction when that specific ACH or Wire is displayed in the risk application, this same data may be displayed in a separate location for FI users wishing to monitor or report on Reflex-based activities. A "Reflex" tab or similar partitioned area dedicated to Reflex activities is contemplated as a preferred display.

An additional criterion is the creation a back-end "console" or control panel, which allows personnel to build expressions on behalf of banks. These expressions define the criteria and the resulting actions that Reflex performs as a result of such criteria. For example, the "suspend user account" Reflex action may involve multiple criteria, including "3 or more red alerts in a 24 hour period", "red alerts may include activities of 'edited user contact information', 'created new wire template' and 'scheduled more than $5,000 in transfers in the same 24 hour period'" before the action is taken. A customer may specify inclusion as well as exclusion criteria, as well as specific actions that may result should the specified criteria be met. This console may not be displayed to the banks using the system. Alternatively, it may be a console for internal use and take the form of custom-made XML scripts (TBD). A simple, easy to use menu-based creation screen is contemplated, and made available to internal personnel, and which may save individual Reflex triggers and actions for later distribution (with customizations) to all FraudMAP customers. Alternatively, this may enable the development of entirely new and custom trigger/response pairs on-demand.

An additional criterion is the creation a matrix of all desired Reflex actions based on expected use cases, and cross-reference these activities against each home banking provider's system. The expectation is that each provider will accomplish individual tasks (ex: performing a ACH or wire release) in a different manner, and that possibly some providers might not allow the action in question from a remote source. This may be mapped and stored in a central location for later reference. It is anticipated that more desirable Reflex actions will take priority (i.e. "what action should be taken?"), followed by the availability of that action (i.e. "can Reflex perform that action via third-party messaging?"), followed by the task's complexity (i.e. "how hard is it to perform that task?").

An additional criterion is the gathering and definition of technical challenges which will hinder or block Reflex actions (engineering impact), and documentation of those challenges and their solutions on that provider's wiki page in a newly-created "Reflex" subsection (product management impact).

An additional criterion is the testing of all Reflex activities with third parties prior to go-live. Documentation may be generated for each provider that illustrates how each Reflex activity may appear to the provider. Clearance from each provider may be obtained, showing that the provider (or their infrastructure) is ready to accept the messaging and perform the tasks. If banks require log files or other special notifications not captured in the FraudMAP risk app, a criterion is to provide these details to the banks prior to user acceptance testing and production go-live.

An additional criterion is the documentation of all changes to the system which result from implementation of Reflex, and the training or re-training to requesting customers (techpubs impact). This would include an update to internal wikis, training materials and all associated support documents (product management impact), and the preparation and distribution of press releases (marketing and possible product management impact), product logos (marketing impact), and sales and marketing messaging and supporting documentation (product management impact). Depending on the complexity of each individual task, this may require individual user Stories for each component.
FraudMAP System Database Design Definition tables are relatively small tables containing data element values and identifications. Definition tables include ENUM tables, MODEDEF tables, and the USER-MODEL table.

Helper Tables or HLP tables are used for initial searching. Typically they are joined with no more than one Definition table to produce a working set of identifications and stored in temporary tables. Note that a few searches are done directly on HLP tables and use no Definition tables. Helper Tables are "INDEX ORGANIZED", meaning that table contents are completely stored in index structures organized around their "organizational keys".

Auxiliary tables are special tables that are searched in some queries and do not contain all SESSION IDs, but need to have the same SESSION-related fields that all HLP tables would have so working sets from them may be fetched into TMP tables. An example of an auxiliary table is the SESSION_STATUS table.

FACTS tables are used for fact storage. FACTS tables are not searched. Searching in this context means fetching rows out of the table using any criteria beyond identification lookup. The only access allowed to FACTS tables is ID lookup.

All queries have three steps: Search Step. This step searches the relevant "Helper Tables" to collect identifications that may qualify as part of the "final answer" into TMP tables. Join Step. This step uses SQL INTERSECT, UNION, and MINUS to compute the final set of identifications that qualify based on the logic of the search. This utilizes the database's notion of LIMIT <N> to produce the "top Risks". Fact Step. This step uses the set of identifications from the Join Step to fetch the FACTs for display. Note that the "Fact Step" may be a nullity for some types of queries, particularly REPORTs.

This schema may minimize the number of pages visited in four distinct ways: through very narrow search tables, INDEX ORGANIZED if possible, through the absence of intermediate joins done on "real" (ie, non-TMP) tables, through exploiting hard search limits in the FACTS step to keep the number of full index traversals at a fixed minimum, and using an "iterative" search strategy for searches that produce large working sets in order to halt the search once the number of rows to display has been reached.

Index Traversals.

Minimizing full index traversals is a central goal, since these are particularly expensive. This is accomplished by avoiding open-ended ID-based intermediate joins for qualification. The use of open-ended ID joins for intermediate qualification is why an initial approach of using a "root and branch" join strategy through a "dimension ID table" failed at about 100M sessions, and why the 2.5 and earlier schema couldn't scale beyond approximately 25M sessions.

For this schema, the number of index traversals is small and bounded:

$$\text{Max\_Index\_Traversals} = N\_\text{Definition\_Items} + \text{Fact\_Limit}$$

where N_Definition_Items is $$\text{SUM}(<N \text{ Definition Values satisfying each search parameter}>)$$

If wildcards are not used, the number of definition values is simply the number of search boxes clicked with valid entries in the RA search screen. If a wildcard is used in a search box, its contribution to the number is the number of search values that satisfy the wildcard. Fact_Limit is the "LIMIT N" constant, which is a configurable global constant, typically 500.

Examples and Comparisons with Other Approaches—an Example Query.

Given the following query: "Show me all the sessions from Paris, Tex. with Comcast as PROVIDER and Opera as the web browser." Below is a high level what the query looks like in the above framework.

Helper Table Initial Search Round.

In the Helper Table round, the "candidate universe" of possible Sessions that match the search criteria are gathered by breaking up the search into its components:
INSERT INTO Temp1 SELECT HLP.SESSION_ID, HLP.RISK_SESSION FROM CITY_MODEDEF M, CITY_HLP HLP WHERE M.MODEDEF_ID=HLP.MODEDEF_ID AND UPPER (M.CITY_NAME)='PARIS';
INSERT INTO Temp2 SELECT HLP.SESSION_ID, HLP.RISK_SESSION FROM STATE_MODEDEF M, STATE_HLP HLP WHERE M.MODEDEF_ID=HLP.MODEDEF_ID AND UPPER (M.STATE_NAME)='TEXAS';
INSERT INTO Temp3 SELECT HLP.SESSION_ID, HLP.RISK_SESSION FROM PROVIDER_MODEDEF M, PROVIDER_HLP HLP WHERE M.MODEDEF_ID=HLP.MODEDEF_ID AND UPPER (M.PROVIDER_NAME)='COMCAST';
INSERT INTO Temp4 SELECT HLP.SESSION_ID, HLP.RISK_SESSION FROM BROWSER_MODEDEF M, BROWSER_HLP HLP WHERE M.MODEDEF_ID=HLP.MODEDEF_ID AND UPPER (M.BROWSER_NAME)='OPERA';
This search has traversed four B-tree indexes to gather the "universe" of session candidates for the query.

FILTER Round.

In FILTERing, the logic used to derive the rows to be handled. SQL SET operators INTERSECT, UNION ALL are employed, and MINUS to logically execute AND, OR, and NOT filter predicates. FraudMatch 3.0 is used to search primarily on ANDed search predicates, so all searches use INTERSECT, although this approach could easily implement OR and NOT searches. The LIMIT feature of the database engine is used to restrict the rows to the "most risky" using ORDER BY on the RISK_SESSION field for rows to be displayed. For REPORTs or ACCOUNTs, a traversing of the solution set is undertaken. In all types of searches, using the above example, an inner query is used as follows:
(SELECT SESSION_ID, RISK_SESSION FROM TEMP1 INTERSECT SELECT SESSION_ID, RISK_SESSION FROM TEMP2 INTERSECT SELECT SESSION_ID, RISK_SESSION FROM TEMP3 INTERSECT SELECT SESSION_ID, RISK_SESSION FROM TEMP4)
Note that REPORT queries add the DAY_SESSION field. For FraudMatch and Alert queries, the sessions for examination are limited to the "riskiest", as determined by the RISK_SESSION. This is accomplished with ORDER BY RISK_SESSION with a LIMIT N predicate. REPORT and ACCOUNT searches completely traverse the search universe.

FACT Round.

In the FACT round the FACTs to be displayed are identified and presented. FACT tables are not searched as searching them is very expensive. A FACT query appears as follows:
SELECT <display_cols>
FROM GA_AR SESSION_FACTS F, <Modedef tables>, (SELECT SESSION_ID, RISK_SESSION FROM TEMP1 INTERSECT SELECT SESSION_ID, RISK_SESSION FROM TEMP2 INTERSECT SELECT SESSION_ID, RISK_SESSION FROM TEMP3 INTERSECT SELECT SESSION_ID, RISK_SESSION FROM TEMP4 ORDER BY RISK_SESSION LIMIT 500) T
WHERE F.SESSION_ID=T.SESSION_ID
AND F.<MODEDEFS>=<MODEDEF_TABS>.MODEDEF_ID;
Note that ACCOUNT searches use the USERMODEL and EXTERNALUSERINFO tables for their FACT tables, but the concept is similar.

Challenges.

The worst-case search is one involving a number of qualifiers with a lot of matches, ie "COUNTRY=UNITED STATES" in most databases. This would invoke much of the database. In practice, these types of searches are rare, and the searches finish fairly quickly. One of the best features of this approach is search times are bounded.

Alternate Approaches.

Note that the above approach contains multiple steps, which seem "excessive". This shows the limitation of using INTERSECTION logic rather than answering these queries directly with joins. This approach has been attempted using several methods, and performance was generally poor, especially with "cold" searches. The best "direct" case was the following: first, search the "FACT" table directly, and index every searchable column; second, pick the initial search which yielded the lowest number of rows, and use that as the "inbound" or "anchor" search; third, make the DBMS initiate the query on that search by using optimizer hints; and fourth, other search criteria would be answered with "outbound" joins from the FACT table to MODEDEF tables.

The search discussed above would be defined as follows
SELECT /*+USE_INDEX(CITY_INDEX)*/
<display columns>
FROM GA—RA_SESSION_FACTS F,
CITY_MODEDEF MC,
STATE_MODEDEF MS,
PROVIDER_MODEDEF MP,
BROWSER_MODEDEF MB,
<other tables with display info>
WHERE   F.CITY_MODEDEF_ID=MC.MODEDEF_ID
AND UPPER(MC.CITY_NAME)='PARIS'
   AND   F.STATE_MODEDEF_ID=MS.MODEDEF_ID
AND UPPER(MC.STATE_NAME)='TEXAS'
   AND
      F.PROVIDER_MODEDEFID=MP.MODEDEF_ID
      AND    UPPER(MC.PROVIDER_NAME)='COMCAST'
   AND
      F.BROWSER_MODEDEF_ID=MB.MODEDEF_ID
      AND UPPER(MC.BROWSER_NAME)='OPERA'
   AND <other quals needed to fetch display cols>
ORDER BY F.RISK_SESSION
LIMIT 500;
In this instance, two HISTORY tables had the columns in the FACT table, which were joined together to fetch the display info, so there was significant additional logic in the query.

Challenges:

By directly involving the FACT table in the initial search, large numbers of database pages containing non-qualifying rows are visited. Even the most restrictive initial search did not efficiently limit the search space. Additionally, many searches involve two low-selectivity searches, which limits the effectiveness of initial search restriction. The "outbound" qualifications in the queries involved traversing numerous B-Trees using ID joins on the MODEDEF tables. Even though the MODEDEF B-Trees would all stay in the DBMS buffer pool, a search in a large database would involve tens or hundreds of thousands of full B-Tree traversals in a single query just for this step. Because most database engines don't support use of multiple indexes on the same table, it is not possible to "vector in" from multiple "sides" of the table in something approximating the "Star Transformation" approach using the above.

Conclusion.

The "Alternate Approach" is effective in small databases, but may perform poorly in databases with more than 10 million sessions, and became unusable above approximately 30 million sessions. The approach discussed in the example performs well with most searches finishing in less than 15 seconds, even on a database with 360 million sessions. It works well because it's externalizing a "Star Transformation" in a way that will work in multiple DBMS engines, including those that don't natively support one. Note also that the new schema is more flexible than a "Star Transformation" in that it allows OR and NOT logic to be used in searches, while most Star Transformations require ANDed logic.

Database-Specific Issues.

The new schema depends on three relatively nonstandard features, but these features are supported by most major databases likely to be encountered:
INDEX ORGANIZED tables Oracle*MySQL: InnoDB storage engine tables are always "index organized":
DB2: "Index-Only" tables.
SQL Server: "Clustered indexes" (note that these are different from Oracle clustering indexes and are more like InnoDB storage).
POSTGRES: EnterpriseDB's "Postgres Plus Advanced Server" claims to support index organized tables. It does not appear that the open-source version supports them.
*ORDER BY<something>LIMIT <N>syntax (MySQL).
Oracle: SELECT ( . . . ORDER BY< . . . >) WHERE ROWNUM <=<N>;
DB2: SELECT . . . ORDER BY< . . . >FETCH FIRST <N>ROWS ONLY;
SQL Server (2005 and later):
SELECT . . . , ROW NUMBER( ) OVER(ORDER BY < . . . >) AS ROWCT
WHERE (<whereclause>) AND ROWCT <=<N>;
POSTGRES: SELECT . . . LIMIT <N>;
SQL INTERSECT, UNION ALL, MINUS
INTERSECT, UNION ALL, and MINUS are all "standard" SQL, but aren't supported by all databases, particularly MySQL. UNION ALL is the only one that can't be easily replaced with a join; fortunately, it *is* supported by MySQL.
INTERSECT can be substituted as follows:
SELECT A1 INTERSECT SELECT A2 INTERSECT SELECT A3 . . . INTERSECT SELECT AN
with
SELECT <cols>
FROM A1, A2, A3, . . . , AN
WHERE A1.cols=A2.cols and A2.cols=A3.cols and . . . and A<N−1>.cols=AN.cols
MINUS can be substitued as follows:
SELECT A1 MINUS SELECT A2
with
SELECT A1 where A1.<cols> NOT IN (SELECT A2).
FraudMAP System Algorithms.
Summary of Algorithms Employed for Pilot Account ACH:
The following special variables are assumed available and used in the various algorithms:
ORIGINATOR: combination of (IMMEDIATE ORIGIN ID, COMPANY ID, COMPANY NAME).
ORIGINATOR QUALIFIED: combination of (IMMEDIATE ORIGIN ID. COMPANY ID, COMPANY NAME, COMPANY ENTRY DESCRIPTION).
RECIPIENT_RN_ACCT: combination of (RECIPIENT ROUTING NUMBER, RECIPIENT ACCOUNT NUMBER).
SUBMISSION_DATE: time in milliseconds of submission date at midnight since epoch, except epoch is in the customer's time zone.
SUBMISSION_TIME_OF_DAY: time of day (in milliseconds from midnight) at which batch was submitted by customer.
SUBMISSION_DAY_OF_WEEK: day of week (1-7) in which batch was submitted by customer in the customer's time zone.
SUBMISSION_WEEK_OF_MONTH: week of month (1-5) in which batch was submitted by customer in the customer's time zone.
EFFECTIVE_DIFF_SUBMISSION_DATE: the date difference between submission date and due date.
TOTAL_CREDITS: total number of all CREDIT transactions in a batch.
TOTAL_DEBITS: total number of all DEBIT transactions in a batch.
AVERAGE_CREDIT_AMOUNT: average amount across all CREDIT transactions in a batch.
AVERAGE_DEBIT_AMOUNT: average amount across all DEBIT transactions in a batch.
Risk Assessment on Transaction-Level Characteristics:
For all transactions:
^,# If the B has been used previously with a different C given same A, then the likelihood of a new C for this B.
^ If the C is a known mule at the time of processing, then an alert is generated.
Call a normalized aggregate of 1-2 above Transaction_Risk_Default.
For all E1 and E2 (not E3) CREDIT/DEBIT transactions:
[1,3,*,#] Likelihood of time difference between current and previous transaction made to B, given same A.
Call a normalized aggregate of 3 above Transaction_Risk_1
Additionally, for all E1 (not E2 or E3) transactions:
[1,2,*,#] Likelihood of current transaction amount, given past E1 transactions in the same direction for the same (A & D).
This assesses the likelihood of an A making a transaction of a given amount.
[1,2,#] Likelihood of current transaction amount to C, given past E1 transactions in the same direction for the same (C & A & D).
This assesses the likelihood of an A making a transaction of a given amount to a given C Call a normalized combination[5] of 4-5 above Transaction_Risk_2.
Assess Risk on these Batch Level Characteristics:
For all batches:
[1,4,*,#] Likelihood of batch being submitted at current F1, given past batch submissions for the same (A & D).
[1,3,*,#] Likelihood of the specified G, given past values for the same A.
[1,3,*,#] Likelihood of time difference between current and previous batch by the same (H & D).
[1,*,#] Likelihood of the batch D given past values for the same A.
Call a normalized aggregate of 6-9 above Batch_Risk_1
For all batches containing at least one E1 or E2 transactions:
[1,*,#] Likelihood of the batch's I (J), given past batches for same (A & F2 & F3).
For all batches containing at least one E1 transaction:
[1,2,*,#] Likelihood of the batch's K (L), given past batches for the same (A & D).

Call a normalized aggregate of 10-11 above Batch_Risk_2.

The maximum of a normalized combination of [Transaction_Risk_1, Transaction_Risk_2, Transaction_Risk_3] is used to show activity risks: The top 1.5% of all such scored activities in a day are classified as RED; the next 1.5% of all such scored activities in a day are classified as YELLOW; and the next 3% of all such scored activities in a day are classified as LIGHT GREEN.

A normalized combination of [Transaction_Risk_1, Transaction_Risk_2, Transaction_Risk_3, Batch_Risk_1, Batch_Risk_2] is used to drive alerts: The top 0.75% of all such scored qualifying batches in a day are classified as RED; the next 0.75% of all such scored qualifying batches in a day are classified as YELLOW, and the next 1.5% of all such scored qualifying batches in a day are classified as LIGHT GREEN.

Debit only batches are excluded from the qualifying batches.

The above risk assessment description is considered in view of the following:

$^1$: Until sufficient history for specific customer is available, assessments are made using prior model configuration set using population level characteristics. As more history is accumulated, assessments from population priors and user history are mixed together.

$^2$: Smaller amounts are considered less risky.

$^3$: Extremely small time differences are considered more risky. Time differences that fit a daily/weekly/fortnightly schedule are considered less risky.

$^4$: Submission time outside business hours are considered more risky.

$^5$: Until sufficient history for specific (C & A & D) is available, assessments are made using A specific model. After sufficient history is available, only the (C & A & D) specific model is used.

\*: The model is configured to generate an appropriate Risk Reason for the top 2.5% of qualifying transactions/batches.

^: The model is configured to generate an appropriate Risk Reason for all such qualifying transactions/batches.

: These values computed but set to zero for DEBIT transactions and DEBIT only batches. The Risk Reason associated with these transactions/batches are still generated via the actual computed value.

E1, E2, E3 represent transaction types.

F1, F2, F3 represent timing parameters.

FraudMAP System Mule Account Matching

Mule Account matching.

Fields under consideration include: first, a routing number (defined as RN), utilizing third_party_current.ga_3pty_acct_list.routing_identifier as its third-party database and concat(ach6_rdfi_id, ach6_check_digit) as its ACH data; second, an account number (defined as ACCT), using third party_current.ga_3pty_acct_list.account_id as its third-party database and ach6_dfl_account_number as its ACH data, and third, an account holder's name (defined as NAME), using third_party_current.ga_3pty_acct_list.user_name as its third-party database and ach6_individual_name as its ACH data.

In relation to the above-described fields, a recipient may be uniquely identified by just the combination (RN, ACCT). The fields named (RN, ACCT) may be included in order to process an ACH transaction. In relation to the RN field: this value may be 9 digits long. In third-party DB, this field typically is always available and always 9 digits. In ACH data this field looks like it is always available and always 9 digits. In relation to the ACCT field: no clear standard. In the third-party DB, this field appears to be always available. However, it may be unclear if this value is complete enough to identify a distinct account. There is significant variation in the number of digits seen in this field. The ACH standard allows for 'alphameric' values in this field In ACH data, and very occasionally (i.e. 334 out of 2.8 million unique recipients in 3 months of data) account numbers are present which do not consist entirely of numbers, but instead contain special characters like spaces and hyphens. It is not assured that these will be reported with all such special characters in the mule set. In relation to the NAME field, there are no clear standards. In third-party DB, this field is not always populated. When available, some common patterns include:

'FirstName LastName': Marzia Hasan

'FirstName MiddleName LastName': muhammad razaib afridi

'FirstName MiddleInitial LastName': Christina G. Ballew

It is not always an individual's name: D.S. Young & Accociates

There is no standardization on capitalization or spelling or short forms (Steve, instead of Steven).

In ACH data, the NAME field is not always populated. When available, some common patterns include:

'FirstName LastName': Wally Eberhardt

'LastName, FirstName': Eberhardt, Wallace

'FirstInitial LastName': W. EBERHARDT

'FirstName MiddleName LastName': Wallace Maurice Eberhardt

'FirstName MiddleInitial LastName': Wallace M. Eberhardt

Risk Assessment on Transactions to Mules: Assumptions.

If it can be confirmed that a transaction is being requested to a known mule, then the transaction may be alerted on. There is no need to learn behavior as regards transactions to mules—these are always risky. For confirming a transfer to a mule, an attempted match is made on any combination of (RN, ACCT, NAME), with the following caveats: NAME is an optional field, and no exact matching algorithm can be defined for non-standard NAME values; and ACCT values do not follow any standard—the same ACCT may be reported as different string values.

Options Considered:

In some contexts, the following fields are available:

From third party: TPD.RN, TPD.ACCT, TPD.NAME

From ACH data: ACH.RN, ACH.ACCT, ACH.NAME

Also, the following string methods may be available:

TRIM(X): returns a copy of string X, with all leading and trailing spaces removed.

UPPER(X): returns a copy of string X, with all characters [a-z] replaced with their upper case equivalents.

REPLACE (X,regexp, b): replace all matches of regular expression 'regexp' in X with string 'b'.

TOKENIZE(X): returns a list of all 'tokens' contained in string X, where tokens are non-space character sequences separated by whitespace.

INITIALIZE(X): returns the first character of string X.

ED_n(X,Y): returns TRUE iff strings X and Y are within edit distance n of each other.

xP_BG(X,Y): returns TRUE iff x percent of the bigrams in the shorter of (X,Y) are contained within the other.

Given above information, the following matching methods can be considered (the first and the third methods above are recommended for implementation):

First the RN_aACCT Method:

An exact string match on (RN) and an approximate one on (ACCT):

X.RN=TRIM(TPD.RN)
    X.ACCT=REPLACE(TRIM(UPPER(TPD.ACCT)),[^0-9A-Z],"")
    Y.RN=TRIM(ACH.RN)
    Y. ACCT=REPLACE(TRIM(UPPER(ACH.ACCT)),[^0-9A-Z],"")
    Return 'RN_aACCT' iff (X.RN==Y.RN && X.ACCT==Y. ACCT)

Second, the RN_aNAME_ED_1 method: An exact string match on (RN) and an approximate one on (NAME) using edit distance on the constituent tokens:

X.RN=TRIM(TPD.RN)
    X.NAME_TOKENS=TOKENIZE(REPLACE(UPPER(TPD.NAMES),[^0-9A-Z],""))
    Y.RN=TRIM(ACH.RN)
    Y.NAME_TOKENS=TOKENIZE(REPLACE(UPPER(ACH.NAMES),[^0-9A-Z],""))
    SHORTER_LIST=whichever of (X.NAME_TOKENS, Y.NAME_TOKENS) has a greater number of tokens longer than 2 characters.
    LONGER_LIST=the token list which is not SHORTER_LIST Return 'RN_aNAME_ED_1' iff:

X.RN==Y.RN
    && For each token pair (a,b) between SHORTER_LIST and
    LONGER_LIST, where a & b are longer than 2 characters and ED_1(a,b) is true: (a,b) are considered matched.
    && For each unmatched token pair (c,d) between SHORTER_LIST and LONGER_LIST, where at least one of (c,d) is <=2 characters in length && INITIALIZE(c)==INITIALIZE(d):(c,d) are considered matched. && No unmatched tokens remain in SHORTER_LIST Third, the RN_aNAME_75P_BG Method:

An exact string match on (RN) and an approximate one on (NAME) using at least 75% bigram match on the constituent tokens:

X.RN=TRIM(TPD.RN)
    X.NAME_TOKENS=TOKENIZE(REPLACE(UPPER(TPD.NAMES),[^0-9A-Z],""))
    Y.RN=TRIM(ACH.RN)
    Y.NAME_TOKENS=TOKENIZE(REPLACE(UPPER(ACH.NAMES),[^0-9A-Z],""))
    SHORTER_LIST=whichever of (X.NAME_TOKENS, Y.NAME_TOKENS) has a greater number of tokens longer than 2 characters
    LONGER_LIST=the token list which is not SHORTER_LIST Return 'RN_aNAME_75P_BG' iff:

X.RN==Y.RN
    && For each token pair (a,b) between SHORTER_LIST and LONGER_LIST, where a & b are longer than 2 characters and 75P_BG(a,b) is true: (a,b) are considered matched
    && For each unmatched token pair (c,d) between SHORTER_LIST and LONGER_LIST, where at least one of (c,d) is <=2 characters in length && INITIALIZE(c)==INITIALIZE(d):(c,d) are considered matched
    && No unmatched tokens remain in SHORTER_LIST A fixed cost is associated with the value returned by the mule matching method:

If match value returned==RN_aACCT: associate cost HIGH_LEVEL_MULE_COST with transaction; else
    If match value returned==RN_aNAME_75P_BG: associate cost MID_LEVEL_MULE_COST with transaction; else
    Associate 0 cost with transaction.

The above can be extended later with more sophisticated matching logic.

Hybrid Behavioral Pattern Analysis of FraudMAP System

Hybrid Behavioral Pattern Analysis.

In modeling and analyzing an individual's behavioral pattern to see whether a newly-observed behavior is in alignment with what past observed or learned behaviors, the individual's behavior may be more effectively explained and predicted if analyzed using the consideration of behavioral patterns seen from others that have some commonality with the underlying individual. For example, if a company has offices in two different cities (city A and city B), it is very likely for employees working in city A to be present in city B. In the context of money transfer, if for example Jack and Mike both work for company (AAN) and it is known that Jack has sent money to Matt Smith (Acc #12345) on behalf of AAN, it should come with no surprise if Mike sends money to Matt Smith even though he might not have sent money to Matt Smith previously. In other words, Mike's money transferring pattern can be predicted and explained based on Jack's pattern.

In above examples, if an individual's geo-location behavioral pattern or money transfer history is analyzed only based on the individual's history, appearing in city B office for the first time or sending money to Matt Smith by Mike would show up as a significant deviation from expected or learned behavior, while if such events are analyzed in conjunction with others' (colleagues) behaviors, they would show up as a more predictable behavior, which would consequently reduce the number of false positive alarms.

In hybrid behavioral pattern analysis, an individual's behavioral pattern is modeled or learned from two perspectives: an individual's predictive model (IPM), meaning that the behavioral pattern is models is based solely on individual's historical data; and a group's predictive model (GPM), meaning the behavioral pattern is model based the group's historical data (aggregated data containing both the individual's and other group's' past performance).

Any newly-observed behavioral pattern is analyzed by both IPM and GMP models. Four possible scenarios may be encountered: First, the new behavioral pattern is confirmed by both IPM and GMP models. In this scenario, the observed behavior is in alignment with the user's past behavioral pattern and there is no abnormality. Second, the new behavioral pattern is neither confirm by IPM nor GPM. In this scenario, the observed behavior cannot be explained by any of the models and it is considered as a significant deviation and unexpected behavior. Third, the new behavioral pattern is confirmed by GPM model but not IPM model: in this scenario, the observed behavior is not in alignment with the individual's past history but it is in the alignment with the group's (individuals' colleague) history. Going back to the city example, this is the case when the individual has always been seen in city A while his colleagues have been seen both in cities A and B, and then the individual is present in city B. Certainly, the newly observed behavior is not as unexpected as scenario B. Depending on the attribute, the risk associated with the deviated behavior should be discounted based on the fact that the new behavior can clearly be explained by the GMP model. For instance, in the case of money transferring example, maybe Matt Smith should be considered a safe recipient for Mike because Mike's colleague's Jack has already sent money to Matt several times.

Fourth, the new behavioral pattern is confirmed by IPM model but not GPM model. This scenario will never happen as all data used to develop IPM exists as part of GMP development as well.

This hybrid approach to analyze behavioral patterns is not necessarily applied to all aspects of behavioral patterns. Some behavioral pattern attributes (e.g. failed login or change password) are more related to individuals' life style, habit, and characteristics than their correlation to other groups. For such attributes, taking into account group's behavioral pattern would not necessarily improve the predictability of individuals' pattern.

FraudMAP System Monitoring Method

A method monitors the change of importance of nodes in an undirected graph, such as social network, databases of user behavior where user behavior can be categorized into a finite set. The changes of importance of users are associated with behavioral changes or external stimuli. Scores are based on importance of users and are updated at a given time interval. The score of a user is based on the importance of users it connects to as well as how similar the user is to other users. The method is particularly useful in improving fraud detection such as fraud detection in online banking, where user behavior is diverse and varying with time; the fraudster behavior evolves over time.

FraudMAP system Activation
Warp Speed II Activation.
The Warp Speed II Activation consists of a series of actions, as follows:
Set up Environment.
Generate Customer Information.
Begin Download of Data.
Run Initial Data Analysis Scripts.
Return to pilot account. Run the data analysis script and follow the prompts. It is possible to cancel and rerun the script anytime during this step.
cd~/warpspeedtop/warp_speed/model_create perl getDataForValidation.pl
<Host> <HostService> <Bank Platform>
Choose to use files from 'staging' or 'production'. In general, use the directory the script says has files in it, which may be located in production. If using staging, choose to rsync or not rsync (if unsure, choose to sync). If unsure which directory to use (i.e. if the script lists 0 files in production or it lists significantly more files in staging than in production), please contact Algorithms/PS before proceeding.

Choose which set to load. The script will compare headers to determine which files have the same file format. Files with the same format will be in the same set. Unless otherwise instructed, select the last-listed set of data. If the last listed set of data has at least 10 dates listed than the set before it, contact Algorithms/PS before proceeding. The script will load the database, which will take some time.

For pilot account Only—the user_id field is always user_name. Remember "user_id=user_name" and skip to step f. The script will prompt the identification of the database user_id column. Unless otherwise instructed, use the value the script suggests. Remember the user_id.

For all pilot accounts only: Ignore all text below "Updating SVN . . . Look in the output for the following messages. Scroll up as appropriate; these messages are generated before the subversion updates happen. The messages will indicate whether to stop for Algorithms feedback or continuation is possible, as follows:
ACTION: Write Down FILE_GAP_STOP_IN_MINUTES. Record the number for reference.
ACTION: Write Down MAX_GAP_IN_MINUTES. Record the number for reference.
ACTION: Problem computing. It is not safe to continue the warp speed process. Instead, contact Algorithms/PS for further instructions. Provide <Host>, <HostService>, and <Platform>.
ACTION: Warnings were found, it is not safe to continue. It's not safe to continue the warp speed process. Contact Algorithms/PS and for further instructions.
ACTION: No warnings were found, it is safe to continue. It is safe to continue the warp speed process.

The script will generate analysis files in the scripting directory and load all of the data into a database on stagedbO1c.dc1.fm-hosted.com raw_<host>_<hostservice>_db.db_query_results.log—important data analysis for [REDACTED].

raw_<host> <hostservice>_db.db warnings_etclog—database error log for [REDACTED].

raw_<host>_<hostservice>_db.db_analyze_info.log—analysis info log for [redacted] Only.

raw_<host> <hostservice>_db.db_analyze_warn.log—analysis warn log for [redacted] Only. This file lists items that Algorithms may review before proceeding.

Determine that all the final output files from above (g) have been checked into svn under [http://svn.guardian.lan/svn/ga/branches/stable/customer-data_customerSpecific-Notes/<HOST>]. This should occur automatically. In situations where it does not, do the following (solely for pilot account customers):
//Create this directory if it does not exist: mkdir warpspeedtop/cd-branch-stable/customer-data/_customerSpecificNotes/<HOST>//Copy all files from the output folder to the svn customer folder. cp ~/warpspeedtop/warp_speed/model_create/ DATAQUALITY_OUTPUT/<HOST>-<HOST SERVICE>/*~/warpspeedtop/cd-branch-stable/customer-data/customerSpecificNotes/<HOST> cd ~/warpspeedtop/cd-branch-stable/customer-dataLcustomerSpecificNotes/<HOST> svn add*svn commit-m"BugzID: YOUR_DEPLOYMENT_CASE_NUMBER"

Review Data Analysis Results and Note Important Items.
Conduct Pilot account Data Analysis Review; conduct Intuit Data Analysis Review.
Initialize the Model on "svn.guardian.lan".
Exercise caution in this step. If the wrong values are entered, Algorithms/PS may be utilized in order to proceed. Run the following script and follow the prompts using the information from all of the steps described above. Locate a file named
<Host>_<HostService>.tenant.data (all lower case) in the warp_speed/model_create directory.
cd ~/warpspeedtop/warp_speed/model_create perl addDetailsCustomer.pl <Host> <HostService> <BugzID>
For pilot accounts—Retail:
  Bot User List: Empty unless told otherwise.
  Timezone: <Timezone for RiskEngine>, in Locale/City format (e.g. "America/LosAngeles"). See list.
  FILE_GAP_STOP_IN_MINUTES: Written down during Initial Data Analysis step.
  MAX_GAP_IN_MINUTES: Written down during Initial Data Analysis step.
  USER_ID: Written down during the Initial Data Analysis step. This field is typically 'member' if it's a CU (credit union) and 'customer' if the customer is a bank.
  Specify whether or not mobile should be enabled for this customer. For Pilot account—Business:
  Bot User List: Empty unless told otherwise.

Timezone: <Timezone for RiskEngine>, in Locale/City format (e.g. "America/LosAngeles"). See list.

FILE_GAP_STOP_IN_MINUTES: Written down during Initial Data Analysis step.

MAX_GAP_IN_MINUTES: Written down during Initial Data Analysis step.

USER_ID: Written down during the Initial Data Analysis step. This field is typically 'member' for a CU (credit union) and 'customer' for a bank.

ACTOR_ID: Preserved in writing during the Initial Data Analysis step. IMPORTANT: If 'user1' is preserved, then MUST enter 'user' instead. 'user1' is the db column name, 'user' is the raw data name.

For pilot account:

Bot User List: Empty unless told otherwise.

Add Bot User List in the Fogbugz case, clearly marked, preferably with the heading "BOT USER LIST" and then the list below it.

Sync Customer with Dummy Model.

Return to pilot account.

Sync with dummy model so that customer model is up to date with the latest Dummy build (link also available at the top of this wiki).

cd ~/warpspeedtop/warp_speed/model_create/perl syncCustomerWithDummy.pl <MY CLIENT>.tenant.data <DUMMY BUILD>//Inspect the changes made by the script to the model to make sure they are as expected: cd~/warpspeedtop/cd-branch-stable/customer-data/<Host>/<HostService>//Commit the changes—be sure to put the bug number in the comments using "BugzID: XXXXX" svn commit-m"BugzID:

Run Harness Script.

At a high level, the script loads the data using the RE in to a first round database, runs some R analysis and updates the model, then re-loads the data into the second-round database. The second-round database is loaded if the analysis on the first-round database is successful.

Build and Deploy Updated Model.

At this point, the RE has run through the input data, and adjusted the model. Below the RF and RA will be started from an assigned env* puppet environment.

Update model for the tenant for RA. On dclstagere01.dc1.fm-hosted.com:

In the /svn/puppet/env[YOUR_NUMBER_HERE] directory, edit versions.pp: put in latest build number obtained (<BUILD NUMBER>) for tenant in the "tenants versions" section, Ex: $[redacted]_Retail="4.2-SNAPSHOT-r25733".

update the "components version" section with the latest builds.

The RA will use the second-round database created by the harness script. The second-round database should be used for all tenants in the deployment block. Therefore, if starting a new block, also update the db name entries in the "pod definitions" section to match the WS_EXE_DB_NAME_2 parameter created previously. If this deployment is not the first in the current block, leave the "pod definitions" section unchanged.

In the /svn/puppet/env[YOUR_NUMBER_HERE] directory, edit teants.pp, and add new tenant. Review the SVN at other puppet/envXX/tenants.pp for sample tenants Note env07 is the only env that enables harversters to run.

Commit the changes to SVN and wait for Puppet to make changes to staging.

Check the status of the Puppet changes by going to dclstagere01.dc1.fm-hosted.com and typing 'pltail'. This will tail the puppet log file although this process is very fast.

Add the RF and RA host and instance # to Fogbugz

Start the RF and RA:

sudo /opt/ga/fraudmap4/env[YOUR_NUMBER_HERE]/run/riskfeed/riskfeed_control.sh start //Note: Recommended to run refresh_ga_country.sh script in the RiskEngine instance if this is the first tenant entered into the schema for RiskApp to load correctly. sudo /opt/ga/fraudmap4/env[YOUR_NUMBER_HERE]/run/riskapp/riskapp_control.sh start In the RiskApp, determine that the new thresholds have taken effect and are entered correctly.

Do a Stamped Build and Send Bug to QA.

On "svn.guardian.lan"

sudo su—buildbot build-model branches/stable-Pstamp-Pproduction-builder Host/Host Service note down the build number for next step Send the following info to QA: Stamped Build; Mobile: Yes/No; Preview url and login/password; DB information for the RA; Path to the harness directory; RE Timezone; RA timezone; Known Fraud; For pilot account Hosted tenants only: Staging Harvester was disabled; For pilot account OnPrem tenants Only: Data Feed Instructions (to be done before RE is started); Copy the contents of /mounts/customer-data/HOST-HOSTSERVICE/sftp_archive/to/mounts/customer-data-prod/HOST-HOSTSERVICE/home/chroot/incoming/; Create a gpg harvester for the HOST-HOSTSERVICE tenant and set it with the cron job schedule listed below. cron schedule; harvester_cronjob hour=>"03-19", harvester_cronjob_minute=>["10", "25", "40", "55"]; and Start the GPG harvester and let it finish before starting RiskEngine.

Schedule Production Build With Network Operations.

RiskEngine Model Generation and RiskApp Metadata Generation

MetaData Project.

The metadata project is the design of RiskEngine model generation and RiskApp metadata generation. Because RiskApp's metadata is based on a RiskEngine model, the process requires Login Model and Activity Model to be defined first then the model definition can be used by RiskApp metadata generator to generate the RiskApp metadata (depending on how RiskApp metadata is defined; this may be a simple loader that can take RiskApp XML definition and parameters files with Login/Activity Model definition/palettes XML files and parameters XML files and process and load all of them into RE and RA respectively and independently)

The components are as follows: first, Login Model Catalog and Palettes, consisting of a set of XML files that include login model definitions that can be selected in order to construct a login model template; second, Login Model Template Definition, which consists of a XML file defines a login model template for a host/host service; third, Activity Model Structure, which consists of an XML file describing the activity model structure; fourth, Login/Activity Parameter Generator (optional), which may generate the login or activity parameters files not originally in XML format; fifth, Model/Palette Stamper, which assigns version and unique key to key elements of the components; sixth, Model Loader, which puts RE model template into RE and RA metadata into RA; and seventh, Riskapp Metadata Generator (optional), which generates RiskApp XML metadata if original sources are not in XML.

Figure 33:
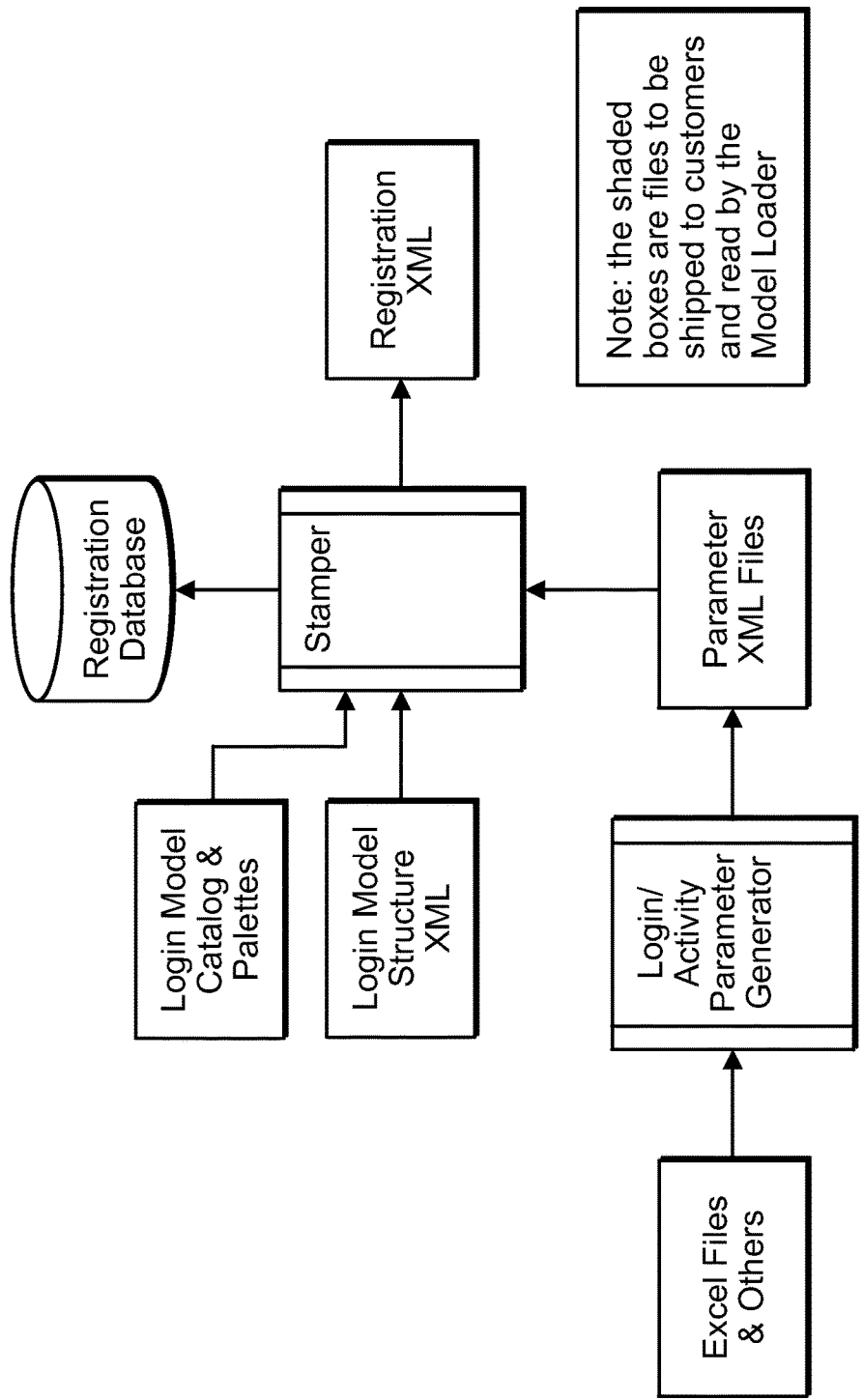
FIG. 33 is a block diagram of model generation and metadata generation, under an embodiment.

FIG. 33 is a block diagram of model generation and metadata generation, under an embodiment.

Login Model Catalog and Palettes.

Login Model Catalog may consist of pieces where a login model can be assembled together. At the lowest level, it has Group Template Palette where unique group templates are defined and Evaluator Template Palette where unique evaluators are defined. A collection of group templates then form a group template structure and a collection of evaluators form an evaluator structure. A group template structure and evaluator structure together define a login model template structure. All the palettes and catalog can be defined in XML.

A Group Template Palette may define the group templates available for use. For example, multiple country group templates may exist, each one using a different stats class or prior class. A group template may be inserted but cannot be updated or deleted. A palette should have the following fields:

PALETTE_REGISTRATION_KEY, which is a key assigned by the Palette Stamper to uniquely secure this palette when in XML format from changes.
GRP_TMPLT_PALETTE_KEY, which is a global key uniquely identify this group.
GRP_TMPLT_TYPE, which identifies the group type, such as country, and which confirms variation. This can mapped to the name in a group template table.
GRP_CLASSNAME
GRPSTATS_CLASSNAME
MODE_CLASSNAME
MODEDEF_CLASSNAME
MODESTATS_CLASSNAME
PRIORS_CLASSNAME
MODEFORGETTING_CLASSNAME
MODEDEF_TABLENAME for RiskApp use; RiskApp may determine what column(s) to use from such table.

```
<GROUP_TMPLT_PALETTE>
    <PALETTE_REGISTRATION_KEY>
    <GROUP_TMPLT_PALETTE_KEY>
    <GROUP_TMPLT_TYPE>
    <GROUP_CLASSNAME>
    <GROUPSTATS_CLASSNAME>
    <MODE_CLASSNAME>
    <MODEDEF_CLASSNAME>
    <MODESTATS_CLASSNAME>
    <PRIORS_CLASSNAME>
    <MODEFORGETTING_CLASSNAME>
    <MODEDEF_TABLENAME>
</GROUP_TMPLT_PALETTE>
```

LMTS Group Structure.

LTMS_TYPE and LMTS_VARIATION together will select the necessary structure from the following two entities.

First Entity. The first entity is LMTS Group Association Palette: the group association defines all the groups to be used for the LMTS_TYPE. The fields for this entity are:
PALETTE_REGISTRATIONKEY, which is a key assigned by the Palette Stamper to uniquely secure this palette when in XML format from changes.
LMTS_TYPE
LMTS_GRP_VARIATION
GRP_TEMPLATE_PALETTE_KEY
GRP_COORD, which is the order in which the group should be processed
MODEDEF_INDEX, which is the modedef number in ga_ra_loginstats_history.

```
<LMTS_GROUP_ASSOC_PALETTE>
    <PALETTE_REGISTRATION_KEY>
    <LMTS_TYPE>
    <LMTS_GRP_VARIATION>
    <GROUP_TMPLT_PALETTE_KEY>
    <GROUP_COORD>
    <MODEDEF_INDEX>
</LMTS_GROUP_ASSOC_PALETTE>
```

All group variations within this LMTS_TYPE will have all the same group types. Every LMTS_TYPE may have one
LMTS_GRP_VARIATION and it is labelled the DEFAULT variation. When a LMTS_TYPE is specified without a variation, it will be interpreted as the DEFAULT variation. The DEFAULT version can be overridden by providing only the differences between a new variation and the DEFAULT one. For example, if a country variation is required, the LMTS_GRP_VARIATION for that model may have one different COUNTRY group specified which overrides the DEFAULT version. All other groups will still be taken from the DEFAULT version.

Second Entity. The second entity is LMTS Group Relationship Palette—this defines the group relationship between parent and child. The fields are
PALETTE_REGISTRATION_KEY, which is a key assigned by the Palette Stamper to uniquely secure this palette when in XML format from changes.
LMTS_TYPE
LMTS_GRP_VARIATION
GROUP_COORD
PARENT_COORD

```
<LMTS_GROUP_REL_PALETTE>
    <PALETTE_REGISTRATION_KEY>
    <LMTS_TYPE>
    <LMTS_GRP_VARIATION>
    <GROUP_COORD>
    <PARENT_COORD>
</LMTS_GROUP_REL_PALETTE>
```

Evaluator Template Palette.

The Evaluator Template Palette defines the evaluators that can be used. This palette may have the following fields:
PALETTE_REGISTRATION_KEY, which is a key assigned by the Palette Stamper to uniquely secure this palette when in XML format from changes.
EVAL_TMPLT_PALETTE_KEY, which is a global key uniquely identify this group
EVAL_CLASSNAME
EVALSTATS_CLASSNAME
LOGINRATE_CLASSNAME
FRAUD_COOCURRENCE_CLASSNAME
TIMEBIN_CLASSNAME

```
<EVAL_TMPLT_PALETTE>
    <PALETTE_REGISTRATION_KEY>
    <EVAL_TMPLT_PALETTE_KEY>
    <EVAL_TMPLT_TYPE>
    <EVAL_CLASSNAME>
    <EVALSTATS_CLASSNAME>
    <LOGINRATE_CLASSNAME>
```

```
    <FRAUD_COOCURRENCE_CLASSNAME>
    <TIMEBIN_CLASSNAME>
</EVAL_TMPLT_PALETTE>
```

LMTS Evaluator Structure.

LMTS Evaluator Structure is the evaluator definition that specifies groups for inclusion in the risk calculation. It consists of the following:

A LMTS Evaluator Association Palette, which is the evaluator association that defines all the evaluators to be used for the LMTS_TYPE. The fields are:
PALETTE_REGISTRATION_KEY, which is a key assigned by the Palette Stamper to uniquely secure this palette when in XML format from changes.
LMTS_TYPE
LMTS_EVAL_VARIATION
EVAL_TMPLT_PALETTE_KEY
EVAL_NAME—the name of EVAL_COORD=0 should be
DEFAULT
EVAL_COORD-0, 1 or 2

```
    <LMTS_EVAL_ASSOC_PALETTE>
        <PALETTE_REGISTRATION_KEY>
        <LMTS_TYPE>
        <LMTS_EVAL_VARIATION>
        <EVAL_TMPLT_PALETTE_KEY>
        <EVAL_NAME>
        <EVAL_COORD>
    </LMTS_EVAL_ASSOC_PALETTE>
```

A LMTS Evaluator Relationship Palette, which defines the group relationship between parent and child. The fields are:
PALETTE_REGISTRATION_KEY—a key assigned by the Palette Stamper to uniquely secure this palette when in XML format from changes.
LMTS_TYPE
LMTS_EVAL_VARIATION
EVAL_COORD
GROUP_COORD

```
    <LMTS_EVAL_REL_PALETTE>
        <PALETTE_REGISTRATION_KEY>
        <LMTS_TYPE>
        <LMTS_GRP_VARIATION>
        <EVAL_COORD>
        <GROUP_COORD>
    </LMTS_EVAL_REL_PALETTE>
```

Currently the ga_grouptmplt_usage_rel is used for 3 purposes: the Parent-Child relationship between groups (PAR_GRP), which is specified in the Group Relationship entity; an Evaluator (EVAL_SRC_GRP); and an Evaluator Mode (EVAL_LEAF_GRP), which is currently not in use.

A Login Model Catalog, which is comprised of all the known LMTS_TYPE and its known group variations and evaluator variations and can be chosen from and associated descriptions.

```
<LMTS_CATALOG>
    <LMTS_TYPE>
        <NAME>DI_BEACON</NAME>
        <DESCRIPTION>For DI customer with merged beacon
        data. It has Access Type as top node and Device Beacon Dummy and
        Device Beacon Avail node</DESCRIPTION>
        <LMTS_GROUP_VARIATIONS>
            <LMTS_GRP_VARIATION>
                <NAME>DEFAULT</NAME>
                <DESCRIPTION>Default
                group<DESCRIPTION>
            <LMTS_GRP_VARIATION>
        <LMTS_GRP_VARIATION>...</LMTS_GRP_VARIATION>
        <LMTS_GROUP_VARIATIONS>
        <LMTS_EVALUATOR_VARIATIONS>
            <LMTS_EVAL_VARIATION>
                <NAME>Default</NAME>
                <DESCRIPTION>Default
                evaluator</DESCRIPTION>
            </LMTS_EVAL_VARIATION>
            <LMTS_EVAL_VARIATION> ...
            </LMTS_EVAL_VARIATION>
        <LMTS_EVALUATOR_VARIATIONS>
    </LMTS_TYPE>
</LMTS_CATALOG>
```

A Global Repository, which may be XML or Database

A Host Service ID Dictionary: to dispense the host service ID. If not defined, stop.

Login Model Template Definition.

A whole login model structure is specified as described below and together with all the palettes defined earlier, assembled with elements from the Group Structure Definition and Evaluator Definition. This may be represented as follows:

```
<RiskEngineModel>
    <Host>
        <Name>StarOne</Name>
        <Description>Credit Union</Description>
    </Host>
    <HostService>
        <Name>StarOne</Name>
        <Description>OnlineBanking</Description>
    </HostServiceName>
    <FraudModel>
        <ID>0</ID>
    <FraudModel>
    <LoginModel>
        <LMTSType>DI_BEACON</LMTSType>
        <LMTSGroupVariation>DEFAULT</LMTSGroupVariation>
        <LMTSEvalVariation>DEFAULT</LMTSEvalVariation>
    </LoginModel>
    <ActivityModel></ActivityModel>
</RiskEngineModel>
```

Variable Elements for Future Determination.

The manner and location for how initiate analysis remains open for further determination. Similarly, the initiation of the Deployment_key and LMTS_SOURCE may be generated by means of a development tool or may be hand-entered.

Activity Model:

Activity models have proven to be quite different among different customers. The introduction of palette concepts may occur over time. However, each customer's data may be broken down to the Structure and parameters (and not dynamic versus static). The Structure consists of two parts: SESSION and ACTIVITY (such as GA_ACTIVITY_TMPLT, GA_ACTIVITY_SUBTYPE) and is typically defined at the beginning and may need minor adjustments. The parameters (also SESSION and ACTIVITY) are data usually in the GA_SESSION_ACT_PARAMSET table and it may require constant tuning to get the parameters (such as COST) correctly as iteration occurs through the data. Version should be assigned by the model stamper:

```
<ACTIVITY_MODEL>
    <VERSION></VERSION>
    <SESSION_STRUCTURE>
        <NAME>
        <DETERMINATOR_CLASSNAME>
        <EVALUATOR_CLASSNAME>
        <MAPPER_CLASSNAME>
        <TERMINATOR_CLASSNAME>
        <CREATOR_CLASSNAME>
        <TIMEOUT_CLASSNAME>
        <PERSIST_UNKNOWN> -- when Y, if an activity is unknown and
        no catch all, the activity will be written out.
    </SESSION_STRUCTURE>
    <ACTIVITY_STRUCTURE>
        <TYPE>
        <IDENTIFIER>
        <ALLOW_SUB_TYPE>
        <ALLOW_QUALIFIER>
        <ALLOW_QUANTIFIER>
        <PERSIST_DETAIL>
        <PERSIST_NOW>
        <CACHE_DETAIL>
        <SUMMARY_COLUMN>
        <DEF_CLASSNAME>
        <STATS_CLASSNAME>
        <SUBTYPES>
            <SUBTYPE>
                <TYPE>
                <IDENTIFIER>
            </SUBTYPE>
        </SUBTYPES>
    </ACTIVITY_STRUCTURE>
<ACTIVITY_MODEL>
```

The GA_ACTIVITY_TMPLT table also has SHORT_NAME, DISPLAY_NAME, QUALIFIER_DESCR, QUANTIFIER_DESCR and QUANTIFIER_TYPE. However, this information is only for RiskApp (ga_ra_activity_tmplt) and may change often. Thus, it may be removed from the RiskEngine metadata. The subtype's DISPLAY_ANME, QUALIFIER_DESCR, QUANTIFIER_DESCR and QUANTIFIER_TYPE may similarly be removed.

Activity Parameters may be broken to two parts: one for modification in-house and the other for modification at the customer site. Activity Parameters for modification at the customer site include:

template.addParamSet("TERMINATION", "TIMEOUT_IN_MINUTE", "20", pVersion); //from Mike: Session time out is set at 15 minutes and is based on inactivity.
template.addParamSet("TERMINATION", "TIMEOUT_ACCURACY", "2", pVersion);
template.addParamSet("TERMINATION", "MAX_BIN_SIZE", "3500", pVersion);
template.addParamSet("TERMINATION", "WARN_BIN_SIZE", "2100", pVersion);
template.addParamSet("TERMINATION", "RECOVER_ IN_MINUTE", "30", pVersion); //suggestion: make this TIMEOUT_IN_MINUTE+3* TIMEOUT_ACCURACY The following parameters may be specified at the SESSION STRUCTURE LEVEL? template.addParamSet("ACTIVITY", "CATCH_ALL", "Misc", pVersion); template.addParamSet(GACfgConstants.SESSION_MODEL, GACfgConstants.ACTIVITY_SCORE—ON, "Y", pVersion); template.addParamSet(GACfgConstants.SESSION_MODEL, GACfgConstants.SCORER_CLASS, "com.ga.riskengine.session.GASessionLoginScorer", pVersion);

Model Parameter Representation in XML.

In order to populate the following XML output from EXCEL spreadsheets and analyze the resulting data, a tool is envisioned, as follows:

Login Parameters:

```
<LOGIN_MODEL_PARAMETERS>
    <VERSION></VERSION> -- to be assigned by the
    Model Stamper
    <GROUPS>
        <GROUP>
            <GROUP_COORD></GROUP_COORD>
            <PARAMS>
                <PARAM>
                    <PARAMSET_NAME></PARAMSET_NAME>
                    <PARAM_NAME></PARAM_NAME>
                    <PARAM_VALUE></PARAM_VALUE>
                </PARAM>
            </PARAMS>
        </GROUP>
    </GROUPS>
    <EVALUATORS>
        <EVALUATOR>
            <EVAL_COORD></EVAL_COORD>
            <PARAMS>
                <PARAM>
                    <PARAMSET_NAME></PARAMSET_NAME>
                    <PARAM_NAME></PARAM_NAME>
                    <PARAM_VALUE></PARAM_VALUE>
                </PARAM>
            </PARAMS>
        </EVALUATOR>
    </EVALUATORS>
</LOGIN_MODEL_PARAMETERS>
```

Activity Parameters:

```
<ACTIVITY_MODEL_PARAMETERS>
    <VERSION></VERSION> -- to be generated by
    MODEL STAMPER
    <SESSION>
        <PARAMS>
            <PARAM>
                <PARAMSET_NAME></PARAMSET_NAME>
                <PARAM_NAME></PARAM_NAME>
                <PARAM_VALUE></PARAM_VALUE>
            </PARAM>
        </PARAMS>
    </SESSION>
    <ACTIVITIES>
        <ACTIVITY>
            <TYPE></TYPE>
            <PARAMS>
                <PARAM>
                    <PARAMSET_NAME></PARAMSET_NAME>
                    <PARAM_NAME></PARAM_NAME>
                    <PARAM_VALUE></PARAM_VALUE>
                </PARAM>
            </PARAMS>
        </ACTIVITY>
    </ACTIVITIES>
</ACTIVITY_MODEL_PARAMETERS>
```

Model/Palette Stamper.

In order to keep track of deployed models at the customer site, a control of the model provided to the customer, and an assignment of a unique key that will be included in ETL files is provided. This enables the identification of the model in use to process a specific event. This involves a registration process: a data model is stamped with a MODEL_KEY prior to provision to the customer. The key may be used to prevent tempering of XML files, meaning the KEY may be be generated based on the content of the structure type and parameter version.

Each palette (such as LMTS_GRP_VARIATION) is protected with a PALETTE_REGISTRATION_KEY. This MODEL_KEY is written into the RE database when deploying it at the customer site and written to the ETL. This MODEL_KEY is stored internally, such as at a database, and be associated with any keys in an ETL file to its configuration. At a customer site, a model may be stamped with a registration key in order to be deployed.

The key features of the Stamper are:

Stamp each Palette in the Login Model Template Palettes.
Read from Login Model Template palettes, login model structure XML definition, login model parameter XML files and verify Login XML parameter file is compatible with the Login Model Structure XML definition.
Generate a LMTP_VERSION for the Login XML parameter.
Read from Activity Model Template structure and parameter XML files.
Generate an Activity Model Structure version.
Generate an Activity Model Parameter version.
Create a model key based on all the above information and generate a registration XML file as shown below. The same information may be stored in a model database so each key can uniquely identify all the components. This file will be shipped to customer and be read by the Model Loader to verify all the components at the customer site when loading a model.

```
<GUARDIAN_ANALYTICS_MODEL>
  <MODEL_KEY></MODEL_KEY>
  <HOST></HOST>
  <HOSTSERVICE></HOSTSERVICE>
  <LMTS_TYPE></LMTS_TYPE>
  <LMTS_GRP_VARIATION></LMTS_GRP_VARIATION>
  <LMTS_EVAL_VARIATION></LMTS_EVAL_VARIATION>
  <LTMP_VERSION></LTMP_VERSION>
  <ACTIVITY_MODEL_VERSION></ACTIVITY_MODEL_VERSION>
  <ACTIVITY_MODEL_PARAMETER_VERSION>
  </ACTIVITY_MODEL_PARAMETER_VERSION>
</GUARDIAN_ANALTYICS_MODEL>
```

Model Loader.

The Model Loader is a separate tool released independently of the RiskEngine. Model Loader derives data from the RiskEngine library. Files to be read by the Model Loaders include the following: Login Model Structure Definition XML file; Login Model Structure Palettes; Login Model Parameter file; Activity Model Structure file; Activity Model Parameter file; and Model Registration XML file.

Model Loader loads its model into a system with the following conditions:

Preserve changes made in the system by the customer
Preserve history of all versions
Check compatibility of version (i.e. to guard against human error) and tempering of data by verifying all the STAMPER generated keys.
Load a version that RiskEngine determines it is the right version to be run.
Activity model can be loaded independently of login model (if login model has not changed but activity model has, only the activity model should be loaded).
Activity model does not have exist.

Display Metadata Generator.

The display model is generated with a similar concept as the login model: a structure, variation and parameters. The structure, static parameters and dynamic parameters are described below. RiskEngine model generator will create a structure xml file describing the login and activity model. Display metadata generator uses the XML file to generate its metadata.

Structure:

the Display structure ties strongly to the login model with minor twist due to session model; this defines what the RiskApp needs in order to tie its schema to the login/activity model (i.e. the basic layout). Display uses Group Association definitions (i.e. all the groups in use for this model) to determine login groups. Display group palettes similar to the login model can be selected and displayed in order to assemble the display model.

Variation:

some variations include removing userAgent from an alert page and adding loginType into the alert page. Some difficulty would be which row, columns the added or deleted component to be and its effect on other components already there.

Parameters:

A threshold is a parameter to Display.

Display Model Definition.

The display model definitions are to be defined in the XML as a subpart <displayMetadata> within the model.

Figure 34:
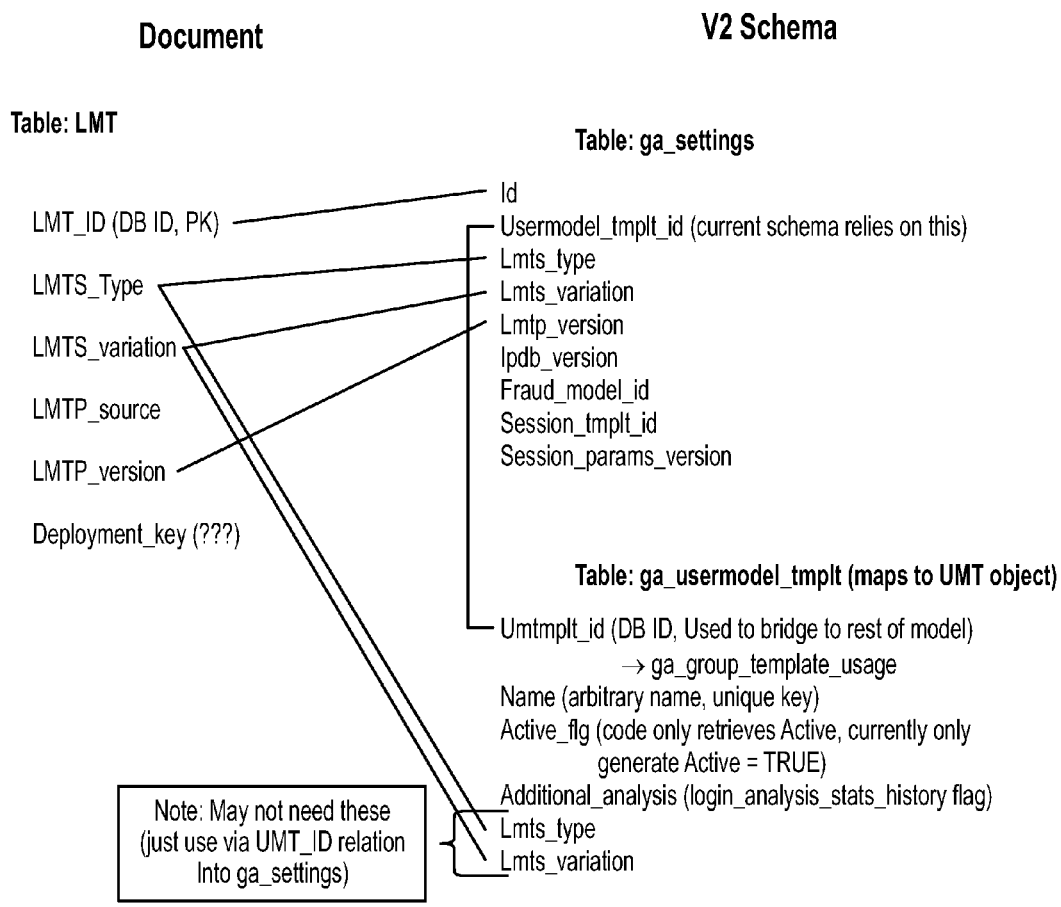
FIG. 34 is a diagram showing risk engine tables, under an embodiment.

FIG. 34 is a diagram showing risk engine tables, under an embodiment.

Figure 35:
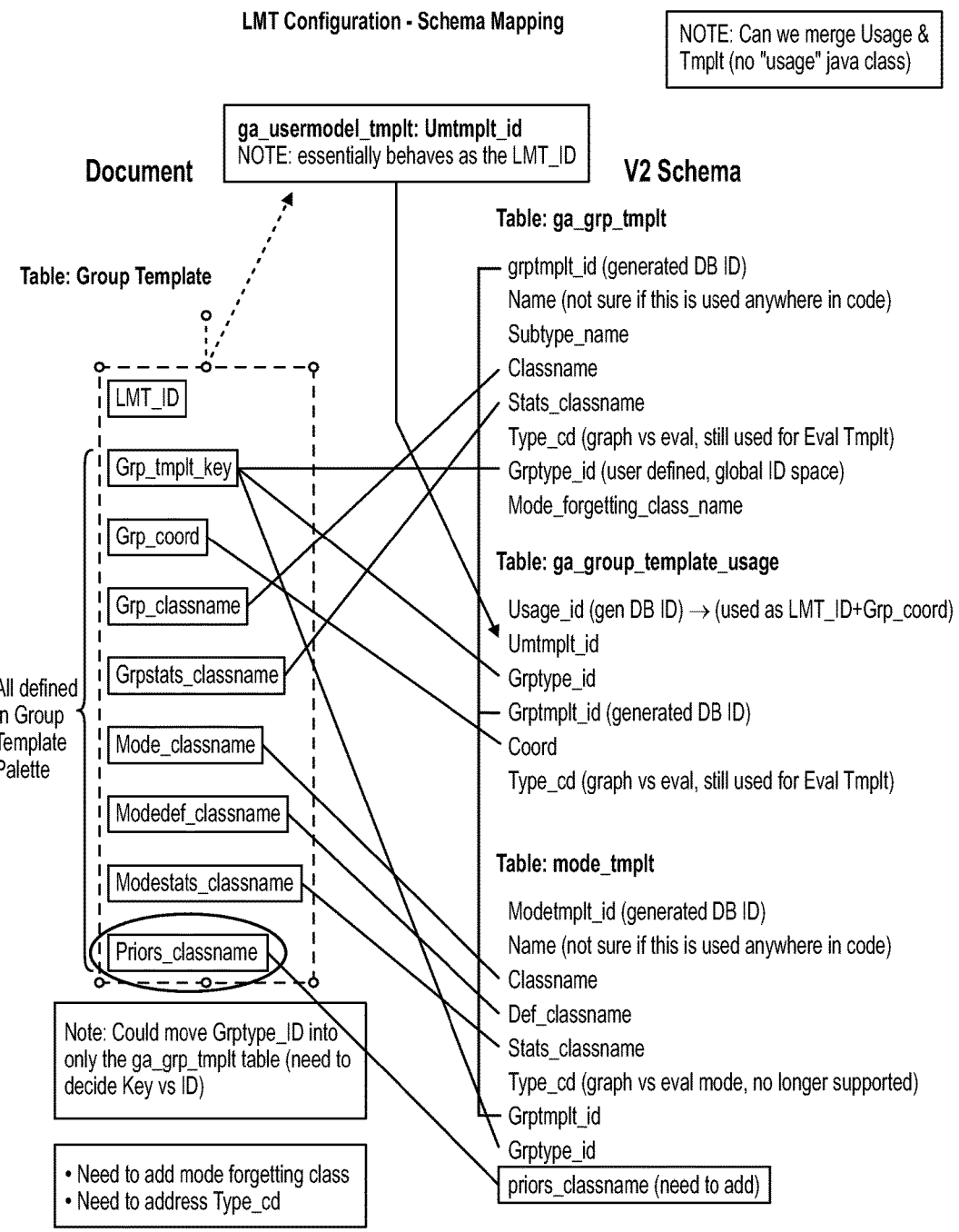
FIG. 35 is a diagram showing schema mapping, under an embodiment.

FIG. 35 is a diagram showing schema mapping, under an embodiment.

Potential Changes to the existing RE database.

Required Changes.

The following may be required changes to the RE database: add prior classname to the group template; add LMPT_SOURCE to the ga_settings table (ga_grouptmplt_usage_param table already has it) in order to indicate who has made changes; remove duplicate GrpType_ID from ga_grouptmplt_usage and ga_grouptmplt_usage_rel table; remove rel_order from the ga_grouptmplt_usage_rel table; Add MODEL_KEY to ga_settings table; remove subtype_name from ga_group_tmplt; Remove TYPE_CD from GA_ACTIVITY_TMPLT; rename LMTS_VARIATION to LMTS_GRP_VARIATION; and add LMTS_EVAL_VARIATION.

Currently the GA_ACTIVITY_TMPLT table also has SHORT_NAME, DISPLAY_NAME, QUALIFIER_DESCR, QUANTIFIER_DESCR and QUANTIFIER_TYPE. This information applies only to RiskApp (ga_ra_activity_tmplt) and may change often. Thus, the information is removed from the RiskEngine metadata.

Recommended Changes.

The following may be recommended changes to the RE database: add the modedef index within an evaluator (currently ga_grouptemplate_usage_rel) to be independent of the coord specified in the system. The coord specifies the order of processing and modedef index specifies which modedef index in the ga_ra_loginstats_history table.

Desirable Changes.

The following may be desirable changes to the RE database: add ga_group_template_palette table into the RE engine; merge usage and group template tables; and create an evaluator table like for group to prevent overload of the group template table by using type_cd.

No Suggested Changes.

The following may be required changes to the RE database: combine ga_group_template and ga_mode_template.

Items for Resolution.

The following may remain to be resolved: merge usage and group template tables; and use Key (string) or ID (int) for group_template identification.

Versioning.

Because there are numerous parameter files that can affect the version of the a model, a multi-version system is envisioned, as follows:

RiskEngine Version: some models work with certain RiskEngine versions. For example, in version 2.5, there are parameter name changes that old models with old parameter names can no longer work in RiskEngine 2.5. [RiskEngine may determine if the installed model version is compatible with the RiskEngine]. This is defined in a file at the highest level of the model tree so it applies to all models under the tree.

Group. Group Structure may be static. When it changes, it becomes a different LMTS_TYPE. Group Definition is defined by Variation. Variations can be different processing classes, different evaluators. A concatenated (group-evaluator-evaluator) variation name is employed. Parameters may be static or dymanic. Static applies to items that change infrequently and apply to all customers using the LMTS_TYPE; when this changes, it would apply to all customers using that LMTS_TYPE. There is a version number to define changes. Dynamic applies to items that change for each customer and have a version number to define a change.

Evaluator. The Evaluator design is based on the following: first, structure defines the group to be included for the evaluator; second, definitions are classes to be used for the evaluator; and third, parameters are items that change for each customer. Static applies to fraud co-occurrence bin, login rate bin, timebin model and the like. Dynamic applies to fraud co-occurrence coefficient, login rate coefficient and the like. Because there are many files involved, it would give rise to error should users update any manually-maintained version number. Thus, a model stamper may assign version based on checksum generation of parameter XML file.

Activity Model version: this is the structure of the activity model such as GA_ACTIVITY_MODEL, GA_ACTIVITY_SUBTYPE Activity Parameter version: this is for information that is entered into the GA_SESSION_ACT_PARAMSET table.

Parameters Files.

Each group in the Excel spreadsheet may undergo identification by Group Template Type or potentially by the Key. The folder structure is as follows:

A new folder 'model' is added to the release. This may be identified as the global model directory.

Figure 36:
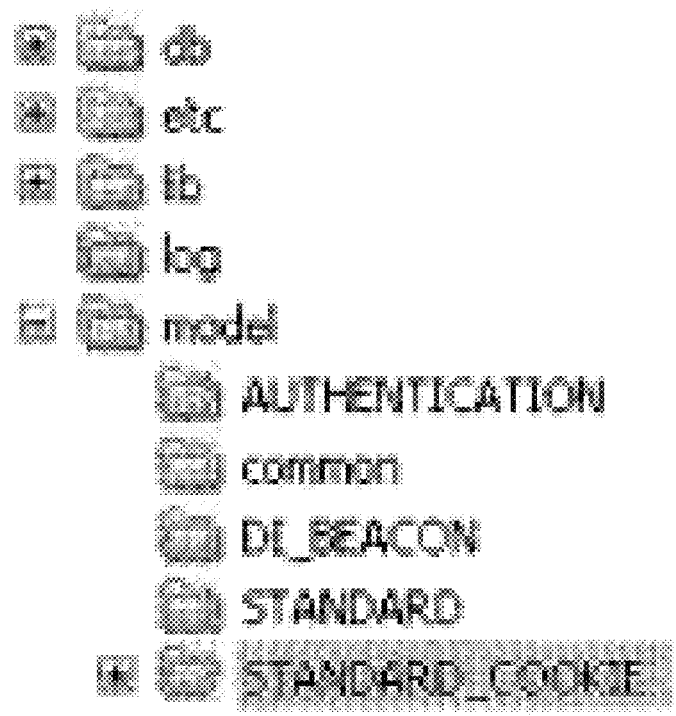
FIG. 36 is a global model directory showing the new 'model' folder.

FIG. 36 is a global model directory showing the new 'model' folder.

Figure 37:
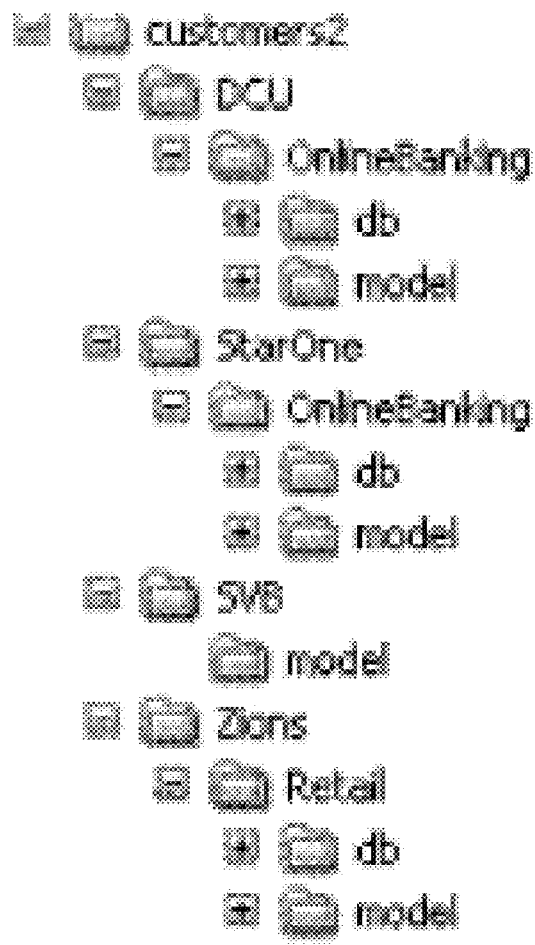
FIG. 37 is the customers.tar.gz structure.

AUTHENTICATION, DI_BEACON, STANDARD, ACCESS_AUTHENTICATION and STANDARD_COOKIE are 5 LMTS defined to date. In the customers.tar.gz, the structure appears as shown in FIG. 37.

Figure 38:
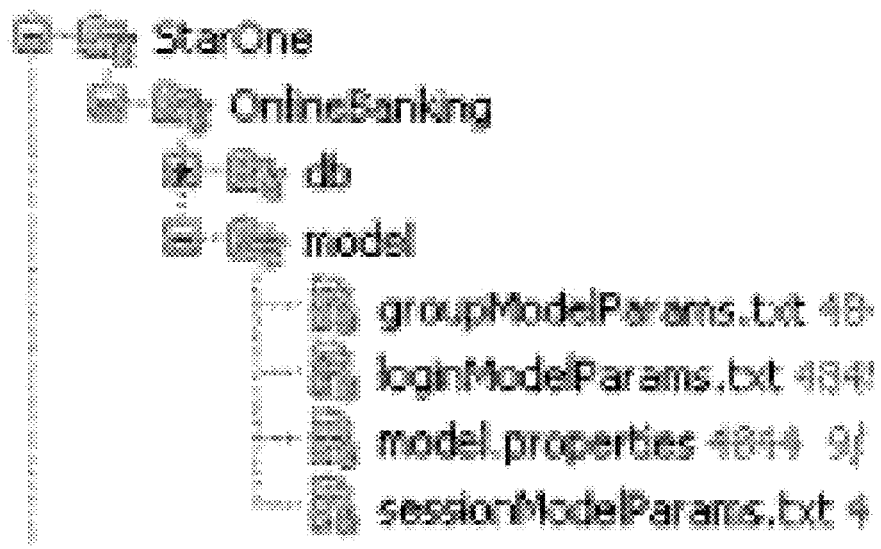
FIG. 38 shows the model-related files for a customer stored in the 'model' subfolder.

The model-related files for a customer is stored in the 'model' subfolder under (sometimes not directly under) the customer name. Typically, in each folder, it has a minimum of up to 4 files (sessionModelParams is needed only if there is session model). FIG. 38 shows the model-related files for a customer stored in the 'model' subfolder.

There are typically 6 files describing a model and they are (in the order to be read by the tool):

Login Model—Evaluator:
  loginModelParams: parameters that are at the model level and are typically customer-specific. Typically it exists in each customer's model folder. An example would be fraud co-occurrence co-efficient (FRAUD CO-OCCURRENCE EXCEL worksheet) and login rate co-efficient. (LOGIN_RATE CO_EFFICIENT EXCEL worksheet). This is at the evaluator level.
  loginModel: parameters that are at the model level. For example, fraud co-occurrence bin definition, trust model definition and login rate bin definition. It is typically it is at the 'model/common' directory as it applies to all models and not customer-specific. Whenever it is changed, it typically applies to all models. This is at evaluator level.

Login Model—Group.
  groupModelParams: parameters that are at the group level and are customer dependent. Typically it exists in each customer's model folder. This usually consists of New Mode parameters (New Mode Excel worksheet), priors for useragent related groups (PRIOR excel worksheet).
  groupModel: parameters that are at the group level and it is typically LMTS dependent but not customer dependent. This usually resides at the each LMTS folder (such as STANDARD, DI_BEACON, etc). Examples are the ALPHA for the Dirichlet parameters. This should be separated from the groupModelParams.txt as it doesn't change for each customer. However, when changed, this is intended to affect all customers using the model.

Session Model:
  sessionModelParams: parameters that are at the session level but are customer dependent or parameters that are activity level, which by definition are customer-dependent. It typically exists in each customer's model folder.
  sessionModel: parameters that are at the session model level and are not customer-dependent. It is typically at the 'model/common' directory.

The model generator tool starts searching for the given file at the customer's model folder.

For login model (4 files):
  if not found, move up to the next level which is LMTS folder;
  if not found, move up to the next level which is common folder.

For session model (2 files):
  if not found, move up to the next level which is common folder.

Any parameters that already exist may be ignored. For example, if parameters in the loginModel.txt (usually a common file) are candidates for modification from the common values, there are two alternatives: first, copy the entire loginModel.txt to either LMTS model level or customer model level and modify that value in it; and second, if just one or two values, specify the values in the loginModelParams.txt so the values in the loginModel.txt will be ignored.

Another design is allow another file (the override file) where any overriding parameters can go into in order to keep the structure consistent. The tool does some checking to make sure all groups get some parameters, if not, it will complain and may prevent the model from being written.

Procedure to Define a Model.

The procedure to define a model includes the following steps: define a new group template; define a LMTS_TYPE and group variation (define a new group association; define a new relationship); and define a new evaluator. There are three aspects to choosing a LMTS_TYPE: First, determine if there is a pre-existing model (and variation) for use; second, if there is not a pre-existing model, determine if any model can be modified to provide a different variation (if so, create a variation for that model; note that a new group template palette or evaluator may needed to be defined); third, if no modification can be made, create group templates for the group template palettes then build a new LMTS. Structure Representation in XML (for Reference Purposes Only).

```
<MODEL>
    <HOST>
        <NAME>StarOne</NAME>
        <DESCRIPTION>CREDIT UNION</DESCRIPTION>
    </HOST>
    <HOSTSERVICE>
        <NAME>StarOne</NAME>
        <ID>0</ID>
        <DESCRIPTION>OnLineBanking</DESCRIPTION>
    </HOSTSERVICE>
    <FRAUD_MODEL>
        <ID>0</ID>
    <FRAUD_MODEL>
    <IPDB_VERSION></IPDB_VERSION>
    <LOGIN_MODEL>
        <LMTSTYPE>DI_BEACON</LMTSTYPE>
        <LMTS_GROUP_VARIATION> -- SEE BELOW
        <LMTS_EVAL_VARIATION> -- SEE BELOW
    </LOGIN_MODEL>
    <ACTIVITY_MODEL> -- SEE BELOW
</MODEL>
    <LMTS_GROUP_VARIATION>
        <NAME>DEFAULT</NAME>
        <GROUPS>
          <GROUP>
            <GROUP_TMPLT_TYPE>
            <GROUP_TMPLT_PALETTE_KEY>
            <GROUP_CLASSNAME>
            <GROUPSTATS_CLASSNAME>
            <MODE_CLASSNAME>
            <MODEDEF_CLASSNAME>
            <MODESTATS_CLASSNAME>
            <PRIORS_CLASSNAME>
            <MODEFORGETTING_CLASSNAME>
            <GROUP_COORD>
            <GROUP_REL>
              <PARENT_COORD>
            </GROUP_REL>
            <MODEDEF_INDEX>
            <MODEDEF_TABLENAME> - although this is not
needed for RiskEngine, but this allows RiskApp to obtain the necessary
information without using the palette.
          </GROUP>
        </GROUPS>
    </LMTS_GROUP_VARIATION>
    <LMTS_EVAL_VARIATION>
        <NAME>DEFAULT</NAME>
        <EVALUATORS>
          <EVALUATOR>
            <NAME>
            <EVAL_COORD>
            <EVAL_CLASSNAME>
            <EVALSTATS_CLASSNAME>
            <LOGINRATE_CLASSNAME>
            <FRAUD_COOCURRENCE_CLASSNAME>
            <TIMEBIN_CLASSNAME>
            <GROUPS>
              <GROUP_TMPLT_PALETTE_KEY>
            <GROUPS>
          </EVALUATOR>
        </EVALUATORS>
    </LMTS_EVAL_VARIATION>
```

Activity Model:

```
<ACTIVITY_MODEL>
    <VERSION></VERSION>
    <SESSION>
```

```
        <NAME>
        <DETERMINATOR_CLASSNAME>
        <EVALUATOR_CLASSNAME>
        <MAPPER_CLASSNAME>
        <TERMINATOR_CLASSNAME>
        <CREATOR_CLASSNAME>
        <TIMEOUT_CLASSNAME>
    </SESSION>
    <ACTIVITIES>
        <ACTIVITY>
            <TYPE>
            <IDENTIFIER>
            <ALLOW_SUB_TYPE>
            <ALLOW_QUALIFIER>
            <ALLOW_QUANTIFIER>
            <PERSIST_DETAIL>
            <PERSIST_NOW>
            <CACHE_DETAIL>
            <SUMMARY_COLUMN>
            <DEF_CLASSNAME>
            <STATS_CLASSNAME>
            <SUBTYPES>
                <SUBTYPE>
                    <TYPE>
                    <IDENTIFIER>
                </SUBTYPE>
            </SUBTYPES>
        </ACTIVITY>
    </ACTIVITES>
</ACTIVITY_MODEL>
```

Major Components:
  Login Model Templates. Login Model Templates consist of the following: a Catalog, which is a new component and can exist in either XML or a centralized database; and a Definition, which may require changes based on the Login Model Dictionary.
  Session (Activity) Model. Although there may be some shared activities, such for DI customers, this is independent of Login Model, therefore, may be enhanced in the future.
  Read Excel Parameters. A summary sheet has been developed that isolates changes in original data spreadsheets.
  Display Metadata. Display is accomplished using two components: first, a Catalog in order to share display model metadata structure, and second, a Definition consisting of two parts. First, remove the hardcoded ID so the data can be written into the database programmatically with generated ID's. Second, if it is desirable to have shareable RiskApp metadata, this part may be re-written in order to facilitate shareable RiskApp metadata (similar to RiskEngine concepts of palette and dictionary).
  Versioning. This applies to login model, session/activity model and display model. This part is sensitive due to the fact that parts of parameters may be shared among customers.
  Model Loader. If the XML representation of model remains unchanged, then only the versioning aspect would involve modification.
Doral Algorithm of FraudMAP System
  Doral Algorithm Requirements—Primary Objective.
    The primary objective is to enable processing and scoring of multiple event streams from different channels and potentially different arrival timing (e.g. batch vs. real-time).
  Doral Algorithm Requirements—Overview.
    To put some of these requirements in context, consider the following observations about the current state of the product and business landscape. Note that the points in this section are not intended as requirements, but are expressed in order to explain the context around the explicit requirements in the sections that follow.

Customers and potential customers want to read, model, score and display events from multiple and varied data sources. The timing (e.g. real-time vs. batch) and availability (now vs. six months from now) of these data sources do not always fit together conveniently, and it may be overly burdensome to expect customers do so.

There are an increasing number of opportunities to create products analyzing data that is not specific to the online channel (e.g. wire transfers, accounts, offline ACH data).

Hosting enables the use of cross-institutional data both to improve fraud detection internally and to create an information source that could be "productized". This contemplates processing and modeling data along different dimensions (e.g. IP address, recipient account, device ID, and potentially even activity sequences).

Moreover, it is desirable to have a repository that contains information that is broadly useful (across all users at all institutions) for risk scoring and other purposes. This repository would contain information from third-party sources as well as internal cross-institutional data and analysis. The analog to this in the current product is the IPDB, which contains the information from a pilot account.

It would be desirable to better utilize some of the extra fields contained about the activities, particularly around display and searching. For example, it is currently not possible to search or match against specific recipient accounts.

A new wave of fraud attacks have been identified, which are enabled by sophisticated malware. These attacks can be broadly grouped into a few main categories:

Stolen Credentials/Different IP address. Malware is used to steal credentials, but the fraudulent session comes from an IP address that is not associated with the user.

Stolen Credentials/Proxy through user's machine. After stealing credentials, the fraudster uses a "back-connect" feature of malware to proxy through the user's machine. So the activity appears to come from the user's legitimate IP address. In this case, the fraudster can also presumably steal the user's cookies and spoof their user agent string, though in practice the fraudsters don't always do this. In this scenario, there is presumably a human executing the activities. Much of the recent fraud at a pilot account site falls under this description.

Session Hijacking/Transaction Modification. Malware waits for a user to login to online banking and then either initiates transactions in the background or changes information (payee, amount) about a user initiated transaction. In this scenario, the transactions are initiated or modified automatically, without requiring a human fraudster to execute each instance. Instances of this kind of fraud have not been observed directly, however it is frequently cited by customers and other players in the fraud space.

A top-level approach enables the detection of fraud by modeling different aspects of user behavior as reflected in the data. However, frequently changing fraudster tactics will require the rapid iteration of improvements to the algorithm in order to effectively detect and prevent new fraud attacks.

Doral Algorithm Requirements—Primary User Cases.

Many of the requirements in the following sections are motivated by the following use cases:

Use Case A (based on a pilot account) is based on one real-time data feed containing the online banking activity. Additionally, ACH files are obtained in batches as they are processed (several times a day). This creates several complications:

Real-time scoring of real-time data is proposed to be provided to customers, but a reasonable scoring of the batch events is also envisioned. This may result in minimal quality decrease in the scoring of the batch events as a tradeoff to scoring them "out of order".

The information will be presented in a single display screen.

A "link" is provided between the account number in the ACH files and the online user id in the online banking data. This may require a look-up table (which can be thought of as a third data source).

The deployment may occur in phases; for example, deploying a system to score the real time data only, and then at a later date adding in the ACH capability. A phased deployment may occur without introducing schema changes or reprocessing historical data.

Use Case B (cross-institutional data feedback) is based on raw data from multiple customers. This cross-institutional data may detect mule accounts, score IP reputation, and otherwise understand and score the data across dimensions other than the online user. This use case requires the ability to model and score event streams across other entities than the online user. Significant flexibility in the kinds of stored information and the kind of formulas used is essential. This also requires a mechanism whereby the information from the cross-institutional model makes its way to the FI-specific risk engine so it can be factored into the risk scoring.

Doral Algorithm Requirements—Data Processing.

Data processing refers to the actions done to the data from the origin of potentially multiple sources of raw input data to creation and ordering of the events for consumption by the computation section of the risk engine. These events may contain all of the necessary information for risk computation (and display). This step also includes determining which events should be skipped (because they are irrelevant, corrupted and the like) The raw data in question may be provided by the customer, third parties, or could be output from internal risk engines.

Doral Algorithm Requirements—Definitions.

The following definitions are provided:

Event:

An event is a basic unit of data and may be represented by a single line in a delimited file or an XML unit in an XML file. Examples of events would be "User JSMITH did a login from IP address 123.43.43.43 on May 14, 2010 at 16:44:35". In a data file, this is conceptualized as a collection of fields.

Field:

A field is the basic component of the event. Fields are separated by delimiters in delimited data, or are different XML units in the event unit of an XML file. For example the event described before might be represented in XML by:

```
<event>
    <username>JSMITH</username>
    <IPaddr>123.43.43.43</IPaddr>
    <acttype>login</acttype>
    <datetime>05/14/2010 16:44:35</datetime>
</event>
```

This event has four fields: username, IPaddr, acttype, and datetime.

```
<event>
    <username>MJONES</username>
    <IPaddr>144.3.22.12</IPaddr>
    <acttype>external transfer</acttype>
    <datetime>05/14/2010 17:32:42</datetime>
    <from_account>4231404423</from_account>
    <routing_number>323444123</routing_number>
    <to_account>1432455234<to_account>
</event>
```

This event has seven fields: username, IPaddr, acttype, datetime, from_account, routing_number, and to_account.

Model Entity:

A model entity represents the unit around which behavior is modeled. Originally, the model entity was always the online user. With the business banking model, this is generalized so that the company could be the model entity. Desired future capabilities require the consideration of other applications with other designations of the model entity such as IP reputation scoring (IP address), mule account detection (target account), and offline wire transfer scoring (source account).

Data Event vs. Conceptual Event:

For the purposes of this document, a data event refers to a line of text for delimited data, or an event XML object in XML data. A "conceptual event" refers to the real-world occurrence that the data represents. For example, if a user changes a password, this may be captured as one data event in a weblog data source, and as another data event in an audit log. Those are two different data events. However, they are the same conceptual event. As another example, consider Use Case A. The online data may indicate that an ACH batch has been sent in the absence of details. Later, the supporting file is transmitted with additional information about this event. In this way the same conceptual event manifests itself in two different data sources.

Doral Algorithm Requirements—Design.

Software can process any event stream with the following structure (See Appendix: Event Stream for an example):

- Each event is either a line of delimited data or an individual XML element.
- Each event contains a collection of fields. In delimited data, the fields are separated by the delimiter and are named according to a header. In XML data, the fields are named by the tags of elements inside the event element.
- The fields included may vary from event to event. (Fields such as "transfer amount" may not be included in an event such as "account summary"). Within an activity type, there may be variation in which fields are listed and which are not.
- A data element is chosen as the model entity. (Note: a data element is usually a single field, but in some cases may be located in different fields. For example, see below).
  - The model entity designates the "dimension" along which modeling occurs. For example, for retail banking, the model entity is the user. For business banking, the model entity is the company. Other applications are envisioned with other designations of the model entity such as IP reputation scoring (IP address), mule account detection (target account), and offline wire transfer scoring (source account).
  - The choice of a model entity means (roughly) that only previous events involving the same value of the model entity are relevant for scoring the current event.
  - The model entity may be present in every event. If it is not present, the event must be skipped or otherwise handled (see below).
  - Software may allow metadata-driven logic to determine, on an event-by-event basis, which field represents the model entity. For example, in a pilot account context, there is (hard-coded) logic which says (roughly) if field A="business", use field B as the model entity, otherwise use field C as the model entity.
  - In some cases, pre-processing may be required to accomplish a consistent model entity across different users. In Use Case A, for example, the online banking user (or company) may be the model entity. The ACH data will likely not contain this field. However, a look up table may link an account to an online user. Therefore a step will be employed by which the online user is appended to the ACH data via the lookup table.

A single model entity is envisioned for each instance of the RiskEngine. However, the same data may be fed to different instances of the RiskEngine. In that case, the instances of RiskEngine may be using each other's output. There is a timing issue involved in that one of the RiskEngines will invariably be processing an event "first" and therefore will not have access to what the other RiskEngine is learning from that same event. Alternatively, different models with different model entities may exist and interact within the same RiskEngine.

Software may allow a metadata-driven configuration to process multiple independent data streams with potentially different "arrival timing" (i.e. real-time vs. batch). For example, consider Use Case A. Possible solutions include:

- Multiple data streams with same arrival timing concatenated into a single time-ordered event stream. This is the simplest way of dealing with multiple data fields. However, it requires running at the speed of the slowest data source. So if one data source is only available in batch mode, the entire system would run in batch mode.
- Multiple data streams with different arrival fed into the same risk engine model (risk engine may receive data out of order). In this solution, the data is fed into the RiskEngine as it becomes available. This requires the models to perform reasonably well when scoring an event that has happened "in the past". When events come in time order, a strategy is used that keeps more details about the recent events in memory and "compress" the data about past events. In this scenario, there may be limitations on the richness of context when scoring an event from hours ago.
- Multiple data streams with different arrival fed into separate risk engines, but where one risk engine may utilize results of the other. One possible solution is to have one RiskEngine operating in real-time, scoring the online data, and a second RiskEngine operating in batch mode scoring the ACH data. However, when scoring the ACH transactions which occurred online, it is preferable to take into account the online data. This may be accomplished by having the output of the real-time risk engine be fed into the batch risk engine as another data source.

Software may allow the results of cross-institutional data to be utilized in the risk scoring process (in a real-time or near-real-time fashion). Consider Use Case B. Cross-institutional data is fed into one RiskEngine where target account is the model entity. This RiskEngine is able to score target accounts, and output data (in a variety of manners) when a recipient account is deemed risky. At the same time, each financial institution has its own RiskEngine scoring the same events (for their own users). Ideally, the information about the risky accounts from the cross-institutional model may be fed to the financial institution-specific RiskEngine so it can be factored into the risk scoring. The primary solution envisioned for this for the cross-institutional RiskEngine to write to an information repository when it sees a risky account. The financial institution RiskEngine has a risk component that makes transfers more risky if the target account is listed in the information repository.

The RiskEngine would not process the same data event more than once. In the event of out-of-order data, this is more difficult to achieve. Possible solutions include first, ensuring that the data stream fed into the risk engine contains no duplicate events (at least in the cases in which out-of-order data is permitted). In other words, customers would control this in their data sources. A second possible solution is to allow duplicate events within some (short but configurable) span of time, and have the RiskEngine maintain a checksum list to ensure it skips any duplicate event.

It is possible to have the same conceptual event in different data streams. However, it must be part of the modeling process in order to understand under what situations this may occur so it can be handled appropriately. For example, in the pilot account-Extended model, the internal and the pilot account login are (in some ways) the same conceptual event. Since this can be anticipated, there are a number of ways to address it (merging, interleaving and the like).

This configuration scheme may be equipped with logic to allow more sophisticated handling of different kinds of data anomalies, allowing "graceful degradation" in the face of missing data, poorly formatted data, corrupted data, and the like. Effectively, this means being able to be as accurate as possible when faced with data quality issues, and being robust so that a small data error will not have wide-ranging effects. Possible scenarios include:

The field "transfer amount" is expected to be a number, but instead contains a text string. This can be configured to be treated as zero or null, but still score the other aspects of that event.

Events from IP address 123.45.67.89 are from a background process that has nothing to do with user activity. These events can be configured to be skipped.

Occasionally, some events in a data source have a timestamp which is in a different time zone than the rest of the data. Though processing of this event may be handled poorly (since this event is "corrupted"), ideally such handling would not cause the skipping of a large number of other events.

As an example from a pilot account, the parsing of data using regular expressions is used in order to pick out certain fields. For example, if the raw data contains a field for the URL as in the following:
/common/Wire/WireMaintTemplate.asp?Action=Create&ID=20073&Status—I&FromPage=wireCreatePrereq.asp&GoToPage=wireManager.asp The ability to parse out the "Action", the ID, and perhaps do some logic is required in order to determine what event it should be mapped to. The data may come in the form of name-value pairs which are themselves contained in generic field names. The software is capable of reading the name-value pairs and performing logic to determine mapping.

A generic event representation handles these different situations, especially those outside of online banking. Currently the event representation is hard-coded to contain IP, UserAgent, Cookie, Session ID, Qualifier, Quantifier, and others, and is abstracted.

Doral Algorithm Requirements—Sessionization.

Sessionization refers to the process by which incoming events from the event stream are "grouped" together (into entities called sessions). It has not been determined whether the notion of a session is useful from a risk scoring point of view (their utility for display purposes is a separate question). The concepts of "in the same session" and "in a previous session" may be replaced by a more flexible notion of how far in the past a previous event took place.

While a session may appear to be a natural entity, in fact it may be difficult to identify. Most customers do not provide a reliable session ID and when they do, it often does not behave in an ideal fashion. For example, mistyped password events before a successful login attempt are typically not included in the same session. Without a session ID provided by the customer, relatively crude logic is employed to determine session boundaries. This typically results in many sessionization errors, which affect the performance of the risk scoring. Moreover, significant modeling and configuration effort is spent trying to minimize this problem.

Sessionization does have some advantages. It is a useful entity for display purposes. It serves as a functional unit one level above the individual events, and so provides a concise summary of these events. It also provides a basis for probability statements such as "what is the probability this user would do a wire". However, all of these can likely be replaced by more fluid notions such as considering the set of recent events and how long ago they took place. A session ID can be utilized in the logic of a risk calculation if desired, without explicitly dividing the event streams into different sessions. For most modeling purposes, the amount of time between events is more informative than whether or not they are in the same session.

The burdens of sessionization may outweigh any advantages. From a risk modeling point of view, it may be preferable to take a purely event-based approach. If session ID is sought and is provided in the data, logic can be developed in the risk components for use, which affords more flexibility than having explicit sessions. In many cases, such as concurrent sessions, the notion of session hampers the risk scoring, since events in one session may not be available to affect the risk scores in another session. If desired, a session can be utilized in some form for display purposes.

Doral Algorithm Requirements—Risk Computation.

Risk computation occurs by taking an event, evaluating the relevant information, and providing a final risk score for output.

Doral Algorithm Requirements—Definitions.

The following terms have the following meanings, and assume the model entity is a user. However all of the concepts below generalize to other choices of the model entity.

Risk Component:

A risk component is the name given to one of the many small computations which focus on a particular feature of the event and its surrounding context. One risk component may focus on the location of the user, another may assess the riskiness of the presence of a wire transfer activity, and still another may assess the additional risk accrued given that the wire approval occurred 15 minutes after the wire was initiated. The values output by the various risk components then go through another layer of computation to yield the final risk score. A risk component can be thought of as a function that takes as input the current event, summary statistics, context variables, model parameters, and information from an information repository.

Summary Statistic:

A summary statistic is stored information about the previous events for the same user. This is the essence of the behavioral modeling approach. The history of the user may be a factor in determining how risky this particular event is. Since it is not feasible to revisit every event of the user in the past to evaluate the current event, some way of storing and updating a compressed version of the user's history is sought. Specifically, only data that is relevant for the required computation is stored (this is known in statistics as a sufficient statistic). For example, to score the risk that a wire transfer occurred at this moment, it is important to know from the user's behavior how frequently the user sends wires. But it may be enough to know how many wires the user has sent, and how long the user has been a customer in order to perform the calculation. Exact dates and times of the previous wires are not required. Generally, the kind of information to be stored varies greatly depending on the kind of computation contemplated. For example, to score the risk based on the timing of a wire approval, required data might include the templates, recipients, and initiating users of all wires initiated in the last 24 hours. Some cases might require significant detail, but only in relation to the recent past. Negotiating the tradeoff between the efficiency cost of storing a significant amount of information and accuracy and sophistication of risk computation enabled by that information is the essence of computational statistics.

Context Variable:

A context variable is information from one risk component that may be relevant for the computation of another risk component. For example, whether a user is in a new location is relevant for evaluating the risk of being on a different computer (since users are much more likely to be on a new computer if they are travelling). It is similar to a summary statistic, except that it stores information about previous computations of the current event, whereas a summary statistic stores information about previous events.

Model Parameter:

A model parameter is a number used by a risk component which is consistent across all users and relatively static in time. Model parameters may be updated manually in response to changing conditions, or even updated automatically by some process.

Information Repository:

An information repository is a source of information that is applicable to all users which are expected to be more dynamic in time. It may store information provided by third parties or that is outputted from the analysis of cross-institutional data. The geo-location information and anonymous proxy data provided by Quova is an example of information repository data.

In evaluating a risk component for the timing of the wire approval, the following example is provided. In order to yield output VALUE1 for a wire approval within NUM_HOURS hours of the initiation and VALUE2 otherwise. VALUE1, VALUE2, and NUM_HOURS would be model parameters for this risk component. The relevant aspect of the history is the time of the template creation, so a summary statistic which captured the creation time of every wire template is sought. The event would provide the time, template name, recipient account, and event type (wire transfer). The function would be the logic to calculate the time since the template was created, compare it to NUM_HOURS, and output VALUE1 or VALUE2 as appropriate. A context variable would not be necessary in this case, but would be necessary in order to use different logic depending on whether the transaction came from a mobile device or not (where MOBILE or NORMAL would have been calculated by a different risk component). Similarly, use of information from the information repository would be valuable in order to check the recipient account against a list of suspected mule accounts, and account for that in the risk score.

Algorithm changes may take several forms, including modification of an existing risk component or addition of a new one. The changes may or may not require the tracking of new summary statistics. An existing risk component may be used in order to output a new context variable to be consumed by another risk component. It is likely that different software architectures will require different procedures depending on the kind of change required. The goal is to have as many different kinds of changes as possible be permitted with the least amount of overhead.

Doral Algorithm Requirements—Design.

Architecture may allow flexibility in the types of summary statistics it can store. Some examples include:

For every wire (in the last week e.g.), stored data include the reference number and the time it was sent, to which template, and the amount. This enables the connection of a wire send activity with the related wire approval.

For every wire approval, stored data includes a summary distribution of the time between the wire being sent and being approved. (Distribution is "quantized" in the same manner as quantifier bins).

In processing ACH files, stored data includes summary statistics about the ACH file name, ACH batch name, and recipient name. These summary statistics may include a list of different amounts received, a summary (quantized) distribution of the amounts, a list of different accounts used, statistics about dates and times. Similar to the preceding paragraph, stored data includes summary information about the file and the batch. This may include a list of checksums, a list of different amounts, a list of batch names included in the file, statistics about dates and times.

For every user created (in a business banking model), stored data includes the name and time of the user creation. This allows calculation of the time elapsed between a user being created and the user logging in for the first time.

Architecture may allow risk components, summary statistics, context variables, and model parameters to be added or modified without requiring schema changes or reprocessing of data. (Obviously, if reprocessing does not occur, the changes will only be effective going forward in time). Examples of risk components include scenarios such when it is intended to score the time elapsed between the initiation and approval of a wire transfer. When a wire has been observed to be approved, it is checked against a list of recent wires which have been sent (and which is stored as a summary statistic) in order to obtain the time elapsed. Then, a calculation is made of the "legitimate probability" of this amount of elapsed time. This requires summary statistics about the previous time intervals for this company/user. By taking the ratio of the fraud probability of that time interval (saved as a summary statistic) it is possible to determine the risk associated with this particular time interval.

Architecture may allow risk components, summary statistics, context variables and model parameters to be added or modified without requiring rebuilding of code. (e.g. algorithm is in metadata to whatever extent possible). Alternatively, the architecture may permit members of the algorithm team to create and implement new risk components and summary statistics without specific knowledge of the inner workings of the risk engine. Similarly, the architecture may permit an efficient process for implementing algorithm-based code changes without requiring a full release cycle.

Architecture may allow algorithm changes to be made without affecting the display. Specifically, when the Algorithms team is determining the best way to implement a customer model, they should not have to worry about whether it will change the display in an undesirable or unexpected way. Instead, a subsequent process may be employed for configuring the display that occurs after the Algorithms team has finished the modeling work. Having more separation in the architecture between the display and risk computation is advantageous.

Risk components may be "live" in the sense that they can be recomputed as new information arrives. This enables the handling of messy data from different sources and may not require that all the relevant information be received on a single event. This may be automated in the absence of sessions.

Architecture may allow testing of risk components in a configuration with minimal dependency on other components, databases and the like.

Doral Algorithm Requirements—Organizational Procedure.

Resources, tools, and documentation may be designated and created for the various steps in customer model configuration. These steps include: obtaining/verifying customer data; configuring the converter to turn one or more data sources into an event stream that contains all required information; determining the appropriate structure and format of risk components to do the risk calculations for the customer; setting the parameters for the risk calculations (to be as automated and data-driven as possible); testing and validating the accuracy of the risk calculations (including creating a process within the algorithms team, as well as providing the QA team with appropriate testing tools to validate model changes in the QA environment); determining the appropriate display elements and configuration for the customer; appropriately linking the display elements to the risk components; and validating the appropriateness of the display configuration.

Resources, tools, environments and procedures may be designated and created for the steps in adding and modifying risk components. These steps include: research/discovery of new features; implementation of new features for testing; validation of features in test environment; implementation of new features in production environment; QA process for new features in production environment; schedule/cycle of adding new features; and tracking and recording of changes to risk components, parameters, as well as the reasoning behind the changes.

Procedures may be designated to determine how disaster recovery will take place in a system which has had model changes in the past. It remains to be determined what conditions and to what extent an attempt is made to replicate the system as it existed before versus reprocessing the historical data with the new model.

Resources and procedures may be designated and created regarding responding to customer requests for enhancements and custom model features. These steps include: obtaining and verifying new data sources or changes to the existing data source, if applicable; modifying the converter to pass through the required information into the single data stream; adding and modifying risk component structure to do the enhanced risk calculation, if any; setting parameters for new risk components, and adjusting any others that may be impacted; testing and validating the accuracy of the new component and new model; adding/modifying display elements for the enhancement, if any; linking any new display elements to risk components, if applicable; and determining how to address the model change in historical record.

Appendix: Merging vs. Interleaving

| Pilot Account Log Data | | | |
|---|---|---|---|
| User | IP Address | Activity | Timestamp |
| SJONES | Mozilla(xxxxxx) | MFA Challenge | May 14, 2010 16:57:35 |
| SJONES | Mozilla(xxxxxx) | questions answered | May 14, 2010 16:57:55 |
| SJONES | Mozilla(xxxxxx) | computer enrolled | May 14, 2010 16:58:04 |
| SJONES | 67.89.43.21 | login authenticated | May 14, 2010 16:58:04 |
| SJONES | 67.89.43.21 | account summary | May 14, 2010 16:58:12 |
| SJONES | 67.89.43.21 | transfer | May 14, 2010 17:00:36 |
| SJONES | 67.89.43.21 | login authenticated | May 16, 2010 09:21:19 |
| SJONES | 67.89.43.21 | account summary | May 16, 2010 09:21:25 |
| SJONES | 67.89.43.21 | account history | May 16, 2010 09:21:52 |
| SJONES | 67.89.43.21 | account summary | May 19, 2010 08:47:21 |
| SJONES | 67.89.43.21 | transfer | May 19, 2010 08:47:43 |
| SJONES | 67.89.43.21 | login authenticated | May 21, 2010 10:23:29 |
| SJONES | 67.89.43.21 | account summary | May 21, 2010 10:24:02 |

| Beacon Data | | |
|---|---|---|
| Username | DateTime | UserAgent |
| SJONES | May 14, 2010 | 16:57:37 |
| SJONES | May 16, 2010 | 09:21:24 |
| SJONES | May 19, 2010 | 08:47:04 |

| Interleaved Data | | | | |
|---|---|---|---|---|
| User | IP Address | Activity | Timestamp | UserAgent |
| SJONES | | MFA Challenge | May 14, 2010 16:57:35 | |
| SJONES | | BEACON | May 14, 2010 16:57:37 | Mozilla(xxxxxx) |
| SJONES | | questions answered | May 14, 2010 16:57:55 | |
| SJONES | | computer enrolled | May 14, 2010 16:58:04 | |
| SJONES | 67.89.43.21 | login authenticated | May 14, 2010 16:58:04 | |
| SJONES | 67.89.43.21 | account summary | May 14, 2010 16:58:12 | |
| SJONES | 67.89.43.21 | transfer | May 14, 2010 17:00:36 | |
| SJONES | 67.89.43.21 | login authenticated | May 16, 2010 09:21:19 | |
| SJONES | | BEACON | May 16, 2010 09:21:24 | Mozilla(xxxxxx) |
| SJONES | 67.89.43.21 | account summary | May 16, 2010 09:21:25 | |

Interleaved Data

| User | IP Address | Activity | Timestamp | UserAgent |
|---|---|---|---|---|
| SJONES | 67.89.43.21 | account history | May 16, 2010 09:21:52 | |
| SJONES | | BEACON | May 19, 2010 08:47:04 | Mozilla(xxxxxx) |
| SJONES | 67.89.43.21 | account summary | May 19, 2010 08:47:21 | |
| SJONES | 67.89.43.21 | transfer | May 19, 2010 08:47:43 | |
| SJONES | 67.89.43.21 | login authenticated | May 21, 2010 10:23:29 | |
| SJONES | 67.89.43.21 | account summary | May 21, 2010 10:24:02 | |

Merged Data

| User | IP Address | Activity | Timestamp | UserAgent |
|---|---|---|---|---|
| SJONES | | MFA Challenge | May 14, 2010 16:57:35 | |
| SJONES | | questions answered | May 14, 2010 16:57:55 | |
| SJONES | | computer enrolled | May 14, 2010 16:58:04 | |
| SJONES | 67.89.43.21 | login authenticated | May 14, 2010 16:58:04 | Mozilla(xxxxxx) |
| SJONES | 67.89.43.21 | account summary | May 14, 2010 16:58:12 | |
| SJONES | 67.89.43.21 | transfer | May 14, 2010 17:00:36 | |
| SJONES | 67.89.43.21 | login authenticated | May 16, 2010 09:21:19 | Mozilla(xxxxxx) |
| SJONES | 67.89.43.21 | account summary | May 16, 2010 09:21:25 | |
| SJONES | 67.89.43.21 | account history | May 16, 2010 09:21:52 | |
| SJONES | 67.89.43.21 | account summary | May 19, 2010 08:47:21 | |
| SJONES | 67.89.43.21 | transfer | May 19, 2010 08:47:43 | |
| SJONES | 67.89.43.21 | login authenticated | May 21, 2010 10:23:29 | |
| SJONES | 67.89.43.21 | account summary | May 21, 2010 10:24:02 | |

Explanation of Merged Data:

Merging requires designating "login" events which an attempt is made to merge with internal events. A specification of a "time tolerance" is indicated to determine how far apart events can be in time and still be merged together. If an internal process does not find a counterpart in the pilot account log, it is assumed to be a "stray beacon" (which happens for a variety of reasons) and is discarded.

Appendix: Relevance of "Live" Risk Components.

The design may score events as they come in, and process whatever information is available. In other words, the design may score as much as possible with the available information. A more detailed example of this is given in the Appendix: Non-sessionized scoring (since this happens automatically if the notion of sessionization is omitted). Note that scoring events in this way also enables the easy use of the preceding interleaved data. Since the information is scored as received, there is no longer a need to rely on the merging process to ensure that all the relevant information is available in a single event. Furthermore, it enables real-time processing of multiple data feeds.

Appendix: Event Stream Example.

Note: data is tab-delimited for readability. In practice, pipe-delimited ("|") or XML would be used.

| User Account | IP Address | Activity | Timestamp | To |
|---|---|---|---|---|
| JSMITH | 123.43.43.43 | login | May 14, 2010 16:54:35 | |
| SJONES | 67.89.43.21 | login | May 14, 2010 16:57:35 | |
| SJONES | 67.89.43.21 | external transfer | May 14, 2010 16:57:58 | 523345555-9876543210 |
| DBROWN | 123.43.43.43 | login | May 14, 2010 17:03:35 | |
| DBROWN | 123.43.43.43 | external transfer | May 14, 2010 17:04:58 | 523345555-9876543210 |
| JSMITH | 159.67.3.32 | login | May 14, 2010 17:22:12 | |
| MJOHNSON | 129.37.3.102 | login | May 14, 2010 17:48:15 | |
| MJOHNSON | 129.37.3.102 | external transfer | May 14, 2010 18:02:11 | 523345555-9876543210 |
| JSMITH | 34.21.12.97 | login | May 14, 2010 18:44:25 | |
| KROSS | 123.43.43.43 | login | May 14, 2010 19:12:44 | |

Consider the event stream above. When the model entity is User, it is possible to model the probability (and risk) associated with JSMITH having logged in from 3 different IP addresses in a short amount of time. When the model entity is IP address, it is possible to model the risk associated with the IP address 123.43.43.43 and that it is seen on three different users. When the model entity is To Account, it is possible to model the risk associated with account 523345555-9876543210, and the fact that 3 different users have transferred money to that account in a brief period of time.

Appendix: Non-Sessionized Scoring.

| User | IP Address | Activity | Timestamp |
|---|---|---|---|
| JSMITH | 123.43.43.43 | login | May 14, 2010 16:44:35 |
| JSMITH | 123.43.43.43 | account summary | May 14, 2010 16:44:52 |
| JSMITH | 123.43.43.43 | change password | May 14, 2010 16:45:32 |
| JSMITH | 123.43.43.43 | view check image | May 14, 2010 16:46:26 |
| JSMITH | 123.43.43.43 | login | May 14, 2010 16:53:04 |
| JSMITH | 123.43.43.43 | external transfer | May 14, 2010 16:55:15 |

Without sessionization, each risk component has a time-decay profile in the logic (e.g. risk for activities last six hours, with no regard for whether it is the "same session" or a "different session", or get "reset" under certain conditions such as change in IP address and the like).

| LocRisk | ChgPwdRisk | XFRRisk | ChkImgRisk | Total | |
|---|---|---|---|---|---|
| 4 | 0 | 0 | 0 | 4 | (login) |
| 4 | 0 | 0 | 0 | 4 | (account summary) |
| 4 | 1 | 0 | 0 | 5 | (change password) |
| 4 | 1 | 0 | 1 | 6 | (view check image) |
| 4 | 1 | 0 | 1 | 6 | (login) |
| 4 | 1 | 2 | 1 | 8 | (external transfer) |

In this way, the risk is more properly thought of as the "risk of the user at this time" rather than "the risk of the session" or "the risk of the event"

The Third Party Data Sources of FraudMAP

Fraud Intelligence Data Warehouse.

Summary.

This summary provides a high-level functional specification for a third-party data repository. Once a high level design is agreed upon, the next step will be to create a detailed design for specific use cases.

Goals:

To provide a source for fraud intelligence data from third parties, a fraud intelligence data warehouse, that can be utilized by multiple proprietary tools, services, and applications. Specific goals are: to provide a central repository and focal point for all fraud intelligence data, independent of platform or product; to perform complex queries efficiently; to provide analytical tools, such as data mining, reporting, and direct querying; and to function without interfering with production applications Use Cases:

Create Data Structure for Each Source.

Each data source may focus on one or more aspects of fraud (IP addresses, account numbers, etc.) and as a result will contain different data elements. Access to some data sources may be tenant specific. The repository should: provide a data structure specific to each source of data to support all incoming data elements; preserve all records in each data source; and provide access at a tenant level.

Support Automated Methods of Collecting Data.

Data sources may provide automated transmission methods. The repository is intended to address the following tasks: support SFTP via push or pull; support CSV and delimited (tab, pipe and the like) formats; and track the source of each file and the date submitted.

Support Manual Entries by Internal Personnel.

Some data sources currently are manually downloaded. Additionally, internal staff may become aware of intelligence to contribute, e.g. through a call with a client, and should be able to enter records directly. The repository is intended to address the following tasks: support uploading of files for a data source; support CSV and tab delimited formats; support adding manual entries; support editing/removing manual entries (in the case of errors); and track internal staff performing file upload and manual entries.

Consume Data from Tenant Reported Fraud.

FraudMAP Online may allow tenants to mark cases as fraud. Data elements in these cases could be consumed by the repository where it could be used as indicators of fraud across other tenants and/or shared out to third-party sources if desired. The repository is intended to collect available data elements from tenant reported fraud, including IP address, user agent string, destination account information, date of occurrence, modified profile information, e.g. email address, phone number and other elements of interest.

Consume and Integrate with Other Internal Data Sources.

There are other internal data sources that contain information which could be used for fraud intelligence. The solution will be enhanced to collect several technical data elements that can be used for device fingerprinting and indication of compromise of a computer. Additionally, the IP Blacklist (IPBL) proposal being developed internally will contain suspicious IP addresses that would indicate a heightened degree of risk if seen within tenant data. This is similar in functionality to what IP address categorization table would be. The repository should consume beacon data as a data source and integrate with the IPBL either as a data source or as part of the repository itself (the IPBL could realistically become a broader scope internal process within the repository)

Provide Query Interface.

The repository can serve as a research tool. Being able to query on specific attributes can enhance link analysis activities of internal personnel. Access to data in the repository would be best facilitated by a query interface. The interface would enable authorized personnel to query records on one or more specific attributes. Some of these attributes are date or range of dates, IP addresses, email addresses, account numbers, RTN numbers, user agent strings, internal data elements, reporting source and malware information.

The query interface may also enable the execution of logical queries (AND, OR, NOT) and wildcard searching (*windows*) across multiple search criteria. For example:

IP address=192.168.0.1 OR 192.168.0.2 AND User agent=NOT*windows*

Expose Intelligence Data to FraudMAP Applications.

The true value of a fraud intelligence data warehouse is utilizing the data in the FraudMAP applications (Online, ACH, Mobile, Wire, and API). This would enable tenants and FraudDESK personnel to properly vet and respond to fraud intelligence data in near real time. There are multiple ways this data could be used. Some of these include informational notification—Transfer to potential mule account, risk factors—Login from IP address confirmed associated with fraud, direct tenant notification—Compromised user credentials, and feed to the IPDB—suspicious IP addresses reported by third party sources.

Provide Data Mining/Exception Reporting Capability.

Along with integrating fraud intelligence data into FraudMAP applications, providing the capability to mine data on the back end would be valuable for identifying suspicious activity. This capability is similar to and could branch off of the monitoring capability proposed in the IPBL proposal or the suspicious accounts (mule) reports. The high level work flow would be as follows: on a periodic basis, specific fraud intelligence data (e.g. known fraudulent accounts) would be queried against tenant data, matches would be collected and output as exception reports, and personnel would vet the results and notify tenants of potential fraudulent activity.

Feedback for Fraud Intelligence Records to Confirmed Fraud.

When fraud intelligence leads to identifying fraud within FraudMAP products, it may be possible to mark that data. Taken into context of Use Case G. this would imply a bi-directional communication between the repository and FraudMAP applications. In other words, FraudMAP applications would pull intelligence from the repository and push back validated hits on that data. For example, if an IP address identified by NCFTA data is confirmed to an account takeover in a tenant session, there needs to be an interface so that can be fed back to the repository as confirmed fraud. This is a logical lead in to the following use case, which focuses on a method for sharing that data back to the respective source it came from.

Provide Outbound Intelligence Sharing.

Part of the benefit of third-party intelligence data is being able to reciprocate the sharing of data from confirmed frauds. A current process for sharing is a manual process through the FraudDESK. Automating the process would make sharing more efficient and would require less Fraud-DESK resources. Additionally, exposing an automated process for sharing to tenants would allow them to contribute while remaining in control of what they want to share. By vetting and correlating a known fraud with data from a third party source the repository should allow authorized personnel and tenants to select relevant data fields to share, automatically select source the data came from to share, select other data sources to share, package the data into the incoming format that is consumable by the data sources, transmit the data to all selected sources and track submissions.

Provide Tracking and Performance Metrics.

In order to know what sources are producing actionable results the repository should be capable of tracking activity and reporting performance metrics. Exactly how this will be implemented may be explored in more detail to ensure that the repository is tracking relevant data to report on. At a minimum, the repository should be able to track when a record from a data source links to confirmed fraud in tenant data and be able to produce trending reports on relationship.

Direct Data Service.

One option for utilizing data in the repository is to provide it directly to tenants without integrating into a specific FraudMAP product or application. This would enable tenants to select the types of data they are interested in and allow them to vet and use it according to their own processes. The advantage of this method is that the repository would provide the data to a tenant but would leave the application of the data to the tenant itself. In this respect, the repository would serve as a conduit for the intelligence data. FraudXchange would be a good fit for a delivery mechanism in this context.

Data Categorization.

Each feed may contain certain data elements that can be used for analytics or data mining activity. Some feeds contain multiple useful elements. Likewise, some elements are present in multiple feeds. Categorizing these elements may assist in organizing the data from all feeds into a structure that can be used for analysis that is not dependent on the source. These categories are, but not limited to account information (routing number/account number, SWIFT/IBAN numbers, prepaid card numbers), IP addresses (suspicious, confirmed fraudulent activity, or known compromised computers), compromised credentials, email addresses, phone numbers and physical addresses.

Categorizing data in this manner will enable the aggregation of data elements from multiple feeds into one normalized data source that can be used by the risk engine, data mining, direct querying, or other internal processes without needing to understand the format of each data source. In theory, this will enable new data sources to come online in the future without modification of the processes consuming the data.

Sources of Third-Party Data.

There are many third parties offering threat data feeds. The types of threat intelligence in these feeds vary widely. For the purposes of the fraud intelligence data warehouse, data that relates to online or offline fraud is the most valuable. These data feeds include the following focus areas:

Internal data—data from FraudMAP products applied across tenants

Active botnet activity—focused on financially motivated malware

Suspicious accounts—Known mules and/or used in confirmed fraud (origination or destination)

Compromised credentials—specifically for online banking platforms

Prepaid card accounts—growing destination for cashing out

Additionally, sources of malware intelligence will be evaluated. These sources may provide intelligence such as automated activity sequences, platform/tenant specific targeting and indicators that can be used to identify compromised computers.

Third-Party Data Description.

A summary of the data of interest that should be present in a third-party data feed that contains information about the data categories listed previously is as follows: Suspicious Accounts—source, data reported, account holder name, company name, address, email, phone number, bank RTN number, bank account number, bank, SWIFT/IBAN, debit/credit card number, amount attempted, data occurred, transaction date/time, distinct destination accounts, distinct source accounts; Suspicious IP Addresses—source, date reported, IP address, user agent string, URL, domain; Compromised Credentials—source, date reported, user login ID, IP address, geolocation information, login domain, date compromised, malware name; Malware Data—source, date reported, infection date, Malware name/family, Malware severity, exploit URL, download URL, command and control URL, drop server URL. This is not an exhaustive list, but details the most critical data fields known of currently to obtain intelligence that the data warehouse can act upon.

Aspects of the FPS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the FPS include: microcontrollers with memory (such as electronically erasable programmable read only memory (EEPROM)), embedded microprocessors, firmware, software, etc. Furthermore, aspects of the FPS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the FPS is not intended to be exhaustive or to limit the systems and methods to the precise forms disclosed. While specific embodiments of, and examples for, the FPS are described herein for illustrative purposes, various equivalent modifications are possible within the scope of the systems and methods, as those skilled in the relevant art will recognize. The teachings of the FPS provided herein can be applied to other systems and methods, not only for the systems and methods described above.

The elements and acts of the various embodiments described above can be combined to provide further embodiments. These and other changes can be made to the FPS in light of the above detailed description.

In general, in the following claims, the terms used should not be construed to limit the FPS to the specific embodiments disclosed in the specification and the claims, but should be construed to include all systems that operate under the claims. Accordingly, the FPS is not limited by the disclosure, but instead the scope of the FPS is to be determined entirely by the claims.

While certain aspects of the FPS are presented below in certain claim forms, the inventors contemplate the various aspects of the FPS in any number of claim forms. Accordingly, the inventors reserve the right to add additional claims after filing the application to pursue such additional claim forms for other aspects of the FPS.

The embodiments described herein include additional components as described in detail below.

What is claimed is:

1. A system comprising:
    a platform comprising a processor coupled to at least one database;
    a plurality of risk engines coupled to the platform, the plurality of risk engines receiving event data and risk data from a plurality of data sources that includes at least one financial application, wherein the event data comprises actual observable parameters corresponding to actions taken in a target account by an owner of the target account during electronic access of the target account during an online session on a web browser, wherein the risk data comprises actual observable parameters corresponding to actions taken in a plurality of accounts different from the target account by at least one user other than the owner of the target account, wherein the plurality of risk engines uses the event data and the risk data to dynamically generate an account model that corresponds to the target account and comprises probabilistic relationships between the event data and the risk data, wherein the plurality of risk engines dynamically update the account model using event data of a future event occurring during the online session or during a future online session in the target account, wherein the plurality of risk engines generate a prediction during the future event with use of the account model, wherein said generated prediction predicts whether the owner of the target account is perpetuating the future event during the online session or during a future online session; and
    a risk application coupled to the platform and comprising an analytical user interface that displays for the actions in the target account at least one of the generated prediction and the event data of any event in the target account,
    wherein the actual observable parameters comprise at least one of: an operating system, a browser type, an IP address, HTTP data, and page views relating to an online session.

2. The system of claim 1, wherein the analytical user interface displays a plurality of columns representing at least one event conducted in the account and at least one risk row representing risk of the at least one event based on the generated prediction such that an intersection region defined by an intersection of the risk row with at least one of the plurality of columns corresponds to a risk score of the at least one event corresponding to the column.

3. The system of claim 2, wherein the intersection region comprises color coding relating the risk score to at least one event.

4. A method comprising:
    receiving at a plurality of risk engines event data and risk data from a plurality of data sources that includes at least one financial application, wherein the event data comprises actual observable parameters corresponding to actions taken in a target account by an owner of the target account during electronic access of the target account during an online session on a web browser, wherein the risk data comprises actual observable parameters corresponding to actions taken in a plurality of accounts different from the target account by at least one user other than the owner of the target account;
    dynamically generating by the plurality of risk engines an account model that corresponds to the target account, wherein the generating comprises generating probabilistic relationships between the event data and the risk data;
    dynamically updating by the plurality of risk engines the account model using event data of a future event occurring during the online session or during a future online session in the target account;
    generating a prediction by the plurality of risk engines during the future event with the account model, wherein the generated prediction predicts whether the owner of the target account is perpetuating the future event during the online session or during a future online session; and presenting an analytical user interface, by a risk application coupled to a platform comprising a processor coupled to at least one database, that displays for the actions in the target account at least one of the generated prediction and the event data of any event in the target account, wherein the actual observable parameters comprise at least one of: an operating system, a browser type, an IP address, HTTP data, and page views relating to an online session.

5. The method of claim 4, wherein the analytical user interface displays a plurality of columns representing at least one event conducted in the target account and at least one risk row representing risk of the at least one event based on the generated prediction such that an intersection region defined by an intersection of the risk row with at least one of the plurality of columns corresponds to a risk score of the at least one event corresponding to the column.

6. The method of claim 5, wherein the intersection region comprises color coding relating the risk score to at least one event.

\* \* \* \* \*